United States Patent
Hutchinson et al.

(10) Patent No.: US 7,303,387 B2
(45) Date of Patent: Dec. 4, 2007

(54) SYSTEM FOR CONTROLLING MOLD TEMPERATURES

(75) Inventors: Gerald A. Hutchinson, Coto de Caza, CA (US); Robert A. Lee, Bowdon Cheshire (GB); Heinrich K. Feichtinger, Hinteregg (CH)

(73) Assignee: Advanced Plastics Technologies Luxembourg S.A., Luxembourg (LU)

( * ) Notice: Subject to any disclaimer, the term of this patent is extended or adjusted under 35 U.S.C. 154(b) by 317 days.

(21) Appl. No.: 11/149,984

(22) Filed: Jun. 10, 2005

(65) Prior Publication Data

US 2006/0051451 A1 Mar. 9, 2006

Related U.S. Application Data

(60) Provisional application No. 60/654,554, filed on Feb. 18, 2005, provisional application No. 60/578,501, filed on Jun. 10, 2004.

(51) Int. Cl.
B29C 45/73 (2006.01)
(52) U.S. Cl. .................. 425/547; 425/552; 425/577
(58) Field of Classification Search ............... 425/547, 425/552, 577
See application file for complete search history.

(56) References Cited

U.S. PATENT DOCUMENTS

| | | |
|---|---|---|
| 2,708,288 A | 5/1955 | Fuller et al. |
| 3,224,043 A | 12/1965 | Lameris et al. |
| 3,305,528 A | 2/1967 | Wynstra et al. |
| 3,317,471 A | 5/1967 | Johnson et al. |
| 3,395,118 A | 7/1968 | Reining et al. |
| 3,418,398 A | 12/1968 | Seefluth |
| 3,430,680 A | 3/1969 | Leghorn |
| 3,482,284 A | 12/1969 | Rees |
| 3,632,267 A | 1/1972 | Kader |
| 3,719,735 A | 3/1973 | Valyi |
| 3,740,181 A | 6/1973 | Uhlig |
| 3,813,198 A | 5/1974 | Valyi |
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis |
| 3,882,213 A | 5/1975 | Uhlig |

(Continued)

FOREIGN PATENT DOCUMENTS

CA 1 174 020 9/1984

(Continued)

OTHER PUBLICATIONS

PCT International Search Report (ISR) for International Application No. PCT/US2005/020744 (published as WO 2005/123357), which claims priority to same U.S. Provisional Applications as the present application; ISR published on May 11, 2006.

(Continued)

*Primary Examiner*—Tim Heitbrink
(74) *Attorney, Agent, or Firm*—Knobbe Martens Olson & Bear, LLP

(57) ABSTRACT

Disclosed is a preferred mold design for producing plastic, molded preforms, which may be blow-molded into a container of a final, desired shape. A preferred mold includes a temperature control system for maintaining the preform mold at a desired temperature. The temperature control system can pass fluid through channels within the preform mold to cool plastic that is injected into the preform mold. In some arrangements, a mold comprises a neck finish mold, the neck finish mold comprising high heat transfer material positioned to transfer heat away from melt within a mold cavity of the mold.

54 Claims, 46 Drawing Sheets

U.S. PATENT DOCUMENTS

| | | |
|---|---|---|
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,108,956 A | 8/1978 | Lee |
| 4,116,606 A | 9/1978 | Valyi |
| 4,145,392 A | 3/1979 | Valyi |
| 4,149,645 A | 4/1979 | Valyi |
| 4,150,079 A | 4/1979 | Chang |
| 4,151,247 A | 4/1979 | Hafele |
| 4,151,248 A | 4/1979 | Valyi |
| 4,177,238 A | 12/1979 | Allen |
| 4,208,177 A * | 6/1980 | Allen .................... 425/552 |
| 4,213,751 A | 7/1980 | Fernandez |
| 4,302,415 A * | 11/1981 | Lake .................... 264/554 |
| 4,323,341 A | 4/1982 | Valyi |
| 4,347,199 A * | 8/1982 | Speier et al. ............ 264/15 |
| 4,357,288 A | 11/1982 | Oas et al. |
| 4,357,296 A | 11/1982 | Hafele |
| 4,375,947 A | 3/1983 | Marcus |
| 4,376,090 A | 3/1983 | Marcus |
| 4,378,963 A | 4/1983 | Schouenberg |
| 4,403,090 A | 9/1983 | Smith |
| 4,438,254 A | 3/1984 | Doorakian et al. |
| 4,451,224 A | 5/1984 | Harding |
| 4,480,082 A | 10/1984 | Mc Lean et al. |
| 4,515,836 A | 5/1985 | Cobbs et al. |
| 4,528,219 A | 7/1985 | Yamada et al. |
| 4,538,542 A | 9/1985 | Kennon et al. |
| 4,540,541 A | 9/1985 | Harding |
| 4,540,543 A | 9/1985 | Thomas et al. |
| 4,560,741 A | 12/1985 | Davis et al. |
| 4,564,541 A | 1/1986 | Taira et al. |
| 4,569,869 A | 2/1986 | Kushida et al. |
| 4,573,596 A | 3/1986 | Slat |
| 4,578,295 A | 3/1986 | Jabarin |
| 4,587,073 A | 5/1986 | Jakobsen |
| 4,590,021 A | 5/1986 | Ota et al. |
| 4,604,044 A | 8/1986 | Hafele |
| 4,604,258 A | 8/1986 | Valyi |
| 4,615,925 A | 10/1986 | Nilsson |
| 4,623,497 A | 11/1986 | Waters |
| 4,646,925 A | 3/1987 | Nohara |
| 4,647,648 A | 3/1987 | Silvis et al. |
| 4,680,001 A * | 7/1987 | Waters .................... 425/552 |
| 4,690,789 A | 9/1987 | Ritchie et al. |
| 4,698,013 A | 10/1987 | Butcher |
| 4,699,809 A | 10/1987 | Maruhashi et al. |
| 4,715,504 A | 12/1987 | Chang et al. |
| 4,717,521 A | 1/1988 | Border et al. |
| 4,741,936 A | 5/1988 | Nohara et al. |
| 4,755,404 A | 7/1988 | Collette |
| 4,818,575 A | 4/1989 | Hirata et al. |
| 4,830,811 A | 5/1989 | Aoki |
| 4,844,987 A | 7/1989 | Hirose et al. |
| 4,847,129 A | 7/1989 | Collette et al. |
| 4,867,664 A | 9/1989 | Fukuhara |
| 4,871,410 A | 10/1989 | Bonnebat et al. |
| 4,871,507 A | 10/1989 | Ajmera et al. |
| 4,937,130 A | 6/1990 | Clagett et al. |
| 4,940,616 A | 7/1990 | Yatsu et al. |
| 4,955,804 A | 9/1990 | Martell et al. |
| 4,956,143 A | 9/1990 | McFarlane |
| 4,980,211 A | 12/1990 | Kushida |
| 5,006,381 A | 4/1991 | Nugent, Jr. et al. |
| 5,071,340 A | 12/1991 | LaBianca |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,188,787 A | 2/1993 | King et al. |
| 5,202,074 A | 4/1993 | Schrenk et al. |
| 5,219,593 A | 6/1993 | Schmidt et al. |
| 5,246,751 A | 9/1993 | White et al. |
| 5,275,853 A | 1/1994 | Silvis et al. |
| RE34,537 E | 2/1994 | Dyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,352,401 A | 10/1994 | Dalgewicz, III et al. |
| 5,354,532 A | 10/1994 | Nakai et al. |
| 5,376,317 A | 12/1994 | Maus et al. |
| 5,411,698 A | 5/1995 | Mero et al. |
| 5,443,378 A | 8/1995 | Jaroschek et al. |
| 5,443,766 A | 8/1995 | Slat et al. |
| 5,460,761 A | 10/1995 | Larsson |
| 5,464,106 A | 11/1995 | Slat et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,508,076 A | 4/1996 | Bright |
| 5,509,965 A | 4/1996 | Harry et al. |
| 5,516,470 A | 5/1996 | Larsson |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,628,950 A | 5/1997 | Schrenk et al. |
| 5,628,957 A | 5/1997 | Collette et al. |
| 5,639,848 A | 6/1997 | Nugent, Jr. et al. |
| 5,645,183 A | 7/1997 | Slat et al. |
| 5,651,933 A | 7/1997 | Slat et al. |
| 5,652,034 A | 7/1997 | Seiner |
| 5,653,907 A | 8/1997 | Kendall et al. |
| 5,676,267 A | 10/1997 | Slat et al. |
| 5,688,570 A | 11/1997 | Ruttinger |
| 5,688,572 A | 11/1997 | Slat et al. |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,804,305 A | 9/1998 | Slat et al. |
| 5,834,078 A | 11/1998 | Cavitt et al. |
| 5,837,339 A | 11/1998 | Wood et al. |
| 5,851,471 A | 12/1998 | Schloss et al. |
| 5,879,727 A | 3/1999 | Puri |
| 5,894,023 A | 4/1999 | Schramm et al. |
| 5,902,541 A | 5/1999 | Imai et al. |
| 5,906,285 A | 5/1999 | Slat |
| 5,906,787 A | 5/1999 | Plester |
| 5,914,138 A | 6/1999 | Swenson |
| 5,927,525 A | 7/1999 | Darr et al. |
| 5,968,620 A | 10/1999 | Harvey et al. |
| 5,971,742 A | 10/1999 | McCollum et al. |
| 5,972,445 A | 10/1999 | Kimura et al. |
| 5,989,661 A | 11/1999 | Krishnakumar et al. |
| 6,051,294 A | 4/2000 | White et al. |
| 6,068,900 A | 5/2000 | Kohn et al. |
| 6,090,460 A | 7/2000 | Collette et al. |
| 6,123,211 A | 9/2000 | Rashid et al. |
| 6,136,354 A | 10/2000 | Wood et al. |

| | | | | | | |
|---|---|---|---|---|---|---|
| 6,168,740 | B1 | 1/2001 | Koch et al. | EP | 0 160 984 | 2/1989 |
| 6,180,715 | B1 | 1/2001 | Schmidt | EP | 0 302 117 | 2/1989 |
| 6,194,043 | B1 | 2/2001 | Fehn | EP | 0 304 059 | 2/1989 |
| 6,196,830 | B1 | 3/2001 | Foltuz et al. | EP | 0 095 909 | 4/1989 |
| 6,257,867 | B1 | 7/2001 | McCollum et al. | EP | 0 171 161 | 6/1989 |
| 6,276,656 | B1 | 8/2001 | Baresich | EP | 0 180 191 | 7/1989 |
| 6,312,628 | B1 | 11/2001 | Wieder et al. | EP | 0 325 030 | 7/1989 |
| 6,312,641 | B1 | 11/2001 | Hutchinson | EP | 0 176 229 | 10/1989 |
| 6,315,549 | B1 | 11/2001 | Jenko et al. | EP | 0 153 894 | 1/1990 |
| 6,319,574 | B1 | 11/2001 | Slat | EP | 0 350 745 | 1/1990 |
| 6,352,426 | B1 | 3/2002 | Hutchinson et al. | EP | 0 351 118 | 1/1990 |
| 6,365,247 | B1 | 4/2002 | Cahill et al. | EP | 0 368 278 | 5/1990 |
| 6,372,318 | B1 | 4/2002 | Collette et al. | EP | 0 092 979 | 8/1990 |
| 6,391,408 | B1 | 5/2002 | Hutchinson | EP | 0 118 226 | 10/1990 |
| 6,413,075 | B1 | 7/2002 | Koch et al. | EP | 0 395 237 | 10/1990 |
| 6,428,305 | B2 | 8/2002 | Jenko | EP | 0 215 630 | 9/1991 |
| 6,428,737 | B1 | 8/2002 | Collette et al. | EP | 0 153 120 | 12/1991 |
| 6,461,697 | B1 | 10/2002 | Slat et al. | EP | 0 462 455 | 12/1991 |
| 6,471,503 | B1 | 10/2002 | Priest et al. | EP | 0 278 403 | 1/1992 |
| 6,485,804 | B1 | 11/2002 | Makamachi et al. | EP | 0 491 650 | 6/1992 |
| 6,524,672 | B1 | 2/2003 | Slat et al. | EP | 0 518 703 | 12/1992 |
| 6,533,571 | B2 | 3/2003 | Fikani | EP | 0 544 545 | 6/1993 |
| 6,676,883 | B2 | 1/2004 | Hutchinson et al. | EP | 0 199 633 | 7/1993 |
| 6,808,820 | B2 | 10/2004 | Lee et al. | EP | 0 555 976 | 8/1993 |
| 6,939,591 | B2 | 9/2005 | Hutchinson et al. | EP | 0 571 116 | 11/1993 |
| 2001/0030163 | A1 | 10/2001 | Rashid et al. | EP | 0 306 675 | 12/1993 |
| 2002/0001686 | A1 | 1/2002 | Kashiba et al. | EP | 0 581 970 | 2/1994 |
| 2002/0014722 | A1 | 2/2002 | Baresich | EP | 0 583 953 | 2/1994 |
| 2002/0028870 | A1 | 3/2002 | Lan et al. | EP | 0 387 614 | 6/1994 |
| 2002/0048682 | A1 | 4/2002 | Subramanian et al. | EP | 0 376 469 | 3/1995 |
| 2002/0061371 | A1 | 5/2002 | Schmidt et al. | EP | 0 212 339 | 8/1995 |
| 2002/0090473 | A1 | 7/2002 | Lee et al. | EP | 0 671 251 | 9/1995 |
| 2002/0155236 | A1 | 10/2002 | Cahill et al. | EP | 0 678 554 | 10/1995 |
| 2003/0001315 | A1 | 1/2003 | Hutchinson et al. | EP | 0 689 933 | 1/1996 |
| 2003/0012904 | A1 | 1/2003 | Hutchinson et al. | EP | 0 341 044 | 9/1996 |
| 2003/0031814 | A1 | 2/2003 | Hutchinson et al. | EP | 0 524 572 | 10/1996 |
| 2003/0039779 | A1 | 2/2003 | Share et al. | EP | 0 744 263 | 11/1996 |
| 2003/0219555 | A1 | 11/2003 | Hutchinson et al. | EP | 0 756 931 | 2/1997 |
| 2004/0013833 | A1 | 1/2004 | Lee et al. | EP | 0 767 049 | 4/1997 |
| 2004/0071885 | A1 | 4/2004 | Hutchinson et al. | EP | 0 774 491 | 5/1997 |
| 2004/0151937 | A1 | 8/2004 | Hutchinson et al. | EP | 0 653 982 | 9/1997 |
| 2004/0247735 | A1 | 12/2004 | Hutchinson et al. | EP | 0 794 007 | 9/1997 |
| 2005/0053739 | A1 | 3/2005 | Lee et al. | EP | 0 822 213 | 2/1998 |
| | | | | EP | 0 894 604 | 2/1999 |
| | | FOREIGN PATENT DOCUMENTS | | EP | 0 964 031 | 12/1999 |
| | | | | EP | 0 837 763 | 12/2001 |
| DE | | 298620 | 8/1925 | FR | 2538297 | 6/1984 |
| DE | | 21 08 774 | 9/1971 | GB | 1 482 956 | 8/1977 |
| DE | | 26 49 640 | 5/1978 | GB | 2011309 | 7/1979 |
| DE | | 30 44 930 | 10/1981 | JP | 55-37335 | 3/1980 |
| DE | | 3407060 | 4/1986 | JP | 57-93126 | 6/1982 |
| DE | | 35 18 441 | 3/1987 | JP | 58-92536 | 6/1983 |
| DE | | 35 18 875 | 11/1989 | JP | 58-173634 | 10/1983 |
| DE | | 31 214 20 | 3/1990 | JP | 58-215309 | 12/1983 |
| DE | | 31 214 21 | 8/1990 | JP | 61-002519 | 1/1986 |
| DE | | 19640662 | 3/1998 | JP | 61-185417 | 8/1986 |
| EP | | 0 019 438 | 11/1980 | JP | 04-074620 | 3/1992 |
| EP | | 0 073 151 | 3/1983 | JP | 04-197634 | 7/1992 |
| EP | | 0 099 727 | 2/1984 | JP | 07-156349 | 6/1995 |
| EP | | 0 100 375 | 2/1984 | JP | 08-281892 | 10/1996 |
| EP | | 0 125 107 | 11/1984 | JP | 09-296056 | 11/1997 |
| EP | | 0 126 575 | 11/1984 | JP | 10-128839 | 5/1998 |
| EP | | 0 174 265 | 3/1986 | JP | 11-090975 | 4/1999 |
| EP | | 0 191 701 | 8/1986 | JP | 2001-106219 | 4/2001 |
| EP | | 0 096 581 | 9/1986 | JP | 2003-103324 | 4/2003 |
| EP | | 0 203 630 | 12/1986 | WO | WO 87/02680 | 5/1987 |
| EP | | 0 105 826 | 3/1987 | WO | WO 87/05276 | 9/1987 |
| EP | | 0 218 245 | 4/1987 | WO | WO 89/08556 | 9/1989 |
| EP | | 0 156 085 | 7/1987 | WO | WO 90/07553 | 7/1990 |
| EP | | 0 225 049 | 2/1988 | WO | WO 92/01558 | 2/1992 |
| EP | | 0 266 900 | 5/1988 | WO | WO 93/01988 | 2/1993 |
| EP | | 0 280 736 | 9/1988 | WO | WO 93/07068 | 4/1993 |
| EP | | 0 287 839 | 10/1988 | WO | WO 93/25835 | 12/1993 |

| | | |
|---|---|---|
| WO | WO 94/01268 | 1/1994 |
| WO | WO 94/19186 | 9/1994 |
| WO | WO 94/25366 | 11/1994 |
| WO | WO 95/00325 | 1/1995 |
| WO | WO 95/06680 | 3/1995 |
| WO | WO 95/07219 | 3/1995 |
| WO | WO 95/18002 | 7/1995 |
| WO | WO 95/22451 | 8/1995 |
| WO | WO 95/29805 | 11/1995 |
| WO | WO 95/34425 | 12/1995 |
| WO | WO 96/18685 | 6/1996 |
| WO | WO 96/20074 | 7/1996 |
| WO | WO 96/33062 | 10/1996 |
| WO | WO 96/35571 | 11/1996 |
| WO | WO 97/02939 | 1/1997 |
| WO | WO 97/09366 | 3/1997 |
| WO | WO 97/15420 | 5/1997 |
| WO | WO 97/26127 | 7/1997 |
| WO | WO 97/28218 | 8/1997 |
| WO | WO 97/31050 | 8/1997 |
| WO | WO 97/34758 | 9/1997 |
| WO | WO 97/40972 | 11/1997 |
| WO | WO 97/40981 | 11/1997 |
| WO | WO 97/42250 | 11/1997 |
| WO | WO 97/43182 | 11/1997 |
| WO | WO 97/44174 | 11/1997 |
| WO | WO 97/47695 | 12/1997 |
| WO | WO 98/02479 | 1/1998 |
| WO | WO 98/17470 | 4/1998 |
| WO | WO 98/21730 | 5/1998 |
| WO | WO 98/25746 | 6/1998 |
| WO | WO 98/46410 | 10/1998 |
| WO | WO 99/20462 | 4/1999 |
| WO | WO 99/43563 | 9/1999 |
| WO | WO 99/61514 | 12/1999 |
| WO | WO 00/62998 | 10/2000 |
| WO | WO 01/83193 | 11/2001 |
| WO | WO 02/20246 | 3/2002 |
| WO | WO 2004/043675 | 5/2004 |

OTHER PUBLICATIONS

Proceedings of 3$^{rd}$ International Conference on Rigid Polyester Packaging Innovations for Food and Beverages; Nova-Pak Americas '98; Jan. 26-27, 1998.

White et al.; "High-Barrier Structural Thermoplastics Based on Diglycidyl Ethers"; Polymer Science; vol. 34(1); 1993; pp. 904-905.

"Mitsui B-010:Gas Barrier Polyester"; Chemical Data Sheet; Mitsui Chemicals, Inc.; Feb. 1, 1998.

The Condensed Chemical Dictionary, 1981, p. 65.

Yukihiko Suematsu; Growth Prospects & Challenges for Pet in Asia/Japan: A Producer's Perspective, date unknown.

PCT International Search Report: mailed Jan. 28, 2002 for International Application No. PCT/US 01/28128, Filed on Sep. 5, 2001.

"Konzepte Fuer Die Werkzeugtemperierung Eine Uebersicht Mit Erfahrungen Aus Der Praxis" Dunststoffe, Carl Hanser Verlag, Munchen, DE, vol. 92, No. 11, Nov. 2002, pp. 28-36, XP001121639 ISSN: 0023-5563 p. 30, col. 3, last paragraph p. 31, col. 3 paragraph 1.

PCT International Search Report: mailed Mar. 30, 2004 for International Application No. PCT/US 03/35949, Filed Nov. 10, 2003.

"Tool Steel Recommendations for Injection Molds Designed for Processing Geon Vinyl Compounds," Technical Service Report, No. 12; Apr. 1996.

* cited by examiner

SYSTEM FOR CONTROLLING MOLD TEMPERATURES

RELATED APPLICATIONS

This application claims the priority benefit under 35 U.S.C. § 119(e) of the provisional application 60/578,501, filed Jun. 10, 2004, and 60/654,554, filed Feb. 18, 2005, which are hereby incorporated by reference in their entireties.

BACKGROUND OF THE INVENTIONS

1. Field of the Inventions

The inventions relate to molds for producing articles. More specifically, these inventions relate to methods and systems for controlling mold temperatures.

2. Description of the Related Art

The use of plastic containers as a replacement for glass or metal containers in the packaging of beverages has become increasingly popular. The advantages of plastic packaging include lighter weight, decreased breakage as compared to glass, and potentially lower costs. The most common plastic used in making beverage containers today is PET. Virgin PET has been approved by the FDA for use in contact with foodstuffs. Containers made of PET are transparent, thin-walled, lightweight, and have the ability to maintain their shape by withstanding the force exerted on the walls of the container by pressurized contents, such as carbonated beverages. PET resins are also fairly inexpensive and easy to process.

Most PET bottles are made by a process that includes the blow-molding of plastic preforms, which have been made by processes including injection and compression molding. For example, in order to increase the through-put of an injection molding machine, and thereby decrease the cost of each individual preform, it is desirable to reduce the cycle time for each injection and cooling cycle. However, the injected preform must cool sufficiently to maintain its molded dimensions before it is removed from the injection mold. Therefore, it would be desirable to utilize a cooling system that can rapidly cool the injected preform. Typically, the temperature of the mold is controlled by pumping cooled water through passages which are within the mold. The temperature of the mold is thus controlled by the temperature of the water flowing through the water passages. The water typically flows continuously throughout the molding operation and may cause condensation to form on the mold. For example, when the mold is cooled by utilizing chilled water, the moisture in the air surrounding the mold can condense, thereby forming condensation on the molding surfaces. The condensation may interfere with the molding operation by reducing preform production and decreasing preform quality. As a result, the potential of mold cooling systems has not been realized.

SUMMARY OF THE INVENTIONS

In some embodiments, a mold is configured to mold an article. The mold can have a mold cavity for receiving and molding moldable material. The mold can be configured to mold a single article or a plurality of articles.

In one embodiment, an injection mold comprises a core section having a core surface and a cavity section having a cavity surface. The injection mold further comprises a plurality of fluid channels proximate to the cavity surface and a valve proximate to the cavity surface. The valve is configured to allow fluid to flow into the fluid channels while causing a pressure drop of the fluid across the valve to cool the cavity surface as the fluid passes through the fluid channels and cools the cavity surface.

In some embodiments, a mold comprises a cavity section and a core section. The core section is configured to mate with the cavity section to form a mold cavity and comprises a core that defines an internal surface of the mold cavity. The core is configured to receive refrigerant to control the temperature of the core. In some embodiments, at least a portion of the refrigerant is vaporized within the core. In some embodiments, at least a portion of the refrigerant is vaporized within the core by passing through one or more pressure reducing elements positioned within the core.

In some embodiments, a mold temperature control assembly comprises a cavity section and a core section. The core section is configured to mate with the cavity section to form a mold cavity and comprises a core that defines an internal surface of the mold cavity. A tube within the core extends from the proximal end of the core to an expansion valve at the distal end of the core. The expansion valve is configured to receive fluid that comprises substantially liquid from the tube and is configured to deliver fluid comprising substantially gas to a channel within the core. In some embodiments, gas is at a temperature less than temperature of the internal surface of the mold cavity.

In another embodiment, a mold temperature control assembly comprises a cavity section, a plurality of fluid channels, and a valve system. The cavity section defines a cavity surface. The plurality of fluid channels surrounds a portion of the cavity surface, and a portion of the fluid channels is within the cavity section. The valve system is located upstream of the fluid channels and is configured to receive fluid at a first temperature and deliver the fluid at a second temperature, which is less than the first temperature, to the fluid channels to cool the cavity surface. In some embodiments, the valve system comprises a single pressure reducing element. In some embodiments, the valve system comprises a plurality of pressure reducing elements.

In one embodiment, a method of controlling the temperature of a mold comprises providing a core section having a core mold surface and a cavity section having a cavity mold surface and channels. Fluid is delivered at a first temperature to a valve system within the cavity section, the valve system outputs the fluid at a second temperature, which is less than the first temperature and the temperature of the cavity mold surface, to the channels to cool the cavity mold surface. In some embodiments, the valve system comprises one or more pressure reducing elements.

In some embodiments, a mold is configured to mold an article. In some embodiments, the mold is configured to produce preforms, containers, trays, closures, and the like. In some embodiments, the mold comprises a temperature control element configured to affect the temperature of the mold. The temperature control element can comprise one or more of the following: fluid passageways, channels, temperature control rod (e.g., heating/cooling rods), and heater (e.g., resistance heater). The mold can be an intrusion mold, compression mold, blow mold, injection mold, or other type of molding system for forming articles. In some embodiments, the blow mold can be a stretch blow mold for stretch blow molding a preform. In some embodiments, the blow mold can be an extrusion blow mold.

In some embodiments, a mold comprises a core section that has a core surface. A cavity section has a cavity surface. A mold cavity is defined by the core section and the cavity section when the mold is in a closed position. In some embodiments, a temperature control element, such as a fluid channel, is disposed within one of the core section and the cavity section. A pressure reducing device is configured to receive and vaporize at least a portion of a refrigerant. In some embodiments, the pressure reducing device is in fluid communication with the fluid channel. The one of the core section and the cavity section comprises high heat transfer material. The high heat transfer material is positioned between the fluid channel and the mold cavity. In some embodiments, the mold does not comprise high heat transfer material.

In some embodiments, a molding system comprises a first mold section and a second mold section movable between an open position and a closed position. A mold cavity is defined between the first mold section and the second mold section when the first mold section and the second mold section occupy the closed position. At least one of the first mold section and the second mold section comprises high heat transfer material and at least one fluid channel. A fluid source is in fluid communication with the at least one fluid channel. The fluid source contains a working fluid (e.g., a refrigerant). A pressure reducing element is in fluid communication with the at least one fluid channel and the fluid source. The pressure reducing element is configured to reduce a pressure of the refrigerant from the fluid source to a second pressure equal to or less than a vaporization pressure of the refrigerant. In some embodiments, the molding system comprises a plurality of pressure reducing elements.

In some embodiments, one or more temperature sensors are interposed between a molding surface of a mold and at least temperature control element of the mold. In some embodiments, one or more temperature sensors are positioned somewhat proximate to the mold surface. The temperature sensors can accurately measure the temperature of the mold. In some embodiments, a controller is in communication with the temperature sensor. The controller can be configured to selectively control the operation of a valve (e.g., a pressure reducing element) in response to a signal from the temperature sensor. In some embodiments, a mold has a plurality of temperature sensors. The sensors can be positioned at various locations within the material forming the mold.

In some embodiments, a mold for molding an article comprises a cavity section and a core section. The core section is configured to mate with the cavity section to form a mold cavity. The core section comprises a core that defines an internal surface of the mold cavity. A tube is disposed within the core. The tube extends from a proximal end of the core to a pressure reducing valve at a distal end of the core. The pressure reducing valve is configured to receive fluid from the tube and to deliver at least partially vaporized fluid to a channel within the core. The partially vaporized fluid in the core is at a temperature less than a temperature of the internal surface of the mold cavity when melt fills the mold cavity.

In some embodiments, a mold assembly comprises a core section and a cavity section. The cavity section defines a cavity surface that is configured to mold at least a portion of an article. The cavity section cooperates with the core section to form a space. A plurality of fluid channels surrounds a portion of the cavity surface. The plurality of fluid channels is positioned within a portion of the cavity section and has a high thermal conductivity. A valve system is located upstream of the fluid channels. The valve system receives fluid at a first temperature and delivers the fluid at a second temperature, which is less than the first temperature, to the plurality of fluid channels. In some embodiments, the fluid is a cryogenic fluid. In some embodiments, the cryogenic refrigerant is a high temperature range cryogenic fluid. In some embodiments, the cryogenic refrigerant is a mid temperature range cryogenic. In some embodiments, the cryogenic refrigerant is a low temperature range cryogenic fluid.

In some embodiments, a mold is configured to utilize a working fluid. In some embodiments, the working fluid is a refrigerant. In some embodiments, the working fluid is a cryogenic fluid. In some embodiments, the fluid is a cryogenic fluid. In some embodiments, the cryogenic refrigerant is a high temperature range cryogenic fluid. In some embodiments, the cryogenic refrigerant is a mid temperature range cryogenic. In some embodiments, the cryogenic refrigerant is a low temperature range cryogenic fluid.

In some embodiments, a method of controlling the temperature of a mold for molding a preform comprises providing a core section having a core mold surface. A cavity section having a cavity mold surface and fluid channels is provided. A refrigerant is delivered at a first temperature to a valve system. The valve system outputs the refrigerant at a second temperature, which is less than the first temperature and a temperature of the cavity mold surface. The refrigerant is passed from the valve system through at least one of the cavity section and the core section to reduce the temperature of polymer material disposed between the core mold surface and the cavity mold surface. In some embodiments, the polymer material is in the shape of a preform or closure.

In some embodiments, a molding system comprises a first mold section and a second mold section movable between an open position and a closed position. A mold cavity is defined between the first mold section and the second mold section when the first mold section and the second mold section occupy the closed position. The mold cavity has a shape of a preform. A neck finish mold is interposed between the first mold section and the second mold section. The neck finish mold has a neck molding surface configured to mold a portion of melt disposed in the mold cavity. The neck finish mold comprises high heat transfer material and a temperature control element configured to selectively control the temperature of the neck molding surface. In some embodiments, the high heat transfer material is positioned between the neck molding surface and the temperature control element. At least a portion of the temperature control element may or may not be embedded in the high heat transfer material.

In some embodiments, a neck finish mold is configured to mold at least a potion of an article. In some embodiments, the neck finish mold comprises a high heat transfer material. The high heat transfer material may or may not form a molding surface that can engage melt injected into a cavity of a mold. In some embodiments, the neck finish mold is a split ring movable between two or more positions. In some embodiments, the neck finish mold comprises a temperature control element, such as one or more fluid passageways, heat/cooling rods.

In some embodiments, a mold temperature control system comprises a first mold section and a second mold section movable between an open position and a closed position. A mold cavity is defined between the first mold section and the second mold section when the first mold section and the second mold section occupy the closed position. A means for passing a refrigerant through at least one of the first mold section and the second mold section for controlling the temperature of moldable material is positioned within the mold cavity. A means for vaporizing at least a portion of the refrigerant that subsequently passes through the means for passing the refrigerant is provided. A means for delivering the refrigerant to the means for vaporizing at least the portion of the refrigerant is provided.

In some embodiments, a method for making a preform comprises providing a cavity mold half and a core mold half. The cavity mold half and the core mold half define a space in the shape of a preform. A first material is deposited into the space. A sufficient amount of refrigerant to reduce the temperature of the refrigerant is vaporized. The refrigerant is circulated within one of the cavity mold half and the core mold half to cool the first material to form a preform. In some embodiments, the method further comprises removing the preform from the cavity mold half. The preform is placed into a second cavity mold half. A second material is injected through a gate of the second cavity mold half into a second space defined by the second cavity mold half and the preform to form a multilayer preform. A second fluid is circulated through at least one of the second cavity mold half and the core mold half to cool a multilayer preform.

In some embodiments, a preform comprises a body comprising a wall and an end cap portion. The wall has a dimensionally stable outer layer suitable for demolding the preform and an interior portion adjacent the outer layer that comprises soft warm polymer material. A neck portion is connected to the body. In some embodiments, the interior portion is positioned between the dimensionally stable outer layer and a second dimensionally stable outer layer. The outer layers form an exterior surface and an interior surface of the preform. In some embodiments, the heat from the preform is transferred through high heat transfer material and to a refrigerant. The refrigerant can comprise cryogenic fluid. In some embodiments, the preform has an eggshell finish.

In some embodiments, a mold apparatus comprises high heat transfer material. In some embodiments, the high heat transfer material has a thermal conductivity greater than the thermal conductivity of iron. In some embodiments, the high heat transfer material has a thermal conductivity selected from one of a thermal conductivity greater than the thermal conductivity of iron, a thermal conductivity at least two times greater than the thermal conductivity of iron, a thermal conductivity at least three times greater than the thermal conductivity of iron, and a thermal conductivity at least four times greater than the thermal conductivity of iron. In some embodiments, the high heat transfer material has a thermal conductivity selected from one of a thermal conductivity greater than the thermal conductivity of iron and less than two times the thermal conductivity of iron, a thermal conductivity at least two times greater than the thermal conductivity of iron and less than three times the thermal conductivity of iron, a thermal conductivity at least three times greater than the thermal conductivity of iron and less than four times the thermal conductivity of iron, and a thermal conductivity at least four times greater than the thermal conductivity of iron. In some embodiments, the high heat transfer material comprises hardened copper alloy.

In some embodiments, molding systems can utilize highly conductive alloys and refrigerants. The combination of high heat transfer materials and refrigerants can provide efficient cooling, or heating, and can minimize cycle time. The high heat transfer materials and refrigerants can be used to rapidly cool molded articles in the mold. The combination of high heat transfer materials and refrigerants can provide efficient and rapid heating of the mold, especially when the mold surfaces are at a low temperature. For example, the mold surfaces can be at a low temperature at the end of a cooling cycle. In some embodiments, the mold surfaces can be warmed so that melt can spread easily through a mold cavity of the mold.

In some embodiments, a mold is configured to mold an article. At least a portion of the article can have a hardened outer surface. The outer surface can be in the form of a somewhat eggshell like layer. In some embodiments, substantially the entire exterior surface and/or interior surface of an article comprise a hardened outer surface. The interior portions of the articles can be warm and soft when the preform is demolded.

In some embodiments, a mold can have one or more mold cavities configured to receive moldable material. The mold can have one or more of the following: a core, a cavity section, a gate insert, and a neck finish mold. These components can be heated or cooled by employing a working fluid. The working fluid can be a refrigerant. The working fluid can be used to cool a moldable material positioned within the mold. When the molded article is removed, the working fluid can preheat the mold surfaces so that moldable material, such as a molten polymer, can spread easily through the mold cavity.

BRIEF DESCRIPTION OF THE DRAWINGS

FIGS. 9A-9L are schematic illustrations of temperature control systems;

DETAILED DESCRIPTION OF THE PREFERRED EMBODIMENT

Figure 1:
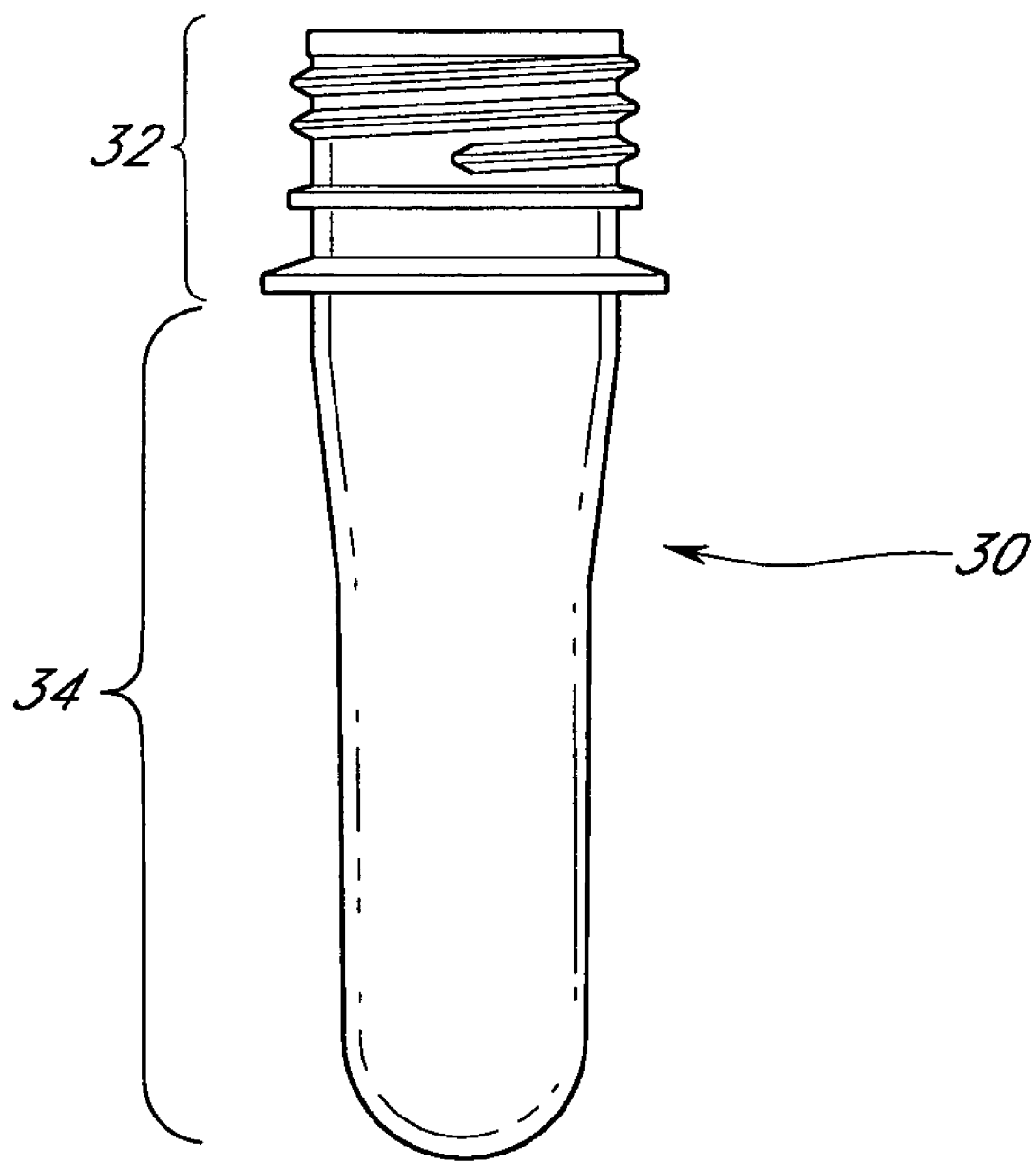
FIG. 1 is a preform as is used as a starting material for making a molded container.

All patents and publications mentioned herein are hereby incorporated by reference in their entireties. Except as further described herein, certain embodiments, features, systems, devices, materials, methods and techniques described herein may, in some embodiments, be similar to any one or more of the embodiments, features, systems, devices, materials, methods and techniques described in U.S. Pat. Nos. 6,109,006; 6,808,820; 6,528,546; 6,312,641; 6,391,408; 6,352,426; 6,676,883; U.S. patent application Ser. No. 09/745,013 (Publication No. 2002-0100566); Ser. No. 10/168,496 (Publication No. 2003-0220036); Ser. No. 09/844,820 (2003-0031814); Ser. No. 10/090,471 (Publication No. 2003-0012904); Ser. No. 10/395,899 (Publication No. 2004-0013833); Ser. No. 10/614,731 (Publication No. 2004-0071885), provisional application 60/563,021, filed Apr. 16, 2004, provisional application 60/575,231, filed May 28, 2004, provisional application 60/586,399, filed Jul. 7, 2004, provisional application 60/620,160, filed Oct. 18, 2004, provisional application 60/621,511, filed Oct. 22, 2004, and provisional application 60/643,008, filed Jan. 11, 2005, U.S. patent application Ser. No. 11/108,342 entitled MONO AND MULTI-LAYER ARTICLES AND COMPRESSION METHODS OF MAKING THE SAME, filed on Apr. 18, 2005, U.S. patent application Ser. No. 11/108,345 entitled MONO AND MULTI-LAYER ARTICLES AND INJECTION METHODS OF MAKING THE SAME, filed on Apr. 18, 2005, U.S. patent application Ser. No. 11/108,607 entitled MONO AND MULTI-LAYER ARTICLES AND EXTRUSION METHODS OF MAKING THE SAME, filed on Apr. 18, 2005, which are hereby incorporated by reference in their entireties. In addition, the embodiments, features, systems, devices, materials, methods and techniques described herein may, in certain embodiments, be applied to or used in connection with any one or more of the embodiments, features, systems, devices, materials, methods and techniques disclosed in the above-mentioned patents and applications.

A. Detailed Description of Some Preferred Materials

1. General Description of Preferred Materials

The articles described herein may be described specifically in relation to a particular material, such as polyethylene terephthalate (PET) or polypropylene (PP), but preferred methods are applicable to many other thermoplastics, including those of the of the polyester and polyolefin types. Other suitable materials include, but are not limited to, foam materials, various polymers and thermosets, thermoplastic materials such as polyesters, polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylenedimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate.

As used herein, the term "polyethylene terephthalate glycol" (PETG) refers to a copolymer of PET wherein an additional comonomer, cyclohexane di-methanol (CHDM), is added in significant amounts (e.g. approximately 40% or more by weight) to the PET mixture. In one embodiment, preferred PETG material is essentially amorphous. Suitable PETG materials may be purchased from various sources. One suitable source is Voridian, a division of Eastman Chemical Company. Other PET copolymers include CHDM at lower levels such that the resulting material remains crystallizable or semi-crystalline. One example of PET copolymer containing low levels of CHDM is Voridian 9921 resin.

In some embodiments polymers that have been grafted or modified may be used. In one embodiment polypropylene or other polymers may be grafted or modified with polar groups including, but not limited to, maleic anhydride, glycidyl methacrylate, acryl methacrylate and/or similar compounds to improve adhesion. In other embodiments polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Clarified polypropylene may be purchased from various sources such as Dow Chemical Co. Alternatively, nucleation inhibitors may be added to polypropylene. One suitable source of nucleation inhibitor additives is Schulman.

Optionally, the materials may comprise microstructures such as microlayers, microspheres, and combinations thereof. In certain embodiments preferred materials may be virgin, pre-consumer, post-consumer, regrind, recycled, and/or combinations thereof.

As used herein, "PET" includes, but is not limited to, modified PET as well as PET blended with other materials. One example of a modified PET is "high IPA PET" or IPA-modified PET, which refer to PET in which the IPA content is preferably more than about 2% by weight, including about 2-10% IPA by weight, also including about 5-10% IPA by weight. PET can be virgin, pre or post-consumer, recycled, or regrind PET, PET copolymers and combinations thereof.

In embodiments of preferred methods and processes one or more layers may comprise barrier layers, UV protection layers, oxygen scavenging layers, oxygen barrier layers, carbon dioxide scavenging layers, carbon dioxide barrier layers, and other layers as needed for the particular application. As used herein, the terms "barrier material," "barrier resin," and the like are broad terms and are used in their ordinary sense and refer, without limitation, to materials which, when used in preferred methods and processes, have a lower permeability to oxygen and carbon dioxide than the one or more of the layers. As used herein, the terms "UV protection" and the like are broad terms and are used in their ordinary sense and refer, without limitation, to materials which have a higher UV absorption rate than one or more layers of the article. As used herein, the terms "oxygen scavenging" and the like are broad terms and are used in their ordinary sense and refer, without limitation, to materials which have a higher oxygen absorption rate than one or more layers of the article. As used herein, the terms "oxygen barrier" and the like are broad terms and are used in their ordinary sense and refer, without limitation, to materials which are passive or active in nature and slow the transmission of oxygen into and/or out of an article. As used herein, the terms "carbon dioxide scavenging" and the like are broad terms and are used in their ordinary sense and refer, without limitation, to materials which have a higher carbon dioxide absorption rate than one or more layers of the article. As used herein, the terms "carbon dioxide barrier" and the like are broad terms and are used in their ordinary sense and refer, without limitation, to materials which are passive or active in nature and slow the transmission of carbon dioxide into and/or out of an article. Without wishing to be bound to any theory, applicants believe that in applications wherein a carbonated product, e.g. a soft-drink beverage, contained in an article is over-carbonated, the inclusion of a carbon dioxide scavenger in one or more layers of the article allows the excess carbonation to saturate the layer which contains the carbon dioxide scavenger. Therefore, as carbon dioxide escapes to the atmosphere from the article it first leaves the article layer rather than the product contained therein. As used herein, the terms "crosslink," "crosslinked," and the like are broad terms and are used in their ordinary sense and refer, without limitation, to materials and coatings which vary in degree from a very small degree of crosslinking up to and including fully cross linked materials such as a thermoset epoxy. The degree of crosslinking can be adjusted to provide the appropriate degree of chemical or mechanical abuse resistance for the particular circumstances. As used herein, the term "tie material" is a broad term and is used in its ordinary sense and refers, without limitation, to a gas, liquid, or suspension comprising a material that aids in binding two materials together physically and/or chemically, including but not limited to adhesives, surface modification agents, reactive materials, and the like.

2. Preferred Materials

In a preferred embodiment materials comprise thermoplastic materials. A further preferred embodiment includes "Phenoxy-Type Thermoplastics." Phenoxy-Type Thermoplastics, as that term is used herein, include a wide variety of materials including those discussed in WO 99/20462. In one embodiment, materials comprise thermoplastic epoxy resins (TPEs), a subset of Phenoxy-Type Thermoplastics. A further subset of Phenoxy-Type Thermoplastics, and thermoplastic materials, are preferred hydroxy-phenoxyether polymers, of which polyhydroxyaminoether copolymers (PHAE) is a further preferred material. See for example, U.S. Pat. Nos. 6,455,116; 6,180,715; 6,011,111; 5,834,078; 5,814,373; 5,464,924; and 5,275,853; see also PCT Application Nos. WO 99/48962; WO 99/12995; WO 98/29491; and WO 98/14498. In some embodiments, PHAEs are TPEs.

Preferably, the Phenoxy-Type Thermoplastics used in preferred embodiments comprise one of the following types:
(1) hydroxy-functional poly(amide ethers) having repeating units represented by any one of the Formulae Ia, Ib or Ic:

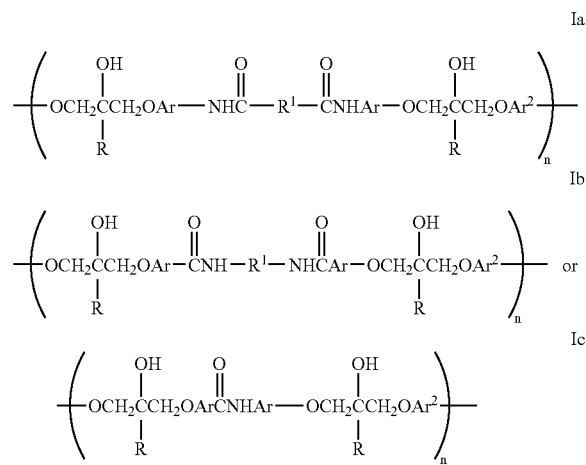

(2) poly(hydroxy amide ethers) having repeating units represented independently by any one of the Formulae IIa, IIb or IIc:

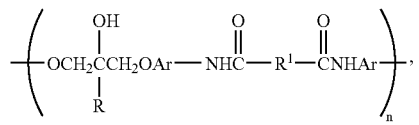
IIa

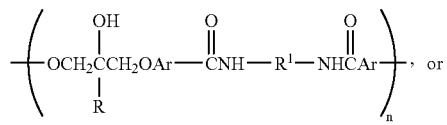
IIb, or

-continued

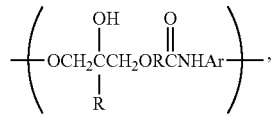
IIc (3) amide- and hydroxymethyl-functionalized polyethers having repeating units represented by Formula III:

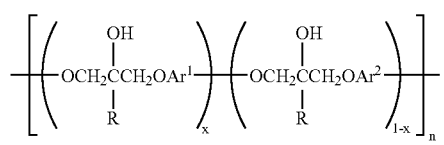
III (4) hydroxy-functional polyethers having repeating units represented by Formula IV:

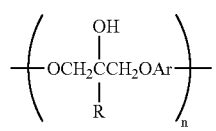
(IV)

(5) hydroxy-functional poly(ether sulfonamides) having repeating units represented by Formulae Va or Vb:

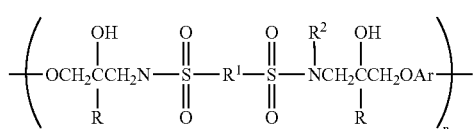
Va

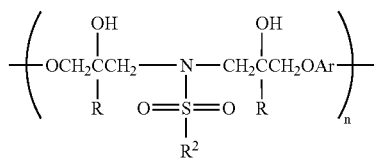
Vb (6) poly(hydroxy ester ethers) having repeating units represented by Formula VI:

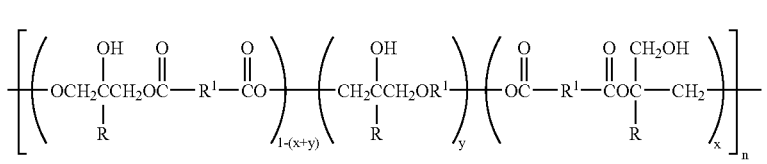
VI (7) hydroxy-phenoxyether polymers having repeating units represented by Formula VII:

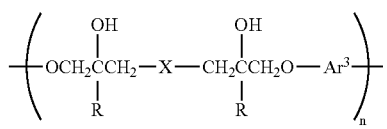
VII and (8) poly(hydroxyamino ethers) having repeating units represented by Formula VIII:

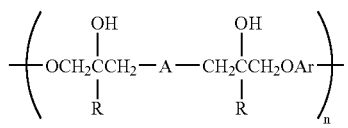
VIII wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

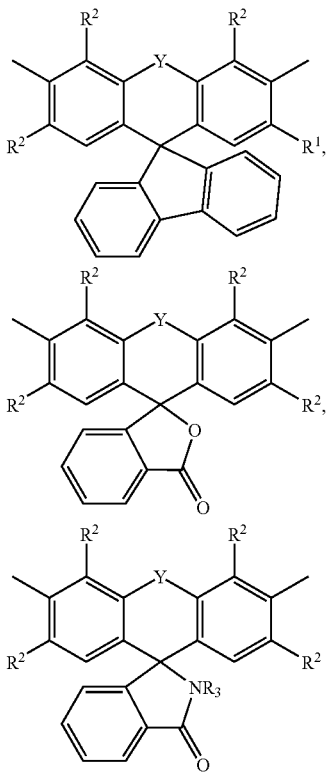

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido)alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl) fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853. For example, polyhydroxyaminoether copolymers can be made from resorcinol diglycidyl ether, hydroquinone diglycidyl ether, bisphenol A diglycidyl ether, or mixtures thereof.

The hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety. One preferred non-limiting hydroxy-phenoxyether polymer, PAPHEN 25068-38-6, is commercially available from Phenoxy Associates, Inc. Other preferred phenoxy resins are available from InChem® (Rock Hill, S.C.), these materials include, but are not limited to, the INCHEMREZ™ PKHH and PKHW product lines.

Generally, preferred phenoxy-type materials form stable aqueous based solutions or dispersions. Preferably, the properties of the solutions/dispersions are not adversely affected by contact with water. Preferred materials range from about 10% solids to about 50% solids, including about 15%, 20%, 25%, 30%, 35%, 40% and 45%, and ranges encompassing such percentages. Preferably, the material used dissolves or disperses in polar solvents. These polar solvents include, but are not limited to, water, alcohols, and glycol ethers. See, for example, U.S. Pat. Nos. 6,455,116, 6,180,715, and 5,834,078 which describe some preferred phenoxy-type solutions and/or dispersions.

One preferred phenoxy-type material is a polyhydroxyaminoether copolymer (PHAE), represented by Formula VIII, dispersion or solution. The dispersion or solution, when applied to a container or preform, greatly reduces the permeation rate of a variety of gases through the container walls in a predictable and well known manner. One dispersion or latex made thereof comprises 10-30 percent solids. A PHAE solution/dispersion may be prepared by stirring or otherwise agitating the PHAE in a solution of water with an organic acid, preferably acetic or phosphoric acid, but also including lactic, malic, citric, or glycolic acid and/or mixtures thereof. These PHAE solution/dispersions also include organic acid salts produced by the reaction of the polyhydroxyaminoethers with these acids.

In other preferred embodiments, phenoxy-type thermoplastics are mixed or blended with other materials using methods known to those of skill in the art. In some embodiments a compatibilizer may be added to the blend. When compatibilizers are used, preferably one or more properties of the blends are improved, such properties including, but not limited to, color, haze, and adhesion between a layer comprising a blend and other layers. One preferred blend comprises one or more phenoxy-type thermoplastics and one or more polyolefins. A preferred polyolefin comprises polypropylene. In one embodiment polypropylene or other polyolefins may be grafted or modified with a polar molecule or monomer, including, but not limited to, maleic anhydride, glycidyl methacrylate, acryl methacrylate and/or similar compounds to increase compatibility.

The following PHAE solutions or dispersions are examples of suitable phenoxy-type solutions or dispersions which may be used if one or more layers of resin are applied as a liquid such as by dip, flow, or spray coating, such as described in WO 04/004929 and U.S. Pat. No. 6,676,883. One suitable material is BLOX® experimental barrier resin, for example XU-19061.00 made with phosphoric acid manufactured by Dow Chemical Corporation. This particular PHAE dispersion is said to have the following typical characteristics: 30% percent solids, a specific gravity of 1.30, a pH of 4, a viscosity of 24 centipoise (Brookfield, 60 rpm, LVI, 22° C.), and a particle size of between 1,400 and 1,800 angstroms. Other suitable materials include BLOX® 588-29 resins based on resorcinol have also provided superior results as a barrier material. This particular dispersion is said to have the following typical characteristics: 30% percent solids, a specific gravity of 1.2, a pH of 4.0, a viscosity of 20 centipoise (Brookfield, 60 rpm, LVI, 22° C.), and a particle size of between 1500 and 2000 angstroms. Other variations of the polyhydroxyaminoether chemistry may prove useful such as crystalline versions based on hydroquinone diglycidylethers. Other suitable materials include polyhydroxyaminoether solutions/dispersions by Imperial Chemical Industries ("ICI," Ohio, USA) available under the name OXYBLOK. In one embodiment, PHAE solutions or dispersions can be crosslinked partially (semi-cross linked), fully, or to the exact desired degree as appropriate for the application by adding an appropriate cross linker material. The benefits of cross linking include, but are not limited to, one or more of the following: improved chemical resistance, improved abrasion resistance, low blushing, low surface tension. Examples of cross linker materials include, but are not limited to, formaldehyde, acetaldehyde or other members of the aldehyde family of materials. Suitable cross linkers can also enable changes to the $T_g$ of the material, which can facilitate formation of specific containers. Other suitable materials include BLOX® 5000 resin dispersion intermediate, BLOX® XUR 588-29, BLOX® 0000 and 4000 series resins. The solvents used to dissolve these materials include, but are not limited to, polar solvents such as alcohols, water, glycol ethers or blends thereof. Other suitable materials include, but are not limited to, BLOX® R1.

In one embodiment, preferred phenoxy-type thermoplastics are soluble in aqueous acid. A polymer solution/dispersion may be prepared by stirring or otherwise agitating the thermoplastic epoxy in a solution of water with an organic acid, preferably acetic or phosphoric acid, but also including lactic, malic, citric, or glycolic acid and/or mixtures thereof. In a preferred embodiment, the acid concentration in the polymer solution is preferably in the range of about 5%-20%, including about 5%-10% by weight based on total weight. In other preferred embodiments, the acid concentration may be below about 5% or above about 20%; and may vary depending on factors such as the type of polymer and its molecular weight. In other preferred embodiments, the acid concentration ranges from about 2.5 to about 5% by weight. The amount of dissolved polymer in a preferred embodiment ranges from about 0.1% to about 40%. A uniform and free flowing polymer solution is preferred. In one embodiment a 10% polymer solution is prepared by dissolving the polymer in a 10% acetic acid solution at 90° C. Then while still hot the solution is diluted with 20% distilled water to give an 8% polymer solution. At higher concentrations of polymer, the polymer solution tends to be more viscous.

Examples of preferred copolyester materials and a process for their preparation is described in U.S. Pat. No. 4,578,295 to Jabarin. They are generally prepared by heating a mixture of at least one reactant selected from isophthalic acid, terephthalic acid and their $C_1$ to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone. Especially preferred copolyester materials are available from Mitsui Petrochemical Ind. Ltd. (Japan) as B-010, B-030 and others of this family.

Examples of preferred polyamide materials include MXD-6 from Mitsubishi Gas Chemical (Japan). Other preferred polyamide materials include Nylon 6, and Nylon 66. Other preferred polyamide materials are blends of polyamide and polyester, including those comprising about 1-20% polyester by weight, more preferably about 1-10% polyester by weight, where the polyester is preferably PET or a modified PET. In another embodiment, preferred polyamide materials are blends of polyamide and polyester, including those comprising about 1-20% polyamide by weight, more preferably about 1-10% polyamide by weight, where the polyester is preferably PET or a modified PET. The blends may be ordinary blends or they may be compatibilized with an antioxidant or other material. Examples of such materials include those described in U.S. Patent Publication No. 2004/0013833, filed Mar. 21, 2003, which is hereby incorporated by reference in its entirety. Other preferred polyesters include, but are not limited to, PEN and PET/PEN copolymers.

3. Preferred Foam Materials

As used herein, the term "foam material" is a broad term and is used in accordance with its ordinary meaning and may include, without limitation, a foaming agent, a mixture of foaming agent and a binder or carrier material, an expandable cellular material, and/or a material having voids. The terms "foam material" and "expandable material" are used interchangeably herein. Preferred foam materials may exhibit one or more physical characteristics that improve the thermal and/or structural characteristics of articles (e.g., containers) and may enable the preferred embodiments to be able to withstand processing and physical stresses typically experienced by containers. In one embodiment, the foam material provides structural support to the container. In another embodiment, the foam material forms a protective layer that can reduce damage to the container during processing. For example, the foam material can provide abrasion resistance which can reduce damage to the container during transport. In one embodiment, a protective layer of foam may increase the shock or impact resistance of the container and thus prevent or reduce breakage of the container. Furthermore, in another embodiment foam can provide a comfortable gripping surface and/or enhance the aesthetics or appeal of the container.

In one embodiment, foam material comprises a foaming or blowing agent and a carrier material. In one preferred embodiment, the foaming agent comprises expandable structures (e.g., microspheres) that can be expanded and cooperate with the carrier material to produce foam. For example, the foaming agent can be thermoplastic microspheres, such as EXPANCEL® microspheres sold by Akzo Nobel. In one embodiment, microspheres can be thermoplastic hollow spheres comprising thermoplastic shells that encapsulate gas. Preferably, when the microspheres are heated, the thermoplastic shell softens and the gas increases its pressure causing the expansion of the microspheres from an initial position to an expanded position. The expanded microspheres and at least a portion of the carrier material can form the foam portion of the articles described herein. The foam material can form a layer that comprises a single material (e.g., a generally homogenous mixture of the foaming agent and the carrier material), a mix or blend of materials, a matrix formed of two or more materials, two or more layers, or a plurality of microlayers (lamellae) preferably including at least two different materials. Alternatively, the microspheres can be any other suitable controllably expandable material. For example, the microspheres can be structures comprising materials that can produce gas within or from the structures. In one embodiment, the microspheres are hollow structures containing chemicals which produce or contain gas wherein an increase in gas pressure causes the structures to expand and/or burst. In another embodiment, the microspheres are structures made from and/or containing one or more materials which decompose or react to produce gas thereby expanding and/or bursting the microspheres. Optionally, the microsphere may be generally solid structures. Optionally, the microspheres can be shells filled with solids, liquids, and/or gases. The microspheres can have any configuration and shape suitable for forming foam. For example, the microspheres can be generally spherical. Optionally, the microspheres can be elongated or oblique spheroids. Optionally, the microspheres can comprise any gas or blends of gases suitable for expanding the microspheres. In one embodiment, the gas can comprise an inert gas, such as nitrogen. In one embodiment, the gas is generally non-flammable. However, in certain embodiments non-inert gas and/or flammable gas can fill the shells of the microspheres. In some embodiments, the foam material may comprise foaming or blowing agents as are known in the art. Additionally, the foam material may be mostly or entirely foaming agent.

Although some preferred embodiments contain microspheres that generally do not break or burst, other embodiments comprise microspheres that may break, burst, fracture, and/or the like. Optionally, a portion of the microspheres may break while the remaining portion of the microspheres does not break. In some embodiments up to about 0.5%, 1%, 2%, 3%, 4%, 5%, 10%, 20%, 30%, 40%, 50%, 60% 70%, 80%, 90% by weight of microspheres, and ranges encompassing these amounts, break. In one embodiment, for example, a substantial portion of the microspheres may burst and/or fracture when they are expanded. Additionally, various blends and mixtures of microspheres can be used to form foam material.

The microspheres can be formed of any material suitable for causing expansion. In one embodiment, the microspheres can have a shell comprising a polymer, resin, thermoplastic, thermoset, or the like as described herein. The microsphere shell may comprise a single material or a blend of two or more different materials. For example, the microspheres can have an outer shell comprising ethylene vinyl acetate ("EVA"), polyethylene terephthalate ("PET"), polyamides (e.g. Nylon 6 and Nylon 66) polyethylene terephthalate glycol (PETG), PEN, PET copolymers, and combinations thereof. In one embodiment a PET copolymer comprises CHDM comonomer at a level between what is commonly called PETG and PET. In another embodiment, comonomers such as DEG and IPA are added to PET to form miscrosphere shells. The appropriate combination of material type, size, and inner gas can be selected to achieve the desired expansion of the microspheres. In one embodiment, the microspheres comprise shells formed of a high temperature material (e.g., PETG or similar material) that is capable of expanding when subject to high temperatures, preferably without causing the microspheres to burst. If the microspheres have a shell made of low temperature material (e.g., as EVA), the microspheres may break when subjected to high temperatures that are suitable for processing certain carrier materials (e.g., PET or polypropylene having a high melt point). In some circumstances, for example, EXPANCEL® microspheres may be break when processed at relatively high temperatures. Advantageously, mid or high temperature microspheres can be used with a carrier material having a relatively high melt point to produce controllably, expandable foam material without breaking the microspheres. For example, microspheres can comprise a mid temperature material (e.g., PETG) or a high temperature material (e.g., acrylonitrile) and may be suitable for relatively high temperature applications. Thus, a blowing agent for foaming polymers can be selected based on the processing temperatures employed.

The foam material can be a matrix comprising a carrier material, preferably a material that can be mixed with a blowing agent (e.g., microspheres) to form an expandable material. The carrier material can be a thermoplastic, thermoset, or polymeric material, such as ethylene acrylic acid ("EAA"), ethylene vinyl acetate ("EVA"), linear low density polyethylene ("LLDPE"), polyethylene terephthalate glycol (PETG), poly(hydroxyamino ethers) ("PHAE"), PET, polyethylene, polypropylene, polystyrene ("PS"), pulp (e.g., wood or paper pulp of fibers, or pulp mixed with one or more polymers), mixtures thereof, and the like. However, other materials suitable for carrying the foaming agent can be used to achieve one or more of the desired thermal, structural, optical, and/or other characteristics of the foam. In some embodiments, the carrier material has properties (e.g., a high melt index) for easier and rapid expansion of the microspheres, thus reducing cycle time thereby resulting in increased production.

In preferred embodiments, the formable material may comprise two or more components including a plurality of components each having different processing windows and/or physical properties. The components can be combined such that the formable material has one or more desired characteristics. The proportion of components can be varied to produce a desired processing window and/or physical properties. For example, the first material may have a processing window that is similar to or different than the processing window of the second material. The processing window may be based on, for example, pressure, temperature, viscosity, or the like. Thus, components of the formable material can be mixed to achieve a desired, for example, pressure or temperature range for shaping the material.

In one embodiment, the combination of a first material and a second material may result in a material having a processing window that is more desirable than the processing window of the second material. For example, the first material may be suitable for processing over a wide range of temperatures, and the second material may be suitable for processing over a narrow range of temperatures. A material having a portion formed of the first material and another portion formed of the second material may be suitable for processing over a range of temperatures that is wider than the narrow range of processing temperatures of the second material. In one embodiment, the processing window of a multi-component material is similar to the processing window of the first material. In one embodiment, the formable material comprises a multilayer sheet or tube comprising a layer comprising PET and a layer comprising polypropylene. The material formed from both PET and polypropylene can be processed (e.g., extruded) within a wide temperature range similar to the processing temperature range suitable for PET. The processing window may be for one or more parameters, such as pressure, temperature, viscosity, and/or the like.

Optionally, the amount of each component of the material can be varied to achieve the desired processing window. Optionally, the materials can be combined to produce a formable material suitable for processing over a desired range of pressure, temperature, viscosity, and/or the like. For example, the proportion of the material having a more desirable processing window can be increased and the proportion of material having a less undesirable processing window can be decreased to result in a material having a processing window that is very similar to or is substantially the same as the processing window of the first material. Of course, if the more desired processing window is between a first processing window of a first material and the second processing window of a second material, the proportion of the first and the second material can be chosen to achieve a desired processing window of the formable material.

Optionally, a plurality of materials each having similar or different processing windows can be combined to obtain a desired processing window for the resultant material.

In one embodiment, the Theological characteristics of a formable material can be altered by varying one or more of its components having different Theological characteristics. For example, a substrate (e.g., PP) may have a high melt strength and is amenable to extrusion. PP can be combined with another material, such as PET which has a low melt strength making it difficult to extrude, to form a material suitable for extrusion processes. For example, a layer of PP or other strong material may support a layer of PET during co-extrusion (e.g., horizontal or vertical co-extrusion). Thus, formable material formed of PET and polypropylene can be processed, e.g., extruded, in a temperature range generally suitable for PP and not generally suitable for PET.

In some embodiments, the composition of the formable material may be selected to affect one or more properties of the articles. For example, the thermal properties, structural properties, barrier properties, optical properties, rheology properties, favorable flavor properties, and/or other properties or characteristics disclosed herein can be obtained by using formable materials described herein.

4. Additives to Enhance Materials

An advantage of preferred methods disclosed herein are their flexibility allowing for the use of multiple functional additives. Additives known by those of ordinary skill in the art for their ability to provide enhanced $CO_2$ barriers, $O_2$ barriers, UV protection, scuff resistance, blush resistance, impact resistance and/or chemical resistance may be used.

Preferred additives may be prepared by methods known to those of skill in the art. For example, the additives may be mixed directly with a particular material, they may be dissolved/dispersed separately and then added to a particular material, or they may be combined with a particular material to addition of the solvent that forms the material solution/dispersion. In addition, in some embodiments, preferred additives may be used alone as a single layer.

In preferred embodiments, the barrier properties of a layer may be enhanced by the addition of different additives. Additives are preferably present in an amount up to about 40% of the material, also including up to about 30%, 20%, 10%, 5%, 2% and 1% by weight of the material. In other embodiments, additives are preferably present in an amount less than or equal to 1% by weight, preferred ranges of materials include, but are not limited to, about 0.01% to about 1%, about 0.01% to about 0.1%, and about 0.1% to about 1% by weight. Further, in some embodiments additives are preferably stable in aqueous conditions. For example, derivatives of resorcinol (m-dihydroxybenzene) may be used in conjunction with various preferred materials as blends or as additives or monomers in the formation of the material. The higher the resorcinol content the greater the barrier properties of the material. For example, resorcinol diglycidyl ether can be used in PHAE and hydroxyethyl ether resorcinol can be used in PET and other polyesters and Copolyester Barrier Materials.

Another additive(s) that may be used are "nanoparticles" or "nanoparticulate material." For convenience the term nanoparticles will be used herein to refer to both nanoparticles and nanoparticulate material. These nanoparticles are tiny, micron or sub-micron size (diameter), particles of materials which enhance the barrier properties of a material by creating a more tortuous path for migrating gas molecules, e.g. oxygen or carbon dioxide, to take as they permeate a material. In preferred embodiments nanoparticulate material is present in amounts ranging from 0.05 to 1% by weight, including 0.1%, 0.5% by weight and ranges encompassing these amounts.

One preferred type of nanoparticulate material is a microparticular clay based product available from Southern Clay Products. One preferred line of products available from Southern Clay products is Cloisite® nanoparticles. In one embodiment preferred nanoparticles comprise monmorillonite modified with a quaternary ammonium salt. In other embodiments nanoparticles comprise monmorillonite modified with a ternary ammonium salt. In other embodiments nanoparticles comprise natural monmorillonite. In further embodiments, nanoparticles comprise organoclays as described in U.S. Pat. No. 5,780,376, the entire disclosure of which is hereby incorporated by reference and forms part of the disclosure of this application. Other suitable organic and inorganic microparticular clay based products may also be used. Both man-made and natural products are also suitable.

Another type of preferred nanoparticulate material comprises a composite material of a metal. For example, one suitable composite is a water based dispersion of aluminum oxide in nanoparticulate form available from BYK Chemie (Germany). It is believed that this type of nanoparticular material may provide one or more of the following advantages: increased abrasion resistance, increased scratch resistance, increased $T_g$, and thermal stability.

Another type of preferred nanoparticulate material comprises a polymer-silicate composite. In preferred embodiments the silicate comprises montmorillonite. Suitable polymer-silicate nanoparticulate material are available from Nanocor and RTP Company.

In preferred embodiments, the UV protection properties of the material may be enhanced by the addition of different additives. In a preferred embodiment, the UV protection material used provides UV protection up to about 350 nm or less, preferably about 370 nm or less, more preferably about 400 nm or less. The UV protection material may be used as an additive with layers providing additional functionality or applied separately as a single layer. Preferably additives providing enhanced UV protection are present in the material from about 0.05 to 20% by weight, but also including about 0.1%, 0.5%, 1%, 2%, 3%, 5%, 10%, and 15% by weight, and ranges encompassing these amounts. Preferably the UV protection material is added in a form that is compatible with the other materials. For example, a preferred UV protection material is Milliken UV390A ClearShield®. UV390A is an oily liquid for which mixing is aided by first blending the liquid with water, preferably in roughly equal parts by volume. This blend is then added to the material solution, for example, BLOX® 599-29, and agitated. The resulting solution contains about 10% UV390A and provides UV protection up to 390 nm when applied to a PET preform. As previously described, in another embodiment the UV390A solution is applied as a single layer. In other embodiments, a preferred UV protection material comprises a polymer grafted or modified with a UV absorber that is added as a concentrate. Other preferred UV protection materials include, but are not limited to, benzotriazoles, phenothiazines, and azaphenothiazines. UV protection materials may be added during the melt phase process prior to use, e.g. prior to injection molding or extrusion, or added directly to a coating material that is in the form of a solution or dispersion. Suitable UV protection materials are available from Milliken, Ciba and Clariant.

In preferred embodiments, $CO_2$ scavenging properties can be added to the materials. In one preferred embodiment such properties are achieved by including an active amine which will react with $CO_2$ forming a high gas barrier salt. This salt will then act as a passive $CO_2$ barrier. The active amine may be an additive or it may be one or more moieties in the thermoplastic resin material of one or more layers.

In preferred embodiments, $O_2$ scavenging properties can be added to preferred materials by including $O_2$ scavengers such as anthroquinone and others known in the art. In another embodiment, one suitable $O_2$ scavenger is AMOSORB® $O_2$ scavenger available from BP Amoco Corporation and ColorMatrix Corporation which is disclosed in U.S. Pat. No. 6,083,585 to Cahill et al., the disclosure of which is hereby incorporated in its entirety. In one embodiment, $O_2$ scavenging properties are added to preferred phenoxy-type materials, or other materials, by including $O_2$ scavengers in the phenoxy-type material, with different activating mechanisms. Preferred $O_2$ scavengers can act either spontaneously, gradually or with delayed action until initiated by a specific trigger. In some embodiments the $O_2$ scavengers are activated via exposure to either UV or water (e.g., present in the contents of the container), or a combination of both. The $O_2$ scavenger is preferably present in an amount of from about 0.1 to about 20 percent by weight, more preferably in an amount of from about 0.5 to about 10 percent by weight, and, most preferably, in an amount of from about 1 to about 5 percent by weight, based on the total weight of the coating layer.

In another preferred embodiment, a top coat or layer is applied to provide chemical resistance to harsher chemicals than what is provided by the outer layer. In certain embodiments, preferably these top coats or layers are aqueous based or non-aqueous based polyesters or acrylics which are optionally partially or fully cross linked. A preferred aqueous based polyester is polyethylene terephthalate, however other polyesters may also be used. In certain embodiments, the process of applying the top coat or layer is that disclosed in U.S. Patent Pub. No. 2004/0071885, entitled Dip, Spray, and Flow Coating Process For Forming Coated Articles, the entire disclosure of which is hereby incorporated by reference in its entirety.

A preferred aqueous based polyester resin is described in U.S. Pat. No. 4,977,191 (Salsman), incorporated herein by reference. More specifically, U.S. Pat. No. 4,977,191 describes an aqueous based polyester resin, comprising a reaction product of 20-50% by weight of waste terephthalate polymer, 10-40% by weight of at least one glycol an 5-25% by weight of at least one oxyalkylated polyol.

Another preferred aqueous based polymer is a sulfonated aqueous based polyester resin composition as described in U.S. Pat. No. 5,281,630 (Salsman), herein incorporated by reference. Specifically, U.S. Pat. No. 5,281,630 describes an aqueous suspension of a sulfonated water-soluble or water dispersible polyester resin comprising a reaction product of 20-50% by weight terephthalate polymer, 10-40% by weight at least one glycol and 5-25% by weight of at least one oxyalkylated polyol to produce a prepolymer resin having hydroxyalkyl functionality where the prepolymer resin is further reacted with about 0.10 mole to about 0.50 mole of alpha, beta-ethylenically unsaturated dicarboxylic acid per 100 g of prepolymer resin and a thus produced resin, terminated by a residue of an alpha, beta-ethylenically unsaturated dicarboxylic acid, is reacted with about 0.5 mole to about 1.5 mole of a sulfite per mole of alpha, beta-ethylenically unsaturated dicarboxylic acid residue to produce a sulfonated-terminated resin.

Yet another preferred aqueous based polymer is the coating described in U.S. Pat. No. 5,726,277 (Salsman), incorporated herein by reference. Specifically, U.S. Pat. No. 5,726,277 describes coating compositions comprising a reaction product of at least 50% by weight of waste terephthalate polymer and a mixture of glycols including an oxyalkylated polyol in the presence of a glycolysis catalyst wherein the reaction product is further reacted with a difunctional, organic acid and wherein the weight ratio of acid to glycols in is the range of 6:1 to 1:2.

While the above examples are provided as preferred aqueous based polymer coating compositions, other aqueous based polymers are suitable for use in the products and methods describe herein. By way of example only, and not meant to be limiting, further suitable aqueous based compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70-95° C., said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkanolamine of glycerin, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

Likewise, by example, U.S. Pat. No. 4,528,321 (Allen) discloses a dispersion in a water immiscible liquid of water soluble or water swellable polymer particles and which has been made by reverse phase polymerization in the water immiscible liquid and which includes a non-ionic compound selected from $C_{4-12}$ alkylene glycol monoethers, their $C_{1-4}$ alkanoates, $C_{6-12}$ polyakylene glycol monoethers and their $C_{1-4}$ alkanoates.

The materials of certain embodiments may be cross-linked to enhance thermal stability for various applications, for example hot fill applications. In one embodiment, inner layers may comprise low-cross linking materials while outer layers may comprise high crosslinking materials or other suitable combinations. For example, an inner coating on a PET surface may utilize non or low cross-linked material, such as the BLOX® 588-29, and the outer coat may utilize another material, such as EXP 12468-4b from ICI, capable of cross linking to ensure maximum adhesion to the PET. Suitable additives capable of cross linking may be added to one or more layers. Suitable cross linkers can be chosen depending upon the chemistry and functionality of the resin or material to which they are added. For example, amine cross linkers may be useful for crosslinking resins comprising epoxide groups. Preferably cross linking additives, if present, are present in an amount of about 1% to 10% by weight of the coating solution/dispersion, preferably about 1% to 5%, more preferably about 0.01% to 0.1% by weight, also including 2%, 3%, 4%, 6%, 7%, 8%, and 9% by weight. Optionally, a thermoplastic epoxy (TPE) can be used with one or more crosslinking agents. In some embodiments, agents (e.g. carbon black) may also be coated onto or incorporated into the TPE material. The TPE material can form part of the articles disclosed herein. It is contemplated that carbon black or similar additives can be employed in other polymers to enhance material properties.

The materials of certain embodiments may optionally comprise a curing enhancer. As used herein, the term "curing enhancer" is a broad term and is used in its ordinary meaning and includes, without limitation, chemical cross-linking catalyst, thermal enhancer, and the like. As used herein, the term "thermal enhancer" is a broad term and is used in its ordinary meaning and includes, without limitation, transition metals, transition metal compounds, radiation absorbing additives (e.g., carbon black). Suitable transition metals include, but are not limited to, cobalt, rhodium, and copper. Suitable transition metal compounds include, but are not limited to, metal carboxylates. Preferred carboxylates include, but are not limited to, neodecanoate, octoate, and acetate. Thermal enhancers may be used alone or in combination with one or more other thermal enhancers.

The thermal enhancer can be added to a material and may significantly increase the temperature of the material during a curing process, as compared to the material without the thermal enhancer. For example, in some embodiments, the thermal enhancer (e.g., carbon black) can be added to a polymer so that the temperature of the polymer subjected to a curing process (e.g., IR radiation) is significantly greater than the polymer without the thermal enhancer subject to the same or similar curing process. The increased temperature of the polymer caused by the thermal enhancer can increase the rate of curing and therefore increase production rates. In some embodiments, the thermal enhancer generally has a higher temperature than at least one of the layers of an article when the thermal enhancer and the article are heated with a heating device (e.g., infrared heating device).

In some embodiments, the thermal enhancer is present in an amount of about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm and ranges encompassing these amounts. The amount of thermal enhancer may be calculated based on the weight of layer which comprises the thermal enhancer or the total weight of all layers comprising the article.

In some embodiments, a preferred thermal enhancer comprises carbon black. In one embodiment, carbon black can be applied as a component of a coating material in order to enhance the curing of the coating material. When used as a component of a coating material, carbon black is added to one or more of the coating materials before, during, and/or after the coating material is applied (e.g., impregnated, coated, etc.) to the article. Preferably carbon black is added to the coating material and agitated to ensure thorough mixing. The thermal enhancer may comprise additional materials to achieve the desired material properties of the article.

In another embodiment wherein carbon black is used in an injection molding process, the carbon black may be added to the polymer blend in the melt phase process.

In some embodiments, the polymer comprises about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm thermal enhancer and ranges encompassing these amounts. In a further embodiment, the coating material is cured using radiation, such as infrared (IR) heating. In preferred embodiments, the IR heating provides a more effective coating than curing using other methods. Other thermal and curing enhancers and methods of using same are disclosed in U.S. patent application Ser. No. 10/983,150, filed Nov. 5, 2004, entitled "Catalyzed Process for Forming Coated Articles," the disclosure of which is hereby incorporated by reference it its entirety.

In some embodiments the addition of anti-foam/bubble agents is desirable. In some embodiments utilizing solutions or dispersion the solutions or dispersions form foam and/or bubbles which can interfere with preferred processes. One way to avoid this interference, is to add anti-foam/bubble agents to the solution/dispersion. Suitable anti-foam agents include, but are not limited to, nonionic surfactants, alkylene oxide based materials, siloxane based materials, and ionic surfactants. Preferably anti-foam agents, if present, are present in an amount of about 0.01% to about 0.3% of the solution/dispersion, preferably about 0.01% to about 0.2%, but also including about 0.02%, 0.03%, 0.04%, 0.05%, 0.06%, 0.07%, 0.08%, 0.09%, 0.1%, 0.25%, and ranges encompassing these amounts.

In another embodiment foaming agents may be added to the coating materials in order to foam the coating layer. In a further embodiment a reaction product of a foaming agent is used. Useful foaming agents include, but are not limited to azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide, diphenylsulfon-3-3, disulfonyl hydrazide, 4,4'-oxybis benzene sulfonyl hydrazide, p-toluene sulfonyl semicarbizide, barium azodicarboxylate, butylamine nitrile, nitroureas, trihydrazino triazine, phenyl-methyl-urethane, p-sulfonhydrazide, peroxides, ammonium bicarbonate, and sodium bicarbonate. As presently contemplated, commercially available foaming agents include, but are not limited to, EXPANCEL®, CELOGEN®, HYDROCEROL®, MIKROFINE®, CELSPAN®, and PLASTRON® FOAM.

The foaming agent is preferably present in the coating material in an amount from about 1 up to about 20 percent by weight, more preferably from about 1 to about 10 percent by weight, and, most preferably, from about 1 to about 5 percent by weight, based on the weight of the coating layer. Newer foaming technologies known to those of skill in the art using compressed gas could also be used as an alternate means to generate foam in place of conventional blowing agents listed above.

The tie-layer is preferably a polymer having functional groups, such as anhydrides and epoxies that react with the carboxyl and/or hydroxyl groups on the PET polymer chains. Useful tie-layer materials include, but are not limited to, DuPont BYNEL®, Mitsui ADMER®, Eastman's EPOLINE, Arkema's LOTADER and ExxonMobil's EVELOY®.

B. Detailed Description of the Drawings

In preferred embodiments articles may comprise one or more formable materials. Articles described herein may be mono-layer or multi-layer (i.e., two or more layers). In some embodiments, the articles can be packaging, such as drinkware (including preforms, containers, bottles, closures, etc.), boxes, cartons, tray, sheets, and the like.

The multi-layer articles may comprise an inner layer (e.g., the layer that is in contact with the contents of the container) of a material approved by a regulatory agency (e.g., the U.S. Food and Drug Association) or material having regulatory approval to be in contact with food (including beverages), drugs, cosmetics, etc. In other embodiments, an inner layer comprises material(s) that are not approved by a regulatory scheme to be in contact with food. A second layer may comprise a second material, which can be similar to or different than the material forming the inner layer. The articles can have as many layers as desired. It is contemplated that the articles may comprise one or more materials that form various portions that are not "layers."

Referring to FIG. 1, a preferred monolayer preform 30 is illustrated. The preform is preferably made of an FDA approved material, such as virgin PET, and can be of any of a wide variety of shapes and sizes. The preform shown in FIG. 1 is of the type which will form a 16 oz. carbonated beverage bottle that can have an oxygen and carbon dioxide barrier, but as will be understood by those skilled in the art, other preform configurations can be used depending upon the desired configuration, characteristics and use of the final article. The monolayer preform 30 may be made by methods disclosed herein.

Figure 2:
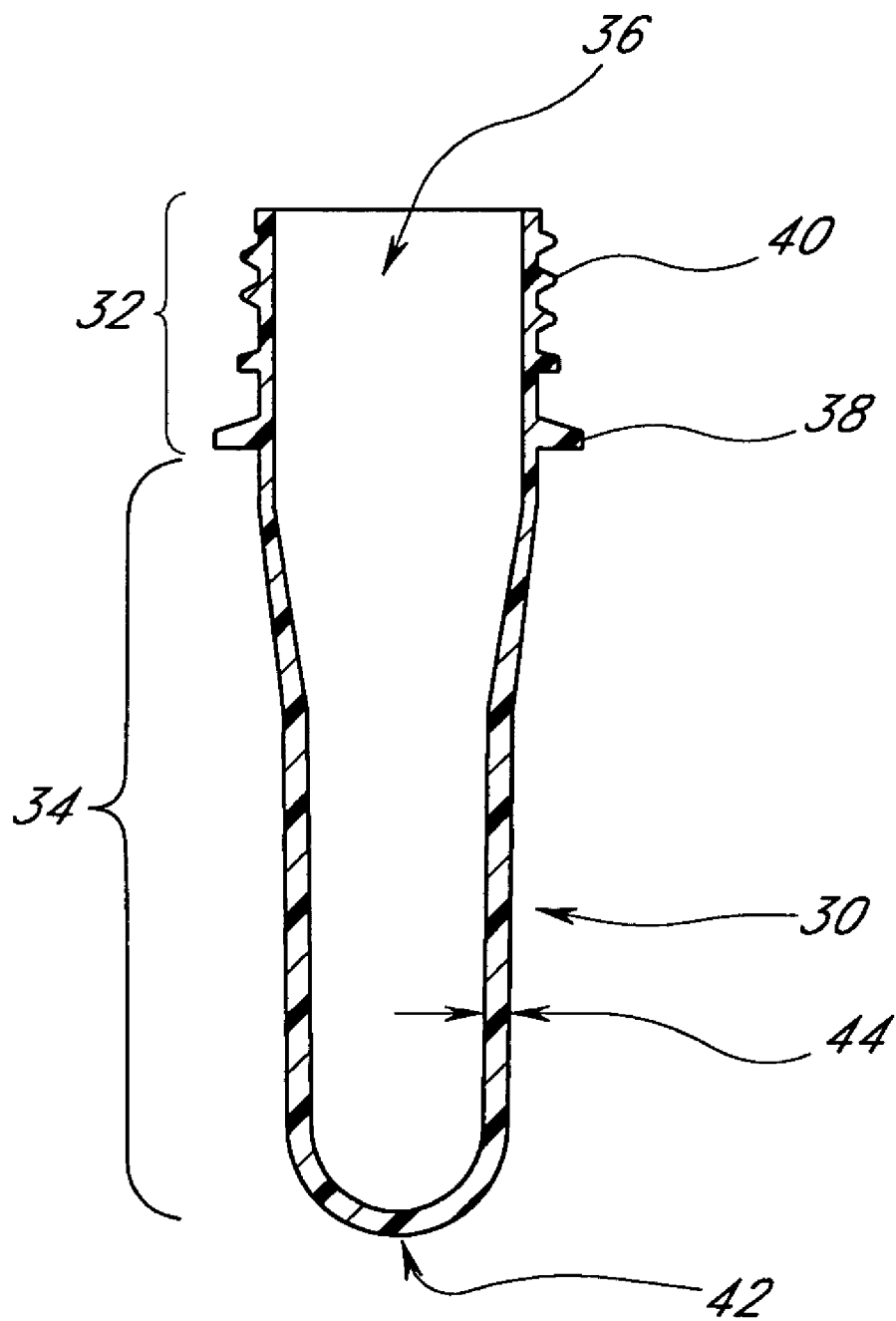
FIG. 2 is a cross-section of the monolayer preform of FIG. 1.

Referring to FIG. 2, a cross-section of the preform 30 of FIG. 1 is illustrated. The preform 30 has a neck portion 32 and a body portion 34, formed monolithically (i.e., as a single, or unitary, structure). Advantageously, the monolithic arrangement of the preform, when blow-molded into a bottle, provides greater dimensional stability and improved physical properties in comparison to a preform constructed of separate neck and body portions, which are bonded together. However, the preforms can comprise a neck portion and body portion that are bonded together.

The neck portion 32 begins at the opening 36 to the interior of the preform 30 and extends to and includes the support ring 38. The neck portion 32 is further characterized by the presence of the threads 40, which provide a way to fasten a cap for the bottle produced from the preform 30. Alternatively, the neck portion 32 can be configured to engage a closure or cap (e.g., a crown closure, cork (natural or artificial), snap cap, punctured seal, and/or the like). The body portion 34 is an elongated and cylindrically shaped structure extending down from the neck portion 32 and culminating in a rounded end cap 42. The preform thickness 44 will depend upon the overall length of the preform 30 and the wall thickness and overall size of the resulting container.

Figure 3:
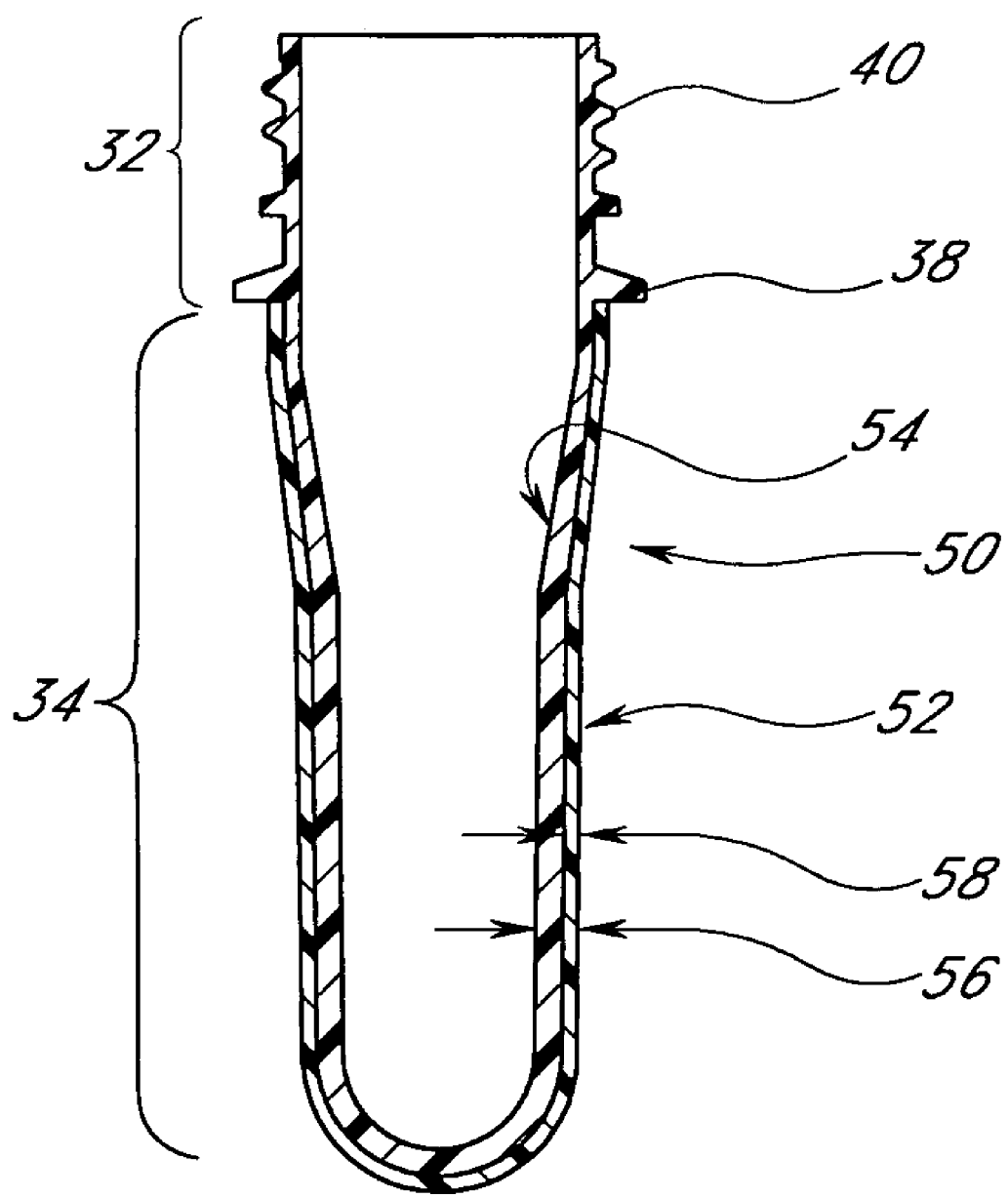
FIG. 3 is a cross-section of a multilayer preform.

Referring to FIG. 3, a cross-section of one type of a multilayer preform 50 having features in accordance with a preferred embodiment is disclosed. The preform 50 has the neck portion 32 and the body portion 34 similar to the preform 30 in FIGS. 1 and 2. The layer 52 is disposed about the entire surface of the body portion 34, terminating at the bottom of the support ring 38. The coating layer 52 in the embodiment shown in the figure does not extend to the neck portion 32, nor is it present on the interior surface 54 of the preform which is preferably made of an FDA approved material, such as PET. The coating layer 52 may comprise either a single material or several microlayers of at least two materials. By way of example, the wall of the bottom portion of the preform may have a thickness of 3.2 millimeters; the wall of the neck, a cross-sectional dimension of about 3 millimeters; and the material applied to a thickness of about 0.3 millimeters. The layer 52 may comprise PET, RPET, barrier material, foam and/or other polymer materials suitable for forming an outer surface of a preform.

The overall thickness 56 of the preform is equal to the thickness of the initial uncoated preform 39 plus the thickness 58 of the outer layer 52, and is dependent upon the overall size and desired coating thickness of the resulting container. However, the preform 50 may have any thickness depending on the desired thermal, or structural properties of the container formed from the preform 50. The preforms and containers can have layers which have a wide variety of relative thicknesses.

Figure 4:
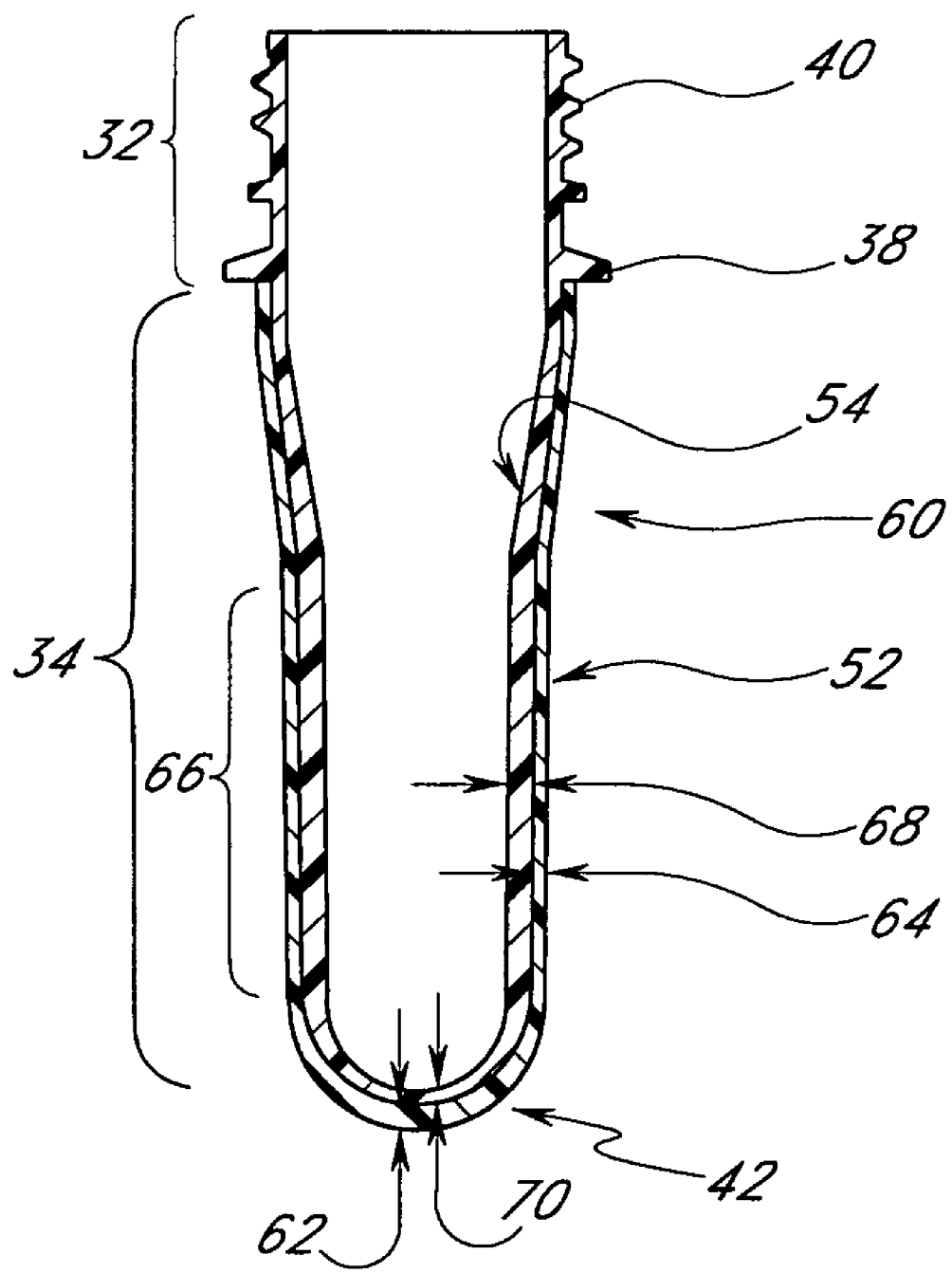
FIG. 4 is a cross-section of another embodiment of a multilayer preform.

Referring to FIG. 4, a preferred embodiment of a multilayer preform 60 is shown in cross-section. The primary difference between the coated preform 60 and the coated preform 50 in FIG. 3 is the relative thickness of the two layers in the area of the end cap 42. The preform 50 of FIG. 3 has an outer layer 52 that is generally thinner than the thickness of the inner layer of the preform throughout the entire body portion of the preform. The preform 60, however, has an outer layer 52 that is thicker at 62 near the end cap 42 than it is at 64 in the wall portion 66, and conversely, the thickness of the inner layer is greater at 68 in the wall portion 66 than it is at 70, in the region of the end cap 42. This preform design is especially useful when the outer layer which is applied to the initial preform in an overmolding process to make the coated preform, as described below, where it presents certain advantages including that relating to reducing molding cycle time. These advantages will be discussed in more detail below. The layer 52 may be homogeneous or it may comprise a plurality of microlayers.

The multilayer preforms and containers can have layers which have a wide variety of relative thicknesses. In view of the present disclosure the thickness of a given layer and of the overall preform or container, whether at a given point or over the entire container, can be chosen to fit a coating process or a particular end use for the container. Furthermore, as discussed above in regard to the outer layer in FIG. 3, the outer layer in the preform and container embodiments disclosed herein may comprise a single material or several microlayers of two or more materials.

Figure 5:
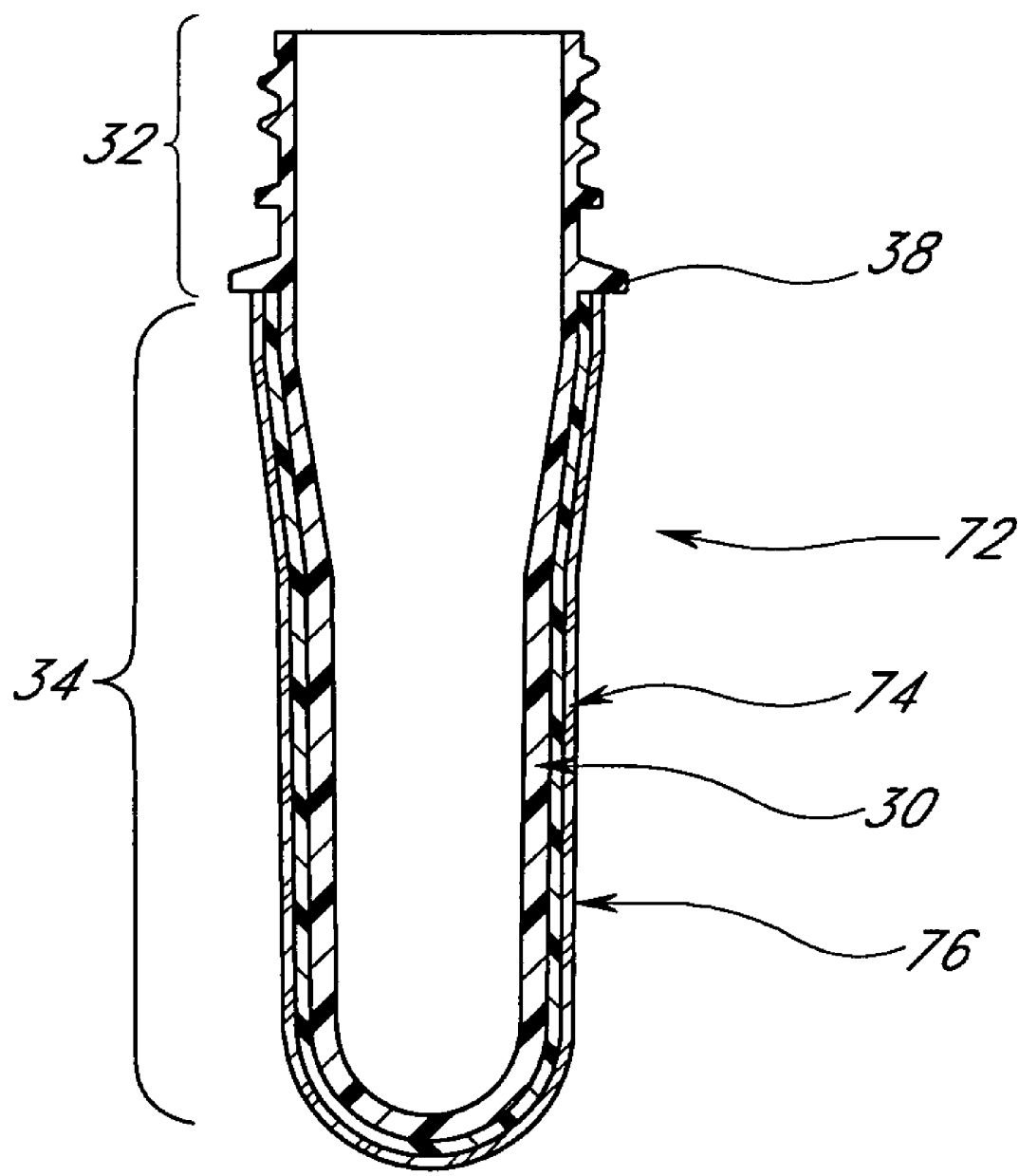
FIG. 5 is a three-layer embodiment of a preform.

Referring to FIG. 5 there is shown a preferred three-layer preform 72. This embodiment of coated preform is preferably made by placing two coating layers 74 and 76 on a monolayer preform, such as preform 30 shown in FIG. 1.

Figure 6:
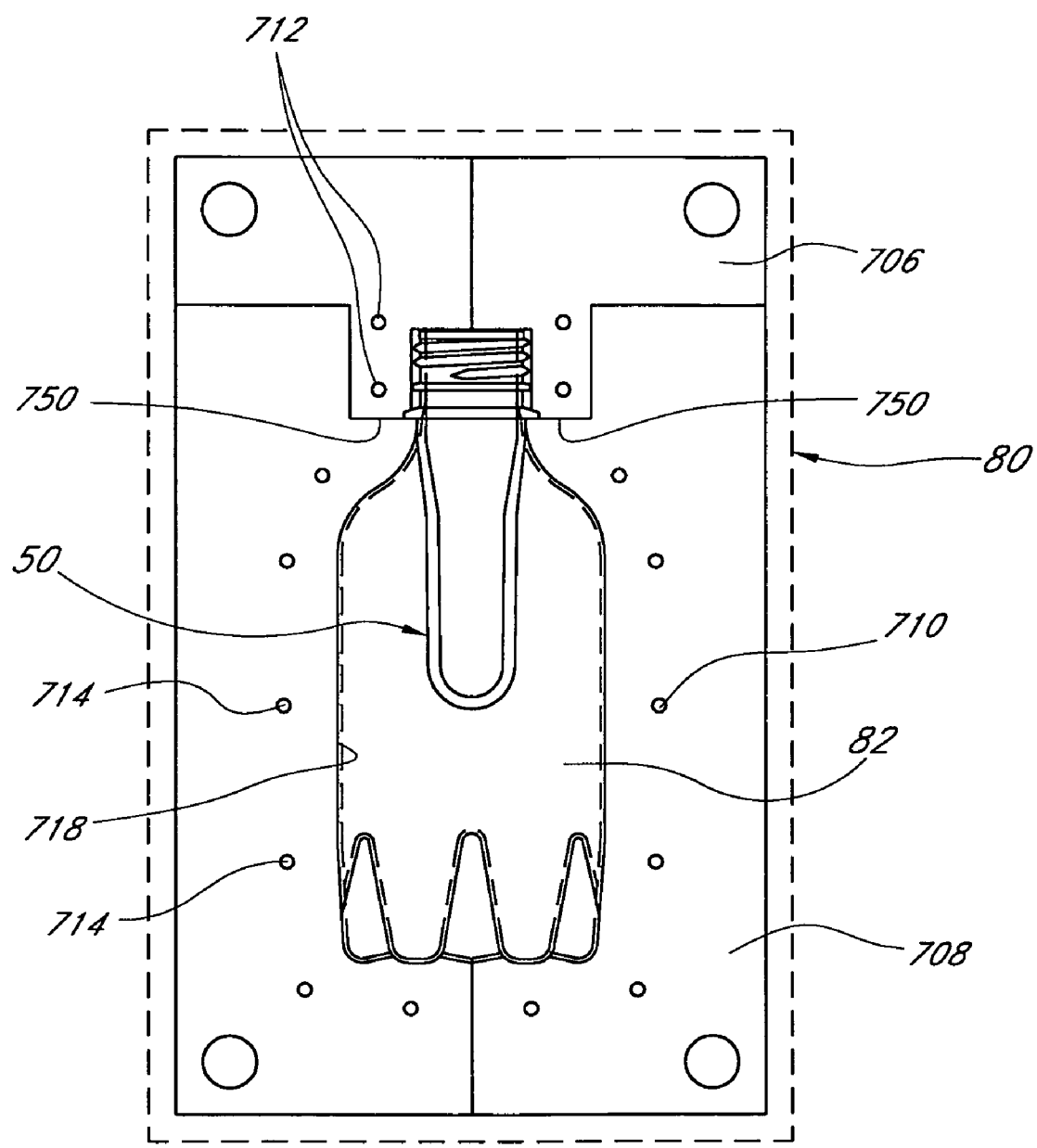
FIG. 6 is a cross-section of a preform in the cavity of a blow-molding apparatus of a type that may be used to make a container.
Figure 7:
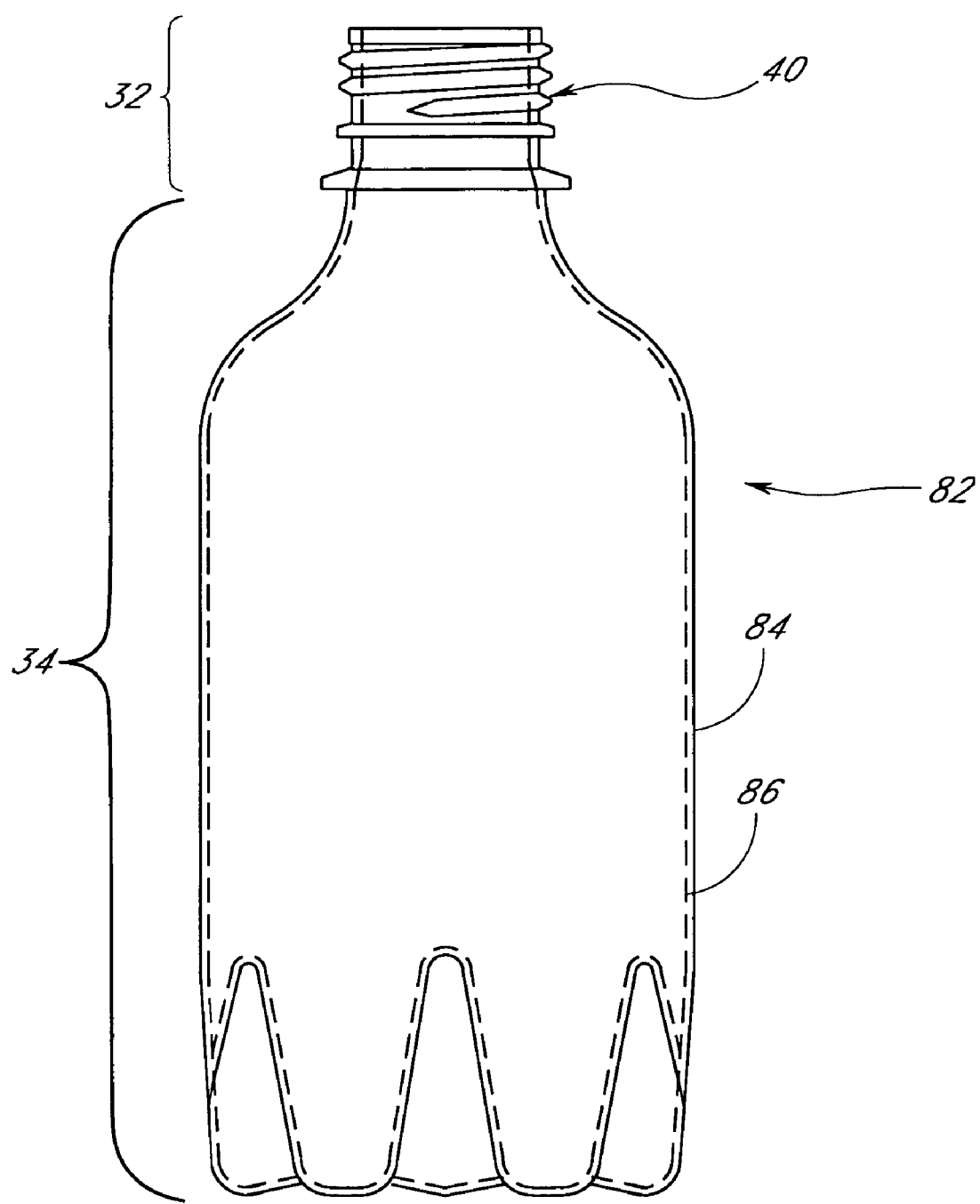
FIG. 7 is a side view of one embodiment of a container.

After a preform, such as that illustrated in FIG. 3, is prepared by a method and apparatus such as those discussed in detail below, it is subjected to a stretch blow-molding process. Referring to FIG. 6, in this process a multilayer preform 50 is placed in a mold 80 having a cavity corresponding to the desired container shape. The preform is then heated and expanded by stretching and by air forced into the interior of the preform 50 to fill the cavity within the mold 80, creating a container 82 (FIG. 7). The blow molding operation normally is restricted to the body portion 34 of the preform with the neck portion 32 including the threads, pilfer ring, and support ring retaining the original configuration as in the preform. Monolayer and multilayer containers can be formed by stretch blow molding monolayer and multilayer preforms, respectively.

Figure 6A:
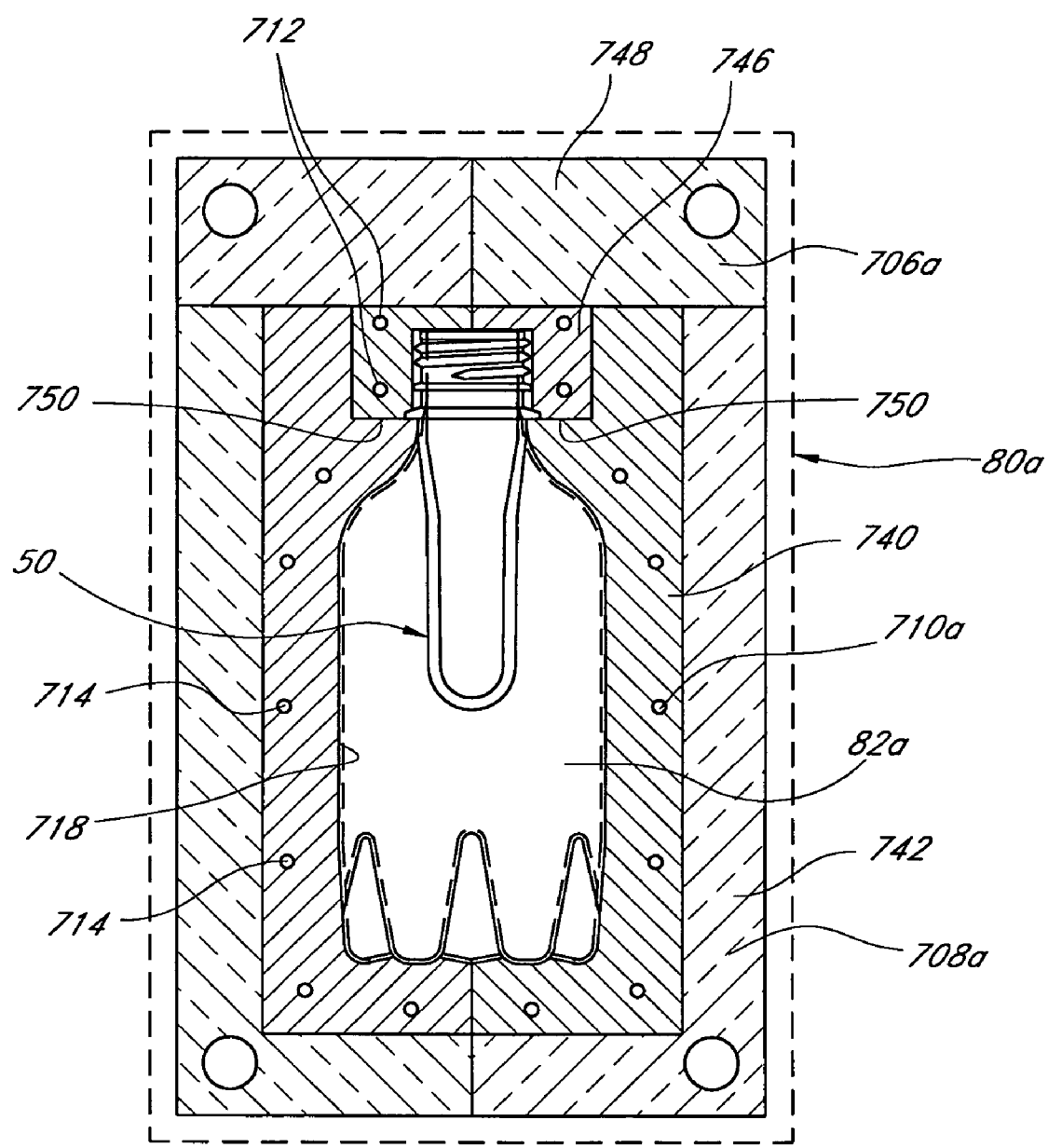
FIG. 6A is a cross-section of another embodiment of a blow-molding apparatus.

FIG. 6A illustrates a stretch blow mold designed to improve cycle times and thermal efficiency. The temperature of the walls of the mold 80A can be precisely controlled to achieve the desired temperature distribution through the blow molded container.

Referring to FIG. 7, there is disclosed an embodiment of container 82 in accordance with a preferred embodiment, such as that which might be made from blow molding the multilayer preform 50 of FIG. 3. The container 82 has a neck portion 32 and a body portion 34 corresponding to the neck and body portions of the preform 50 of FIG. 3. The neck portion 32 is further characterized by the presence of the threads 40 which provide a way to fasten a cap onto the container.

The outer layer 84 covers the exterior of the entire body portion 34 of the container 82, stopping just below the support ring 38. The interior surface 86 of the container, which is made of an FDA-approved material, preferably PET, remains uncoated so that only the interior surface 86 is in contact with beverages or foodstuffs. In one preferred embodiment that is used as a carbonated beverage container, the thickness 87 of the layer is preferably 0.508 mm-1.524 mm (0.020-0.060 inch), more preferably 0.762 mm-1.016 mm (0.030-0.040 inch); the thickness 88 of the PET layer is preferably 2.032 mm-4.064 mm (0.080-0.160 inch), more preferably 2.54 mm-3.556 mm (0.100-0.140 inch); and the overall wall thickness 90 of the barrier-coated container 82 is preferably 3.556 mm-4,562 mm (0.140-0.180 inch), more preferably 3.82 mm-4.318 mm (0.150-0.170 inch). Preferably, on average, the overall wall thickness 90 of the container 82 derives the majority of its thickness from the inner PET layer. Of course, the container 82 can be a monolayer container. For example, the container 82 can be made by stretch blow molding the preform 30 of FIG. 1. Additional articles and associated materials are disclosed in U.S. patent application Ser. No. 11/108,345 entitled MONO AND MULTI-LAYER ARTICLES AND INJECTION METHODS OF MAKING THE SAME, filed on Apr. 18, 2005 that can be made by the systems disclosed herein.

Figure 8:
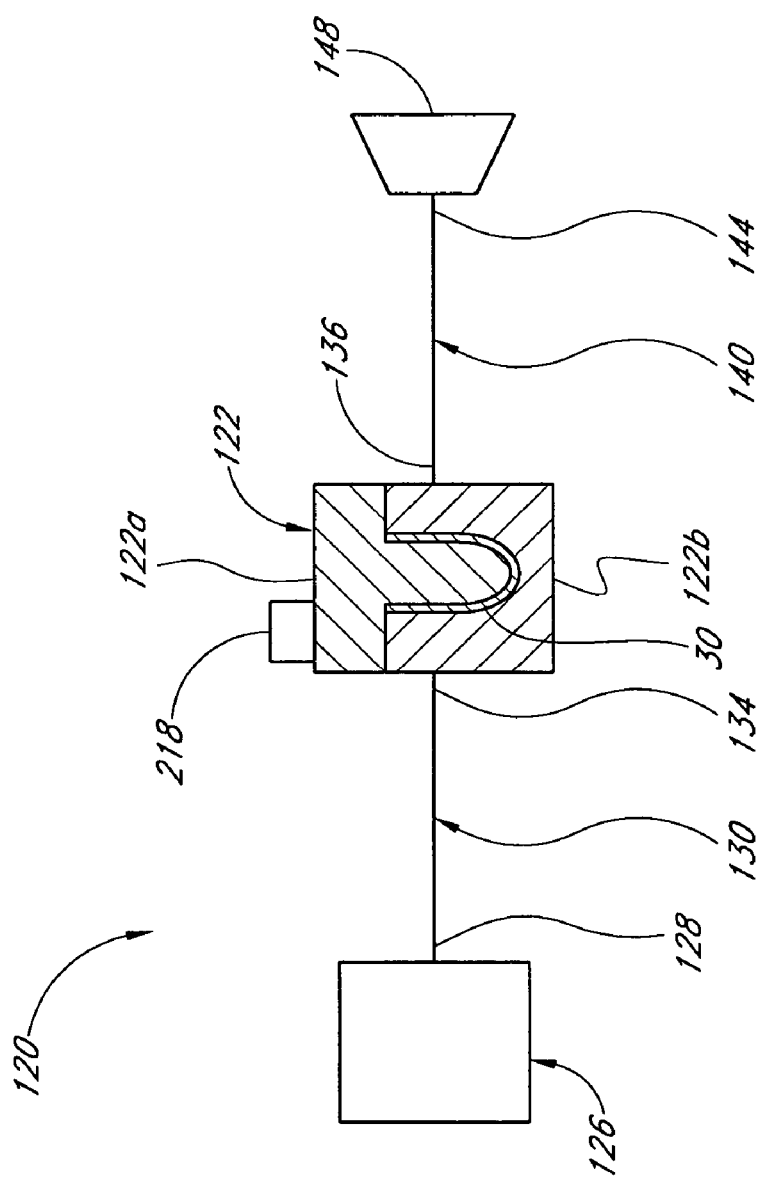
FIG. 8 is a schematic illustration of a temperature control system.

FIG. 8 schematically illustrates a temperature control system 120 in accordance with a preferred embodiment. The illustrated temperature control system 120 is an open loop system. The temperature control system 120 can be used to control the temperature of a mold apparatus 122. The mold apparatus 122 can be configured to mold a single article or a plurality of articles. The mold apparatus 122 can be configured to form articles of any shape and configuration. For example, the mold apparatus 122 can be designed to produce preforms, containers, and other articles that are formed by molds. In some embodiments, the mold apparatus 122 can be a stretch blow-molding apparatus, injection molding apparatus, compression molding apparatus, thermomolding or thermoforming system, vacuum forming system, and the like. The mold apparatus 122 may or may not comprise high heat transfer material. Some exemplary temperature control systems employ a working fluid or other means for controlling the temperature of the mold apparatus during the molding process. The illustrated temperature control system 120 has a working fluid passing through the mold apparatus 122 to control the temperature of the polymer in the mold apparatus 122. The working fluid can be at a wide range of temperatures depending on the particular application.

The illustrated mold apparatus 122 comprises a plurality of mold sections that cooperate to define a molding cavity. In some embodiments, the mold apparatus 122 comprises a mold section 122a and mold section 122b movable between an open position and a closed position. The mold section 122a and the mold section 122b can form a mold cavity sized and configured to make preforms, such as the preform 30 as illustrated. The mold apparatus 122 can also be designed to form a layer of a multilayer preforms or other articles. The temperature control system 120 can be used selectively control the temperature of the mold apparatus 122 to reduce cycle time, produce a desired finish (e.g., an amount of crystallinity), improve mold life, improve preform quality, etc.

In the illustrated embodiment, the temperature control system 120 includes fluid lines 130, 140. The fluid line 130 connects a fluid source 126 to the mold apparatus 122, and the fluid line 140 connects the mold apparatus 122 to an exhaust system 148. Fluid lines can define flow paths of the working fluid passing through the system 120.

As used herein, the term "fluid source" is a broad term and is used in its ordinary sense and refers, without limitation, to a device which is suitable for providing fluid that can be used to maintain the mold apparatus 122 at a suitable temperature. In various embodiments, the fluid source may comprise a bottle, canister, compressor system, or any other suitable fluid delivery device. The fluid source 126 might contain a quantity of liquid, preferably a refrigerant. For example, the fluid source 126 can comprise one or more refrigerants, such as Freon, Refrigerant 12, Refrigerant 22, Refrigerant 134a, and the like. The fluid source 126 can also comprise cryogenic fluids, such as liquid carbon dioxide ($CO_2$) or nitrogen ($N_2$). In some embodiments, the working fluid can be conveniently stored at room temperature. For example, $CO_2$ or nitrogen is liquid at typical room temperatures when under sufficient pressure. In some non-limiting embodiments, the pressure of the stored fluid in the fluid source 126 will often be in the range of about 40 bars to about 80 bars. In some embodiments, the fluid source 126 is a bottle and the pressure in the bottle will be reduced during the molding of preforms as fluid from the bottle is consumed. The fluid source 126 can contain a sufficient amount of fluid so that the mold apparatus 122 can be cooled for many cycles, as described below. The fluid source 126 may have a regulator to control the flow of fluid into the fluid line 130 and may comprise a compressor that can provide pressure to the fluid in the fluid line 130. Optionally, the working fluid of the temperature control system can comprise a combination of two or more of the aforementioned fluids to achieve the desired thermal characteristics of the working fluid. In some embodiments, the percentages of the components of the working fluids can be selected based on the desired temperatures and pressures so that the components of the working fluid do not solidify, for example. Other working fluids, such as water, can also be employed to control the temperature of molding apparatus. Of course, refrigerants can be used to more rapidly heat and/or cool the mold apparatus and associated molded articles as compared to non-refrigerants, such as water.

As used herein, the term "refrigerant" is a broad term and is used in its ordinary sense and refers, without limitation, to non-cryogenic refrigerants (e.g., Freon) and cryogenic refrigerants. As used herein, the term "cryogenic refrigerant" is a broad term and is used in its ordinary sense and refers, without limitation, to cryogenic fluids. As used herein, the term "cryogenic fluid" means a fluid with a maximum boiling point of about −50° C. at about 5 bar pressure when the fluid is in a liquid state. In some non-limiting embodiments, cryogenic fluids can comprise $CO_2$, $N_2$, Helium, combinations thereof, and the like. In some embodiments, the cryogenic refrigerant is a high temperature range cryogenic fluid having a boiling point higher than about −100° C. at about 1.013 bars. In some embodiments, the cryogenic refrigerant is a mid temperature range cryogenic fluid having a boiling point between about −100° C. and −200° C. In some embodiments, the cryogenic refrigerant is a low temperature range cryogenic fluid having a boiling point less than about −200° C. at about 1.013 bars.

The heat load capabilities of a temperature control system using a non-cryogenic fluid may be much less than the heat load capabilities of a temperature control system using cryogenic fluid. Further, non-cryogenic refrigerants may lose its effective cooling ability before it reaches critical portions of the mold. For example, Freon refrigerant may be heated and completely vaporized after it passes through the expansion valve but before it reaches critical mold locations and, thus, may not effectively cool the mold surfaces. The temperature control systems using cryogenic fluid can provide rapid cooling and/or heating of the molding surface of the mold apparatus to reduce cycle times and increase mold output.

In one embodiment, a fluid source inlet 128 of the fluid line 130 is connected to the fluid source 126, and the fluid line 130 has an outlet 134 leading to mold apparatus 122. Fluid from the fluid source 126 can pass through the fluid source inlet 128 into the fluid line 130 and out of the outlet 134 to the mold apparatus 122. The fluid line 130 is a conduit, such as a pipe or hose, in which pressurized fluid can pass. For example, in the illustrated embodiment of FIG. 8, fluid in the fluid line 130 is a liquid refrigerant at a pressure of about 40 bars to about 80 bars.

Figure 10:
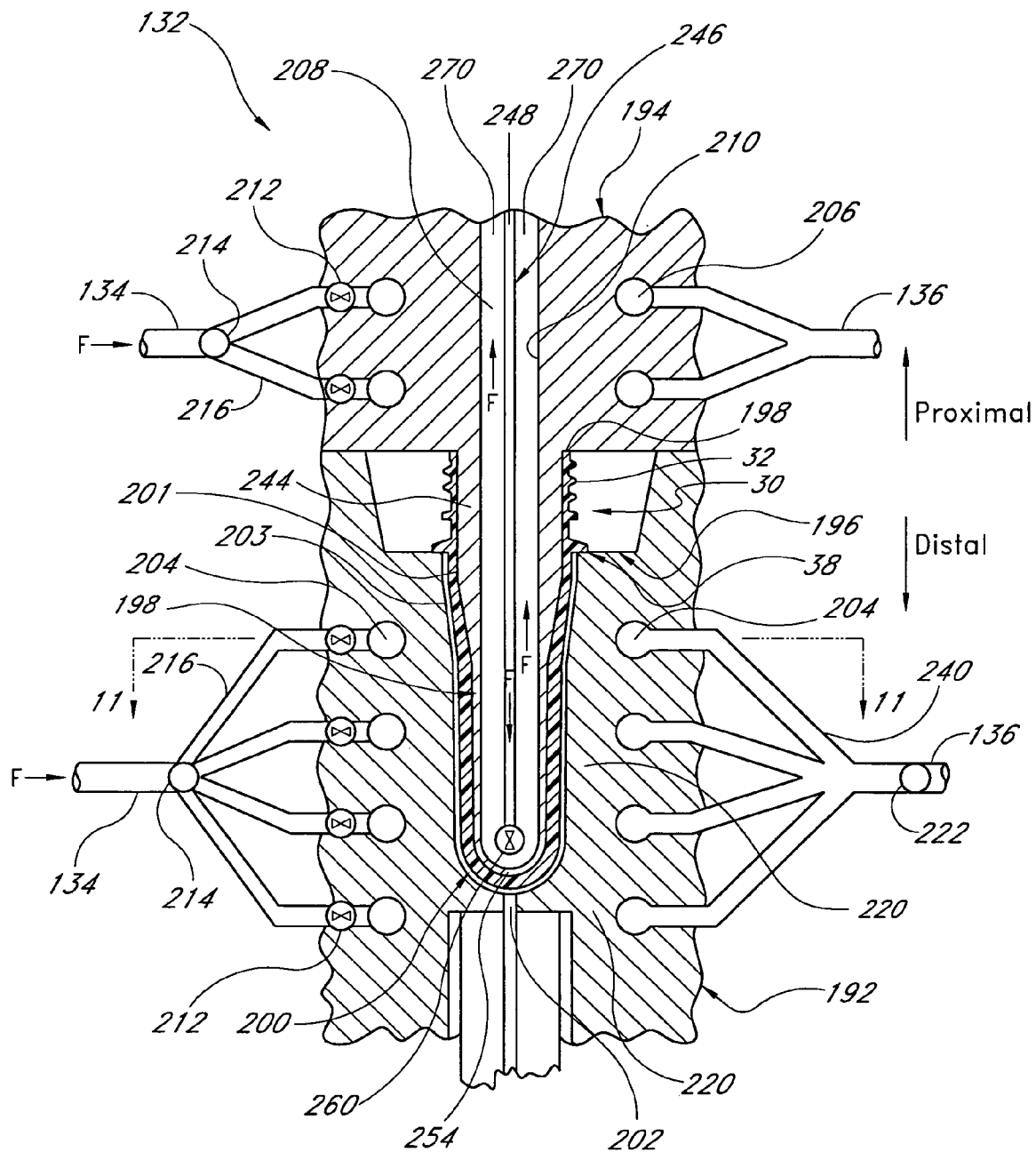
FIG. 10 is a cross-section of an injection mold of a type that may be used to make a preferred multilayer preform.

Fluid from the fluid line 130 passes through the mold apparatus 122 to control the temperature of the mold apparatus 122. In some embodiments, the fluid passes through one or more flow control devices (e.g., pressure reducing elements, valves, and the like) located upstream of or within the mold apparatus 122. The flow control devices receive the fluid (preferably a liquid) at a high pressure and output a low pressure and temperature fluid (e.g., gas or gas/liquid mixture) to one or more flow passageways in the mold apparatus 122. As shown in FIG. 10, for example, the fluid can pass through a plurality of pressure reducing elements 212 in into a plurality of fluid passageways or channels 204 to selectively control the temperature of the preform. The fluid circulating through the mold apparatus of FIG. 10 cools the warm melt to form a multilayer preform.

As used herein, the term "pressure reducing element" is a broad term and is used in its ordinary sense and refers, without limitation, to a device configured to reduce the pressure of a working fluid. In some embodiments, the pressure reducing element can reduce the pressure of the working fluid to a pressure equal to or less than a vaporization pressure of the working fluid. The working fluid can comprise a refrigerant (e.g., a cryogenic refrigerant or a non-cryogenic refrigerant). In some embodiments, the pressure reducing elements are in the form of pressure reduction or expansion valves that cause vaporization at least a portion of the working fluid passing therethrough. The pressure reducing element can have a fixed orifice or variable orifice. In some embodiments, the pressure reducing element can be a nozzle valve, needle valve, Joule-Thomson expansion valve, or any other suitable valve for providing a desired pressure drop. For example, a Joule-Thomson expansion valve can recover work energy from the expansion of the fluid resulting in a lower downstream temperature. In some embodiments, the pressure reducing element vaporizes an effective amount of the working fluid (e.g., a cryogenic fluid) to reduce the temperature of the working fluid such that the working fluid can sufficiently cool an article within a mold to form a dimensionally stable outer surface of the article. In some embodiments, the pressure reducing elements can be substituted with flow regulating elements (e.g., a valve system) especially if the working fluid is a non-refrigerant, such as water.

With reference again to FIG. 8, after the working fluid passes through the mold apparatus 122, the fluid passes through the inlet 136 and through the fluid line 140 and out of an outlet 144 to the exhaust system 148. The fluid line 140 is a conduit, such as pipe or hose, in which pressurized fluid can pass. In some embodiments, the fluid in the fluid line 140 is at a pressure less than about 10 bars, 5 bars, 3 bars, 2 bars, and ranges encompassing such pressures. Of course, the pressure of working fluid may be different depending on the application.

The exhaust system 148 can receive and discharge the fluid from the fluid line 140. The exhaust system 148 can include one or more valves that can control the pressure of the fluid in the fluid line 140 and the amount of fluid emitted from the temperature control system 120. The exhaust system 148 can include one or more fans and/or vents to further ensure that the fluid properly passes through the temperature control system 120. Preferably, the fluid is in the form of a gas that is discharged into the atmosphere by the exhaust system 148. Thus, fluid from the fluid source 126 passes through the fluid line 130, the mold apparatus 122, the fluid line 140, and out of the exhaust system 148 into the atmosphere. Preferably, the working fluid of the temperature control system 120 is a refrigerant, including cryogenic refrigerants like nitrogen, hydrogen, or combinations thereof. These fluids can be conveniently expelled into the atmosphere unlike some other refrigerants which may adversely affect the environment.

Figure 9A:
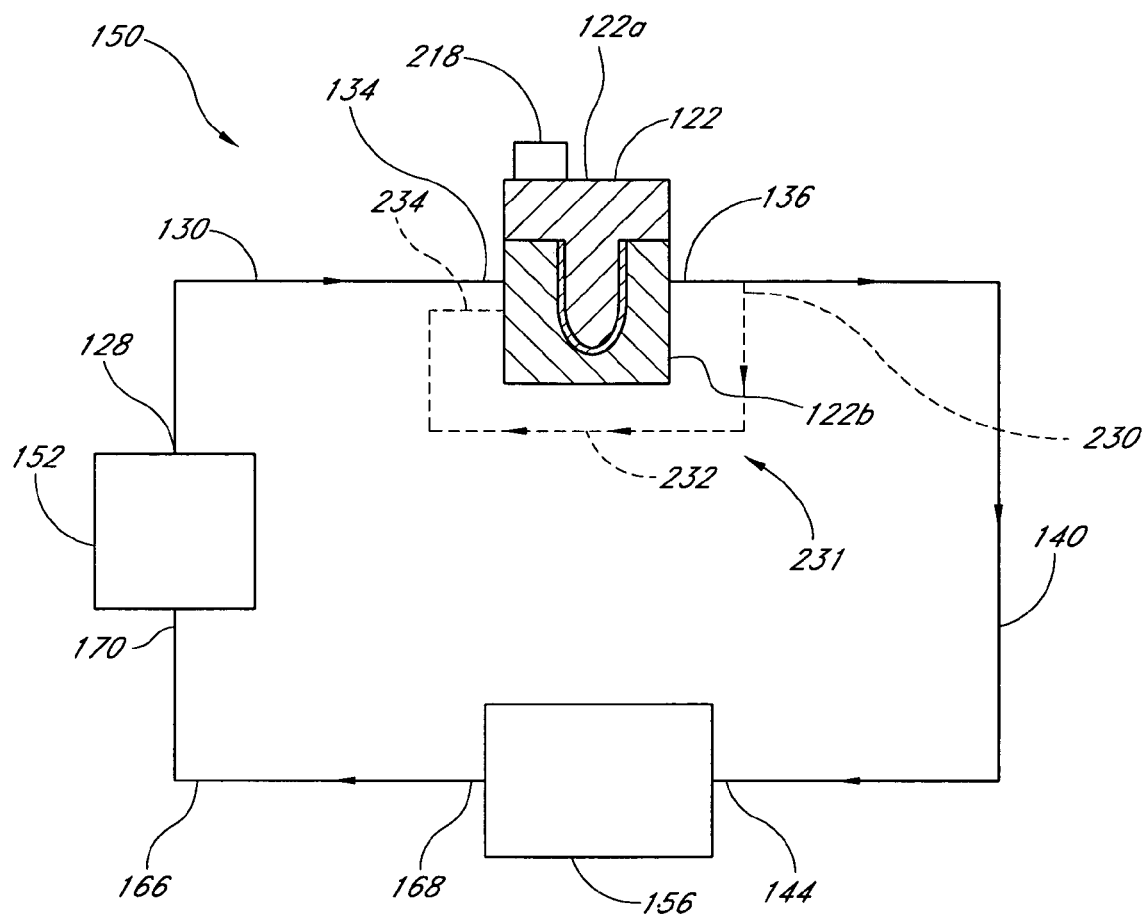
Figure 9B:
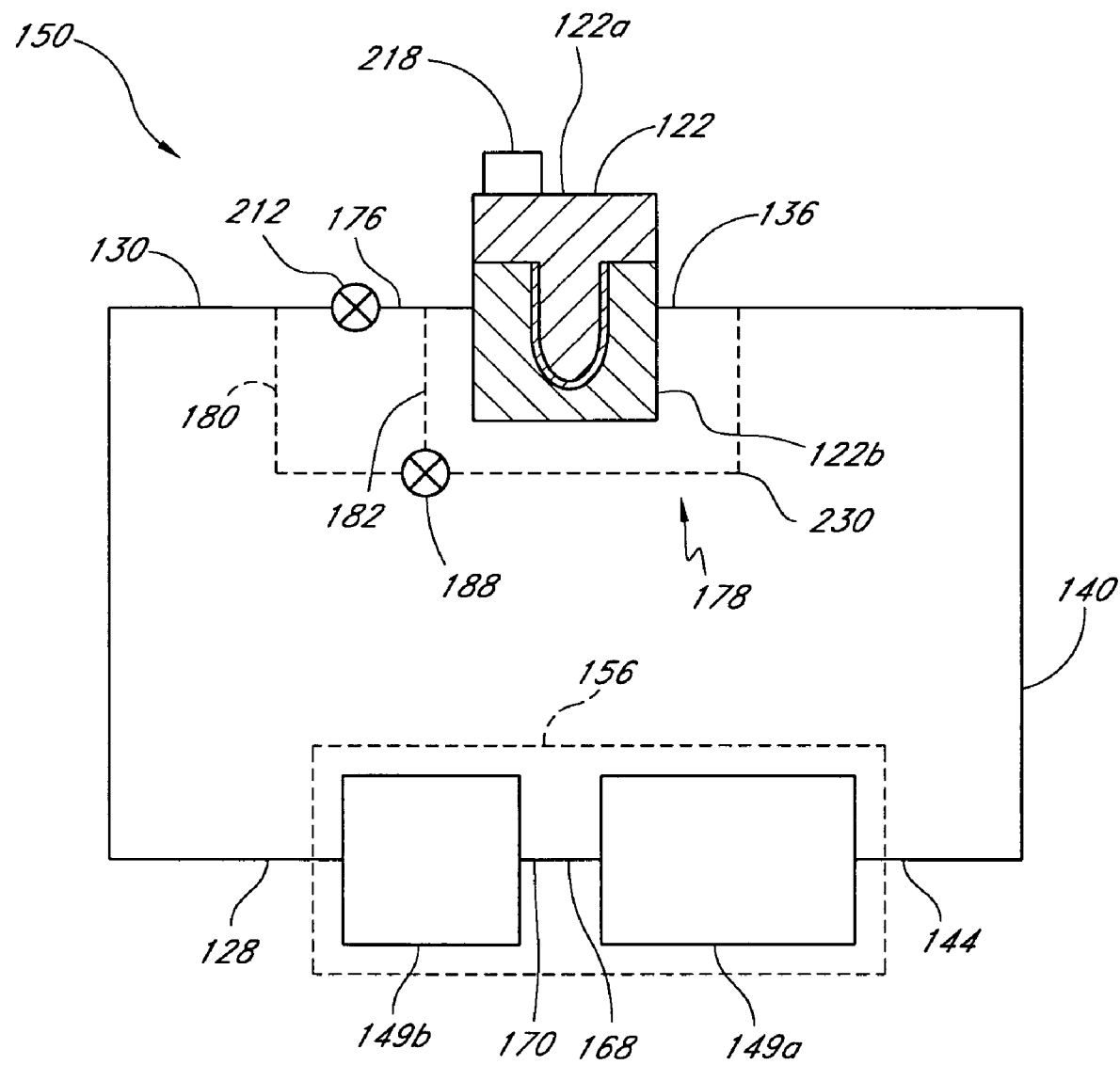
Figure 9C:
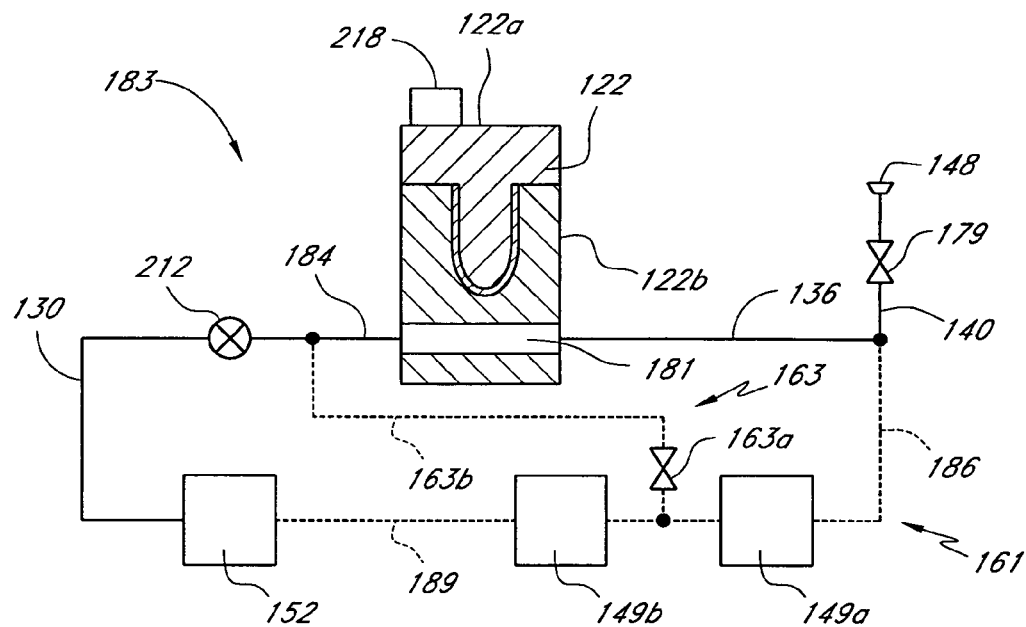
Figure 9D:
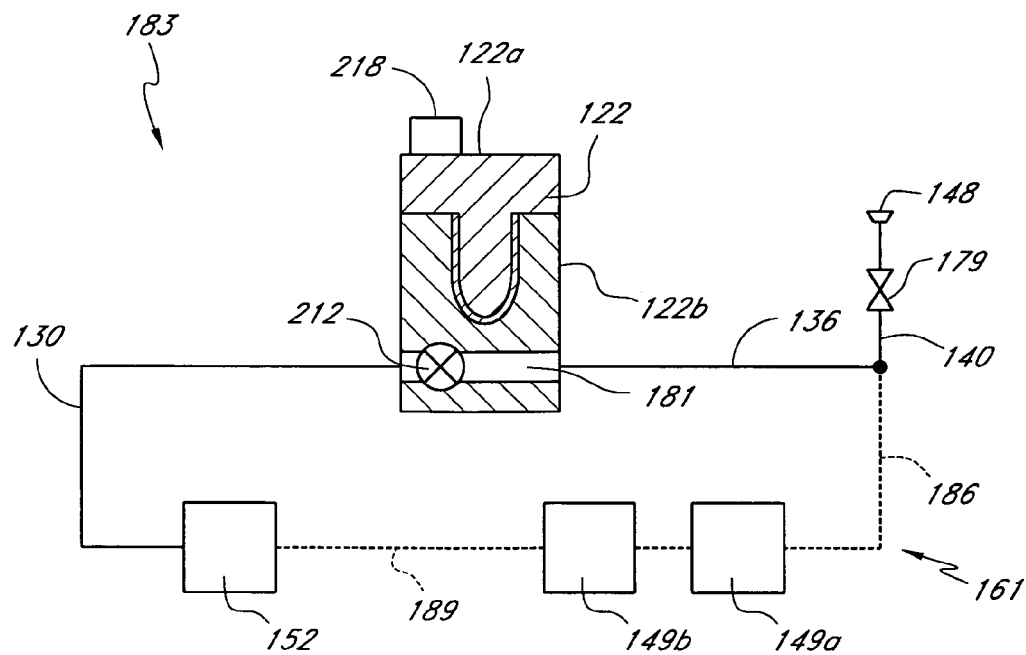
Figure 9E:
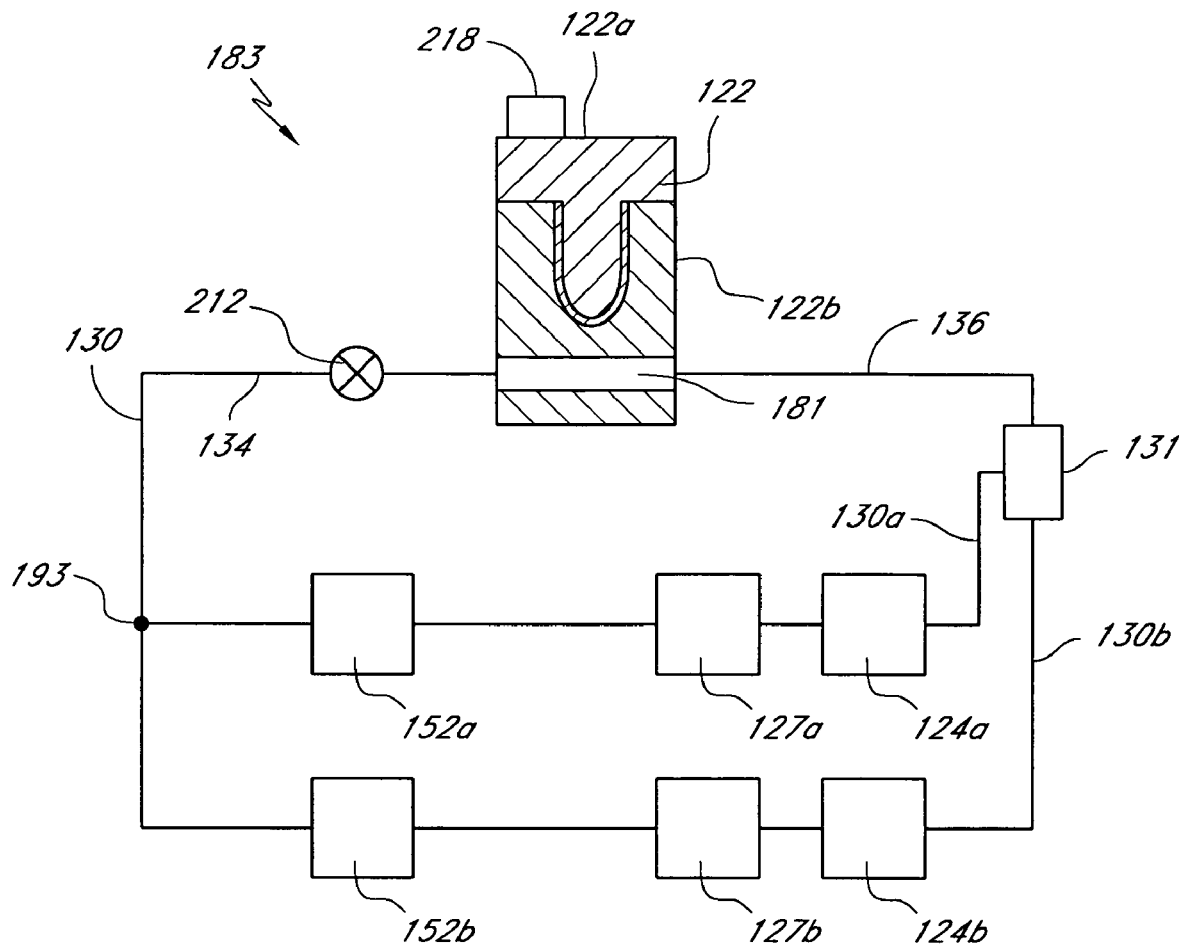
Figure 9F:
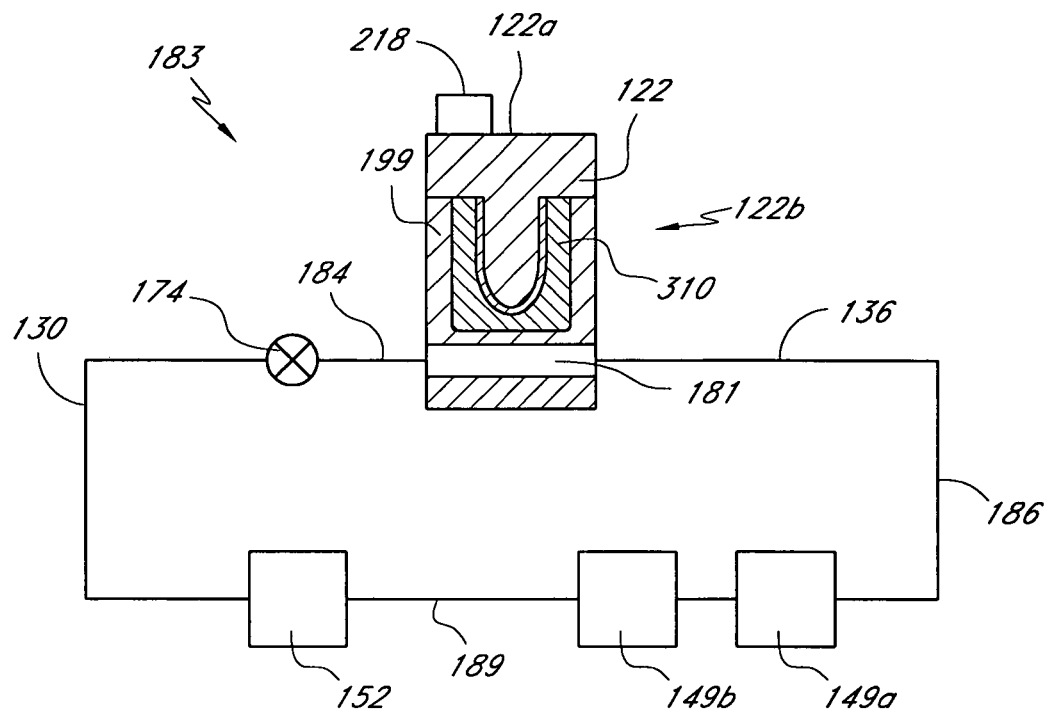
Figure 9G:
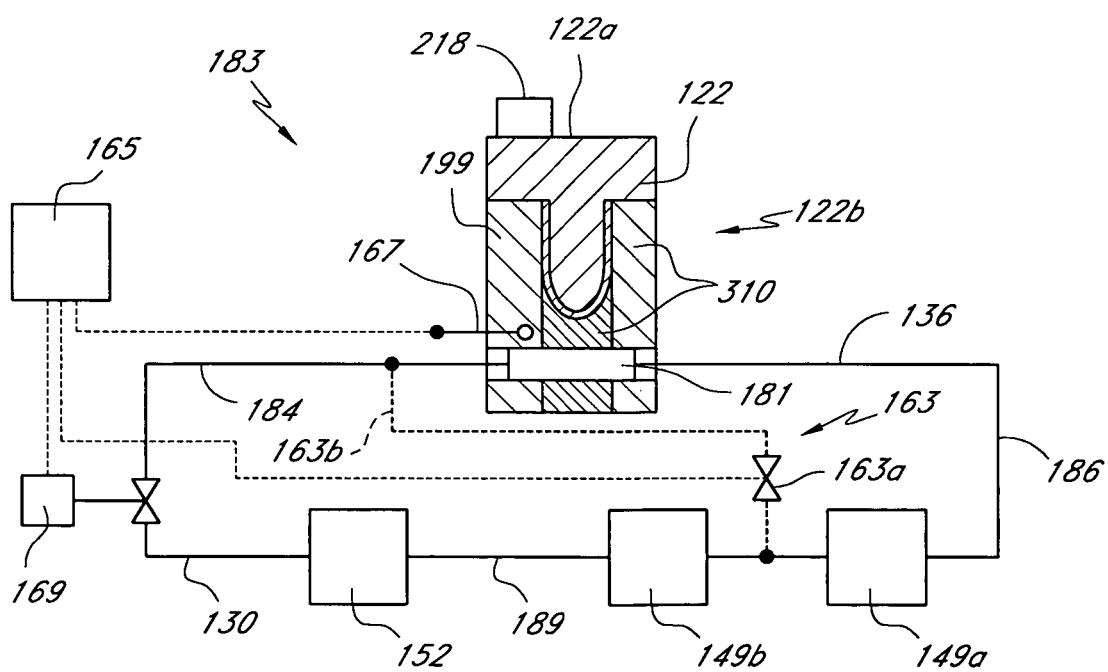
Figure 9H:
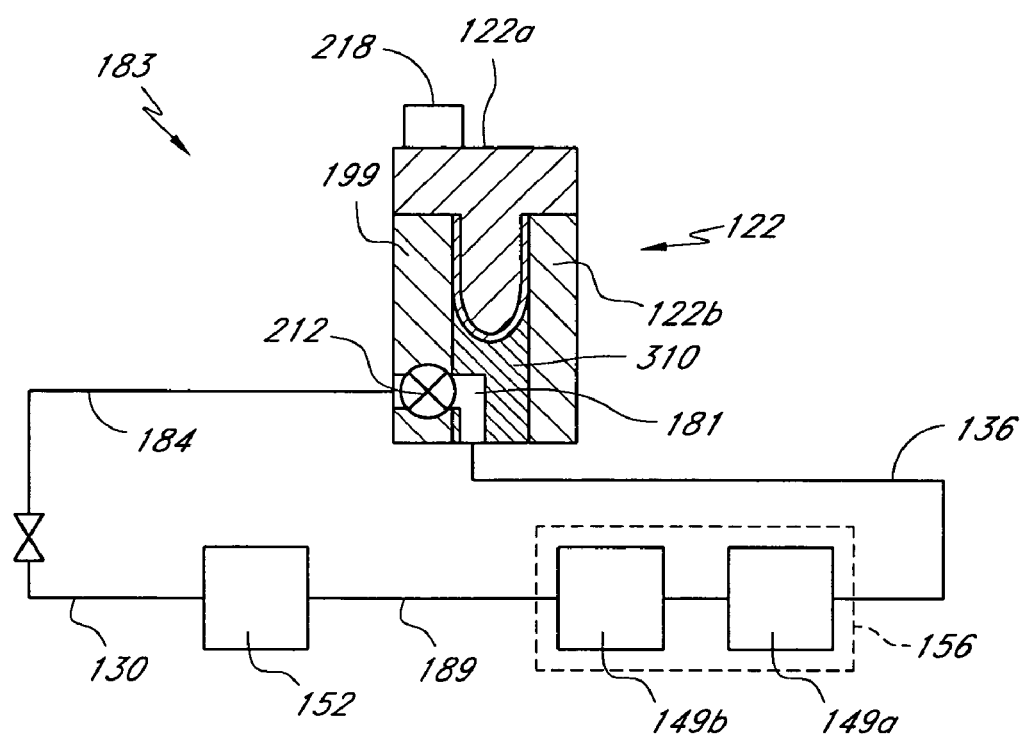
Figure 91:
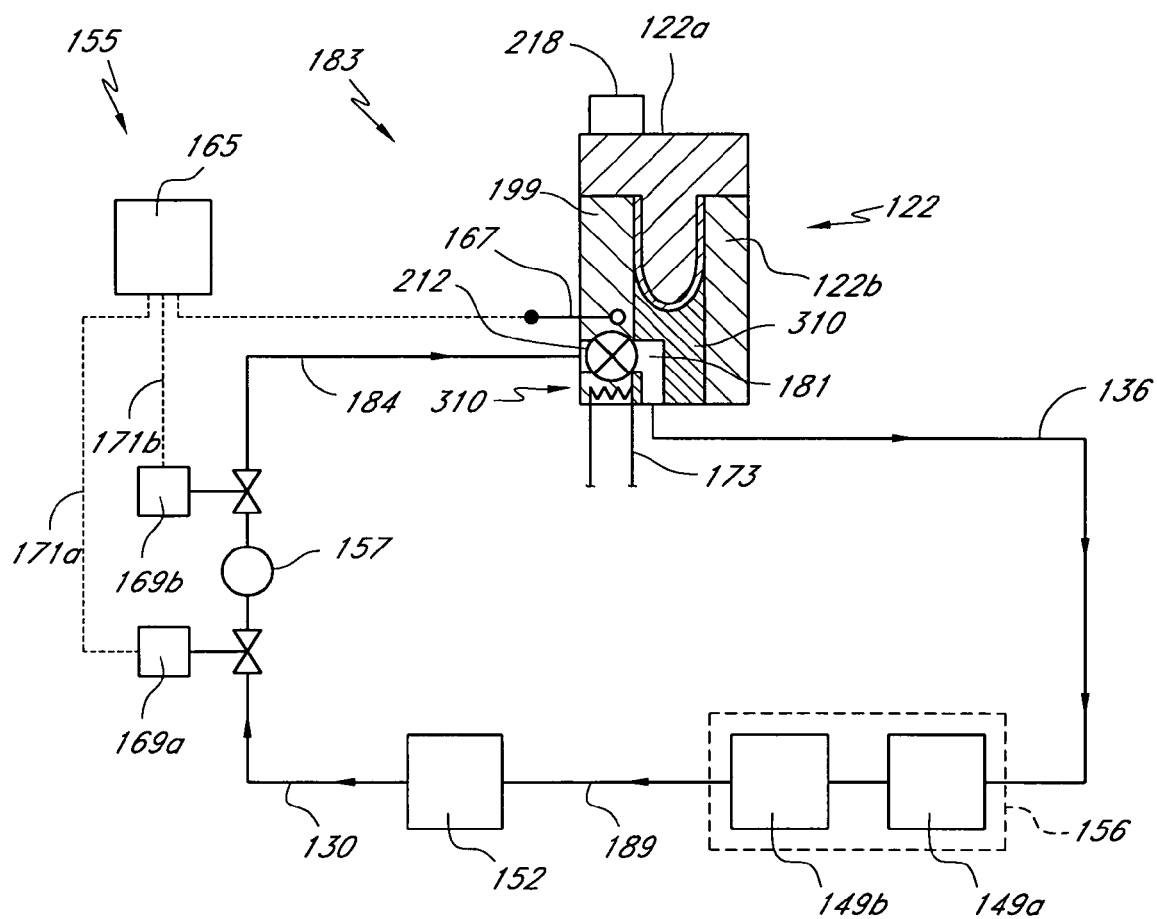
Figure 9J:
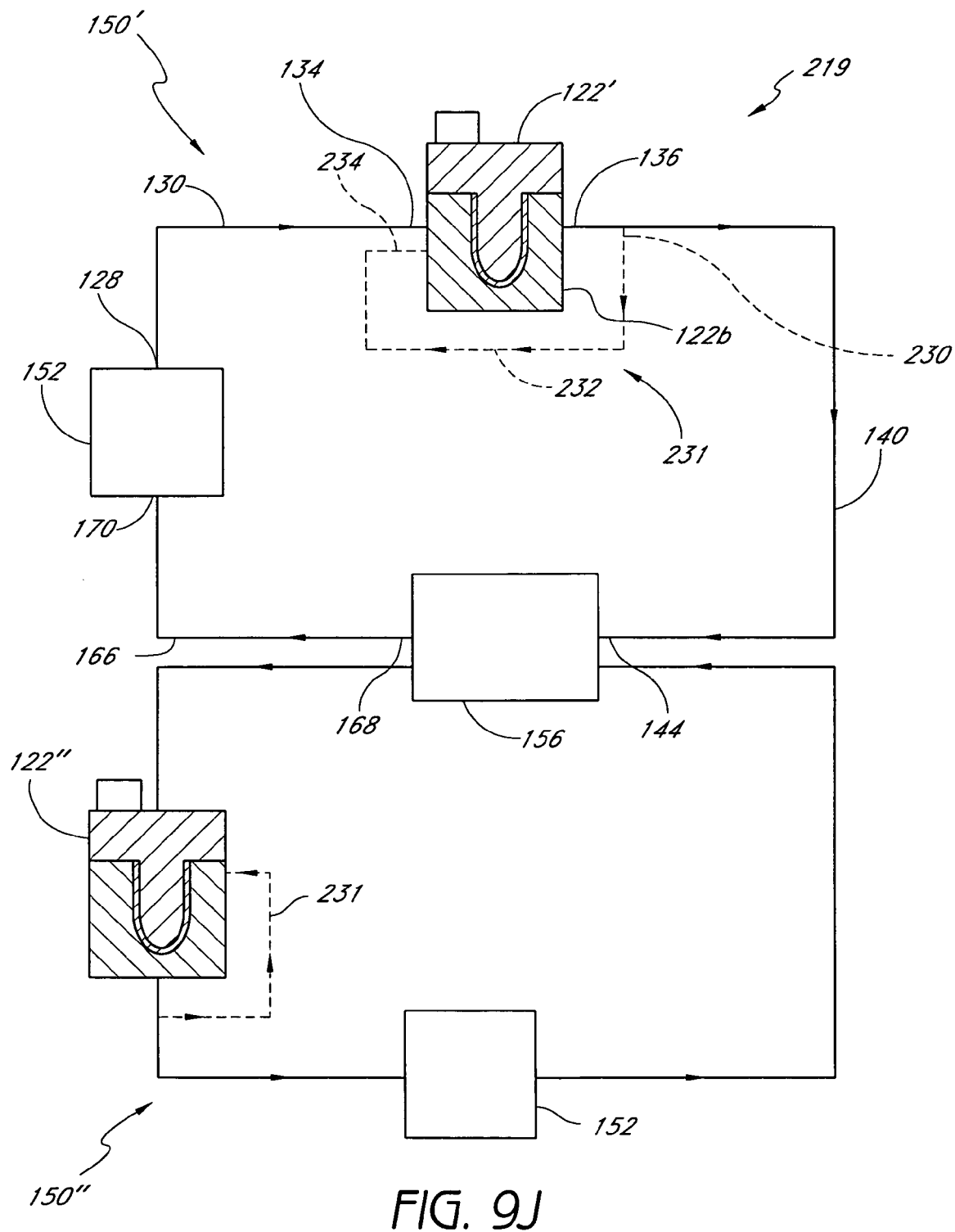
Figure 9K:
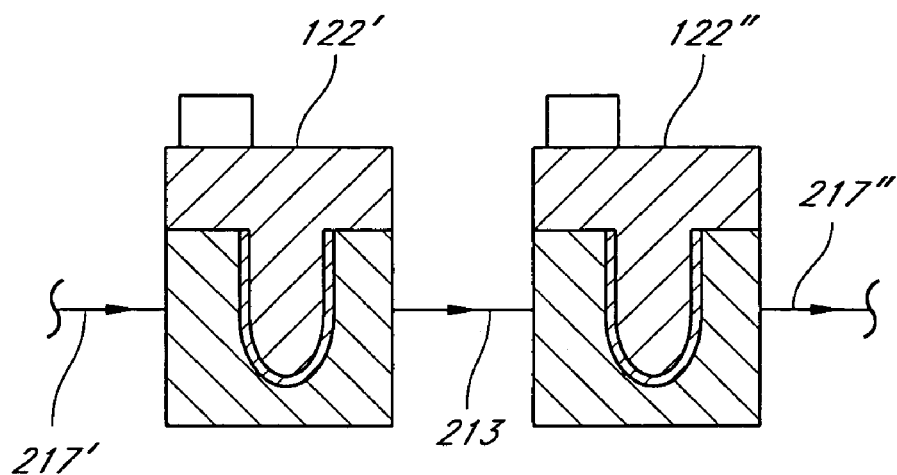
Figure 9L:
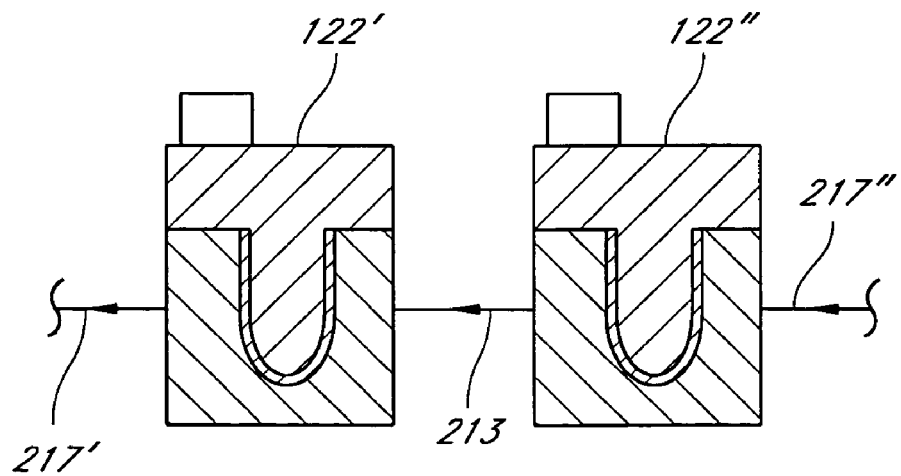

FIGS. 9A-9L depict additional embodiments of temperature control systems for controlling the temperature of mold apparatuses. These temperature control systems may be generally similar to the embodiment illustrated in FIG. 8, except as further detailed below. Where possible, similar or identical elements of FIGS. 8-9L are identified with identical reference numerals.

FIG. 9A schematically illustrates a temperature control system 150, which is a closed loop system designed to control the temperature of the mold apparatus 122 during preform manufacturing. The temperature control system 150 has a fluid source 152 in communication with the mold apparatus 122. The mold apparatus 122 is in communication with a unit 156, which is in communication with the fluid source 152. To cool the mold apparatus 122, the working fluid can flow clockwise as indicated by the arrow heads.

The fluid source 152 is connected to an outlet 170 of a fluid line 166 and is connected to the source inlet 128 of the fluid line 130. The fluid source 152 receives fluid from the fluid line 166 and delivers fluid to the fluid line 130. The fluid source 152 can store the working fluid before, during, and/or after a production cycle.

As illustrated in FIG. 9A, the fluid line 130 is connected to the fluid source 152 and the mold apparatus 122 in the manner described above. The fluid line 140 is in fluid communication with the mold apparatus 122 and the unit 156. The mold inlet 136 of the line 140 is connected to the mold apparatus 122, and the outlet 144 of the line 140 is connected to the unit 156. Fluid passes from the mold apparatus 122 into the inlet 136 and through the fluid line 140 to the outlet 144. The fluid then passes through the outlet 144 and into the unit 156.

The unit 156 can recondition the fluid so that the fluid can be redelivered to the mold apparatus 122 for continuous flow through the temperature control system 150. The unit 156 can include a compressor and/or heat exchanger. The fluid can flow through a compressor which pressurizes the fluid and then flows through a heat exchanger (e.g., a condenser) that reduces the temperature of the pressurized fluid. In some instances, the terms "heat exchanger" and "condenser" can be used interchangeably herein. Preferably, the unit 156 outputs a low temperature liquid to an inlet 168 of the fluid line 166. Fluid from the unit 156 can therefore pass through the fluid line 166 into the fluid source 152 by way of the outlet 170.

The unit 156 can change modes of operation to heat the mold apparatus 122, and the molded articles disposed therein. The working fluid can flow counter-clockwise through the temperature control system 150 to heat the mold apparatus 122. In one embodiment, the unit 156 receives cool fluid (preferably a liquid) from the fluid line 166 and delivers a high temperature gas or gas/liquid mixture, as compared to the cool liquid, to the fluid line 140. The high temperature fluid can heat the mold apparatus 122 and article disposed therein. The unit 156 can thus include an evaporator and/or compressor for heating the working fluid. Thus, the unit 156 can be used to change the mode of operation to heat or cool the mold apparatus 122 as desired.

With continued reference to FIG. 9A, the temperature control system 150 can cool at least a portion of the mold apparatus 122, which in turn cools the plastic in the mold apparatus 122. In one embodiment, the fluid source 152 delivers refrigerant, such as cryogenic fluid (preferably liquid carbon dioxide or nitrogen), to the fluid line 130 and the mold apparatus 122.

The liquid passes through a portion of the mold apparatus 122 and is delivered to one or more pressure reducing elements 212 (see FIG. 10). The pressure reducing elements 212 preferably receive the liquid at a high pressure and output fluid (e.g., gas or gas/liquid mixture) at a low temperature to the channels in the mold apparatus 122. The pressure reducing element 212 can reduce the temperature of the working fluid passing therethrough. The fluid passes through and cools portions of the mold apparatus 122, thereby cooling the polymer in the mold apparatus.

As shown in FIG. 9A, the mold apparatus 122 delivers the heated fluid to the fluid line 140, which, in turn, delivers the fluid to the unit 156 functioning as a compressor and condenser. The unit 156 outputs fluid in the form of a low temperature liquid to the fluid line 166 and the source 152.

In some embodiments, including the illustrated embodiment of FIG. 9A, the temperature control system 150 can have an optional a feedback system 231 for delivering heated fluid from the mold apparatus 122 back into and through the mold apparatus 122. In operation, fluid in the fluid line 140 passes through the feedback system 231 to mold apparatus 122 via a feedback line 232. Preferably, the temperature of the fluid in the feedback line 232 is at a temperature higher than the temperature of the fluid in the fluid line 130. Different portions of the mold apparatus 122 can be maintained at different temperatures by utilizing both the fluid from the fluid line 130 and the feedback line 232. The fluid in the feedback line may or may not be at a temperature of the melt deposited into the mold apparatus. One or more valve systems can be disposed along the lines 130, 232 to regulate the flow of fluid through the mold apparatus 122. In some embodiments, the heating of the mold apparatus 122 by the utilizing the fluid from the feedback line 232 can be performed when the fluid flow from the source 152 to the mold apparatus 122 is reduced or stopped. In some embodiments, the heated fluid from the feedback line 232 can be used to reduce the rate of cooling of the melt in the mold apparatus 122 to, for example, produce a high degree of crystallinity in the molded article. A variety of temperature distributions can be achieved in the mold by utilizing working fluids at different temperatures.

As discussed above, the temperature control system 150 can also heat at least a portion of the mold apparatus 122 by circulating the working fluid in the counter-clockwise direction. In one embodiment, the fluid source 152 delivers fluid to the fluid line 166, which delivers the fluid to the unit 156. The unit 156 can function as a compressor and can increase the temperature of the working fluid. In some embodiments, the unit 156 can receive a fluid (e.g., a two-phase working fluid) from the line 162. The temperature of the two-phase working fluid can be increased by the unit 156 and then delivered to the line 140.

The unit 156 delivers heated fluid (e.g., a high temperature gas or gas/liquid mixture) to the fluid line 140. The fluid is then delivered to and passes through the mold apparatus 122. The fluid passing through the passageways in the mold apparatus 122 heats one or more portions of the mold, which in turn heats or reduces the rate of cooling of the polymer in the mold apparatus 122. The fluid is cooled as it passes through the mold apparatus 122 and is delivered to the fluid line 130, which delivers the cooled fluid to the fluid source 152. The fluid source 152 then delivers the fluid to the fluid line 166 as described above. Thus, fluid flows in one direction through the temperature control system 150 to cool the mold apparatus 122 and flows in the opposite direction through the temperature control system 150 to heat the mold apparatus 122. Further, the flow of fluid can be reversed one or more times during preform production to heat (e.g., reduce the rate of cooling of the melt) and cool the mold repeatedly as desired.

The temperature control system 150 can have a device (not shown) for ensuring that the pressure in the mold apparatus 122 remains at a sufficiently low pressure. For example, the device can be a safety valve, blow off valve, or rupture disk that will prevent the pressure in the mold apparatus 122 from reaching critical limits, especially as the working fluid is heated within the mold apparatus 122 and undergoes a phase change (e.g., from liquid to gas).

If the working fluid passing through the mold apparatus 122 is a two-phase fluid, the two-phase fluid can remain at a generally constant temperature. In some embodiments, the two-phase liquid/gas mixture can be at a generally constant pressure, while absorbing heat and remaining at a relatively low temperature so long as both liquid and gas phases of the working fluid are present. That is, the working fluid in the mold (e.g., in the fluid channels) can remain at a somewhat constant temperature as long at least some of the working fluid is in a liquid state. Additionally, the size of the channel can increase in the downstream direction to limit or prevent a temperature increase of the working fluid as the working fluid is vaporized. If liquid (e.g., chilled water) is circulated through a mold, the temperature of the liquid may increase in the downstream direction and, thus, may produce a declining cooling efficiency in the downstream direction. Advantageously, the mold apparatus 122 can be cooled by the two-phase mixture that is at a generally constant temperature throughout the mold apparatus 122 for enhanced thermal efficiency and/or more uniform cooling of the molded article.

In some embodiments of operation the fluid source 152 stores a refrigerant, such as cryogenic fluid in the form of carbon dioxide, at a temperature of about 20° C. and at a pressure of about 57 bar. The temperature of the fluid within the fluid source 152 can be controlled by increasing or decreasing the pressure applied to the fluid. For example, the fluid source 152 can contain carbon dioxide at a pressure of 80 bar and a temperature of about 25° C. If the pressure of the carbon dioxide is lowered to 20 bar, the liquid carbon dioxide may vaporize and lower the temperature of the liquid/gas mixture to about −20° C., so long as the cryogenic fluid comprises liquid carbon dioxide. The carbon dioxide two-phase fluid can be passed, preferably at a relatively high flow rate, through the mold apparatus 122. The high flow rate enhances wall contact, and the vaporization causes a high degree of turbulence resulting in effective heat transfer between the walls of the passageway and the working fluid. Of course, other working fluids can be used to control the temperature of the mold apparatus 150 in a similar manner.

The proportion of liquid phase of the working fluid can be increased to increase heat transfer to the working fluid. For example, a second fluid in the liquid phase can have a freezing point so low that the second fluid will be a stable liquid at most of all of the temperatures and pressures experienced during the cooling process. The second fluid can increase the rate of cooling of the polymer in the mold apparatus 122. The first fluid and the second fluid can be delivered together to the mold apparatus 122. The first fluid can vaporize (at least partially) while the second fluid remains a liquid. Additional fluids with other freezing points can be used control the temperature of the mold apparatus 122 for a desired application. In view of the present disclosure, a skilled artisan can select the number and types of working fluids to achieve the desired thermal characteristics of the working fluid. In some embodiments, a plurality of working fluids can be utilized, wherein the working fluids can be selected to enhance mixing of the fluids. In some embodiments, the densities of two or more of the working fluids can be substantially similar to each other to promote even mixing and cooling. However, in some embodiments, the densities of the working fluids can be substantially different from each other.

The fluid source of the temperature control systems can comprise a plurality of fluid sources. Each of the fluid sources can contain a different working fluid. For example, although not illustrated, the temperature control system 150 of FIG. 9A can have a second fluid source containing a second fluid. The second fluid can have a freezing point that is higher than the temperature of the vaporized fluid from the first fluid source 152, as discussed above. It is contemplated that additional fluid sources can be added to any of the fluid systems described herein. Accordingly, any number of fluid sources and working fluids can be used to control the temperature of the mold apparatus.

FIG. 9B illustrates a modified temperature control system. The temperature control system 150 of FIG. 9B can have a working fluid (e.g., a refrigerant, cryogenic fluid, and the like) that circulates the closed loop system. The working fluid can flow in the clockwise direction through the system 150 to provide chilled fluid to the mold apparatus 122. The fluid can flow in the counter-clockwise direction to provide a heated fluid to the mold apparatus 122.

Fluid can pass through the fluid line 130 to the pressure reducing element 212. The pressure reducing element 212 can comprise one or more valves adapted to produce a change in temperature of the working fluid. The illustrated pressure reducing elements cause a pressure drop of the working fluid, thereby reducing the temperature of the fluid. The pressure drop across the pressure reducing element 212 can be increased to increase the temperature drop. In some embodiments, the pressure reducing element 212 is configured to reduce the pressure of the refrigerant to a pressure equal to or less than a vaporization pressure of the working fluid. When a fluid (e.g., a refrigerant) passes through a pressure reducing element 212, at least portion of the refrigerant is vaporized. The amount of fluid that is vaporized can be selected to achieve a desired temperature change in the working fluid. The fluid in the line 176 can thus comprise a two-phase fluid (e.g., a gas/vapor mixture), although the fluid in the line 176 can comprise mostly or entirely a gas phase fluid. The fluid line 176 can be insulated to minimize temperature increases of the working fluid before the working fluid cools a material disposed in the mold apparatus 122.

With continued reference to FIG. 9B, the low pressure fluid outputted from the pressure reducing element 212 then passes through a fluid line 176 and enters the mold apparatus 122. Preferably, the fluid enters the mold apparatus 122 as a low pressure and low temperature two-phase mixture comprising liquid and gas. In the mold apparatus 122, heat from the mold apparatus 122 is transferred to the two-phase mixture such that some of the liquid component of the mixture is vaporized as a result of the heat transfer. The working fluid then passes through the fluid line 140 to the unit 156, which comprises a compressor 149a and condenser 149b. The compressor 149a compresses, preferably adiabatically, the fluid to produce a saturated vapor. The saturated vapor is then passed to the condenser 149b. The condenser 149b can be a heat exchanger that condenses the fluid as heat is transferred from the working fluid to the environment. The fluid then passes through the fluid line 130 and the pressure reducing element 212 to repeat the process for continuous mold cooling. The flow of the working fluid can be continuous, intermittent, etc.

The temperature control system 150 can include an optional bypass system 178 that can be used to obtain the desired characteristics of the fluid delivered to the mold apparatus 122. In the illustrated embodiment, the bypass system 178 can have a fluid line 180 that is connected to the fluid line 130 and a fluid line 182 that is connected to the fluid line 176. The high pressure fluid in the fluid line 130 can pass through the fluid line 180 and the low pressure fluid in the fluid line 176 can pass through the fluid line 182. A valve system 188 can independently control the flow of fluid through the lines 180, 182 to adjust the pressure and temperature drop across the pressure reducing element 212. The fluid from the lines 180, 182 can be delivered along the line 230, thereby bypassing the mold apparatus 122. Alternatively, the bypass system 178 can deliver heated downstream fluid in the line 140 to the mold apparatus 122. Heated fluid can be drawn through the line 230 to the valve system 188. The valve system 188 can deliver the heated fluid directly to the mold or to the line 176 (as shown). In some embodiments, the valve system 188 comprises one or more flow regulating valves and one or more pumps or compressors. Thus, the bypass system 178 can be used to vary the pressure, temperature, and/or flow rate of the fluid that is delivered to the mold apparatus 122.

The fluid line 182 can also deliver fluid directly to the mold apparatus 122. Although not illustrated, the fluid line 182 can be connected to the mold apparatus 122. Heated fluid in the line 140 can flow through lines 230, 182 and into fluid channels in the mold apparatus 122. The heated fluid can be passed through the mold apparatus 122. The heated fluid can heat the mold apparatus 122 as the cool fluid from the line 130 is passed through the mold apparatus 122. Thus, portions of the mold apparatus 122 can be heated by a heated fluid while other portions of the mold apparatus 122 are heated with a cooled fluid. In some embodiments, the flow of cooled fluid from the line 130 is reduce or stopped as the heated fluid from the line 182 flows through the mold apparatus. In operation, the cooled fluid can flow through the mold apparatus 122 to cool melt disposed within the mold apparatus 122. The valve system 188 can stop the flow of heated fluid through the line 182 and the mold apparatus 122. After the molded article is removed from the mold apparatus 122, heated fluid can be passed through the valve system 188, the line 182, and into mold apparatus 122. The heated fluid can limit the formation of condensation and/or heat the temperature of the mold surfaces to facilitate the injection of melt into the mold cavity of the mold apparatus 122.

With respect to FIG. 9C, the temperature control system 183 has a mold section 122b that comprises one or more temperature control elements 181. As used herein, the term "temperature control element" is a broad term and is used in its ordinary sense and refers, without limitation, to a passageway, channel, temperature control rod (e.g., heating/cooling rods), heaters (e.g., resistance heaters), combinations thereof, and the like. Temperature control elements can be positioned within molds (including injection molds, compression molds, stretch blow molds, and the like) to control the temperature of the mold. The temperature control elements can be strategically placed in the mold for a desired temperature distribution. For example, to increase thermally efficiency, the temperature control elements can be mold towards molding surfaces of the molding apparatus 122.

The illustrated temperature control element 181 is in the form of a fluid passageway. The fluid passageway 181 can comprise a plurality of fluid channels, such as the fluid channels 204 illustrated in FIG. 10. The working fluid, preferably partially vaporized, in the passageway 181 absorbs heat delivered by the mold section 122b, which is heated by the hot polymer within the mold apparatus 122. The working fluid can flow at a constant or variable flow rate depending on the application.

The mold section 122a can likewise have one or more temperature control elements similar to or different than the temperature control element of the mold section 122b. In some embodiment, at least a portion of the mold section 122b can be formed of a high heat transfer material. The high heat transfer material can be at a location along the fluid passageway 181 where rapid cooling is especially desirable. The high heat transfer material can be proximate to or near the molding surfaces of the mold apparatus 122 to maximize heat transfer. The high heat transfer material can also form the molding surfaces that contact the melt and subsequently formed article, although other configurations can be used. The high heat transfer material and the temperature control element 181 in combination can rapidly and efficiently control the temperature of the mold apparatus 122. However, the mold can also be formed partially or entirely of low heat transfer materials.

The temperature control system 183 can operate as an open loop system, closed loop system, and combinations thereof. In one mode of operation, the system 183 operates as an open loop system. The working fluid can flow through the passageway 181 and into the lines 136, 140 and can be vented off by the exhaust system 148. A valve system 179 can be used to selectively control the flow of fluid to the exhaust system 148. For example, the valve system 179 can be operated to maintain a target pressure in the fluid lines and/or mold apparatus 122. The target pressure can be equal to or above a predetermined pressure drop across the pressure reducing element 212. For example, if the working fluid is liquid carbon dioxide, a pressure drop across the pressure reducing device 212 that less than 5 bar could lead to the formation of solid carbon dioxide. The valve system 179 can be operated to ensure that the pressure of the working fluid maintains desirable operation of the system.

In some modes of operation, the system 183 can be operated as a closed-loop system. The system 183 can comprise a closed-loop portion 161 that feeds the working fluid back to the fluid source 152. The temperature control system 183 can thus be operated as a closed loop system or a closed loop system depending on whether the working fluid is suitable for venting to atmosphere.

With continued reference to FIG. 9C, the closed-loop portion 161 can comprise a compressor 149a and a condenser 149b. The heated fluid in the line 136 can flow through the line 186 (shown in dashed line) to the compressor 149a. The compressor 149a can be series with the condenser 149b to reduce the temperature of the fluid delivered to the source 152. The compressor 149a and the condenser 149b can cooperate to deliver fluid at a desired temperature and pressure to the fluid source 152 through the line 189. Preferably, the working fluid is delivered to the source 152 at the original pressure and temperature of the fluid in the source 152. In some embodiments, the fluid source(s) can be removed from the temperature control system and the working fluid can be stored in the fluid lines.

The illustrated closed-loop system 161 can have an optional bypass system 163 that delivers heated fluid to some location upstream of the mold apparatus 122. The illustrated bypass system 163 has at least one valve system 163*a* (e.g., a flow control valve) positioned along the line 163*b*. The valve system 163*a* can be operated to let warm compressed fluid flow through the line 163*b*. The warm fluid from the line 163*b* is mixed with the cool fluid outputted by the pressure reducing element 212. The ratio of the fluid from the line 163*b* and fluid from the pressure reducing element 212 can be selected to achieve a target fluid temperature of the fluid circulating through the mold apparatus 122. Thus, the bypass system 163 can be used to selectively control the temperature of the fluid delivered to the mold apparatus 122.

The pressure reducing element 212 can be disposed external to the mold apparatus 122 as shown in FIG. 9C. However, the pressure reducing element 212 can be positioned within the mold apparatus 122. As shown in FIG. 9D, for example, the pressure reducing element 212 is disposed within the mold apparatus 122. The pressure reducing element 212 can be positioned any suitable point along the passageway 181. For example, the pressure reducing element 212 can be positioned at the entrance of the passageway 181, inside the passageway 181. However, the pressure reducing element 212 can be positioned inside a mold plate leading to the passageway 181, or any other suitable location.

FIG. 9E illustrates a temperature control system 183 that has at least one flow separator 131. The line 136 delivers a fluid (e.g., a heated gas/liquid mixture) from passageway 181 to the phase separator 131 which, in turn, delivers the gas phase fluids to the line 130*a* and liquid phase fluids to the line 130*b*. The flow separator 131 can be a membrane separation unit or other suitable device for separating liquid and gas flows.

The flow separator 131 can have a membrane that allows certain substances to pass therethrough at a first flow rate and other substances to pass therethrough at a second flow rate different than the first flow rate. For example, and more particularly, such membrane separation unit can be provided with a membrane that allows liquids and gases to pass therethrough at different rates. The effect is that the retentate liquid (e.g., liquid that do not permeate through the membrane) remains on one side of the membrane. The permeate gases pass through the membrane. In this manner, the liquid and gas component of the working fluid are separated. The gas and fluid are then delivered to the lines 130*a*, 130*b*. It is contemplated that other types of flow separators can be employed.

A compressor 124*a* and a heat exchanger 127*a* are positioned along the line 130*a* so as to deliver fluid to the source 152*a* at substantially the same pressure and temperature as the fluid contained in the source 152*a*. The flow separator 191 delivers the liquid component to the line 130*b*. The liquid is delivered to a compressor 124*b*, heat exchanger 127*b*, and returned to the fluid source 152*b*. In some embodiments, a single heat exchanger can be used to cool both the gas phase component and liquid phase components from the flow separator 191.

Fluids from the fluid sources 152*a*, 152*b* flow along the lines 130*a*, 130*b*, respectively, and are preferably mixed at the junction 193. The fluid source 152*a* comprises a first fluid. The first fluid is preferably a cryogenic fluid that will at least partially vaporize as it passes through the pressure reducing element 212. The fluid source 152*b* preferably comprises a second fluid which remains a stable liquid as it passes through the pressure reducing element 212. Thus, the passageway 181 can contain one or more different fluids. The first fluid can have a liquid component that vaporizes as it absorbs heat from the mold apparatus 122. The second fluid from the source 152*b* can remain a liquid, thus maintaining high thermal loading capabilities. Alternatively, both fluids can vaporize as they circulate through the mold apparatus 122.

FIG. 9F shows the example of a temperature control system 183 that comprises a mold apparatus 122 having portions with different thermal conductivities. The illustrated mold apparatus 122 comprises a first section 199 comprising a first material and a second section 310 comprising a second material. In some embodiments, the second material preferably has a thermal conductivity greater than the first material. In some embodiments, the second section 310 comprises a high heat transfer material. The first section 199 can surround and thermally insulate the second section 310 to minimize heat losses from the mold apparatus 122. For example, the first section 199 can be in the form of a mold plate that houses the second section 310. The mold plate can comprise steel (e.g., stainless steel or other steel alloys) or other low thermally conductive material.

The passageway 181 can pass through the first section 199 and/or the second section 310. The position of the passageway 181 in the mold apparatus 122 can be selected based on the desired cooling rates and heat distribution of the polymer in the mold apparatus 122. Additionally, the pressure reducing device 212 can be positioned external to the mold apparatus (shown), within the first section 199, within the second section 310, or another suitable location for reducing the pressure of the working fluid.

With respect to FIG. 9G, the temperature control system 183 comprises one or more sensors coupled to the mold apparatus 122. In some embodiments, the sensors are configured to detect and send a signal indicative of the temperature of the mold apparatus 122. In some embodiments, including the illustrated embodiment, a sensor 167 is positioned somewhat between the passageway 181 and the polymer in the mold apparatus 122. In some embodiments, the sensor 167 is interposed directly between the mold cavity and the passageway 181. In some embodiments, the sensor 167 is positioned near the molding surface of the mold apparatus 122 for accurately measuring the temperature of the molding surfaces.

The sensor 167 can send a signal directly or indirectly to a controller 165. The controller 165 can have a stored control program or map and can selectively control the valve 169 based on the signal from the sensor 167. The controller 165 can selectively control the valve 169 based on, for example, absolute mold temperatures, rate of temperature changes, and/or the like to achieve the desired cycle and preform finish. Any number of sensors 167 can be positioned in the mold apparatus 122 to measure the temperature of the mold apparatus 122. A plurality of sensors can be positioned throughout the mold is measured the temperature of the mold apparatus 122 at various locations.

The valve 169 can be any suitable flow regulator or valve for controlling the flow of fluid to the fluid line 184. The valve 169 can be a solenoid valve which inhibits flow of the fluid coming from the fluid source 152 by way of the line 130. In other embodiments, the valve 169 comprises a needle valve (preferably an adjustable needle valve). The valve 169 can provide a pressure drop so that a gas/liquid mixture is delivered to the line 184, which leads to the passageway 181 of the mold section 122*b*.

In some embodiments, at least a portion of the line 184 is disposed within the first section 199 in the form of a mold plate. The line 184 can be thermally insulated to inhibit the absorption of heat to the working fluid from the mold apparatus or the surrounding environment. The line 184 can be insulated with stainless steel, phenolic, nomex, and/or other suitable low heat transfer material for enhancing thermal isolation of the fluid flowing through the line 184. In some embodiments, the line 184 is insulted by an insulating jacket. The insulating jacket can comprise a polymer, foam, or a metal (e.g., steel and its alloys, such as stainless steel). Advantageously, an insulator can limit or prevent the deposition of moisture (e.g., condensation) on fluid lines. The insulated line 184 reduces or limits temperature changes of the working fluid passing through the line 184 for increased thermal efficiency. As the fluid passes through the passageway 181 it absorbs heat coming from the polymer, which causes additional vaporization of the fluid. As described above, the heated fluid passes through the line 136 to the unit 156, which pressurizes the working fluid. The fluid can have a somewhat elevated temperature. The heat exchanger 197 receives and cools the fluid, which lead to final condensation. The condensed fluid is returned to the source 152. The valve 163*a* of the bypass system 163 is preferably closed when the working fluid flows clockwise through the temperature control system 183 and cools the mold apparatus 122.

The temperature of the mold apparatus 122 can be raised for at least a portion of the production cycle. For example, the temperature of the mold section 122 can be raised to prevent the formation of condensation on the mold surfaces. The temperature of the mold surfaces can be raised before injection of the polymer into the mold cavity in order to prevent formation of moisture on the mold surfaces forming the mold cavity.

To warm the mold apparatus 122, the controller 165 can reduce or stop the flow of fluid through the valve 169 and can permit fluid flow through the valve 163*a* of the bypass system 163. The warm compressed fluid in the bypass line 163*b* is fed back into the passageway 181 to heat the molding surfaces, and preferably minimizing the formation of condensation.

When the mold surfaces of the mold apparatus 122 are exposed to atmospheric air, the temperature of the mold surfaces can be maintained at or above a dew point temperature to limit the formation of condensation. The controller 165 can operate the valves 163*a*, 169 to maintain the temperature of the mold surfaces at a preset temperature preferably at or above the dew point. In some embodiments, the mold surfaces can be preheated to aid the spreading of melt through the mold cavity. After the melt fills the mold cavity, the mold surfaces can be cooled at various rates to form articles with a particular finish.

The controller 165 can close the valve 163*a* and open the valve 169 to cool the mold surfaces before, during, and/or after the polymer has been injected into the mold cavity of the mold apparatus 122. The fluid in the line 184 can be at a relatively low pressure because the valve 163*a* is closed, thus introducing a fluid mixture with minimum temperature and maximum cooling efficiency to the channel 181.

High conductivity materials can be used for rapid temperature changes of the mold apparatus 122. During the molding process, if the mold surfaces are relatively cool, the leading portions of the melt can travel the furthest distance along the mold cavity and thus may be significantly cooler than the other portions of the melt (e.g., the polymer in the vicinity of the gate). The non-uniform cooling rates can lead to less than optimum polymer properties. Thus, during portions of the production cycle, certain sections of the mold apparatus 122 can be cool for portion(s) of the molding process and relatively warm for other portion(s) of the injection process. To reduce production cycle times, the temperature changes in the mold can be relatively fast. The temperature and/or flow rate of the cooling fluid can vary considerably during the production cycle for different applications.

The materials forming the mold apparatus 122 can be chosen to achieve the desired amount of crystallinity in the article. For example, the polymer adjacent to the second section 310 can a can be rapidly cooled to form a polymer with a low degree of crystallinity. Thus, the polymer near or contacting the second section 310 can comprise mostly or entirely amorphous material. The first portion 199 can comprise a material with a lower thermal conductivity to reduce the rate cooling of the polymer thereby increasing the degree of crystallinity of the polymer. For example, the first portion 199 can be configured to form a crystalline neck finish of preform.

With reference to FIG. 9H, a temperature control system 183 is illustrated. The illustrated passageway 181 extends through the first section 199 and the second section 310. As discussed above, first section 199 can be formed of a material having a higher thermal conductivity than the second section 310 such that the first section 199 cools the polymer at a lower rate than the second section 310. In alternative embodiments, the second section 310 and the first portion 199 can both be made of materials having similar conductivities. For example, the second section 310 and the first section 199 can comprise materials having a high thermal conductivity. Low conductivity materials (e.g., inserts) can be positioned between the first section 199 and the second section 310 for thermal isolation. In some embodiments, the second section 310 and the first section 199 each comprises high heat transfer materials. Each of the second section 310 and first section 199 can have one or more temperature sensors to measure the temperature of the mold apparatus 122.

With respect to FIG. 9I, the temperature control system 183 has a passageway 181 that may or may not pass through both sections 310, 199. Fluid from the fluid source 152 is delivered to a flow metering system 155. The flow metering system 155 can be a dosing system that includes a plurality of valves that cooperate to delivered doses of fluid to the mold apparatus 122. The illustrated flow metering system 155 can be used to deliver a precise amount of fluid with desirable characteristics to the mold apparatus 122. The flow metering system 155 can comprises a first valve 169*a* (e.g., a solenoid valve), a tank 157, and a second valve 169*b* (e.g., a solenoid valve). The control lines 171*a*, 171*b* provide communication between the control unit 165 and the valves 169*a*, 169*b*, respectively. The controller 165 can operate the first valve 169*a* and the second valve 169*b* to accurately fill the tank 157 with a certain amount of fluid. The control unit 155 can be any suitable controller for selectively operating the valves 169*a*, 169*b*.

To cool the mold apparatus 122, the control unit 165 opens the valve 169*a* and fluid is delivered to the dosing tank 157. After the dosing tank 157 is filled with a desired amount of fluid, the control unit 165 opens the valve 169*b* and the fluid from the dosing tank 157 is delivered to the line 184. The capacity of the dosing tank 157 can be selected based on the desired amount of fluid delivered to the line 184. The tank 157 can be partially or completely filled depending on the desired amount of fluid delivered to the mold apparatus 122. Thus, a precise amount of fluid can be delivered to the line 184 and ultimately to the mold apparatus 122.

The flow metering system 155 is able to produce a rapid sequence of "micro-pulses" of fluid that expands in the line 184 and the passageway 181 to cool the mold apparatus 122. The sensor 167 monitors the temperature of mold apparatus 122 and delivers a signal to control unit 165. The control unit 165 determines the number and timing of doses that are delivered to the line 184. The number of doses of fluid delivered to the mold apparatus 122 can be increased or decreased to increased or decrease rate of cooling in the mold apparatus 122. When the molded article is demolded, the valve 169b can limit or prevent the circulation of working fluid through the mold apparatus 122 to minimize the formation of condensation on the mold surfaces.

Optionally, the mold apparatus 122 can comprise one or more temperature control elements for heating portions of the molds. The illustrated mold apparatus 122 comprises a temperature control elements in the form of a heater 173 (FIG. 9I). The illustrated heater 173 is a resistance heater positioned within the mold apparatus 122. As such, the heater 173 can heat a desired portion of the polymer in the mold apparatus 122. In some embodiments, the heater 173 can heat (including reducing the rate of cooling) a portion of mold apparatus 122 as the cooling fluid is delivered through the passageway 181. Thus various portions of the mold apparatus 122 can be at any desired temperature. Other suitable temperature control devices can also be used to control the temperature of the mold apparatus 122.

A plurality of temperature control systems can be connected together. As shown in FIG. 9J, the temperature control system 219 comprises a plurality of independent flow circuits. The illustrated temperature control system 219 comprises a first temperature control system 150' and a second temperature control system 150". The unit 156 can be a heat exchanger configured to exchange heat between the working fluids of the first temperature control system 150' and the second temperature control system 150". In some embodiments, the first temperature control system 150' can be configured to cool a first mold apparatus 122'.

A second temperature control system 150" can be used to cool the second mold apparatus 122" as the first temperature control system 150' heats the mold apparatus 122'. The heated fluid delivered from the line 140 to the unit 156 can be cooled by the fluid passing through the temperature control system 150'. The flows in the temperature control system 150', 150" can be reversed to change the mode of operation of the systems 150', 150".

The temperature control systems described herein can be combined and modified to achieve the desired thermal performance. The fluid lines are schematically illustrated as a single line. However, the fluid lines can comprise a plurality of lumen and/or a plurality of houses.

FIGS. 9K and 9L illustrate a plurality of mold apparatuses that are connected by a connecting line 213. Fluid warmed in one mold apparatus can be used to heat another mold apparatus. For example, cool fluid can be used to cool a first mold apparatus. The fluid can be heated as it passes through the first mold apparatus and then can be used to heat a second mold apparatus. For example, the second mold apparatus can be heated when the article is removed from the second mold apparatus. During a second portion of the production cycle, fluid can be heated as it passes through the second mold apparatus and can then be used to heat a first mold apparatus.

Any number of mold apparatuses can be connected together by any number of fluid lines depending on, e.g., the production cycles. The illustrated system comprises a first mold apparatus 122' and a second mold apparatus 122" connected by a fluid line 213. In some embodiments, the line 217' and mold apparatus 122' can be part of a temperature control system described above. Similarly, the line 217" and mold apparatus 122" can be a part of a temperature control system described above.

With continued reference to FIG. 9K, during a first period of time, a working fluid is delivered through the line 217' to the mold apparatus 122' to cool at least one article therein. The working fluid is heated as it passes through the mold apparatus 122'. The heated fluid can flow through the connecting line 213 to the mold apparatus 122". The heated fluid can then heat the mold apparatus 122". The mold apparatus 122" can be heated to limit or prevent the formation of condensation on the mold surfaces, heat the surfaces of the mold to enhance the flow of melt through a mold cavity, produce crystalline material, and the like.

During a second period of time, a working fluid is delivered through the line 217" to the mold apparatus 122" to cool at least one article therein, as shown in FIG. 9L. The working fluid is heated as it passes through the mold apparatus 122". The heated fluid can flow through the connecting line 213 to the mold apparatus 122'. The heated fluid can then heat the mold apparatus 122'. The mold apparatus 122' can be heated to limit or prevent the formation of condensation on the mold surfaces, heat the surfaces of the mold to enhance the flow of melt through a mold cavity, produce crystalline material, and the like.

The features, components, systems, subsystems, devices, materials, and methods of the temperature control systems in FIGS. 8-9L can be mixed and matched by one of ordinary skill in this art in accordance with principles described herein. Additionally, one or more check valves, pressure sensors, flow regulators, fluid lines, temperature sensors, detectors, and the like can be added to the temperature control systems as desired.

C. Methods and Apparatus for Injection Molding

Monolayer and multilayer articles (including packaging such as closures, preforms, containers, bottles) can be formed by an injection molding process. One method of producing multi-layered articles is referred to herein generally as overmolding. Multilayer preforms can be formed by overmolding by, e.g., an inject-over-inject ("IOI") process. The name refers to a procedure which uses injection molding to inject one or more layers of a material over an existing preform or substrate, which preferably was itself made by injection molding. The terms "overinjecting" and "overmolding" are used herein to describe the molding process whereby a layer of material is injected over an existing preform. In an especially preferred embodiment, the over-injecting process is performed while the underlying preform has not yet fully cooled. Overinjecting may be used to place one or more additional layers of materials, such as those comprising barrier material, recycled PET, foam material, or other materials over a monolayer or multilayer preform.

Molding may be used to place one or more layers of material(s) such as those comprising lamellar material, PP, foam material, PET (including recycled PET, virgin PET), barrier materials, phenoxy type thermoplastics, combinations thereof, and/or other materials described herein over a substrate (e.g., the underlying layer). In some non-limiting exemplary embodiments, the substrate is in the form of a preform, preferably having an interior surface suitable for contacting foodstuff. The temperature control systems can be utilized to control the temperature of preforms formed by these molding processes. The temperature control systems can also be used when forming a single monolayer preform, as described below in detail.

Articles made by a molding process may comprise one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot fill applications, a layer having a melt strength suitable for extrusion. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, and/or combinations thereof. For the sake of convenience, articles are described primarily with respect to preforms, containers, and closures.

FIG. 10 illustrates a preferred type of mold apparatus 132 for use in methods which utilize overmolding. The mold apparatus 132 can form a layer on the preform 30 to form a multilayer preform, such as the preform 50 of FIG. 3. The temperature control systems described herein can be used to control the temperature of the mold apparatus 132, and the other molds described below.

The mold apparatus 132 comprises two halves, a cavity section 192 and a core section 194. The cavity section 192 comprises a cavity in which the preform is placed. The core section 194 and the cavity section 192 are movable between a closed position and an open position. The preform can be a monolayer preform (illustrated) or a multilayer preform. The preform 30 is held in place between the core section 194, which exerts pressure on the top of the preform and the ledge 196 of the cavity section 192 on which the support ring 38 rests. The neck portion 32 of the preform 30 is thus sealed off from the body portion of the preform 30. Inside the preform 30 is the core 198. As the preform 30 sits in the mold apparatus 132, the body portion of the preform 30 is completely surrounded by a void space 200. The space 200 is formed by outer surface of the preform 30 and a cavity molding surface 203 of the cavity section 192. The preform, thus positioned, acts as an interior die core in the subsequent injection procedure, in which the melt of the overmolding material is injected through the gate 202 into the void space 200 to form an outer layer of the preform.

The cavity section 192 and/or the core section 194 have one or more temperature control elements 204. The temperature control elements 204 are in the form of a plurality of passageways or channels for controlling the temperature of the melt and the preform 30. Fluids flowing through the channels 204 can, for example, cool the mold apparatus 132, which in turn cools the injected melt. In the illustrated embodiment of FIG. 10, the cavity section 192 has a plurality of channels 204 while the core section 194 also has a plurality of channels 206. A plurality of pressure reducing elements 212 are positioned upstream of the channels 204, 206. The pressure reducing elements 212 are positioned within the cavity section 192 and the core section 194. However, the pressure reducing elements 212 can be positioned outside of the cavity section 192 and/or the core section 194. In the illustrated embodiment, there is an upper outlet 134 and a lower outlet 134 that deliver fluid to the channels 206, 204, respectively.

With continued reference to FIG. 10, the mold outlets 134 can have a flow regulator 214 in fluid communication with the pressure reducing elements 212. The flow regulator 214 can be a valve system that selectively controls the flow of fluid to the channels 204. A plurality of conduits 216 can provide fluid flows between the flow regulator 214 and the pressure reducing elements 212. Each flow regulator 214 can selectively permit or inhibit the flow of fluid from the outlet 134 into the conduits 216 and into the mold apparatus 132. In one embodiment, the flow regulator 214 can be solenoid valve, either actuated electronically or pneumatically, to permit or inhibit the flow into the mold apparatus 132. In various other embodiments, the flow regulator 214 can be a gate valve, globe valve, or other suitable device that can control the flow of fluid. A controller (e.g., the controller 218 of FIG. 9A) can command the flow regulator 214 to permit or inhibit the flow of fluid to the channels (e.g., channels 204 and/or 206). The flow regulator 214 can stop the flow of fluid through the mold apparatus 132 for intermittent fluid flow. Optionally, the flow regulator 214 can provide different fluid flow rates to each of the conduits 216.

Fluid from the conduits 216 passes through pressure reducing elements 212 and into the channels 204 in the mold apparatus 132. Although not shown, the outlet 134 can feed fluid directly to the pressure reducing elements 212. As discussed above, there can be a temperature drop across the pressure reducing elements 212. In the illustrated embodiment of FIG. 10, there is a pressure drop across the pressure reducing elements 212 so that the temperature of the fluid in channels (e.g., channels 204) is at or near a desired temperature. The temperature drop is preferably caused by a reduction in pressure across the pressure reducing elements 212.

Advantageously, during operation of the temperature control system, the pressure of the working fluid (e.g., a cryogenic fluid such as nitrogen) can be substantially less than the pressure of non-cryogenic fluid (e.g., Freon). When the working fluid of the temperature control systems is a cryogenic fluid such as supercritical carbon dioxide ($CO_2$) or nitrogen ($N_2$), the mold apparatus does not have to be able withstand the high pressures that are typical of non-cryogenic systems. Thus, the low pressure molds cooled with cryogenic fluids may be less costly to produce than the high pressure molds that are cooled with non-cryogenic fluids. Additionally, because the cryogenic fluid in the mold apparatus is at such a low pressure, there may be less leakage from the mold apparatus and/or other sections of the temperature control system. The non-cryogenic refrigerants based systems may require expensive hermetic seals to ensure that the working fluid does not escape to the environment.

With continued reference to FIG. 10, the working fluid can undergo a phase change as it passes through the pressure reducing elements 212. A portion of the fluid can change phases, i.e. vaporize to gas, as it passes through the pressure reducing elements 212 and the enthalpy of the gas can further cool the channels in the mold. In one embodiment, at least a substantial portion of the liquid from the outlet 134 changes to gas as it passes through the pressure reducing elements 212. In one embodiment, a controller 218 (FIG. 9A) commands the pressure reducing elements 212 to increase or decrease the pressure change across the pressure reducing elements 212 in order to ensure the proper temperature of fluid in the channels of the mold apparatus 132.

In some embodiments, for example, the fluid upstream of the pressure reducing elements 212 is liquid (e.g., liquid $CO_2$ or $N_2$) at about 40 bars to about 80 bars. In some embodiments, the fluid upstream of the pressure reducing elements 212 is at a pressure of about 60 bars to about 80 bars. In some embodiments, the fluid upstream of the pressure reducing elements 212 is at a pressure of 20 bars, 30 bars, 40 bars, 50 bars, 60 bars, 70 bars, 80 bars, and ranges encompassing such pressures. The pressure of the liquid is reduced across the pressure reducing element 212 such that at least a portion, preferably a substantial portion, of the liquid vaporizes resulting in fluid comprising gas downstream of the pressure reducing elements 212. The gas in the channels is preferably at 10 bars or less and will result in a reduced downstream temperature of the fluid. In some embodiments, the pressure on the low side of the pressure reducing element is 2 bars, 4 bars, 5 bars, 7 bars, 10 bars, 15 bars, and ranges encompassing such pressures. For example, in some non-limiting embodiments, the downstream temperature of the working fluid may less than about 10° C., 0° C., −5° C., −30° C., −60° C., −100° C., −150° C., −175° C., −200° C., and ranges encompassing such temperatures. Preferably, the temperature of the fluid can be maintained at a suitable temperature by adjusting the pressure of the fluid in the channels 204, 206. In the illustrated embodiment, a valve 222 is disposed along the mold inlet 136 of the fluid line 140 and can selectively permit or inhibit the flow of fluid such that the fluid in channels of the mold apparatus 132 is at the desired pressure and temperature. A controller can therefore command the pressure reducing elements 212, 222 so that the temperature of the fluid in the channels 204 is at the desired temperature.

With continued reference to FIG. 10, the pressure reducing elements 212 can be proximate to the cavity molding surface 203 to ensure that the cavity molding surface 203 is maintained at a relatively low temperature. As such, the temperature of the fluid does not substantially change as it moves through the mold apparatus 132 between the pressure reducing elements 212 and the channels 204. In some embodiments, the channels 204 are sized to permit expansion and further cooling of the working fluid. For example, the channels 204 can be enlarged in the downstream direction to allow expansion of the working fluid. It is contemplated that the pressure reducing elements 212 can be positioned at other suitable locations for delivering fluid to the channels within the mold apparatus 132. For example, the pressure reducing elements 212 can be positioned outside of the mold apparatus 132 (e.g., see FIG. 9B).

The channels 204, 206 are located in the mold apparatus 132 such that heat is transferred to the fluid flowing through the channels 204, 206 to cool the mold apparatus 132. As used herein, the term "channel" is a broad term and is used in its ordinary sense and refers, without limitation, to any structure or elongated passage that defines a fluid flow path for effectively controlling the temperature of a mold. In some instances, the terms "channels" and "passageways" are used interchangeably herein. Liquids can flow along the length of the channels for high thermal loads. In some embodiments, the channels can be a diffusion passage configured to produce a pressure drop. The diffusion channels can be positioned downstream of the pressure reducing element. The channels can have varying cross sections along their lengths. For example, the channels can have a cross sectional area that increases in one direction. In some embodiments, if a two-phase fluid flows through a channel, the cross sectional area of the channel can increase in the downstream direction to accommodate an increase in the volume of the fluid as some of the liquid component vaporizes due to the absorption of heat. Thus, the working fluid may not rise in pressure due to the absorption of heat. In some embodiments, however, the fluid channels can have a somewhat constant cross sectional area or other suitable configuration.

An inner portion 220 of the cavity section 192 is disposed between one or more channels 204 and the cavity molding surface 203 and is designed to permit efficient heating or cooling of the cavity molding surface 203. The terms "cavity molding surface" and "cavity surface" may be used interchangeably herein. In some embodiments, the inner portion 220 of the mold comprises a high heat transfer material to rapidly cool the material engaging the cavity molding surface 203.

As used herein, the term "high heat transfer material" is a broad term and is used in accordance with its ordinary meaning and may include, without limitation, low range, mid range, and high range high heat transfer materials. Low range high heat transfer materials are materials that have a greater thermal conductivity than iron. For example, low range high heat transfer materials may have a heat conductivity superior to iron and its alloys. High range high heat transfer materials have thermal conductivity greater than the mid range materials. For example, a material that comprises mostly or entirely copper and its alloys can be a high range heat transfer material. Mid range high heat transfer materials have thermal conductivities greater than low range and less than the high range high heat transfer materials. For example, AMPCOLOY® alloys, alloys comprising copper and beryllium, and the like can be mid range high heat transfer materials. In some embodiments, the high heat transfer materials can be a pure material (e.g., pure copper) or an alloy (e.g., copper alloys). Advantageously, high heat transfer materials can result in rapid heat transfer to reduce cycle times and increase production output. For example, the high heat transfer material at room temperature can have a thermal conductivity more than about 100 W/(mK), 140 W/(mK), 160 W/(mK), 200 W/(mK), 250 W/(mK), 300 W/(mK), 350 W/(mK), and ranges encompassing such thermal conductivities. In some embodiments, the high heat transfer material has a thermal conductivity 1.5 times, 2 times, 3 times, 4 times, or 5 times greater than iron.

To enhance temperature control, the temperature control elements can be used in combination with high heat transfer material. For example, one or more temperature control elements can be positioned near or within the high heat transfer material to maximize heat transfer between the mold surfaces and the temperature control elements. For example, the high heat transfer can form at least a substantial portion mold material interposed between the one or more temperature control elements and the molding surfaces.

The high heat transfer material may or may not form the molding surface that contact the melt. For example, a layer of material can be positioned between the high heat transfer material and the molding cavity. To protect the high heat transfer material, a thin layer of material (e.g., titanium nitride, hard chrome, and other materials harder than the high heat transfer material) may be deposited on the high heat transfer material and form a hard molding surface 203. Such a protective layer is preferably less than about 0.0254 mm (0.001 inches), 0.127 mm (0.005 inches), 0.254 mm (0.01 inches), 1.27 mm (0.05 inches), 2.54 mm (0.1 inches), and ranges encompassing such thicknesses. The protective layer can improve mold life while also providing rapid heat transfer from the melt to the high heat transfer material.

The high heat conductivity alloys can be used for rapid heating and cooling. The high heat conductivity alloys can achieve both high and low temperatures along the mold surfaces in contact with the polymer. Additionally, the high heat conductivity alloys can produce a generally flat temperature profile over most of the mold wall for efficient heat flow. This allows for increased flexibility of mold design.

For example, the temperature control elements can be moved away from the mold surfaces without substantially effecting the cooling/heating capacity of the temperature control elements because heat can be rapidly conducted through the high heat transfer material.

Time from injection to demolding, which may strongly influence cycle time, can be different for mold cooling and post-cooling operations. In the absence of post-cooling, the preform has to remain in the mold until the bulk of the polymer has cooled to a temperature profile which will not cause structural instability after demolding. After demolding, the periphery of the preform is not actively cooled and is reheated by the heat coming from the warm interior of the article. Because the bulk of the polymer has to cool down and polymers can have low heat conductivity, the time to demold, and thus cycle time, can largely depend on the preform dimensions (e.g., the preform's wall thickness). Thus, time to demold and cycle time can be increased as the preform's wall thickness is increased.

High conductivity mold materials can be employed to reduce cycle times. For producing preforms with higher wall thicknesses, high conductivity mold materials may produce a negligible reduction of the cycle time, as heat flow is dominated by the largest heat resistor, which in this case is the bulk polymer itself. Nevertheless, molds comprising high heat conductive mold materials can be used for mold cooling processes.

If a post-cooling operation is utilized, demolding can be done at an earlier stage as structural stability of the molded article is primarily needed to withstand the mechanical forces during demolding. The structural stability molded article can be quickly demolded from the mold. At the moment of demolding, due to the chilling effect of the mold wall the peripheral layers of the molded article have already fallen to lower temperatures while the interior of the article is a soft liquid. For example, there can be a steep temperature rise between the periphery of the preform and the interior of the preform. The peripheral low temperature region of the polymer mechanically stabilizes the preform at demolding. The mechanical strength of the preform can therefore depend on the temperature gradient during the cooling process. For example, the cooled periphery of the preform (e.g., a cooled outer shell) depend on the peripheral temperature gradient. The peripheral temperature gradient is mainly a function of the mold surface temperature. A mold utilizing a high conductivity alloy and a cooling means, such as cold cooling fluid, can produce a low mold surface temperature, thus a steeper temperature gradient and therefore a mechanically stable "shell" faster than, e.g., a steel mold. Thus, the combination of high heat transfer material and a low temperature cooling fluid (e.g., refrigerants including cryogenic fluids) are especially useful for post-cooling processes.

Utilizing a low temperature cooling fluid in combination with a steel mold will only bring moderate success. The poor heat conductivity of steel produces a steep temperature gradient in the mold, thereby leading to a high surface temperature in the mold. Utilizing a high conductivity mold alloy in combination with a non-refrigerant cooling fluid, such as water, will result in a generally flat temperature gradient in the mold. Additionally, the temperature of the mold surface can be warmer than mold surfaces cooled with refrigerants. Thus, if a mold utilizes steel or non-refrigerant cooling fluids, the formation of a rigid shell, which allows early demolding, will be delayed and therefore increase cycle time.

The cavity section 192 comprising the high heat transfer material can provide high heat transfer rates that may not be achieved with traditional molds. Traditional molds are typically made of steel that is subjected to high thermal stresses upon rapid and large temperature changes. The thermal stresses may cause strain hardening of the steel and may dramatically reduce mold life. For example, cyclic thermal loading can cause fatigue which eventual compromises the structural integrity of the molds. Steel and some other typical mold materials may be unsuitable for the extreme temperature loads and thermal cycles. Thus, these materials may be unsuitable for use with refrigerants, such as cryogenic fluids. Copper has a high thermal conductivity and can undergo rapid temperature changes. However, copper is a relatively soft material that has a relatively low mechanical strength and hardness and, thus, may not be able to withstand high clamp forces experienced during molding processes. Also, if copper forms the molding surfaces, the copper can become worn and roughened after extended use and can result in improperly formed molded articles. However, some high heat transfer materials are much more suitable for rapid and large temperature changes while also having improved mold life. The high heat transfer materials can withstand cyclic thermal loading with limited amounts of damage due to fatigue. The high heat transfer materials can be hardened material for an improved life as compared to copper. Advantageously, the high heat transfer material can transfer heat at a higher rate than steel and other traditional mold materials. Thus, cycle times can be reduced due to the thermal properties of high heat transfer materials.

Additionally, because the fluid in the channels 204 is at such a low pressure, the channels can be located extremely close to the cavity molding surface 203. For example, the distance between one or more of the channels 204 and the cavity molding surface 203 can be less then about 5 cm, 3 cm, 2 cm, 1 cm, and ranges encompassing such distances. In one embodiment, the distance between one or more of the channels 204 and the cavity molding surface 203 can be less then about 1.5 cm. In yet another embodiment, the distance between one or more of the channels 204 and the cavity molding surface 203 can be less then about 5 mm. In yet another embodiment, the distance between one or more of the channels 204 and the cavity molding surface 203 can be less then about 3 mm. The combination of the high heat transfer materials and the location of the channels 204 can provide extremely quick temperature changes of the cavity molding surface 203. If high heat transfer material is employed in the mold apparatus 132, the channels 204 can be moved away from the cavity molding surface 203 while still providing effective temperature control of the surface 203. Other types of temperature control elements than channels (e.g., heaters) can be similarly positioned in the mold apparatus 132.

Figure 11:
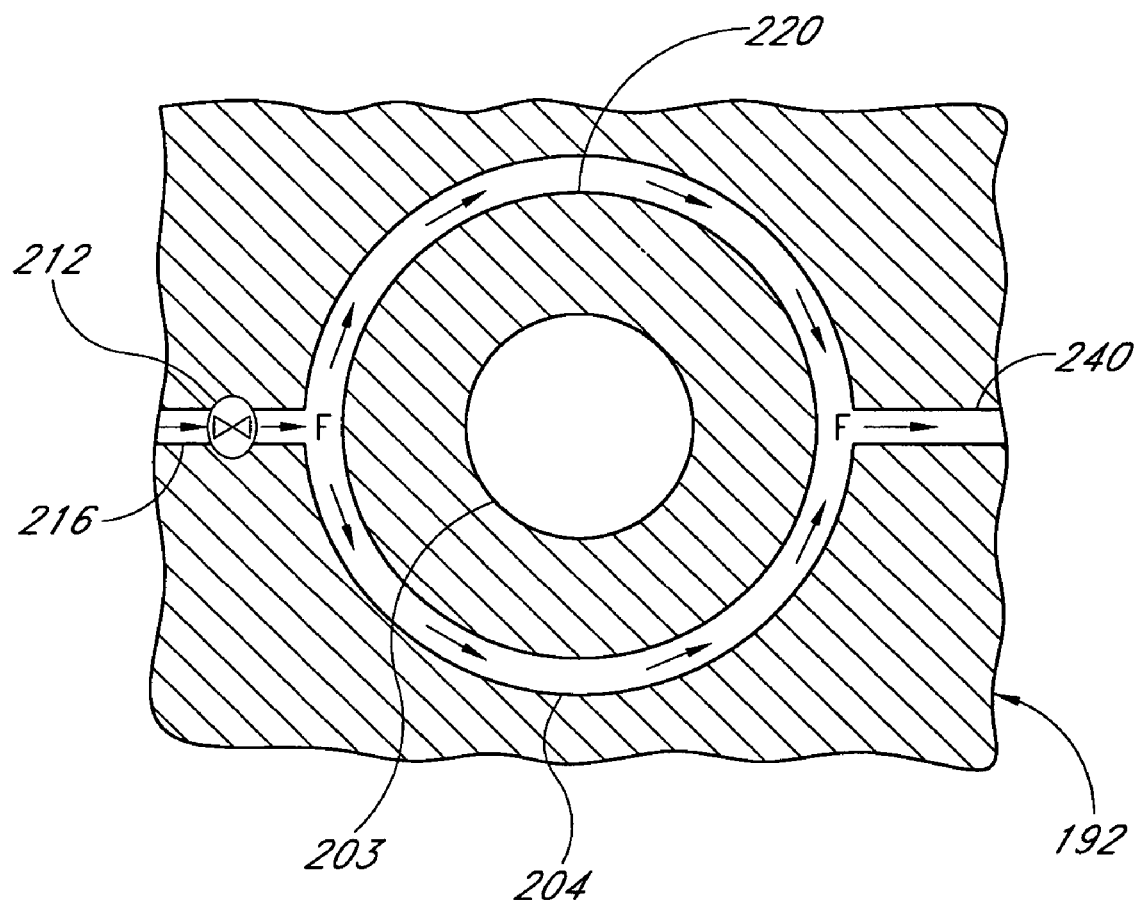
FIG. 11 is a cross-section of the mold of FIG. 10 taken along lines 11-11.

As illustrated in FIG. 10 and FIG. 11 (an elevational partial cross-sectional view of the cavity section 192), the channels 204 are generally annular channels, preferably substantially concentric with the cavity molding surface 203 to ensure that the thickness of the portion 220 between the cavity molding surface 203 and the channels 204 is substantially uniform. The heat transfer between the melt and the fluid in the channels can be increased by decreasing the distance between the channels 204 and the cavity molding surface 203. Those skilled in the art recognize that the channels 204 can have various shapes and sizes depending on desired heat distributions in the mold apparatus 132. In the illustrated embodiment, the channels 204 have a substantially circular cross-sectional profile. In other embodiments, the channels 204 can have a cross-sectional profile that is generally elliptical, polygonal (including rounded polygonal), or the like. In one embodiment, the cavity section 192 has less than about then about ten channels 204. In another embodiment, the cavity section 192 has less than about seven channels 204. In another embodiment, the cavity section 192 has less than about four channels 204. The number and placement of channels 204 can be selected for efficient cooling of the mold apparatus 132.

With reference to FIG. 11, fluid F flows from the conduit 216 through the pressure reducing element 212 and into the channel 204. The fluid F (preferably a two-phase flow) is split into two fluid flows and passes through the two semi-circular portions of the channel 204 towards the conduit 240. The fluid F then passes through the conduit 240 to the mold inlet 136 and into the fluid line 140. Heat is transferred between the fluid F in the channels 204 and the mold cavity section 192 because of the temperature difference between the fluid F and the walls of the channels 204. If the working fluid F is a two-phase flow, the liquid component of the flow can undergo a phase change become a gas as the fluid absorbs heat. Advantageously, the temperature of the fluid F can remain generally constant along the channels 204, so long as the fluid F comprise liquid.

If the temperature of the channels 204 is at a temperature higher than the temperature of the fluid in the channels 204, there will be heat transferred to the fluid F. Thus, the mold apparatus 132 can be cooled as heat is transferred to the fluid F. If the temperature of the fluid F in the channels 204 is higher than the temperature of the channels 204, heat will be transferred to the channels 204. The flow rate of the fluid F can be increased to increase the heat transfer between the fluid F and the mold apparatus 132.

With reference again to FIG. 10, the core section 194 has the core 198 that is hollow. The core 198 has a wall 244 having a generally uniform thickness proximate to the neck portion 32 of the preform 30. The thickness of the wall 244 necks down to a distal portion having a generally uniform thickness. A temperature control arrangement 246 is disposed in the core 198 and comprises a core channel or tube 248 located centrally in the core 298 which preferably receives fluid F from the fluid line 130 and delivers fluid F directly to a base end 254 of the core 198. The fluid F passes through a pressure reducing element 260, preferably an expansion valve, and into a channel 208. In the illustrated embodiment, the channel 208 is defined by the outer surface of the core channel 248 and an inner surface 210 of the wall 244 of the core. The fluid F works its way up the core 198 from the base end 254 though the channel 208 and exits through an output line 270. In one embodiment, the fluid F in the core channel 248 is a liquid that is vaporized as it passes through the pressure reducing element 260. At least a substantial portion of the fluid in the channel 208 can be gas, preferably at a lower temperature than the temperature of the fluid in the core channel 248, to ensure that the core 198 is maintained at a suitable temperature. In some embodiments, the pressure reducing element is positioned outside of the core 198. Thus, a gas or two-phase flow can be delivered to the core channel 208.

Different fluids can be used to control the temperature of the cavity section 192 and the core section 194. In one embodiment, for example, the fluid line 130 can comprise two tubes where one of the tubes delivers $CO_2$ to the cavity section 192 and the other tube delivers $N_2$ to the core section 194. Thus, the temperature control systems can use multiple fluids to maintain desirable temperatures in the mold apparatus 132. In other embodiments, similar fluids can be used in the cavity section 192 and the core section 194. For example, $CO_2$ can be the working fluid in the cavity section 192 and the core section 194.

Pulse temperature control can be utilized to periodically heat or cool the mold apparatus 132. In some embodiments, pulse temperature control comprises pulse cooling. For pulse cooling, fluid cam be pulsed through the mold apparatus 132 for periodic temperature changes. When the moldable material is disposed in the mold apparatus 132, chilled fluid can circulate through the apparatus 132 to cool the polymer material. During the reduced flow period of pulse cooling, the flow of chilled fluid is substantially reduced or stopped. In one embodiment, the flow regulator 214 is controlled to stop the flow of fluid through the mold apparatus 132. The flow regulator 214 can independently stop or reduce the fluid flow into each of the conduits 216. In another embodiment, the valve 222 can be operated to stop or reduce the flow of the fluid through the mold apparatus 132.

Figure 24:
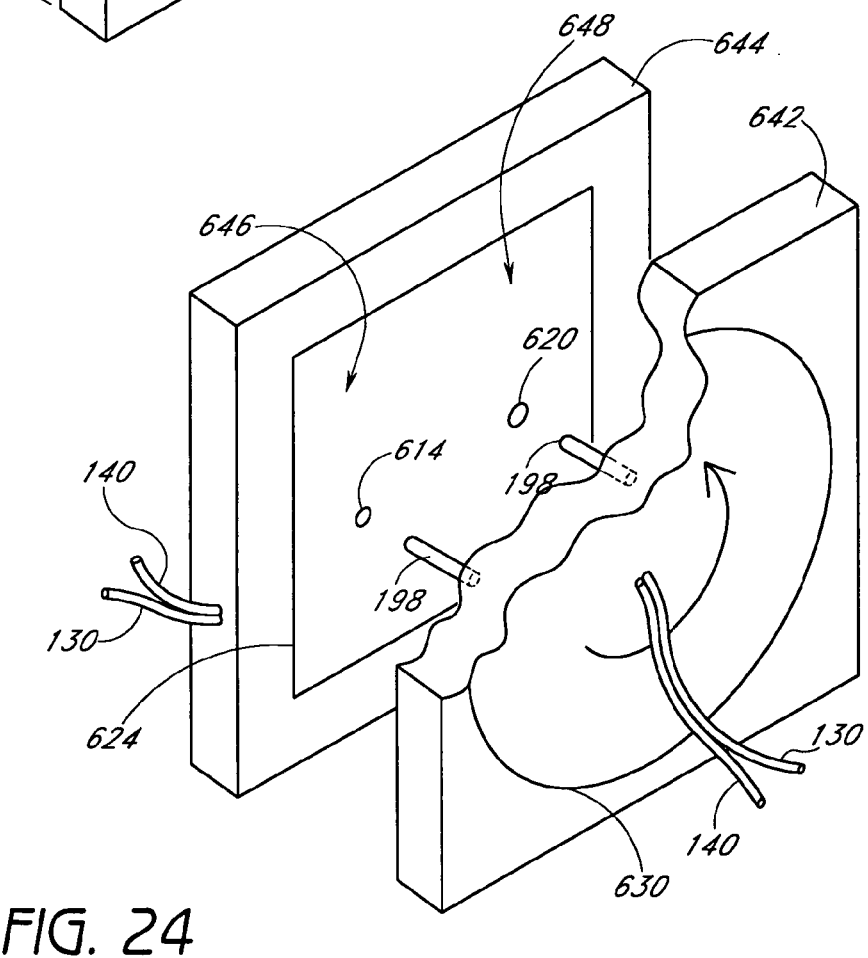
FIG. 24 is a perspective view of a mold with cores fully withdrawn from the molding cavities, prior to rotation.

The reduced flow period preferably corresponds to when the mold apparatus 132 is empty and/or during non-use of the mold apparatus 132 (e.g., during repair periods). For example, after the preform is at a desired temperature, the core section 194 and the cavity section 192 can be separated; as shown in FIG. 24, and the preform can be removed from the mold apparatus 132. While the core section 194 and cavity section 192 are separated, the flow rate of the fluid through the mold apparatus 132 is reduced to inhibit the formation of condensation on the surfaces of the mold. The flow of chilled fluid can be reduced before or after the core section 194 and the cavity section 192 are separated.

Advantageously, pulse cooling efficiently uses fluid from fluid source and can result in reduced cycle time and properly formed preforms. The temperature control system may be an open loop with a fluid source having a limited supply of fluid. The refrigerant is efficiently used during manufacturing periods that require heat transfer to the refrigerant, such as for cooling preforms. The frequency of replacing the fluid source is reduced because fluid is used for cooling the preform and is not used when, for example, the mold apparatus 132 is empty.

As mentioned above, the pulse cooling can reduce condensation that forms on the preform molds during preform production. Condensation can form on the molding surfaces when moisture in the air contacts the mold surfaces, which are at a low temperature (i.e., the dew point or condensation formation temperature). When the temperature of the air is lowered to its dew point, condensation can form on the mold surfaces. During the preform manufacturing process, the surfaces of the preform mold may be exposed to the air (e.g., after the preform has been removed from the mold but before the mold has been injected with melt). Conventional cooling systems may continuously passing chilled water through the mold causing the temperature of the surfaces of the mold to reach the condensation formation temperature resulting in the formation of condensation. In other words, while the surfaces of the mold are exposed to the air, the continuous cooling of conventional systems may lower the surface temperature of the mold such that moisture from the atmosphere condenses on the surfaces of the mold. This can interfere with the preform manufacturing process. For example, condensation can contact the injected melt and inhibit the flow of the melt through the mold and therefore causes improperly formed preforms.

Advantageously, pulse cooling is used to remove heat from the melt while limiting the formation of condensation on the surfaces of the mold. The reduced flow period of the pulse cooling can correspond to when the surfaces (e.g., the core surface 201 and the cavity molding surface 203) of the mold apparatus 132 are exposed to the air so that the surfaces are not at sufficiently low temperatures to cause the formation of condensation. Thus, the preform can be rapidly cooled thereby reducing the cycle time without forming condensation on the surfaces of the mold apparatus 132.

The mold apparatus 132 of FIG. 10 can be used to produce preforms having thin walls with low residual stresses. In one embodiment, the melt can be injected into the space 200 defined by the uncoated preform and the cavity molding surface 203, which are distanced to form preforms with thin walls. The temperatures of the surfaces 201, 203 are sufficiently high so that the melt injected into the space 200 remains in a liquid state as it passes along space 200. A reduced flow of the chilled fluid can ensure that the temperature of the surfaces 201, 203 is sufficiently high for proper flow of the melt. In one embodiment, to ensure that the melt passes easily through the space 200, the surfaces 201, 203 can be heated by a heated flow through the channels 204. After the melt flows into the space 200, the flow of fluid can then be reversed to cool the melt. Thus, the temperature control system can facilitate the flow of the melt into the mold and then can rapidly cool the melt resulting in reduced cycle times and preforms with low residual stresses. Additionally, the melt can be injected into the mold at a lower injection pressure because of the high temperatures of the mold's surfaces facilitating spreading of the melt.

With continued reference to FIG. 10, the core 198 can be very slender while providing rapid cooling of the melt. The temperature control arrangement 246 can be utilized for substantial heat loads even though a low amount of fluid flows through the core 198. Advantageously, the low volumetric flow rates allow an increased thickness of the wall 244 to ensure that the core 198 is properly aligned with the cavity molding surface 203 during the molding process. In some embodiments, a portion of the core 198 for molding the preform has a length equal to or greater than about 7 cm, 8 cm, 9 cm 10 cm, 11 cm, 12 cm, 13 cm and an average outer diameter equal to or less than about 1 cm, 1.5 cm, 2 cm, 2.5 cm. The length and diameter can be selected based on the preform design. The length of the core corresponds to the portion of the core that molds the interior surface of the preform. Thus, the length of the core generally corresponds to the distance from the opening of the preform to the interior surface of the preform forming the end cap. The diameter of the core is the average outer diameter of the portion of the core that forms the preform. In some embodiments, the core 198 has a length greater than about 11 cm and an outer diameter of less than about 2 cm. Preferably, the core 198 has a length to diameter (L/D) ratio equal to or greater than about 4, 4.5, 5, 5.5, 5.8, 6, 6.5, 7, 8, 9, 10, 11, 12, 13, and ranges encompassing such ratios. In some embodiments, the core 198 has an L/D ratio greater than about 5. In yet another embodiment, the core 198 has an L/D ratio greater than about 7. Thus, the core 198 can have a high L/D ratio because of the temperature control arrangement 246 having high heat transfer capabilities.

Due to the thermal capabilities of refrigerants, the channels in the core 198 can be smaller than water passages in conventional cores further allowing higher L/D ratios. Conventional cores may not be rigid enough to form thin walled preforms because of their thin core walls. These conventional cores may move during the molding process resulting in preforms that will likely have weak spots or other defects that could affect container performance. Additionally, the pressure reducing device 260 can be smaller than many of the conventional valves used in typical cold-water bubblers.

The thickness of the wall 244 can be increased because of the reduced size of the channels and valve within the core 198, thereby increasing the rigidity of the core 198. The increased rigidity of the core 198 can ensure that the surface 201 of the core 198 is generally concentric with the surface 203 of the cavity section 192. The concentric surfaces result in the production of preforms that have generally uniform wall thicknesses. Thus, the mold apparatus 132 can be used to produce the long, small diameter articles with thin wall sections that would not otherwise be manufactured by injection molding processes.

With continued reference to FIG. 10, the core section 194 has channels 206 that are in fluid communication with the fluid lines 130, 140. The core section 194 has channels and valves similar to the cavity section 192. The temperature of the core section 194 is maintained in a similar manner as the cavity section 192 and therefore will not be discussed in further detail.

The melt, as well as the uncoated preform, is cooled or heated by fluid circulating in channels 204 and 206 in the two halves of the mold. Preferably the circulation in channels 204 is completely separate from the circulation of fluid in the channels 206. Additionally, although not illustrated, cold water-bubblers can be used to cool the core 198 illustrated in FIG. 10.

Figure 12:
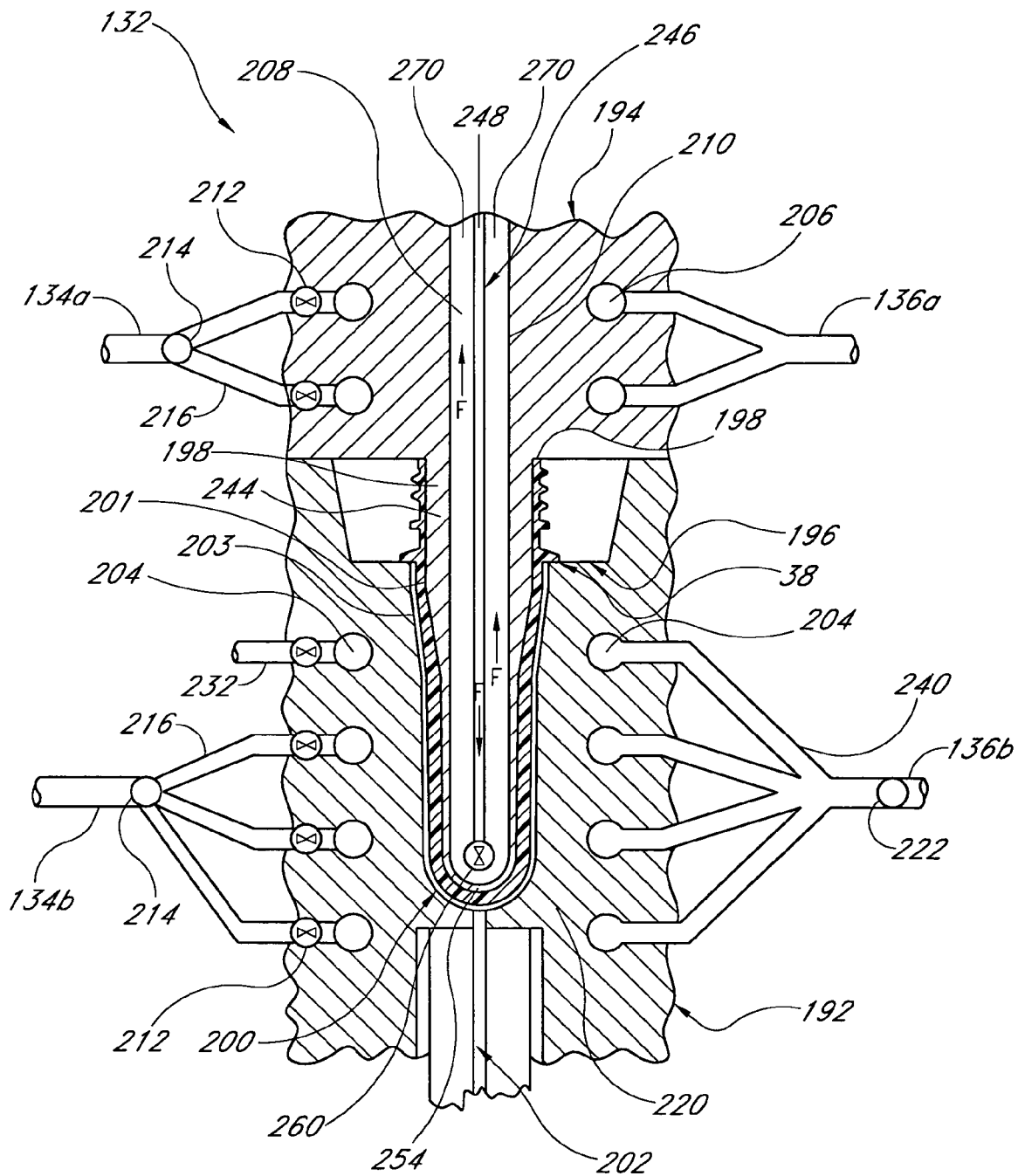
FIG. 12 is another embodiment of an injection mold of a type that may be used to make a multilayer preform.

FIG. 12 illustrates a modified injection mold that can be used to make a multilayer preforms. To further reduce condensation on the mold apparatus 132, the temperature control system can have the feedback line 232 (see FIG. 9A), which is in fluid communication with the fluid line 140 and the mold apparatus. The temperature of the fluid in the fluid line 140 is sufficiently high such that the fluid in the fluid line 140 can be used utilized to heat portions of the mold apparatus 132. The channels 204 can be used to reduce the temperature of portions of the mold apparatus 132 at different rates by passing fluid at different temperatures through different channels 204. One or more of the channels can contain heated fluid while one or more of the channels contain cooled fluid. Alternatively, heaters (such as resistance heaters) can be employed to heat portions of the preform to, e.g., cause crystallization. Thus, the channels and the flow fluid can be used to obtain the desired temperature distributions through the mold apparatus 132.

In the illustrated embodiment, heated fluid from the fluid line 140 passes through the feedback line 232 and through the upper channel 204 while the cooling fluid from the fluid line 130 passes through the other channels 204. The temperature of the upper portion of the preform body is higher than the temperature of the lower portion of the body portion of the preform. Similarly, although not illustrated, heated fluid from the feedback line 232 can pass through one or more of the channels 206 while the cooling fluid from the fluid line 130 can pass through the other channels 206.

Figure 13:
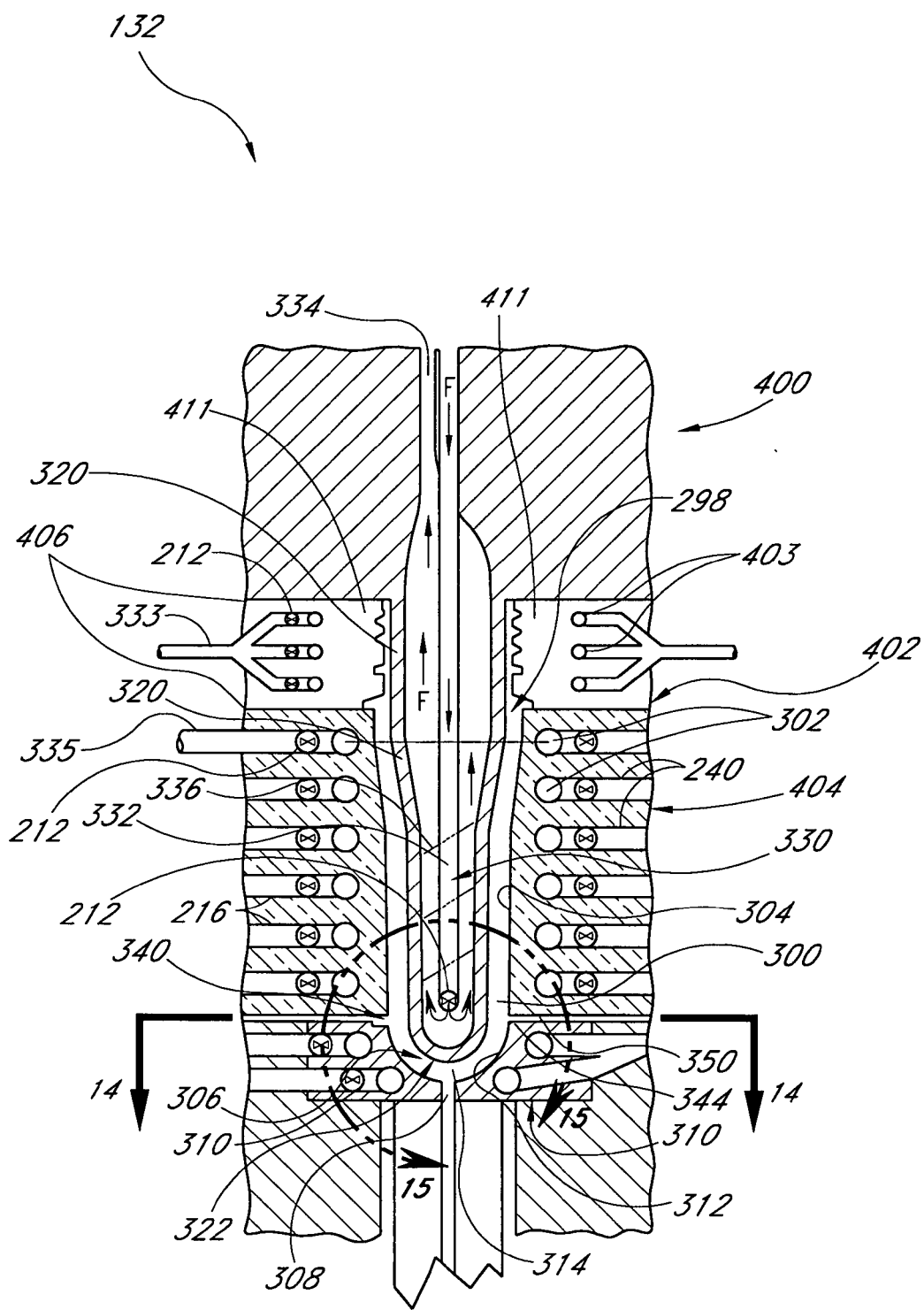
FIG. 13 is a cross-section of an injection mold of a type that may be used to make a monolayer preform.

With reference to FIG. 13, a preferred embodiment of the mold apparatus 132 having a mold core 298 and associated mold cavity 300 are shown. The illustrated mold apparatus 132 is configured to produce a monolayer preform. Channels 302 are formed just below the surface 304 of the mold cavity 300. The channels 302 can be formed in a spiral fashion or in any other configuration for permitting flow through the mold apparatus 132. A gate area 306 of the cavity 300 is defined near a gate 308 and an insert 310 of a material with especially high heat transfer properties is disposed in the cavity at the gate area 306. Thus, the injected preform's gate area/base end 314 is cooled especially quickly.

The core 298 is hollow and has a wall 320 of generally uniform thickness. The outer surface of the wall 320 can define a core molding surface. A temperature control arrangement 330 is disposed in the hollow core 298 and comprises a core channel or tube 332 located centrally in the core 298. The pressure reducing element 212 is located at the distal end of the channel 332. Fluid F passes through the pressure reducing element 212 and is delivered to a base end 322 of the core 298. Preferably, the pressure reducing element 212 provides a pressure reduction such that the fluid F in the channel 332 comprises liquid and the fluid is delivered by the pressure reducing element 212 to the base end 322 preferably comprises gas, or a liquid/gas mixture. Since the base end 322 is the first point of the core 298 contacted by this fluid F, the fluid is coldest and most effective at this location. Thus, the gate area 314 of the injected preform is cooled at a faster rate than the rest of the preform. Fluid injected into the core at the base end 322 proceeds along the length of the core 298 and exits through an output line 334. A plurality of ribs 336 are arranged in a spiral pattern around the core tube 332 to direct fluid F along the core wall. Fluid F works its way up the core from the base end 322 and exits through an output line 334. The core channel 332 is held in place by ribs 336 extending between the tube and the core wall 320.

To enhance the cooling effect of the core 298 on the inner surface of the preform and especially to enhance the cooling effect of the core 298 at the preform's gate area/base end 314, the core 298 is preferably substantially hollow, having a relatively thin uniform wall 320. Preferably, this uniform thickness is between 0.254 cm and 0.762 cm (0.1 inch and 0.3 inches) and is most preferably about 0.508 cm (0.2 inches). The wall 320 at the base end 322 of the core 298 may by thinner than the rest of the core wall 320 because the thin wall aids in rapidly communicating heat away from the molten gate area 314 of the injected preform.

In other embodiments where greater crystallinity and less crystalline gradient are desired, molds are paired with modified cores. In the modified cores, the fluid circulation in the cores is modified such that, for the portions to form the crystalline preform parts, the fluid circulation is independent and at a relatively higher temperature, or the flow of chilled fluid is restricted or altered in these regions such that the temperature of the surface of the core in the portion which forms the crystalline portion of the preform is higher than that in the body regions. Alternatively, the relevant portions of the core may be heated by other means as described above. Use of cores having these characteristics allows for a greater degree of crystallization towards and/or at the inner surface of the preform in the neck, neck finish and/or neck cylinder area and a lesser crystalline gradient between the inner surface and the outer surface in these areas.

The cavity section 404 has several channels 302 through which a fluid, preferably a chilled gas or liquid/gas mixture, is circulated. The cavity section 404 can comprise high heat transfer material to increase thermal communication between the melt and channels 302. The cavity section 404 can comprise a mold plate that comprises high heat transfer material.

The neck finish mold 402 of FIG. 13 is configured to form at least a portion of the preform. The neck finish mold 402 can comprise high heat transfer material. For example, the neck finish mold 402 can comprise more than about 5%, 20%, 50%, 70%, 80%, and 90% and ranges encompassing these amounts of high heat transfer material by weight. In some embodiments, the neck finish mold 402 comprises mostly or entirely high heat transfer material, such as copper and its alloys (e.g., AMPCOLOY® alloy). The neck finish mold 402 can be formed of more than one material (e.g., bimetallic) or formed of a single material. When high heat transfer material forms the neck finish mold, the melt can be rapidly cooled so that a somewhat stable outer layer is formed on the preform, so that the preform can be ejected from the mold. This outer layer eggshell-like layer and may be relatively thin and suitable for permitting demolding of the preform. Preferably, the preform can be removed from the mold without damaging the preform, even though the inner portions of the preform may be very soft. The preform can be removed from the mold when the inner and outer portions are both relatively cool. The eggshell-like layer permits design flexibility. The outer layer functions as a protective layer that allows further cooling of the interior portions of the preform subsequent to demolding. The preform can have thick and/or thin neck cylinders because of cooled outer layer and the ease of demolding. Even if the interior portion of the neck cylinder comprises a hot, soft polymer, the preform can be demolded, thereby reducing cycle time.

The neck finish mold 402 can have one or more temperature control elements 403 for cooling and/or heating the molded material. The illustrated neck finish mold 402 comprises a plurality of temperature control elements 403 in the form of channels in which a fluid circulates. A portion 411 the neck finish mold 402 is positioned between the channels 403. The portion 411 preferably forms at least a substantial portion of the neck finish mold interposed between the plurality of fluid channels 403 and the mold cavity 300. In some embodiments, the portion 411 preferably comprises high heat transfer material for high heat flow through the neck finish mold 402.

The fluid circulation in channels 403, 302 are preferably separate and independent. The fluid F circulating through the core section 400 is also separate from both channels 403, 302. However, a fluid source or single coolant source may provide the fluid for the core section 400, the channels 302, and/or the channels 302.

Thermal isolation of the cavity section 404, neck finish mold 402 and core section 400 is achieved by utilizing inserts 406 having low thermal conductivity. However, materials having low thermal conductivity should not be used on the molding surfaces which contact the preform. Examples of preferred low thermal conductivity materials include heat-treated tool steel (e.g. P-20, H-13, stainless steel, etc.), polymeric inserts of filled polyamides, nomex, air gaps and minimum contact shut-off surfaces.

To produce preforms with a crystalline neck finish, the fluid in the channels 402 can be warmer than the fluid in the portions of the mold used to form non-crystalline portions of the preform. To produce preforms with amorphous neck finishes and body portions, all of the channels can contain relatively cool fluid. In some embodiments, the portions of the mold which form the crystalline portions of the preform, (corresponding to neck finish mold 402) contain a heating apparatus placed in the neck, neck finish, and/or neck cylinder portions of the mold so as to maintain the higher temperature (slower cooling) needed to promote crystallinity of the material during cooling. Such a heating apparatus includes but is not limited to heating coils, heating probes, and electric heaters. A feedback system can also deliver heated fluid used to heat portions of the mold to form crystalline material.

Figure 13A:
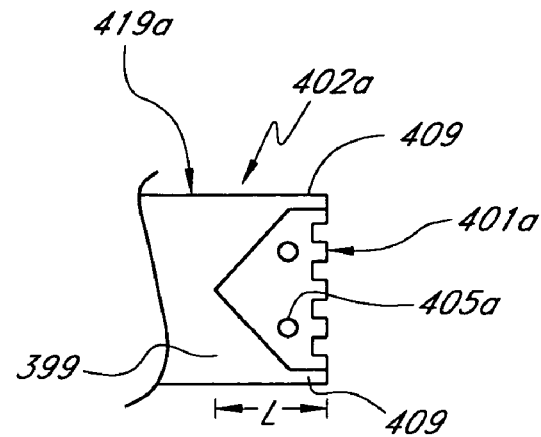
FIGS. 13A-13F are side views of portions of neck finish molds.

FIG. 13A illustrates a neck finish mold 402a that comprises a first portion 401a and a second portion 419a. The first portion 401a and the second portion 419b can have different thermal conductivities. In some embodiments, the first portion 401a has a thermal conductivity greater, preferably substantially greater, than the second portion 419a. The first portion 401a preferably comprises a high heat transfer material (e.g., a mid or high range high heat transfer material). The second portion 419a can comprises a low thermally conductive material, such as tool steel. Such a neck finish mold can have one or more temperature control elements. The illustrated neck finish mold 402a has a plurality of temperature control elements in the form of fluid channels 405a. Some exemplary embodiments of neck finish molds may have temperature control systems 405a that include one or more of the following: channels, heat/cooling rods, bubblers, heaters (e.g., electric heaters) and combinations thereof. Preferably, the high heat transfer material of the neck finish mold 402a is proximate to or forms the molding surface which contacts the melt that is injected into a mold cavity. The illustrated neck finish mold 402a is configured to mold threads of a preform, although the neck molding surface can be configured to mold other neck finishes.

Optionally, the neck finish mold 402a can have one or more portions 409 that can reduce heat transfer between the neck finish mold 402a and an adjacent cavity section and/or core section. Thus, thermal isolation of one or more portions of a preform can be achieved. During operation, the first portion 401a can be at a first temperature and the second portion 419a can be at second temperature. The neck finish mold 402a may thus selectively control the temperature of the neck of the preform to produce, e.g., crystalline neck finishes, neck finishes with an egg-shell finish or layer, and the like.

In some embodiments, a portion 399 of the neck finish mold 402a nearest the mold cavity has a length L and can comprise more than about 5%, 20%, 50%, 70%, 80%, and 90% of high heat transfer material by weight. That is, the portion 399 is the portion of the neck molding finish 402a within the distance L from the mold cavity. The length L of the portion 399 can be less than or equal to about 0.25 inch, 0.5 inch, 1 inch, 1.5 inches, and ranges encompassing such lengths. In some embodiments, the length is greater than or equal to about 1.5 inches, 2 inches, 2.5 inches, and ranges encompassing such lengths. In view of the present disclosure, a skilled artisan can select the length L suitable for forming the neck finish mold 402a.

In some embodiments, the neck finish mold 402a comprises at least 5%, 20%, 30%, 50%, 60% 80%, 80%, 90% by weight of high heat transfer material. A substantial portion of the neck finish mold 402a extending between the temperature control element(s) and the neck molding surface can comprise high heat transfer material. The high heat transfer material preferably forms the neck molding surface for efficient thermal communication. The neck molding surface can be configured to form one or more threads, flanges, recesses, or other structures for engaging a closure as mentioned above. The illustrated neck finish mold 402a is designed to mold threads of a preform. In some embodiments the neck finish mold 402a is configured to mold an outer surface of a preform without any closure engaging structures. Threads or other structures can be added to the preform in a subsequent process. Of course, the neck finish mold can be a split ring that is movable between a first position for molding a portion of a preform and a second position for demolding the preform.

FIGS. 13B-13F illustrate neck finish molds that are similar to the neck mold finish 402a, except as described below.

Figure 13B:
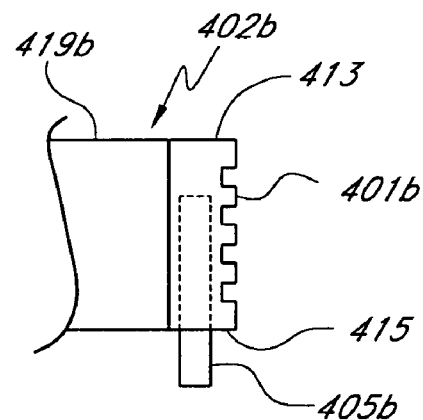

FIG. 13B illustrates a neck finish mold 402b that has a first portion 401b that forms an upper surface 413 and lower surface 415 of the neck mold finish 402b. The first portion 401b preferably comprises high heat transfer material. A temperature control element 405b in the form of a heating/cooling rod is positioned within the neck finish mold 402b, preferably positioned within the first portion 401b. Additional temperature control elements (e.g., channels, rods, heaters, etc.) can be positioned within the first portion 401b.

Figure 13C:
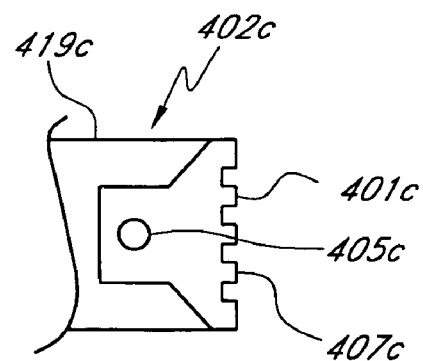

With reference to FIG. 13C, a neck finish mold 402c has a first portion 401c that extends into the second portion 419c. A temperature control system 405c can be positioned within the first portion 401c to effectively cool the melt, even though the temperature control system 405c may not be proximate to the molding surface 407c.

Figure 13D:
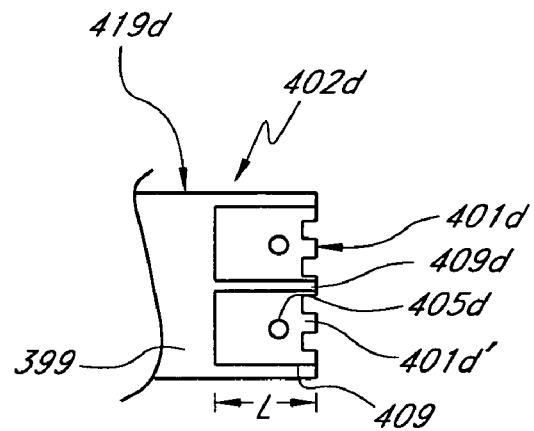

With reference to FIG. 13D, the neck finish mold 402d comprises a plurality of portions 401d, 410d' comprising high heat transfer material that have different or similar thermal conductivities. Each of the portions 401d, 401d' can have one or more temperature control elements 405d. A portion 409d is positioned between the portions 401d, 401d' for thermal isolation of the portions 401d, 401d'. Thus, the portions 401d, 401d' can be at the same or different temperatures to precisely control the temperature of the preform.

Figure 13E:
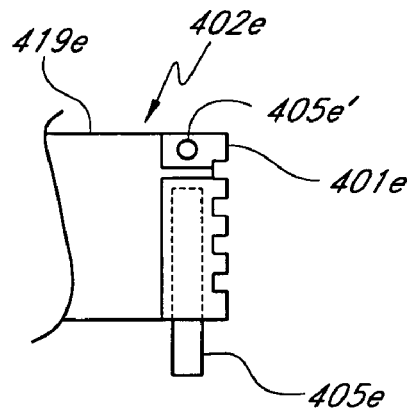
Figure 13F:
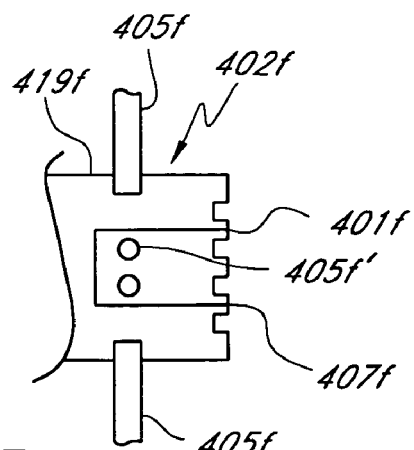

FIGS. 13E and 13F illustrated additional embodiments of neck finish molds having a plurality of temperature control elements. The illustrated neck finish mold 402e has a temperature control element 405e in the form of a heating/cooling rod and a channel 405e' positioned within the portion 401e. FIG. 13F illustrates a neck finish mold 402f comprising a plurality of a heating/cooling rods 405f and a plurality of channels 405f'. As such, the temperature control elements may or may not be positioned within high heat transfer material. It is contemplated that the neck finish molds of FIGS. 13A-13F can be used with the molding systems (e.g., the injection and compression molding systems) described herein. Neck finish molds can thus be bimetallic or formed of a single material. The type and location of materials can be selected to achieve the desired heat flow through the neck finish mold. Various types of temperature control elements can be used to control the temperature of the neck finish molds.

Figure 14:
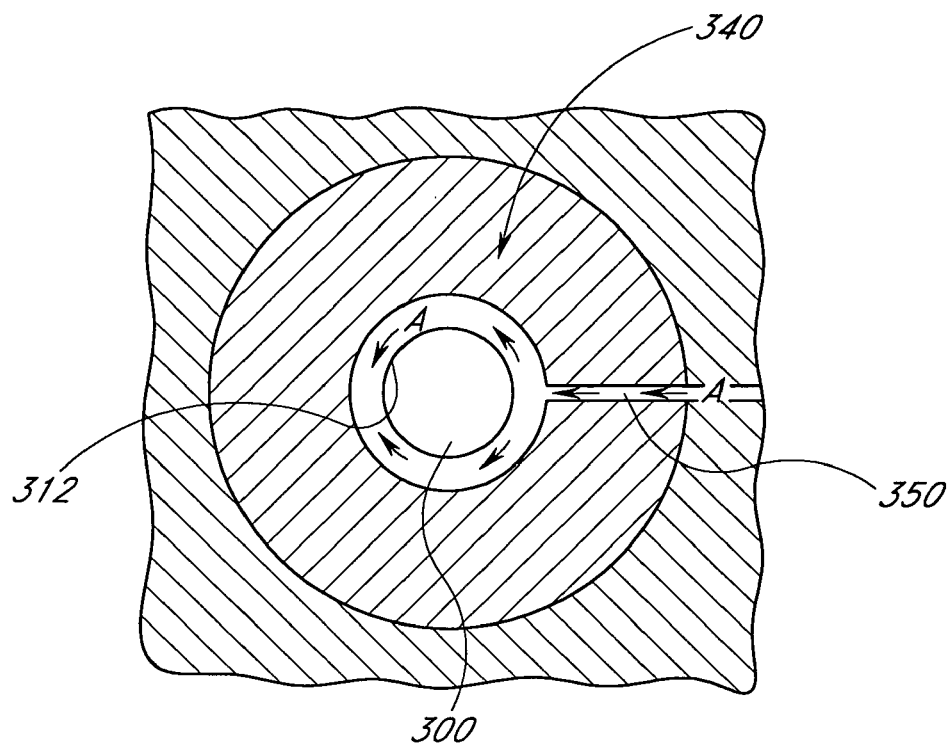
FIG. 14 is a cross-section of the mold of FIG. 13 taken along lines 14-14.
Figure 15:
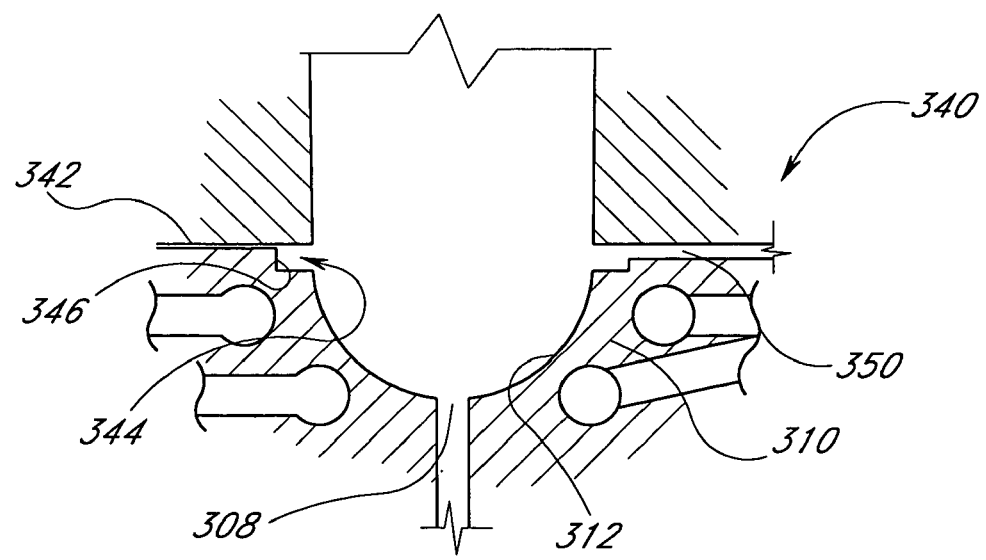
FIG. 15 is a cutaway close up view of the area of FIG. 13 defined by line 15.

Referring to FIGS. 13, 14, and 15, an air insertion system 340 is shown formed at a joint 342 between members of the mold cavity 300. A notch 344 is formed circumferentially around the cavity 300. The notch 344 is sufficiently small that substantially no molten plastic will enter during melt injection. An air line 350 connects the notch 344 to a source of air pressure and a valve regulates the supply of air to the notch 344. During melt injection, the valve is closed. When injection is complete, the valve is opened and pressurized air A is supplied to the notch 344 in order to defeat a vacuum that may form between an injected preform and the cavity wall 304. Additionally, similar air insertion systems 340 may be utilized in other portions of the mold, such as the thread area, for example but without limitation.

Figure 16:
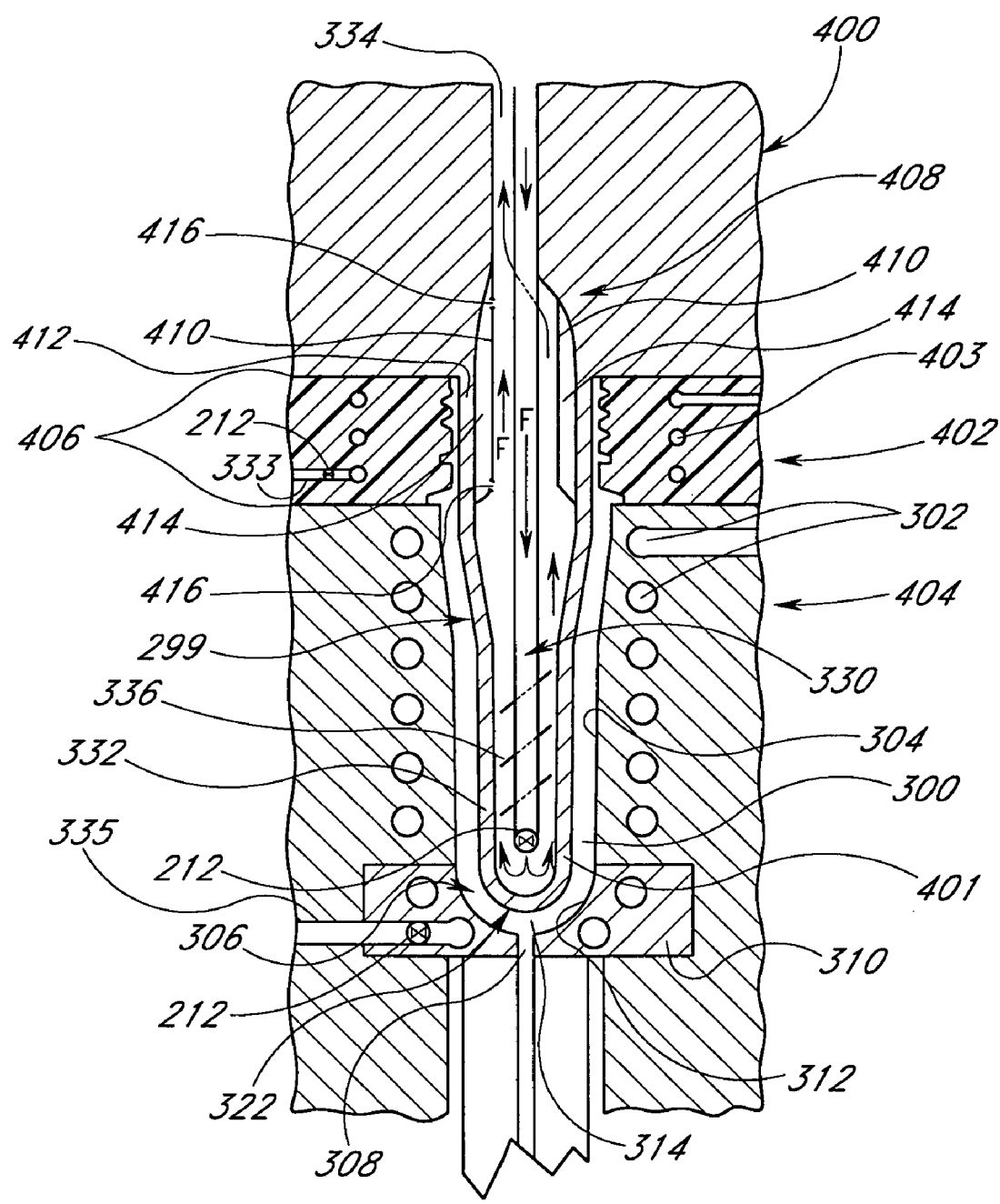
FIG. 16 is a cross-section of an injection mold core having a double wall neck finish portion.

FIG. 16 is a cross-section of an injection mold core having a double wall neck finish portion. The mold is configured to produce a monolayer preform that may or may not be overmolded. In some embodiments, the core 299 is configured to achieve greater crystallinity of the neck portion of an injected preform. The mold of FIG. 16 is similar in construction to the mold described above with reference to FIG. 13 and includes a core section 400, the cavity section or body mold 404, and the neck finish portion 402. The channel or tubes 302, 403 spiral around the core 299. The mold cooling system can be optimized for the mold cavities by arranging channels 302 in a spiral arrangement around the mold cavity 300 and just below the surface 304.

The core 299 of FIG. 16 includes a double wall portion 408 generally adjacent to the neck finish portion 402 of the mold. An inner wall 410 substantially inhibits circulating fluid F from coming into contact with the outer wall 412 of the core 299 in the region proximate to the neck finish portion 402 of the mold. In addition, an insulating space 414 is defined between the inner wall and the outer wall 412. Accordingly, the insulating space 414 reduces the cooling effect of the circulating fluid F on the neck portion of a preform within the mold cavity 300, thereby increasing the crystallinity of the resulting preform and reducing the crystallinity gradient between the outer surface and the inner surface of the resulting preform.

The inner wall 410 of the modified core 299 may optionally include one or more openings 416. These openings 416 permit circulating fluid F to enter the insulating space 414. Preferably, the size of the openings 416 are configured such that a limited amount of circulating fluid F enters the insulating space 414. Such a construction provides a greater cooling effect on the neck portion of the resulting preform than when no fluid is permitted within the insulating space 414, but less cooling than unrestricted contact of the circulating fluid F with the outer wall 412 of the core 299. Advantageously, adjustment of the size and placement of the openings 416 allows adjustment of the cooling on the neck portion of the injected preform, thereby allowing adjustment of the crystallinity and crystallinity gradient in the neck portion.

Figure 17:
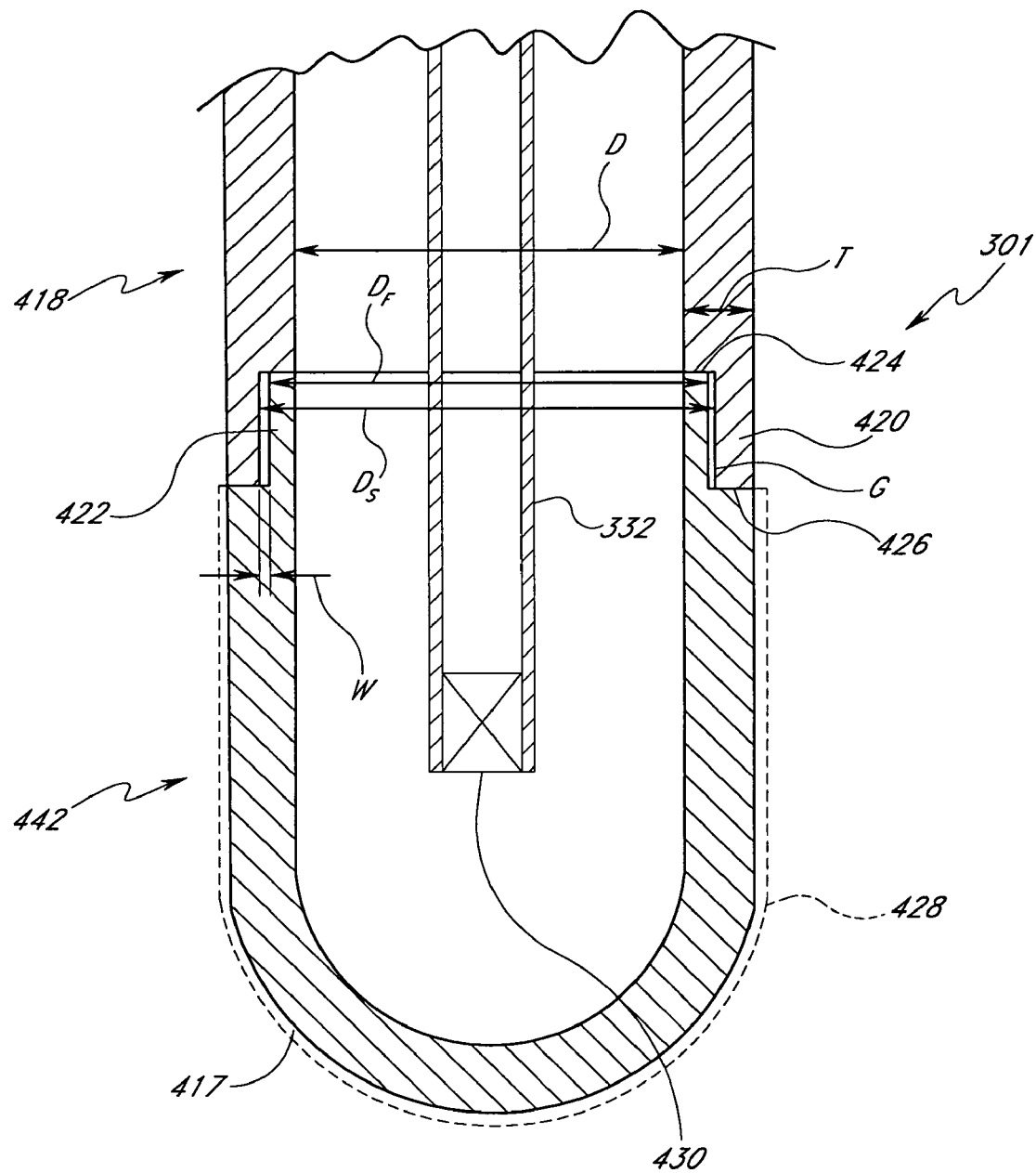
FIG. 17 is a cross-section of an enhanced injection mold core having a high heat transfer base end portion.

FIG. 17 is a schematic representation of another embodiment of a core 301, including a modified base end 417 or tip. The mold core 301 of FIG. 17 is similar in construction to the mold described above with reference to FIG. 13.

As described above, the end cap portion of the injection molded preform adjacent the base end 417, receives the last portion of the melt stream to be injected into the mold cavity 300. Thus, this portion is the last to begin cooling. If the PET layer has not sufficiently cooled before the overmolding process takes place, the force of the barrier material melt entering the mold may wash away some of the PET near the base end 417 of the core 301. To speed cooling in the base end 417 of the core in order to decrease cycle time, the modified core 301 includes a base end 442 portion constructed of an especially high heat transfer material, preferably a high heat transfer material, such as AMPCOLOY or other copper alloy. Advantageously, the AMPCOLOY base end 442 allows the circulating fluid F to withdraw heat from the injected preform at a higher rate than the remainder of the core 301. Such a construction allows the end cap portion of the preform to cool quickly, in order to decrease the necessary cooling time and, thus, reduce the cycle time of the initial preform injection.

The modified core 301 illustrated in FIG. 17 generally comprises an upper core portion 418, substantially as illustrated in FIG. 13, and a base end portion 442 constructed of a high heat transfer material, including, but not limited to, a beryllium-free copper alloy, such as AMPCOLOY. A pressure reducing element 430 is at the distal end of the core channel 332, as described above. That is, the pressure reducing element 430 can provide a fluid pressure drop. As in FIG. 13, the present core channel 332 is operable for delivering circulating cooling fluid F to the base end 442 of the core 301.

The core 301 is substantially hollow and defines an inner diameter D and wall thickness T. The upper core portion 418 includes a recessed step 420 having a diameter $D_S$ which is greater than the inner diameter D of the core 301. The upper core portion 418 can be for molding a neck portion of a preform. The base end portion 442 includes a flange 422 having a diameter $D_F$ which is smaller than the diameter $D_S$ of the step 420. The difference between the diameters $D_S$ and $D_F$ of the step 420 and flange 422, respectively, is preferably between about 0.0254 mm and 0.635 mm (0.001 and 0.025 inches). More preferably, the difference is between about 0.254 mm and 0.381 mm (0.010 and 0.015 inches). When the base end portion 442 is placed concentrically within the upper core portion 418, the difference in the diameters $D_S$, $D_F$ results in a gap G being formed between the base end and upper core portions 442, 418. The width W of the gap G is approximately equal to one-half the difference between the diameters $D_S$, $D_F$. Additionally, the base end portion 442 is preferably about 1.905 cm and 3.175 cm (0.750-1.250 inches) in length.

Preferably, the modified core 301 is constructed by starting with an unmodified core 298 made from a single material, substantially as illustrated in FIG. 13. The end portion, or tip, of the unmodified core 298 is cut off approximately at the point where the high heat transfer base end 442 is desired to begin. A drilling, or boring, tool may then be inserted from the end portion of the core 301 to ensure that the inner diameter D is correctly sized and concentric with a center axis of the core 301. This also ensures that the wall thickness T is consistent throughout the portion of the core 301 which is in contact with the injected preform, thus ensuring that the cooling of the preform is consistent as well. Such a method of construction presents a distinct advantage over conventionally formed cores. In a conventional core, because the length to diameter ratio is large, the drilling tool used to create the hollow inner portion of the core often tends to wander, that is, tends to deflect from the center axis of the core. The wandering of the drilling tool results in a core having an inconsistent wall thickness and, thus, inconsistent heat transfer properties. With the above-described method of sizing the inner diameter D from the base end of the core 301, the problem of tool wandering is substantially reduced or eliminated. Therefore, a consistent wall thickness T and, as a result, consistent heat transfer properties are achieved.

The upper core portion 418 and base end portion 442 are preferably joined by a silver solder process. AMPCOLOY is a preferred material for the base end portion 442 in part because it contains some silver. This allows the silver solder process to provide a joint of sufficient strength to be useful in injection molding applications. Preferably, the soldering process results in a full contact joint. That is, solder material is disposed on all of the mating surfaces (424, 426 and gap G) between the upper core portion 418 and base end portion 442. Advantageously, the provision of the gap G enhances the flow of solder material such that a strong joint is achieved. In addition, the full contact joint is advantageous because it provides for consistent heat transfer properties and high strength. If the soldered joint was not a full contact joint, any air present in the gap G would result in inconsistent heat transfer through the gap G portion of the core 301. Although it is preferred to join the upper core portion 418 and base end portion 442 with a silver solder process, other suitable joining processes may also be used.

As illustrated in FIG. 17, the base end portion 442 of the modified core 301 is preferably of a larger size than the final dimension desired (illustrated by the dashed line 428) when it is joined to the upper core portion 418. Advantageously, this allows for the base end portion 442 to be machined to its desired dimension after assembly to the upper core portion 418 in order to ensure a proper final diameter and a smooth surface at the transfer from the upper core portion 418 to the base end portion 442.

Another way to enhance cooling of the preform's gate area was discussed above and involves forming the mold cavity so that the inner polymer layer (e.g., a PET layer) is thinner at the gate area than at the rest of the injected preform as shown in FIG. 4. The thin gate area thus cools quickly to a substantially solid state and can be quickly removed from the first mold cavity, inserted into the second mold cavity, and have a layer of barrier material injected thereover without causing washing of the PET.

In the continuing effort to reduce cycle time, injected preforms are removed from mold cavities as quickly as possible. However, it may be appreciated that the newly injected material is not necessarily fully solidified when the injected preform is removed from the mold cavity. This results in possible problems removing the preform from the cavity 300. Friction or even a vacuum between the hot, malleable plastic and the mold cavity surface 304 can cause resistance resulting in damage to the injected preform when an attempt is made to remove it from the mold cavity 300 as shown in FIG. 13.

Typically, mold surfaces are polished and extremely smooth in order to obtain a smooth surface of the injected part. However, polished surfaces tend to create surface tension along those surfaces. This surface tension may create friction between the mold and the injected preform which may result in possible damage to the injected preform during removal from the mold. To reduce surface tension, the mold surfaces are preferably treated with a very fine sanding device to slightly roughen the surface of the mold. Preferably the sandpaper has a grit rating between about 400 and 700. More preferably a 600 grit rating sandpaper is used. Also, the mold is preferably sanded in only a longitudinal direction, further facilitating removal of the injected preform from the mold.

While some of the above-described improvements to mold performance are specific to the method and apparatus described herein, those of skill in the art will appreciate that these improvements may also be applied in many different types of plastic injection molding applications and associated apparatus. For instance, use of high heat transfer material in a mold may quicken heat removal and dramatically decrease cycle times for a variety of mold types and melt materials. Pulse cooling can be used to cool the cores, neck finish portion, and/or the cavity section of the mold. Also, roughening of the molding surfaces and provides air pressure supply systems may ease part removal for a variety of mold types and melt materials.

Figure 18:
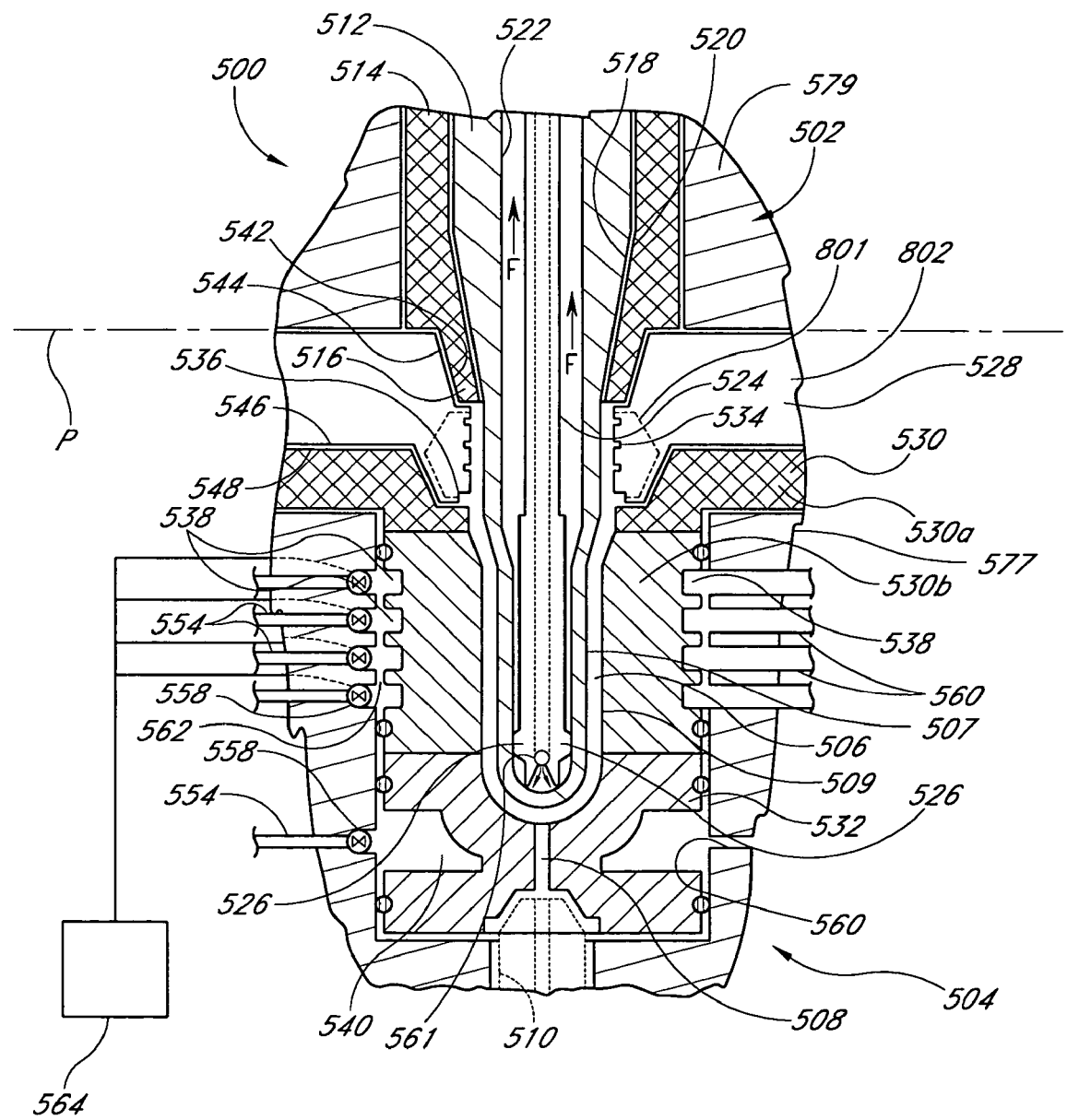
FIG. 18 is a cross-section of an injection mold utilizing a combination of hardened material components and high heat transfer material components and fluid channels.

FIG. 18 illustrates an injection mold apparatus, similar to those described above, and referred to generally by the reference numeral 500. The injection mold assembly 500 is configured to produce a monolayer preform. In the illustrated arrangement, the mold 500 utilizes one or more hardened materials to define contact surfaces between various components of the mold 500. As used herein, the term "hardened material" is a broad term and is used in its ordinary sense and refers, without limitation, to any material which is suitable for preventing wear, such as tool steel. In various embodiments, the hardened or wear resistant material may comprise a heat-treated material, alloyed material, chemically treated material, or any other suitable material. The mold 500 also uses one or more materials having high heat transfer properties to define at least a portion of the mold cavity surfaces. The mold 500 may also utilizes the hardened materials (having generally slower heat transfer properties) to produce a preform having regions with varying degrees of crystallinity, similar to the injection molds described above. In some embodiments, the molds described herein can comprise a hardened high heat transfer material to reduce wear. For example, hardened copper and its alloys can have a hardness and/or strength properties (e.g., yield strength, ultimate tensile strength, and the like) greater than unhardened pure copper.

As in the mold arrangements described above, the mold assembly 500 comprises a core section 502 and a cavity section 504. The core section 502 and the cavity section 504 define a parting line P, indicated generally by the dashed line of FIG. 18, between them. The core section 502 and the cavity section 504 cooperate to form a mold cavity 506, which is generally shaped in the desired final shape of the preform. In the illustrated embodiment, at least a portion of the mold cavity 506 is defined by a core molding surface 507 and a cavity molding surface 509. The cavity section 504 of the mold 500 can define a passage, or gate 508, which communicates with the cavity 506. An injection nozzle 510 delivers a molten polymer to the cavity 506 through the gate 508.

Preferably, the core section 502 of the mold 500 includes a core member 512 and a core holder 514. The core holder 514 is sized and shaped to be concentric about, and support a proximal end of, the core member 512. The core member 512 extends from an open end 516 of the core holder 514 and extends into the cavity section 504 of the mold to define an internal surface of the cavity 506 and thus, an internal surface of the final preform. The core member 512 and the core holder 514 include cooperating tapered portions 518, 520, respectively, which locate the core member 512 relative to the core holder 514.

Preferably, the core Member 512 is substantially hollow, thus defining an elongated cavity 522 therein. A core channel or tube 524 extends toward a distal end of the core cavity 522 to deliver a fluid, preferably a cooling fluid, to the distal end of the cavity 522. As in the previous arrangements, cooling fluid passes through the core 524 and through a pressure reducing element 561, which can be similar to pressure reducing element 212, and is delivered to the end of the core member 512, and progresses through the cavity 522 toward the base of the core member 512. The pressure reducing element 561 can provide a pressure drop in the working fluid similar to pressure reducing element 212 for vaporizing at least a portion of the working fluid. A plurality of tangs 526 extend radially outward from the body of the tube 524 and contact the inner surface of the cavity 522 to maintain the tube 524 in a coaxial relationship with the core member 512. Such a construction inhibits vibration of a distal end of the tube 524, thus improving the dimensional stability of the preforms produced by the mold 500.

The cavity section 504 of the mold 500 includes a neck finish mold 528, a main cavity section 530 and a gate portion 532. All of these portions 528, 530, 532 cooperate to define an outer surface of the cavity 506, and thus an outer surface of the finished preform produced by the mold 500. The distal end of the core member 512 correlates to the distal end of the cavity 506. The neck finish mold 528 is positioned adjacent the core section 502 of the mold 500 and cooperates with the core section 502 to define the parting line P. The neck finish mold 528 defines the threads 534 and neck ring 536 portions of the cavity 506, and thus of the final preform. Preferably, the neck finish mold 528 comprises two semicircular portions, which cooperate to define the neck finish mold of the cavity 506 so that the neck finish mold 528 may be split apart from one another, in a plane perpendicular to the plane of separation between the core section 502 and cavity section 504, to permit removal of the finished preform from the cavity 506, as is known in the art.

The main cavity section 530 defines the main body portion of the cavity 506. Desirably, the main cavity section 530 also defines a plurality of temperature control elements in the form of channels 538, which direct fluid around the main body portion 530 to maintain the temperature the preform within the cavity 506. Several conduits 554 receive fluid from the fluid line (e.g., the fluid line 130 shown in FIG. 8 and FIG. 9A), and deliver the fluid to the pressure reducing device 558.

The pressure reducing devices are proximate to the high heat transfer material portion 530b. The fluid passes through the pressure reducing devices 558 and is delivered to the channels 538. As described above, there can be a pressure drop across the pressure reducing devices 558 resulting in low temperature fluid, preferably a gas or liquid/gas mixture, in the channels 538. The fluid passes through the channels 538 and removes heat from the mold 500 and passes through the conduits 560 and into the fluid line 140. In the illustrated embodiment, narrow passages 562 connect the channels 538. Fluid can pass between the channels 538 by passing through the passages 562. The channels in the mold 500 can be diffusion passages that cause a pressure drop downstream of the pressure reducing elements 558. The diffusion passages can lower the temperature of the working fluid. Although not illustrated, the channels 538 can spiral around the cavity molding surface 509.

The gate portion 532 of the mold 500 is interposed between the main cavity section 530 and the injection nozzle 510 and defines at least a portion of the gate 508. The gate portion 532 defines one large channel 540, but any number of smaller channels may alternatively be provided. Fluid can flow through the channel 540 of the gate portion 532 to maintain the proper temperature of the gate portion 532. In the illustrated embodiment, the conduit 554 delivers pressurized fluid to the pressure reducing element 558. The temperature and pressure of the fluid is reduced as it passes through the pressure reducing element 558 and into the channel 540. The fluid passes through the channel 540 and heat can be transferred to the fluid. The heated fluid passes out of the channel 540 and into the conduit 560, which can be connected to the fluid line 140.

A controller can be connected to the valves which feed fluid into the channels. In one embodiment, a controller 564 is connected to the pressure reducing elements 558 to command one of more of the pressure reducing elements to stop or vary the flow of fluid. The valves 558, for example, can be controlled to produce pulse cooling for rapid cooling of the cavity 506 with minimal formation of condensation on the core surface 507 and the cavity molding surface 509. In the illustrated embodiment, portions of surfaces 507, 509 formed by high heat transfer materials can be rapidly cooled, especially after the preform has been removed from the cavity 506.

The mold 500 defines a number of contact surfaces defined between the various components that make up the mold 500. For example, in the illustrated arrangement, the core section 502, and specifically the core holder 514 defines a contact surface 542 that cooperates with a contact surface 544 of the cavity section 504 and, more specifically, the neck finish mold 528 of the mold 500. Similarly, the opposing side of the neck finish mold 528 defines a contact surface 546 that cooperates with a contact surface 548 of the main cavity section 530.

The corresponding contact surfaces 542, 544 and 546, 548 intersect the mold cavity 506 and, therefore, it is desirable to maintain a sufficient seal between the contact surfaces 542, 544 and 546, 548 to inhibit molten polymer within the cavity 506 from entering between the respective contact surfaces. Preferably, the corresponding contact surfaces 542, 544 and 546, 548 include mating tapered surfaces, generally referred to as taper locks. Due to the high pressure at which molten polymer is introduced into the cavity 506, a large clamp force is utilized to maintain the core section 502 and the cavity section 504 of the mold in contact with one another and maintain a good seal between the contact surfaces 542, 544 and 546, 548. As a result of such a high clamp force, it is desirable that the components of the mold 500 defining the contact surfaces are formed from a hardened material, such as tool steel, for example, to prevent excessive wear to these areas and increase the life of the mold.

Furthermore, as described in detail throughout the present application, it is also desirable that at least a portion of the mold 500 that defines the cavity 506 be made of a high heat transfer material, such as AMPCOLOY. Such an arrangement permits rapid heat withdrawal from the molten polymer within the cavity 506, which cools the preform to a solid state so that the cavity sections 502 and 504 may be separated and the preform removed from the mold 500. As described above, the rate of cooling of the preform is related to the cycle time that may be achieved without resulting in damage to the preform once it is removed from the mold 500.

A decrease in cycle time means that more parts may be produced in a given amount of time, therefore reducing the overall cost of each preform. However, high heat transfer materials that are preferred for at least portions of the molding surface of the cavity 506 are generally too soft to withstand the repeated high clamping pressures that exist at the contact surfaces 542, 544 and 546, 548, for example. Accordingly, if an entire mold were to be formed from a high heat transfer material, the relatively short life of such a mold may not justify the decrease in cycle time that may be achieved by using such materials. The illustrated mold 500 of FIG. 18, however, is made up of individual components strategically positioned such that the contact surfaces 542, 544 and 546, 548 comprise a hardened material, such as tool steel, while at least a portion of the mold 500 defining the cavity 506 comprises a high heat transfer material, to reduce cycle time.

In the illustrated embodiment, the core holder 514 is desirably constructed of a hardened material while the core member 512 is constructed from a high heat transfer material. Furthermore, the neck finish mold 528 of the mold desirably is constructed of a hardened material. The main cavity section 530 preferably includes a hardened material portion 530a and a high heat transfer material portion 530b. The hardened material portion 530a could be made from the same material the neck finish mold 528. The hardened material portion 530a could be made from a different material than the neck finish mold 528. Preferably, the hardened material portion 530a defines the contact surface 548 while the high heat transfer material portion 530b defines a significant portion of the mold surface of the cavity 506. The high heat transfer material portion 530b and the gate portion 532 may be made from the same or different material. The hardened material portion 530a and the high heat transfer material portion 530b of the main cavity section 530 may be coupled in any suitable manner, such as a silver soldering process as described above, for example.

Furthermore, the gate portion 532 of the mold 500 is also desirably formed from a high heat transfer material, similar to the molds described above.

In some embodiments, the neck finish mold 528 may or may not comprise high heat transfer material. The illustrated neck finish mold 528 comprises a contact portion 802 coupled to an optional insert 801 (preferably a threaded insert configured to mold threads of a preform), which preferably comprises high heat transfer material. The contact portion 802 is positioned adjacent the core section 502 of the mold 500 and cooperates with the core section 502 to define the parting line P. Preferably, the contact portion 802 is made from a hardened material, such as tool steel. The threaded insert 801 can define the threads 534 and the neck ring 536 portion of the cavity 506. The threaded inserts 801 can be coupled to the contact portion 802 and can be formed from a high heat transfer material. Of course, the threaded insert 801 and the contact portion 802 can form a portion of the threads 534 and/or neck ring 536 and the proximal end of the cavity 506.

With a construction as described above, advantageously the mold 500 includes hardened materials at the contact surfaces 542, 544 and 546, 548 to provide a long life to the mold 500. In addition, the mold 500 also includes high heat transfer materials defining at least a portion of the molding surfaces of the cavity 506 such that cycle times may be reduced and, therefore, through-put of the mold 500 is increased. Such an arrangement is especially advantageous in molds designed to form preforms, which are later blow molded into a desired final shape.

Another benefit of the mold 500 is that the hardened material neck finish mold 528 has a lower rate of heat transfer than the high heat transfer portions of the mold 500. Accordingly, the neck finish of the preform may become semi-crystalline or crystalline, which allows the neck finish to retain its formed dimensions during a hot-fill process. Furthermore, the portion of the core member 512 adjacent the neck finish mold 528 is preferably high heat transfer material, which rapidly cools the inner surface of the thread finish of the preform, thereby allowing the preform to maintain its formed dimensions when removed from the mold in a less than fully cooled state. The cycle time may be reduced by 15%-30% utilizing a mold construction such as mold 500 in comparison with a mold made from conventional materials and construction techniques. In addition, certain portions of the mold 500 may be replaced, without necessitating replacement of the entire mold section. For example, the core member 512 and core holder 514 may be replaced independently of one another. In the illustrated embodiment, the valves 558 can be easily replaced by removing the portions of the mold 500. After portions of the mold 500 are removed, the valves 558 are exposed for convenient valve replacement. For example, the portion 530b can be removed from the mold apparatus 132 so that the pressure reducing element 558 is exposed for rapid replacement. Preferably, the pressure reducing elements 558 are expansion valves that can be inserted into the mold 500. Valves with different diameter orifices can be easily and rapidly replaced to produce various preforms comprising different materials. However, in other embodiments the pressure reducing elements 558 are built in the mold 500.

The mold 500 can be thermally insulated to reduce heat losses. The illustrated mold 500 can include a portion 577 comprising a low thermally conductivity material (e.g., tool steel) that surrounds the channels 538. The portion 577 can be a thermal barrier that reduces heat transfer between the mold 500 and the surrounding environment. The portion 577 can be a mold plate that holds various components of the mold. The portion 579 of the core section 502 can likewise comprise low thermally conductivity material to reduce thermal inefficiencies.

Figure 18A:
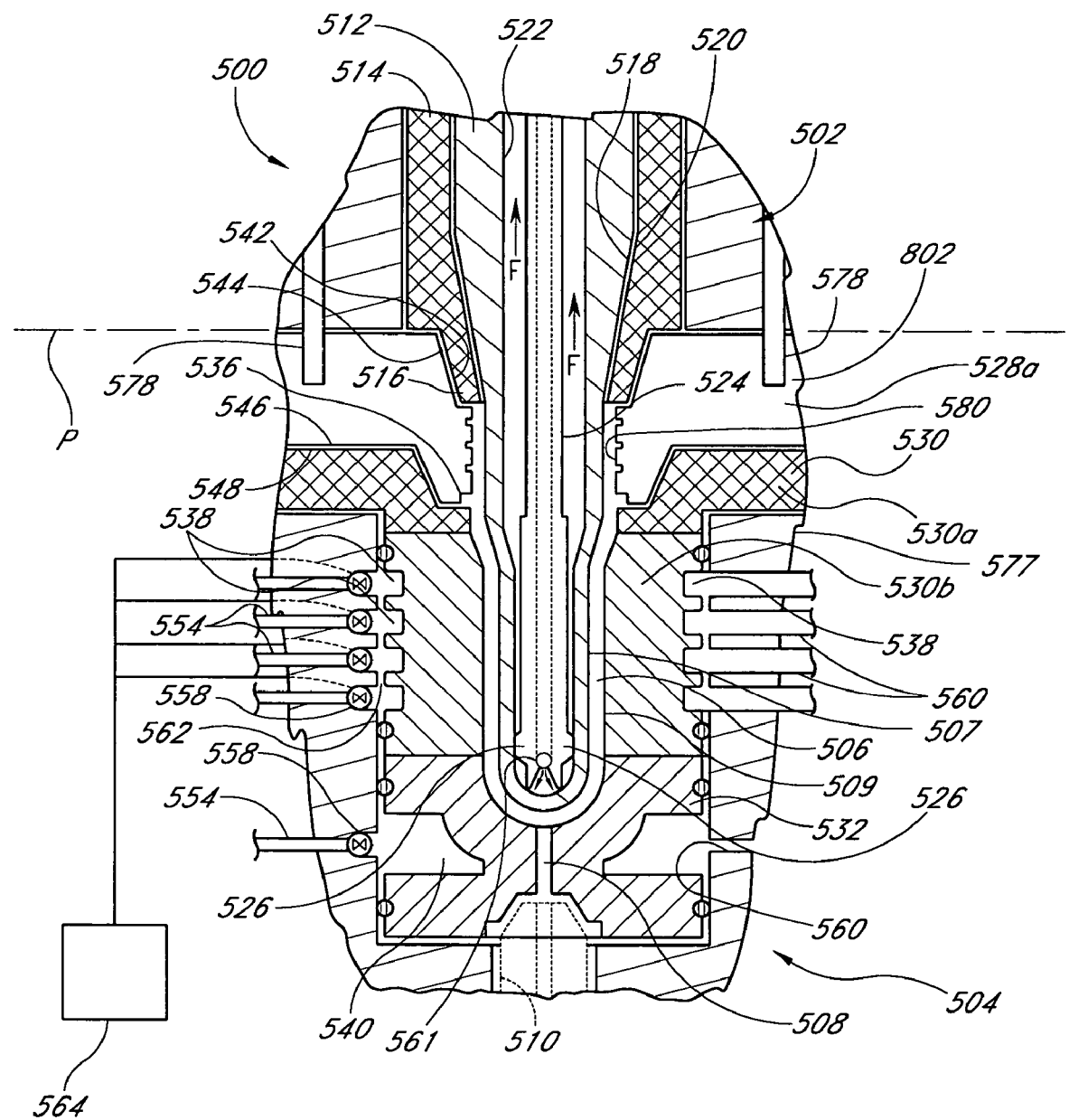
FIG. 18A is a cross-section of another injection mold utilizing high heat transfer material.

FIG. 18A illustrates a modified mold similar to the mold 500 of FIG. 18. The neck finish mold 528a of FIG. 18A comprises one or more temperature control elements. The illustrated neck finish mold 528a comprises a pair of temperature control elements 578 in the form of heating/cooling rods. The temperature control elements 578 can be spaced from the molding surface 580 by a distance of about 2 cm, 5 cm, 10 cm, 15 cm, 20 cm, 25 cm, 30 cm, 50 cm, and ranges encompassing such distances. The temperature control elements 578 can be in the form of channels, bubblers, and other devices to control the temperature of the neck finish mold 528a. Any number of temperature control elements can be spaced about the cavity 506. Of course, cooling channels or other temperature control elements, such as resistance heaters, can also be disposed in the neck finish mold 528a.

Figure 19:
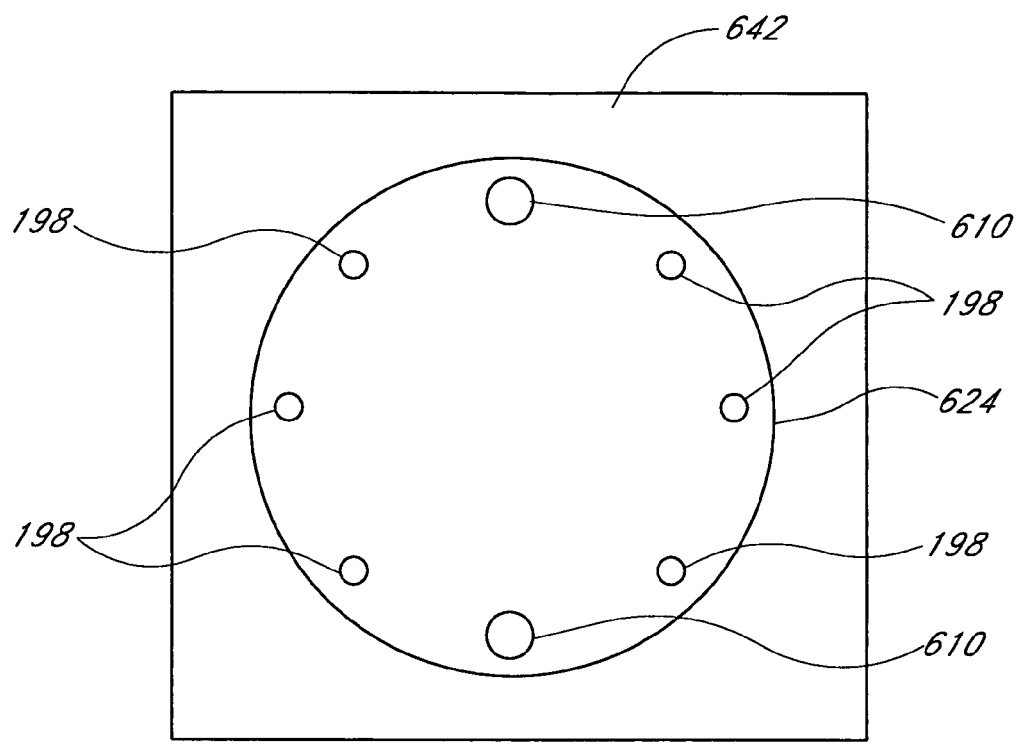
FIGS. 19 and 20 are two halves of a molding machine to make multilayer preforms.
Figure 20:
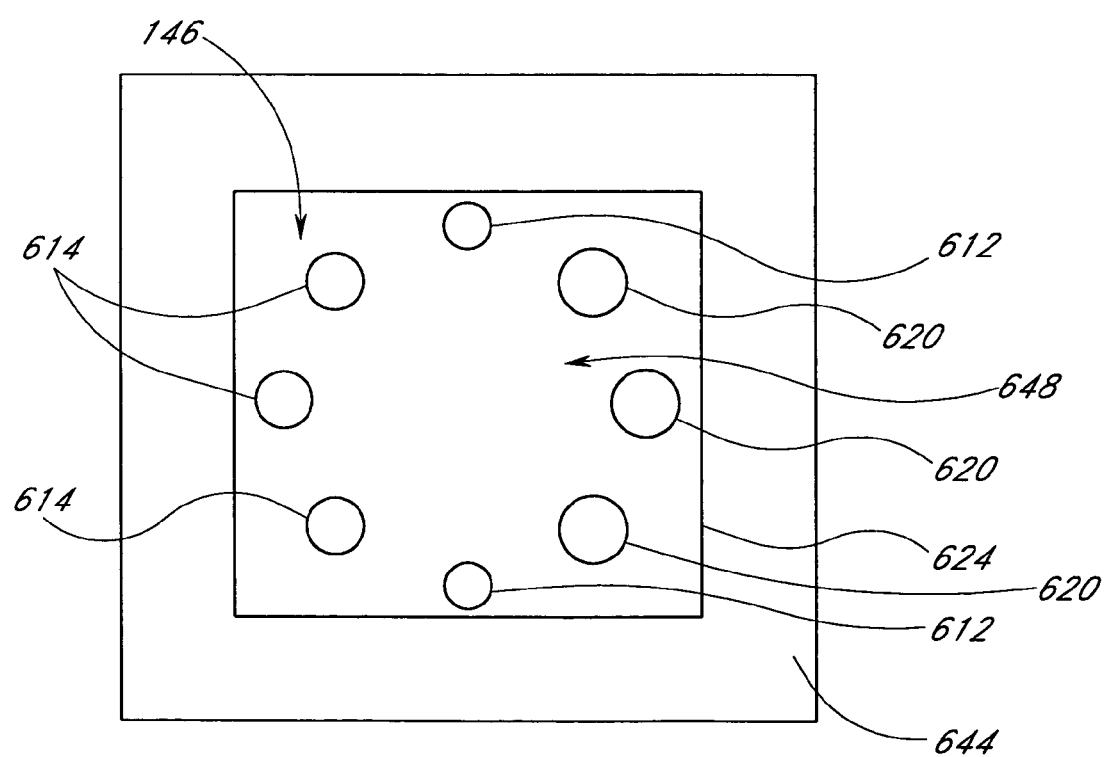

FIGS. 19 and 20 are a schematic of a portion of the preferred type of apparatus to make coated preforms in accordance with a preferred embodiment. The apparatus is an injection molding system designed to make one or more uncoated preforms and subsequently coat the newly-made preforms by over-injection of a material. FIGS. 19 and 20 illustrate the two halves of the mold portion of the apparatus which will be in opposition in the molding machine. The alignment pegs 610 in FIG. 19 fit into their corresponding receptacles 612 in the other half of the mold.

The mold half depicted in FIG. 20 has several pairs of mold cavities, each cavity being similar to the mold cavity depicted in FIG. 13. The mold cavities are of two types: first injection preform molding cavities 614 and second injection preform coating cavities 620. The two types of cavities are equal in number and are preferably arranged so that all cavities of one type are on the same side of the injection block 624 as bisected by the line between the alignment peg receptacles 612. This way, every preform molding cavity 614 is 180° away from a preform coating cavity 620.

The mold half depicted in FIG. 19 has several cores, such as core 198, one for each mold cavity (614 and 620). When the two halves which are FIGS. 19 and 20 are put together, a core 198 (which can be similar to the core 298 of FIG. 13) fits inside each cavity and serves as the mold for the interior of the preform for the preform molding cavities 614 and as a centering device for the uncoated preforms in preform coating cavities 620. The cores 198 are mounted on a turntable 630 which rotates 180° about its center so that a core 198 originally aligned with a preform molding cavity 614 will, after rotation, be aligned with a preform coating cavity 620, and vice-versa. As described in greater detail below, this type of setup allows a preform to be molded and then coated in a two-step process using the same piece of equipment.

It should be noted that the drawings in FIGS. 19 and 20 are merely illustrative. For instance, the drawings depict an apparatus having three molding cavities 614 and three coating cavities 620 (a 3/3 cavity machine). However, the machines may have any number of cavities, as long as there are equal numbers of molding and coating cavities, for example 12/12, 24/24, 48/48 and the like. The cavities may be arranged in any suitable manner. These and other minor alterations are contemplated as part of this disclosure.

Figure 21:
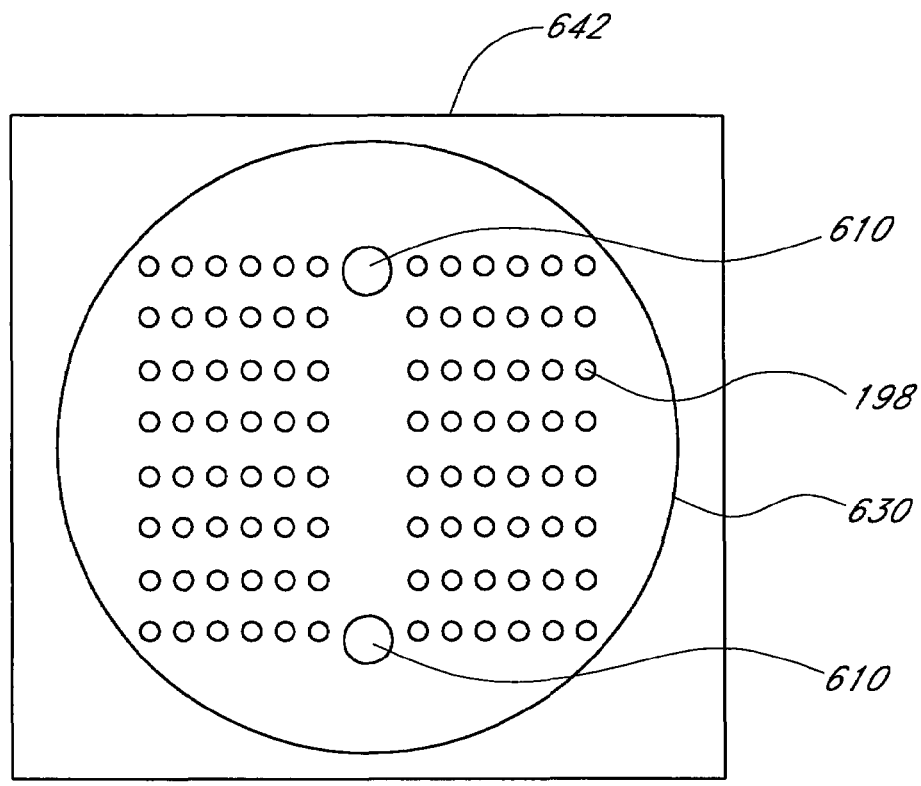
FIGS. 21 and 22 are two halves of a molding machine to make forty-eight two layer preforms.
Figure 22:
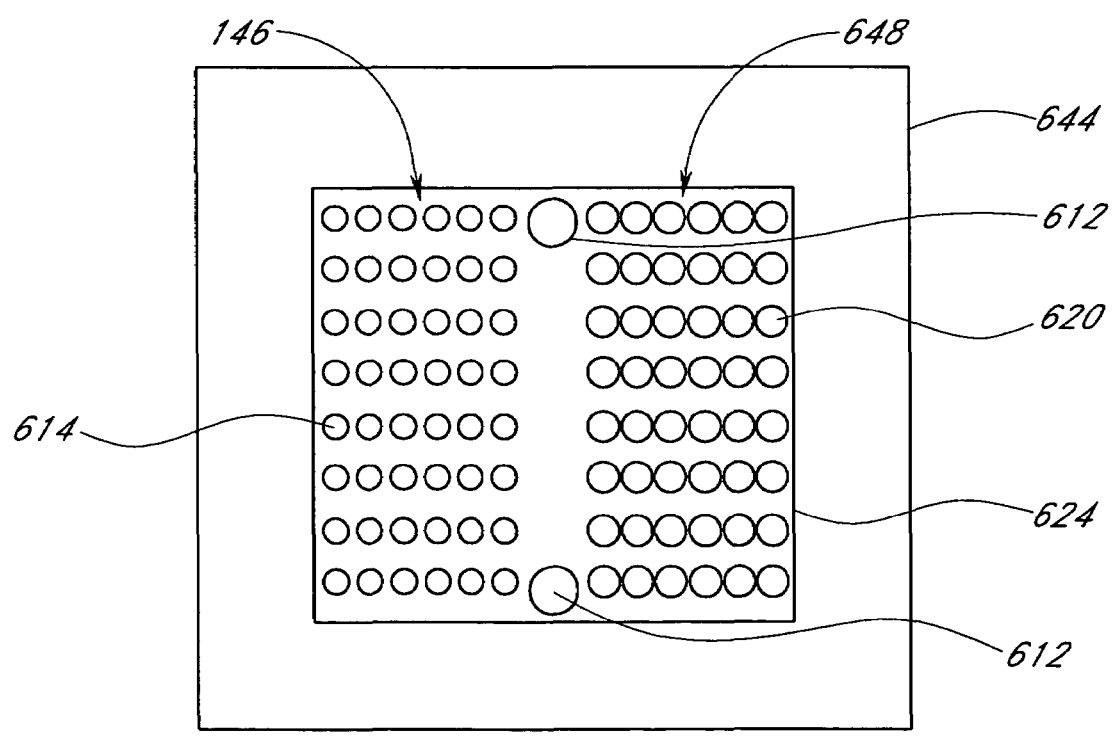

The two mold halves depicted in FIGS. 21 and 22 illustrate an embodiment of a mold of a 48/48 cavity machine as discussed for FIGS. 19 and 20. Referring to FIG.

23 there is shown a perspective view of a mold of the type for an overmolding (inject-over-inject) process in which the cores, such as cores 198, are partially located within the cavities 614 and 620. The arrow shows the movement of the movable mold half 642, on which the cores 198 lie, as the mold closes.

FIG. 24 shows a perspective view of a mold of the type used in an overmolding process, wherein the cores 198 are fully withdrawn from the cavities 614 and 620. When the cores 198 are fully withdrawn from the cavities 614, 620, the moisture in the air may form condensation on each cavity if the temperature of the surface of the cavity is sufficiently low. The arrow indicates that the turntable 630 rotates 180° to move the cores 198 from one cavity to the next. In the illustrated embodiment, the fluid lines 130 and 140 rotate with the turntable 630. On the stationary half 644, the cooling for the preform molding cavity 614 is separate from the cooling for the preform coating cavity 620. The fluid line 130 connected to the turntable 630 and the fluid line 130 connected to the stationary half 644 can be connected to the same fluid source or different fluid sources. Thus, the stationary half 644 and the turntable 630 can have independent temperature control systems, such as the temperature control system 120. The cooling of the cavities of the stationary half 644 is separate from the cooling for the cores 198 in the movable half.

The preferred method and apparatus for making multilayer preforms is discussed in more detail below. Because the methods and apparatus are especially preferred for use in forming multilayer bottles comprising certain preferred materials, the physical characteristics, identification, preparation and enhancement of the preferred materials is discussed prior to the preferred methods and apparatus for working with the materials.

1. Preferred Overmolding (Inject-Over-Inject) Processes

The overmolding is preferably carried out by using an injection molding process using equipment similar to that used to form the uncoated preform itself. A preferred mold for overmolding, with an uncoated preform in place is shown in FIG. 10. The mold comprises two halves, a cavity section 192 and a core section 194, and is shown in FIG. 10 in the closed position prior to overinjecting. The cavity section 192 comprises a cavity in which the uncoated preform is placed. The support ring 38 of the preform rests on a ledge 196 and is held in place by the core section 194, which exerts pressure on the support ring 38, thus sealing the neck portion off from the body portion of the preform. The cavity section 192 has a plurality of tubes or channels 204 therein which carry a fluid as discussed above. Preferably the fluid in the channels circulates in a path in which the fluid passes into the cavity section 192, through the channels 204, and out of the cavity section 192. In a closed loop system, the fluid is passed back into the cavity section 192 after the fluid reaches a desired temperature. The circulating fluid serves to cool the mold, which in turn cools the plastic melt which is injected into the mold to form coated or uncoated preforms. Of course, the fluid can flow through an open loop system, as described above.

The core section 194 of the mold comprises the core 198. The core 198, sometimes called a mandrel, protrudes from the core section 194 of the mold and occupies the central cavity of the preform. In addition to helping to center the preform in the mold, the core 198 cools the interior of the preform. The cooling is done by fluid circulating through channels in the core section 194 of the mold, most importantly through the length of the core 198 itself. The channels 206 of the core section 194 work in a manner similar to the channels 204 in the cavity section 192, in that they create the portion of the path through which the cooling fluid travels which lies in the interior of the mold half.

As the preform sits in the mold cavity, the body portion of the preform is centered within the cavity and is completely surrounded by a void space 200. The preform, thus positioned, acts as an interior die core in the subsequent injection procedure. The melt of the overmolding material, preferably, comprising a barrier material, is then introduced into the mold cavity from the injector via gate 202 and flows around the preform, preferably surrounding at least the body portion 34 of the preform. Following overinjection, the overmolded layer will take the approximate size and shape of the void space 200.

To carry out the overmolding procedure, one preferably heats the initial preform which is to be coated preferably to a temperature above its Tg. In the case of PET, that temperature is preferably about 60 to 175° C., more preferably about 80-110° C. If a temperature at or above the minimum temperature of crystallization for PET is used, which is about 120° C., care should be taken when cooling the PET in the preform. The cooling should be sufficient to minimize crystallization of the PET in the preform so that the PET is in the preferred semi-crystalline state. Advantageously, the neck portion of the preform is not in contact with the melt of overriding material, and thus retains its crystalline structure. Alternatively, the initial preform used may be one which has been very recently injection molded and not fully cooled, as to be at an elevated temperature as is preferred for the overmolding process.

The coating material is heated to form a melt of a viscosity compatible with use in an injection molding apparatus. The temperature for this, the inject temperature, will differ among materials, as melting ranges in polymers and viscosities of melts may vary due to the history, chemical character, molecular weight, degree of branching and other characteristics of a material. For the preferred barrier materials disclosed above, the inject temperature is preferably in the range of about 160-325° C., more preferably 200 to 275° C. For example, for the Copolyester Barrier Material B-010, the preferred temperature is around 210° C., whereas for the PHAE XU-19040.00L, BLOX 0005 or BLOX 0003 the preferred temperature is in the range of 160-260° C., and is more preferably about 175-240° C. Most preferably, the PHAE inject temperature is about 175-200° C. If recycled PET is used, the inject temperature is preferably 250-320° C. The coating material is then injected into the mold in a volume sufficient to fill the void space 200.

The coated preform is preferably cooled at least to the point where it can be displaced from the mold or handled without being damaged, and removed from the mold where further cooling may take place. If PET is used, and the preform has been heated to a temperature near or above the temperature of crystallization for PET, the cooling should be fairly rapid and sufficient to ensure that the PET is primarily in the semi-crystalline state when the preform is fully cooled. As a result of this process, a strong and effective bonding takes place between the initial preform and the subsequently applied coating material.

Overmolding can be also used to create coated preforms with three or more layers. In FIG. 5, there is shown a three-layer embodiment of a preform 72 in accordance with one preferred embodiment. The preform shown therein has two coating layers, a middle layer 74 and an outer layer 76. The relative thickness of the layers shown in FIG. 5 may be varied to suit a particular combination of layer materials or to allow for the making of different sized bottles. As will be understood by one skilled in the art, a procedure analogous to that disclosed above would be followed, except that the initial preform would be one which had already been coated, as by one of the methods for making coated preforms described herein, including overmolding.

a. A Preferred Method and Apparatus for Overmolding

A preferred apparatus for performing the overmolding process is based upon the use of a 330-330-200 machine by Engel (Austria). The preferred mold portion the machine is shown schematically in FIGS. 19-24 and comprises a movable half 642 and a stationary half 644. In one preferred embodiment, both halves are preferably made from hard metal. The stationary half 644 comprises at least two mold sections 146, 148, wherein each mold section comprises N(N>0) identical mold cavities 614, 620, an input and output for cooling fluid, channels allowing for circulation of cooling fluid within the mold section, injection apparatus, and hot runners channeling the molten material from the injection apparatus to the gate of each mold cavity. Because each mold section forms a distinct preform layer, and each preform layer is preferably made of a different material, each mold section is separately controlled to accommodate the potentially different conditions required for each material and layer. The injector associated with a particular mold section injects a molten material, at a temperature suitable for that particular material, through that mold section's hot runners and gates and into the mold cavities. The mold section's own input and output for cooling fluid allow for changing the temperature of the mold section to accommodate the characteristics of the particular material injected into a mold section. Different cooling fluids can be used in different channels within the mold for proper temperature distributions. Further, although not illustrated, the distance between the cavity mold surface and the each of the channels can be different. Similarly, the distance between the cavity mold surface and the valves (e.g., pressure reducing elements) can be different. Consequently, each mold section may have a different injection temperature, mold temperature, pressure, injection volume, cooling fluid temperature, etc. to accommodate the material and operational requirements of a particular preform layer.

The movable half 642 of the mold comprises a turntable 630 and a plurality of cores 198. The alignment pins guide the movable half 642 to slidably move in a preferably horizontal direction towards or away from the stationary half 644. The turntable 630 may rotate in either a clockwise or counterclockwise direction, and is mounted onto the movable half 642. The plurality of cores 198 are affixed onto the turntable 630. These cores 198 serve as the mold form for the interior of the preform, as well as serving as a carrier and cooling device for the preform during the molding operation. The cooling system in the cores is separate from the cooling system in the mold sections.

The mold temperature or cooling for the mold is controlled by circulating fluid. The flow rate of fluid can be varied depending on the stage of the preform production. There is separate cooling fluid circulation for the movable half 642 and for the overmolding section 648 of the stationary half 644. Additionally, the initial preform mold section 646 of the stationary half 644 comprises two separate cooling fluid circulation systems; one for the non-crystalline regions and one for the crystalline regions. Each cooling fluid circulation set up works in a similar manner. The fluid enters the mold, flows through a network of channels or tubes inside as discussed above, and then exits through an output (e.g., mold inlet 136). From the output, the fluid travels through a temperature control system before going back into the mold. In another embodiment, the fluid exits out the temperature control system by passing out of an exhaust system.

In a preferred embodiment, the cores and cavities are constructed of a high heat transfer material, such a beryllium, which is coated with a hard metal, such as tin or chrome. The hard coating keeps the beryllium from direct contact with the preform, as well as acting as a release for ejection and providing a hard surface for long life. The high heat transfer material allows for more efficient cooling, and thus assists in achieving lower cycle times. The high heat transfer material may be disposed over the entire area of each core and/or cavity, or it may be only on portions thereof. Preferably, at least the tips of the cores comprise high heat transfer material. In some embodiments, the high heat transfer material is AMPCOLOY, which is commercially available from Uudenholm, Inc. The temperature control system can employ pulse cooling to cool the cavity and/or core while limiting the formation of condensation on the surfaces of the high heat transfer material.

The number of cores is equal to the total number of cavities, and the arrangement of the core 198 on the movable half 642 mirrors the arrangement of the cavities 614, 620 on the stationary half 644. To close the mold, the movable half 642 moves towards the stationary half 644, mating the core 198 with the cavities 614, 620. To open the mold, the movable half 642 moves away from the stationary half 644 such that the cores 198 are well clear of the block on the stationary half 644. After the cores are fully withdrawn from the mold sections 646, 648, the turntable 630 of the movable half 642 rotates the cores 198 into alignment with a different mold section. Thus, the movable half rotates 360°/(number of mold sections in the stationary half) degrees after each withdrawal of the cores from the stationary half. When the machine is in operation, during the withdrawal and rotation steps, there will be preforms present on some or all of the cores.

The size of the cavities in a given mold section 646, 648 will be identical; however the size of the cavities will differ among the mold sections. The cavities in which the uncoated preforms are first molded, the preform molding cavities 614, are smallest in size. The size of the cavities 620 in the mold section 648 in which the first coating step is performed are larger than the preform molding cavities 614, in order to accommodate the uncoated preform and still provide space for the coating material to be injected to form the overmolded coating. The cavities in each subsequent mold section wherein additional overmolding steps are performed will be increasingly larger in size to accommodate the preform as it gets larger with each coating step.

After a set of preforms has been molded and overmolded to completion, a series of ejectors eject the finished preforms off of the cores 198. The ejectors for the cores operate independently, or at least there is a single ejector for a set of cores equal in number and configuration to a single mold section, so that only the completed preforms are ejected. Uncoated or incompletely-coated preforms remain on the cores so that they may continue in the cycle to the next mold section. The ejection may cause the preforms to completely separate from the cores and fall into a bin or onto a conveyor. Alternatively, the preforms may remain on the cores after ejection, after which a robotic arm or other such apparatus grasps a preform or group of preforms for removal to a bin, conveyor, or other desired location.

FIGS. 19 and 20 illustrate a schematic for an embodiment of the apparatus described above. FIG. 20 is the stationary half 644 of the mold. In this embodiment, the block 624 has two mold sections, one section 646 comprising a set of three preform molding cavities 614 and the other section 648 comprising a set of three preform coating cavities 620. Each of the preform coating cavities 620 is preferably like that shown in FIG. 10, discussed above. Each of the preform molding cavities 614 is preferably similar to that shown in FIG. 13, in that the material is injected into a space defined by the core 198 (albeit without a preform already thereon) and the wall of the mold which is cooled by fluid circulating through channels inside the mold block. Consequently, one full production cycle of this apparatus will yield three two-layer preforms. If more than three preforms per cycle is desired, the stationary half can be reconfigured to accommodate more cavities in each of the mold sections. An example of this is seen in FIG. 22, wherein there is shown a stationary half of a mold comprising two mold sections, one 646 comprising forty-eight preform molding cavities 614 and the other 648 comprising forty-eight preform coating cavities 620. If a three or more layer preform is desired, the stationary half 644 can be reconfigured to accommodate additional mold sections, one for each preform layer FIG. 19 illustrates the movable half 642 of the mold. The movable half comprises six identical cores 198 mounted on the turntable 630. Each core 198 corresponds to a cavity on the stationary half 644 of the mold. The movable half also comprises alignment pegs 610, which correspond to the receptacles 612 on the stationary half 644. When the movable half 642 of the mold moves to close the mold, the alignment pegs 610 are mated with their corresponding receptacles 612 such that the molding cavities 614 and the coating cavities 620 align with the cores 198. After alignment and closure, half of the cores 198 are centered within preform molding cavities 614 and the other half of the cores 198 are centered within preform coating cavities 620.

The configuration of the cavities, cores, and alignment pegs and receptacles must all have sufficient symmetry such that after the mold is separated and rotated the proper number of degrees, all of the cores line up with cavities and all alignment pegs line up with receptacles. Moreover, each core must be in a cavity in a different mold section than it was in prior to rotation in order to achieve the orderly process of molding and overmolding in an identical fashion for each preform made in the machine.

Figure 23:
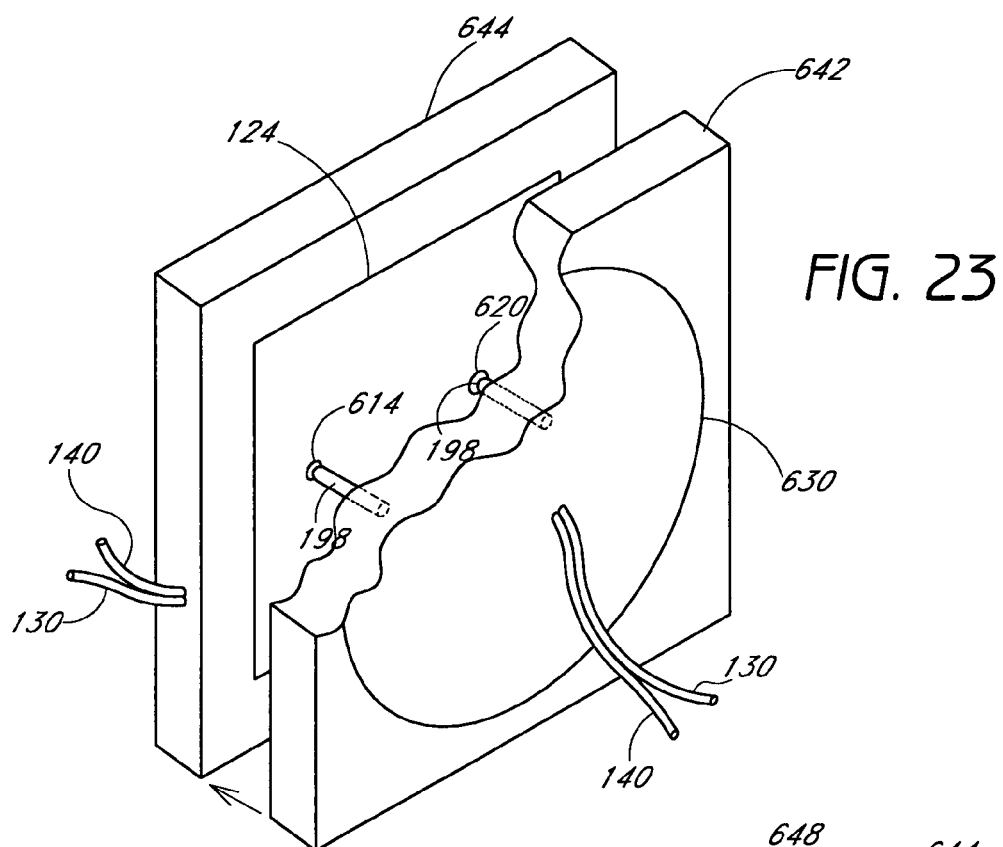
FIG. 23 is a perspective view of a schematic of a mold with cores partially located within the molding cavities.

Two views of the two mold halves together are shown in FIGS. 23 and 24. In FIG. 23, the movable half 642 is moving towards the stationary half 644, as indicated by the arrow. Two cores 198, mounted on the turntable 630, are beginning to enter cavities, one enters a molding cavity 614 and the other is entering a coating cavity 620 mounted in the block 624. In FIG. 24, the cores 198 are fully withdrawn from the cavities on the stationary side. The preform molding cavity 614 has two cooling circulation systems which are separate from the cooling circulation for the preform coating cavity 620, which comprises the other mold section 648. The two cores 198 are cooled by a single system that links all the cores together. The arrow in FIG. 12 shows the rotation of the turntable 630. The turntable 630 could also rotate clockwise. Not shown are coated and uncoated preforms which would be on the cores if the machine were in operation. The alignment pegs and receptacles have also been left out for the sake of clarity.

The operation of the overmolding apparatus will be discussed in terms of the preferred two mold section apparatus for making a two-layer preform. The mold is closed by moving the movable half 642 towards the stationary half 644 until they are in contact. A first injection apparatus injects a melt of first material into the first mold section 146, through the hot runners and into the preform molding cavities 614 via their respective gates to form the uncoated preforms each of which become the inner layer of a coated preform. The first material fills the void between the preform molding cavities 614 and the cores 198. Simultaneously, a second injection apparatus injects a melt of second material into the second mold section 648 of the stationary half 644, through the hot runners and into each preform coating cavity 620 via their respective gates, such that the second material fills the void (200 in FIG. 20) between the wall of the coating cavity 620 and the uncoated preform mounted on the core 198 therein.

During this entire process, cooling fluid is circulating through the four separate areas, corresponding to the non-crystalline regions of mold section 646 of the preform molding cavities 614, the crystalline regions of mold section 646 of the preform molding cavities 614, mold section 648 of the preform coating cavities 620, and the movable half 642 of the mold, respectively. Thus, the melts and preforms are being cooled in the center by the circulation in the movable half that goes through the interior of the cores, as well as on the outside by the circulation in each of the cavities.

The movable half 642 then slides back to separate the two mold halves and open the mold until all of the cores 198 having preforms thereon are completely withdrawn from the preform molding cavities 614 and preform coating cavities 620. The ejectors eject the coated, finished preforms off of the cores 198 which were just removed from the preform coating cavities. As discussed above, the ejection may cause the preforms to completely separate from the cores and fall into a bin or onto a conveyor, or if the preforms remain on the cores after ejection, a robotic arm or other apparatus may grasp a preform or group of preforms for removal to a bin, conveyor, or other desired location. The turntable 630 then rotates 180° so that each core 198 having an uncoated preform thereon is positioned over a preform coating cavity 620, and each core from which a coated preform was just ejected is positioned over a preform molding cavity 614. Rotation of the turntable 630 may occur as quickly as 0.5-0.9 seconds. Using the alignment pegs 610, the mold halves again align and close, and the first injector injects the first material into the preform molding cavity 614 while the second injector injects a second material into the preform coating cavity 620.

A production cycle of closing the mold, injecting the melts, opening the mold, ejecting finished multilayer preforms, rotating the turntable, and closing the mold is repeated, so that preforms are continuously being molded and overmolded.

When the apparatus first begins running, during the initial cycle, no preforms are yet in the preform coating cavities 620. Therefore, the operator should either prevent the second injector from injecting the second material into the second mold section during the first injection, or allow the second material to be injected and eject and then discard the resulting single layer preform comprised solely of the second material. After this start-up step, the operator may either manually control the operations or program the desired parameters such that the process is automatically controlled.

Two layer preforms may be made using the first preferred overmolding apparatus described above. In one preferred embodiment, the two layer preform comprises an inner layer comprising polyester and an outer layer comprising a barrier material, foam, polyester, and other materials disclosed herein. In especially preferred embodiments, the inner layer comprises virgin PET. The description hereunder is directed toward the especially preferred embodiments of two layer preforms comprising an inner layer of virgin PET, in which the neck portion is generally crystalline and the body portion is generally non-crystalline. The description is directed toward describing the formation of a single set of coated preforms 60 of the type seen in FIG. 4, that is, following a set of preforms through the process of molding, overmolding and ejection, rather than describing the operation of the apparatus as a whole. The process described is directed toward preforms having a total thickness in the wall portion 66 of about 3 mm, comprising about 2 mm of virgin PET and about 1 mm of barrier material. The thickness of the two layers will vary in other portions of the preform 60, as shown in FIG. 4.

It will be apparent to one skilled in the art that some of the parameters detailed below will differ if other embodiments of preforms are used. For example, the amount of time which the mold stays closed will vary depending upon the wall thickness of the preforms. However, given the disclosure below for this preferred embodiment and the remainder of the disclosure herein, one skilled in the art would be able to determine appropriate parameters for other preform embodiments.

The apparatus described above is set up so that the injector supplying the mold section 646 containing the preform molding cavities 614 is fed with virgin PET and that the injector supplying the mold section 648 containing the preform coating cavities 620 is fed with a barrier material.

The movable half 642 of the mold is moved so that the mold is closed. A melt of virgin PET is injected through the back of the block 624 and into each preform molding cavity 614 to form an uncoated preform 30 which becomes the inner layer of the coated preform. The injection temperature of the PET melt is preferably 250 to 320° C., more preferably 255 to 280° C. The mold is kept closed for preferably 1 to 10 seconds, more preferably 2 to 6 seconds while the PET melt stream is injected and then cooled by the coolant circulating in the mold.

In the first step, the PET substrate is injection molded by injecting molten PET into the cavities formed by the molds and cores in the mold stack. When the cavity is filled, the resin in the body portion will come into contact with cooling surfaces and the resin in the neck finish will come into contact with the heated thread mold. As the PET in the neck finish cools, it will begin to crystallize as a result of this contact with the relatively hot mold. Once in contact, the crystallization will start and continue at a rate determined by time and temperature. When the neck finish portions of the molds are kept above the minimum temperature of crystallization of the PET used, crystallization will begin on contact. Higher temperatures will increase the rate of crystallization and decrease the time required to reach the optimum level of crystallization while maintaining post mold dimensional stability of the neck finish of the preform. At the same time the resin in the neck finish portion is cooling into a crystallized state, the resin in the body portion or lower body portion of the preform will be in contact with the chilled portions of the mold and thus cooled into an amorphous or semi-crystalline state.

The movable half 642 of the mold is then moved so that the two halves of the mold are separated at or past the point where the newly molded preforms, which remain on the cores 198, are clear of the stationary side 644 of the mold. When the cores 198 are clear of the stationary side 644 of the mold, the turntable 630 then rotates 180° so that each core 198 having a molded preform thereon is positioned over a preform coating cavity 620. Thus positioned, each of the other core 198 which do not have molded preforms thereon, are each positioned over a preform molding cavity 614. The mold is again closed. Preferably the time between removal from the preform molding cavity 614 to insertion into the preform coating cavity 620 is 1 to 10 seconds, and more preferably 1 to 3 seconds.

When the molded preforms are first placed into preform coating cavities 620, the exterior surfaces of the body portions of the preforms are not in contact with a mold surface. Thus, the exterior skin of the body portion is still softened and hot as described above because the contact cooling is only from the core inside. The high temperature of the exterior surface of the uncoated preform (which forms the inner layer of the coated preform) aids in promoting adhesion between the PET and barrier layers in the finished coated preform. It is postulated that the surfaces of the materials are more reactive when hot, and thus chemical interactions between the barrier material and the virgin PET will be enhanced by the high temperatures. Barrier material will coat and adhere to a preform with a cold surface, and thus the operation may be performed using a cold initial uncoated preform, but the adhesion is markedly better when the overmolding process is done at an elevated temperature, as occurs immediately following the molding of the uncoated preform. As discussed earlier, the neck portion of the preform has desirably crystallized from the separated, thermally isolated cooling fluid systems in the preform molding cavity. Since the coating operation does not place material on the neck portion, its crystalline structure is substantially undisturbed. However, the neck portion of the preform can also be amorphous or partially crystalline as desired. In some embodiments, the preform may have a hardened or egg-shell outer layer that surrounds a soft interior of the preform. The overmolding material can be selected to achieve the desired interaction between substrate and the overmolded layer.

A second injection operation then follows in which a melt of a material (e.g., a barrier melt, recycled melt, polypropylene melt, foam melt, etc.) is injected into each preform coating cavity 620 to coat the preforms. The temperature of the melt of polymer material is preferably 160 to 325° C. The exact temperature range for any individual barrier material is dependent upon the specific characteristics of that material, but it is well within the abilities of one skilled in the art to determine a suitable range by routine experimentation given the disclosure herein. For example, if BLOX 0005 or BLOX 0003 is used, the temperature of the melt (inject temperature) is preferably 160 to 260° C., more preferably 200 to 240° C., and most preferably 175 to 200° C. If the Copolyester Barrier Material B-010 is used, the injection temperature is preferably 160 to 260° C., more preferably 190 to 250° C. During the same time that this set of preforms are being overmolded with polymer material in the preform coating cavities 620, another set of uncoated preforms is being molded in the preform molding cavities 614 as described above.

The two halves of the mold are again separated preferably 3 to 10 seconds, more preferably 4 to 6 seconds following the initiation of the injection step. The preforms which have just been coated in the preform coating cavities 620, are ejected from the cores 198. The uncoated preforms which were just molded in preform molding cavities 614 remain on their cores 198. The turntable 630 is then rotated 180° so that each core having an uncoated preform thereon is positioned over a coating cavity 620 and each core 98 from which a coated preform was just removed is positioned over a molding cavity 614.

The cycle of closing the mold, injecting the materials, opening the mold, ejecting finished preforms, rotating the turntable, and closing the mold is repeated, so that preforms are continuously being molded and overmolded. Those of skill in the art will appreciate that dry cycle time of the apparatus may increase the overall production cycle time for molding a complete preform.

The process using modified molds and chilled cores will produce a unique combination of amorphous/crystalline properties. As the core is chilled and the thread mold is heated, the thermal transfer properties of the PET act as a barrier to heat exchange. The heated thread molds crystallize the PET at the surface of the thread finish, and the PET material transitions into an amorphous form near the core as the temperature of the PET reduces closer to the core. This variation of the material from the inner (core) portion to the outer (thread) portion is also referred to herein as the crystallinity gradient.

The core temperature and the rate of crystallization of the resin play a part in determining the depth of crystallized resin. In addition, the amorphous inner surface of the neck finish stabilizes the post mold dimensions allowing closer molding tolerances than other crystallizing processes. On the other side, the crystallized outer surface supports the amorphous structure during high temperature filling of the container. Physical properties are also enhanced (e.g. brittleness, impact etc.) as a result of this unique crystalline/amorphous structure.

The optimum temperature for crystallization may vary depending upon factors including resin grade, resin crystallization temperature, intrinsic viscosity, wall thickness, exposure time, mold temperature. Preferred resins include PET homopolymer and copolymers (including but not limited to high-IPA PET, Copolyester Barrier Materials, and copolymers of PET and polyamides) and PEN. Such resins preferably have low intrinsic viscosities and moderate melt temperatures, preferably IVs of about 74 is 86, and melt temperatures of about 220-300° C. The preferred mold temperature range for PET is from about 240-280° C., with the maximum crystallization rate occurring at about 180° C., depending upon the above factors, the preferred exposure time range is from about 20 to 60 seconds overall, which includes both injection steps in inject-over-inject embodiments, and the preferred injection cavity pressure range is about 5000 to 22000 PSI. Thicker finish wall thickness will require more time to achieve a particular degree of crystallinity as compared to that needed for a thinner wall thickness. Increases in exposure time (time in mold) will increase the depth of crystallinity and the overall percentage of crystallinity in the area, and changes in the mold temperature in the region for which crystallinity is desired will affect the crystallinity rate and dimensional stability.

One of the many advantages of using the process disclosed herein is that the cycle times for the process are similar to those for the standard process to produce uncoated preforms; that is the molding and coating of preforms by this process is done in a period of time similar to that required to make uncoated PET preforms of similar size by standard methods currently used in preform production. Therefore, one can make barrier coated PET preforms instead of uncoated PET preforms without a significant change in production output and capacity.

If a PET melt cools slowly, the PET will take on a crystalline form. Because crystalline polymers do not blow mold as well as amorphous polymers, a preform comprised of a body portion of crystalline PET would not be expected to perform as well in forming containers as one having a body portion formed of PET having a generally non-crystalline form. If, however, the body portion is cooled at a rate faster than the crystal formation rate, as is described herein, crystallization of the PET will be minimized and the PET will take on an amorphous or semi-crystalline form. Thus, sufficient cooling of the PET in the body portion of the preform is crucial to forming preforms which will perform as needed when processed.

The rate at which a layer of PET cools in a mold such as described herein is proportional to the thickness of the layer of PET, as well as the temperature of the cooling surfaces with which it is in contact. If the mold temperature factor is held constant, a thick layer of PET cools more slowly than a thin layer. This is because it takes a longer period of time for heat to transfer from the inner portion of a thick PET layer to the outer surface of the PET which is in contact with the cooling surfaces of the mold than it would for a thinner layer of PET because of the greater distance the heat must travel in the thicker layer. Thus, a preform having a thicker layer of PET needs to be in contact with the cooling surfaces of the mold for a longer time than does a preform having a thinner layer of PET. In other words, with all things being equal, it takes longer to mold a preform having a thick wall of PET than it takes to mold a preform having a thin wall of PET. The temperature control system with the valves proximate to the preform can rapidly cool the preform to minimize the cooling time for thick wall or thin wall PET.

The uncoated preforms, including those made by the first injection in the above-described apparatus, are preferably thinner than a conventional PET preform for a given container size. This is because in making the barrier coated preforms, a quantity of the PET which would be in a conventional PET preform can be displaced by a similar quantity of one of the preferred barrier materials. This can be done because the preferred barrier materials have physical properties similar to PET, as described above. Thus, when the barrier materials displace an approximately equal quantity of PET in the walls of a preform or container, there will not be a significant difference in the physical performance of the container. Because the preferred uncoated preforms which form the inner layer of the barrier coated preforms are thin-walled, they can be removed from the mold sooner than their thicker-walled conventional counterparts. For example, the uncoated preform can be removed from the mold preferably after about 4-6 seconds without the body portion crystallizing, as compared to about 12-24 seconds for a conventional PET preform having a total wall thickness of about 3 mm. All in all, the time to make a barrier coated preform is equal to or slightly greater (up to about 30%) than the time required to make a monolayer PET preform of this same total thickness.

Additionally, because the preferred barrier materials are amorphous, they will not require the same type of treatment as the PET. Thus, the cycle time for a molding-overmolding process as described above is generally dictated by the cooling time required by the PET. In the above-described method, barrier coated preforms can be made in about the same time it takes to produce an uncoated conventional preform.

The advantage gained by a thinner preform can be taken a step farther if a preform made in the process is of the type in FIG. 4. In this embodiment of a coated preform, the PET wall thickness at 70 in the center of the area of the end cap 42 is reduced to preferably about $\frac{1}{3}$ of the total wall thickness. Moving from the center of the end cap out to the end of the radius of the end cap, the thickness gradually increases to preferably about $\frac{2}{3}$ of the total wall thickness, as at reference number 68 in the wall portion 66. The wall thickness may remain constant or it may, as depicted in FIG. 4, transition to a lower thickness prior to the support ring 38. The thickness of the various portions of the preform may be varied, but in all cases, the PET and barrier layer wall thicknesses must remain above critical melt flow thickness for any given preform design.

Using preforms 60 of the design in FIG. 4 allows for even faster cycle times than that used to produce preforms 50 of the type in FIG. 3. As mentioned above, one of the biggest barriers to short cycle time is the length of time that the PET needs to be cooled in the mold following injection. If the body portion of a preform comprising PET has not sufficiently cooled before it is ejected from the core, it will become substantially crystalline and potentially cause difficulties during blow molding. Furthermore, if the PET layer has not cooled enough before the overmolding process takes place, the force of the barrier material entering the mold will wash away some of the PET near the gate area. The preform design in FIG. 4 takes care of both problems by making the PET layer thinnest in the center of the end cap region 42, which is where the gate is in the mold. The thin gate section allows the gate area to cool more rapidly, so that the uncoated PET layer may be removed from the mold in a relatively short period of time while still avoiding crystallization of the gate area and washing of the PET during the second injection or overmolding phase.

The physical characteristics of the preferred barrier materials help to make this type of preform design workable. Because of the similarity in physical properties, containers having wall portions which are primarily barrier material can be made without sacrificing the performance of the container. If the barrier material used were not similar to PET, a container having a variable wall composition as in FIG. 4 would likely have weak spots or other defects that could affect container performance.

D. Formation of Preferred Containers by Blow Molding

The containers are preferably produced by blow-molding preforms, the creation of which is disclosed above. The mold 80 of FIG. 6 can comprise one or more temperature control systems 710. The illustrated mold 80 comprises a blow mold neck portion 706 and a blow mold body portion 708. The temperature control system 710 can comprise a single or multi circuit system. The illustrated temperature control system 710 comprises a plurality of temperature control elements in the form of channels 712, 714, although other temperature control elements can be used. The fluid circulation in the channels 712 is preferably independent from the fluid circulation in the channels 714. The channels 712 pass through the blow mold neck portion 706, and the channels 714 pass through the blow mold body portion 708. However, the channels can be at any suitable location for controlling the temperature of the blow molded container. The blow mold temperature control system can also comprise heating/cooling rods, electric heaters, and the like.

The mold 80 can comprise high heat transfer material to rapidly cool the molded container, thus reducing the amount of chilled air (e.g., food grade air) used to reduce the temperature of the container, although chilled air can be blown into the container to further reduce the temperature of the container. For example, at least a portion of the blow molding interior surface 718 can comprise high heat transfer material. In some embodiments, high heat transfer material form at least about 10%, 40%, 60%, 80%, 90% and ranges encompassing these amounts of the interior surface. In some embodiments, the entire interior surface 718 comprises high heat transfer material. The high heat transfer material can rapidly change the temperature of the blow molded container when the container contacts the interior surface 718.

The blow mold 80 can be substituted with the molding apparatuses of the temperature control systems described above. As such, various configurations of fluid systems and working fluids can be employed with blow molds. Additionally, one or more pressure reducing elements can be in fluid in communication with the fluid channels 712, 714. The pressure reducing elements can vaporizes an effective amount of refrigerant (e.g., cryogenic fluids) to reduce the temperature of the cryogenic fluid such that the cryogenic fluid can sufficiently cool the blow molded container within the mold cavity. Once the container contacts the interior surface 718, the wall of the blown container can be quickly cooled to form a dimensionally stable wall of the container.

In other preferred embodiments in which it is desired for the entire container to be heat-set, it is preferred that the containers be blow-molded in accordance with processes generally known for heat set blow-molding, including, but not limited to, those which involve orienting and heating in the mold, and those which involve steps of blowing, relaxing and reblowing. The mold 80 can quickly cool the container during this process, especially with high heat transfer material absorbing heat from the container at a high rate.

In some embodiments, the mold 80 can be used to produce crystalline neck finishes. For example, the blow mold neck portion 706 and the blow mold body portion 708 can selectively control the temperature of the preform/container to achieve a desired amount of crystallization. Thus, the neck portion of the preform/container can be heated and gradually reduced in temperature to produce a desired amount of crystalline material. To enhance thermal isolation, inserts 750 may be used to reduce heat transfer between portions of the mold 80. The illustrated inserts 750 are positioned between the blow mold neck portion 706 and the blow mold body portion 708 and can be formed of an insulator.

In some embodiments for preforms in which the neck finish is formed primarily of PET, the preform is heated to a temperature of preferably 80° C. to 120° C., with higher temperatures being preferred for the heat-set embodiments, and given a brief period of time to equilibrate. After equilibration, it is stretched to a length approximating the length of the final container. Following the stretching, pressurized air, such as chilled food grade air, is forced into the preform which acts to expand the walls of the preform to fit the mold in which it rests, thus creating the container. Working fluid is circulated through the channels 712, 714 and rapidly cools the container contacting the interior surface 718. The temperature of the chilled air for stretching the preform and the temperature of the working fluid cooling the interior surface 718 can be selected based on the desired container finish, production time, and the like.

FIG. 6A illustrates another embodiment of the mold for stretch blow molding preforms. The blow mold body portion 708*a* comprises an inner portion 740 and an outer portion 742. The inner portion 740 and the outer portion 742 can comprise materials with different thermal conductivities. The inner portion 740 defines blow molding interior surface 718*a* and preferably comprises a high heat transfer material. A chilled fluid, such as a refrigerant, can be passed through the channels 710*a* to rapidly cool the blow molded container. The outer portion 742 can form a thermal barrier to reduce heat transfer to the surrounding environment. The outer portion 742 surrounds the inner portion 740 to thermally isolate the inner portion 740. The outer portion 742 can comprise steel or other thermally insulating material in comparison to the material forming the inner portion 740.

The mold neck portion 706*a* can comprise a neck portion 746 and an upper neck portion 748. The neck portion 746 preferably comprises high heat transfer material. The upper neck portion 748 can comprise an insulating material to thermally isolate the internal portions of the mold 80*a* similar to the body portion 708*a*.

The temperature of the interior surfaces of the blow molds 80, 80*a* can be selected based on the preform design. For example, the temperatures of the interior mold surfaces can be different for blow molding preforms comprising an outer layer of foam material and for blow molding preforms comprising an outer layer of PET. Although the blow mold 80 is discussed primarily with respect to stretch blow molding a preform, the mold 80 can be an extrusion blow mold. Thus, it is contemplated that the mold 80 can be used for an extrusion blow molding process. Additionally, the embodiments, features, systems, devices, materials, methods and techniques described herein may, in some embodiments, be similar to any one or more of the embodiments, features, systems, devices, materials, methods and techniques described in U.S. patent application Ser. No. 11/108,607 entitled MONO AND MULTI-LAYER ARTICLES AND EXTRUSION METHODS OF MAKING THE SAME, filed on Apr. 18, 2005 which is incorporated herein by reference in its entirety.

E. Compression Methods and Apparatuses for Making Preferred Articles

Monolayer and multilayer articles (including packaging such as closures, preforms, containers, bottles) can be formed by a compression molding process. As discussed above, one method of producing multi-layered articles is referred to herein generally as overmolding. The name also refers to a procedure which uses compression molding to mold one or more layers of material over an existing layer, which preferably was itself made by a molding process, such as compression molding.

One overmolding method for making articles involves using a melt source in conjunction with a mold comprising one or more cores (e.g., mandrels) and one or more cavity sections. The melt source delivers a first amount of moldable material (e.g., a molten polymer (i.e., polymer melt)) to the cavity section. A first portion of an article is molded between the core and the cavity section. The first portion (e.g., a substrate layer) remains in the cavity section when the core is pulled out of the cavity section. A second amount of material is then deposited onto the interior of the first portion of the article. A second core is used to mold the second amount of material into a second portion of the article, thus forming a multi-layer article. This process may be referred to as "compress-over-compress."

In one embodiment of compress-over-compress a melt source deposits a first moldable material into a cavity section. A first portion (e.g., a substrate layer) of articles is molded between a core and the first cavity section. The first layer remains on the core when the core is pulled out of the first cavity section. A second moldable material is then deposited into a second cavity section in order to make an exterior portion of the article. The core and the corresponding first portion are then inserted into the second cavity section. As the core and the first layer are moved into the second cavity section, the second material is molded into a second portion of the article. The core and the accompanying article are then removed from the second cavity section and the article is removed from the core.

Thus, the overmolding method and apparatus can be used to mold inner layers and/or outer layers of articles as desired. The multilayer articles can be containers, preforms, closures, and the like. Additionally, one or more compression systems can be employed to form multilayer articles. Each compression system can be a compression mold having cavity sections and cores that are used to mold a portion of an article. A transport system can transport articles between each pair compression molding systems. Thus, a plurality of compression molding systems can be used for an overmolding process.

In an especially preferred embodiment, the compress-over-compress process is performed while the first portion, e.g. a substrate layer, has not yet fully cooled. The underlying layer may have retained inherent heat from a molding process that formed the underlying layer. In some embodiments, the underlying layer can be at room temperature or any other temperature suitable for overmolding. For example, articles at room temperature can be overmolded with one or more layers of material. These articles may have been stored for an extended period of time before being overmolded.

Molding may be used to place one or more layers of material(s) such as those comprising lamellar material, PP, foam material, PET (including recycled PET, virgin PET), barrier materials, phenoxy type thermoplastics, combinations thereof, and/or other materials described herein over a substrate (e.g., the underlying layer). In some non-limiting exemplary embodiments, the substrate is in the form of a preform, preferably having an interior surface for contacting foodstuff.

Articles made by compression molding may comprise one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot fill applications, a layer having a melt strength suitable for extrusion. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, and/or combinations thereof. For the sake of convenience, articles are described primarily with respect to preforms, containers, and closures.

Figure 25:
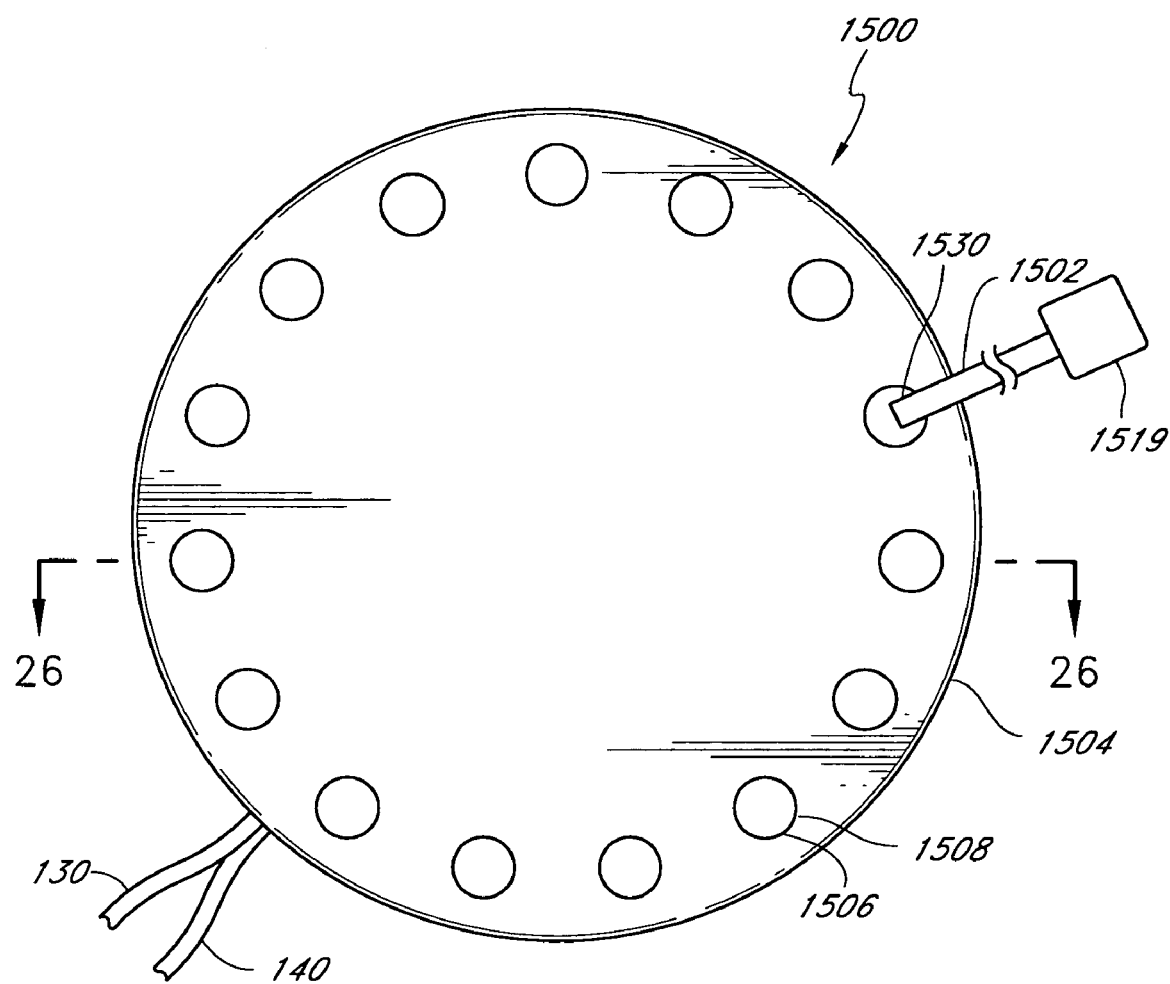
FIG. 25 is a top plan view of a compression molding system for producing preforms.

The temperature control systems described above can comprise a molding apparatus configured to mold articles (e.g., monolayer and multilayer articles) by a compression molding process. FIG. 25 illustrates a molding system 1500 designed to make preforms that comprise one or more layers. In the illustrated embodiment, the molding system 1500 is a compression molding system and comprises a melt source 1502 configured to deliver moldable material to a turntable 1504 that has cavity portions 1508 with one or more mold cavity sections 1506 (FIG. 26).

The core section 1510 can cooperate with a corresponding cavity section 1506 to mold the moldable material. The illustrated core section 1510 (FIG. 26) has a core 1512 sized and adapted to be inserted into a corresponding cavity section 1506. The core 1512 can be moved between an open position and a closed position. The illustrated core section 1512*a* is in a closed position.

Figure 27:
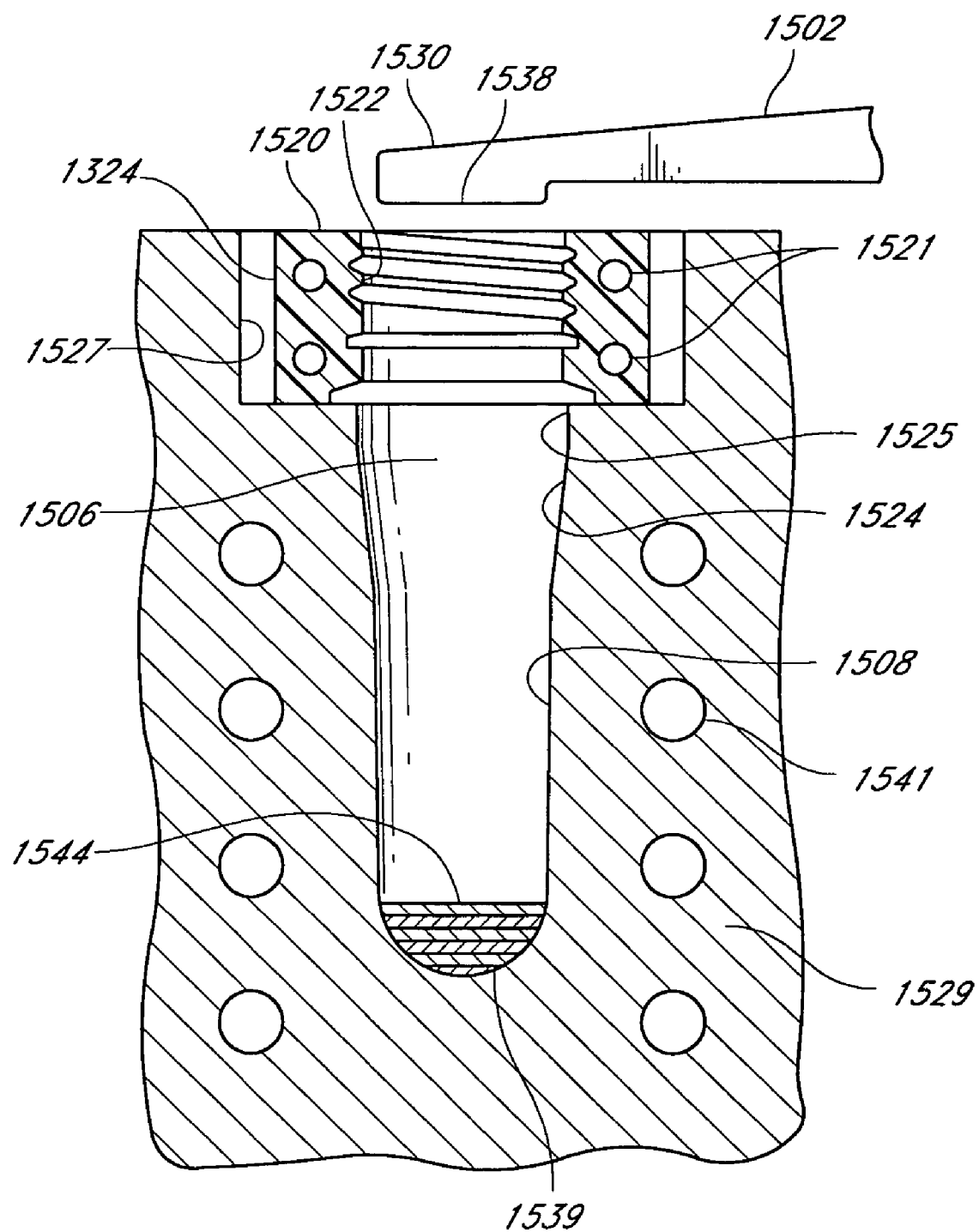
FIG. 27 is a cross-section of a cavity section of FIG. 26 containing a plug of material.

The source 1502 can feed melt material into the mold cavity section 1506 from above or through an injection point along the mold cavity section 1506. The term "melt material" is a broad term and may comprise one or more of the materials disclosed herein. In some embodiments, melt material may be at a temperature (e.g., an elevated temperature) suitable for compression molding. As shown in FIG. 27, the source 1502 can produce and/or deliver melt material to the mold cavity sections 1506 of the turntable 1504. The turntable 1504 can rotate about a central axis to move the mold cavity sections 1506 into position such that the source 1502 can fill a portion of a mold cavity section 1506 with melt for subsequent compression molding. The turntable 1504 and the mold core section 1510 can continuously or incrementally rotate about the center of the turntable 1504. Preferably, the core section 1510 and the turntable 1504 move in unison for a portion of the molding process as discussed below.

Figure 26:
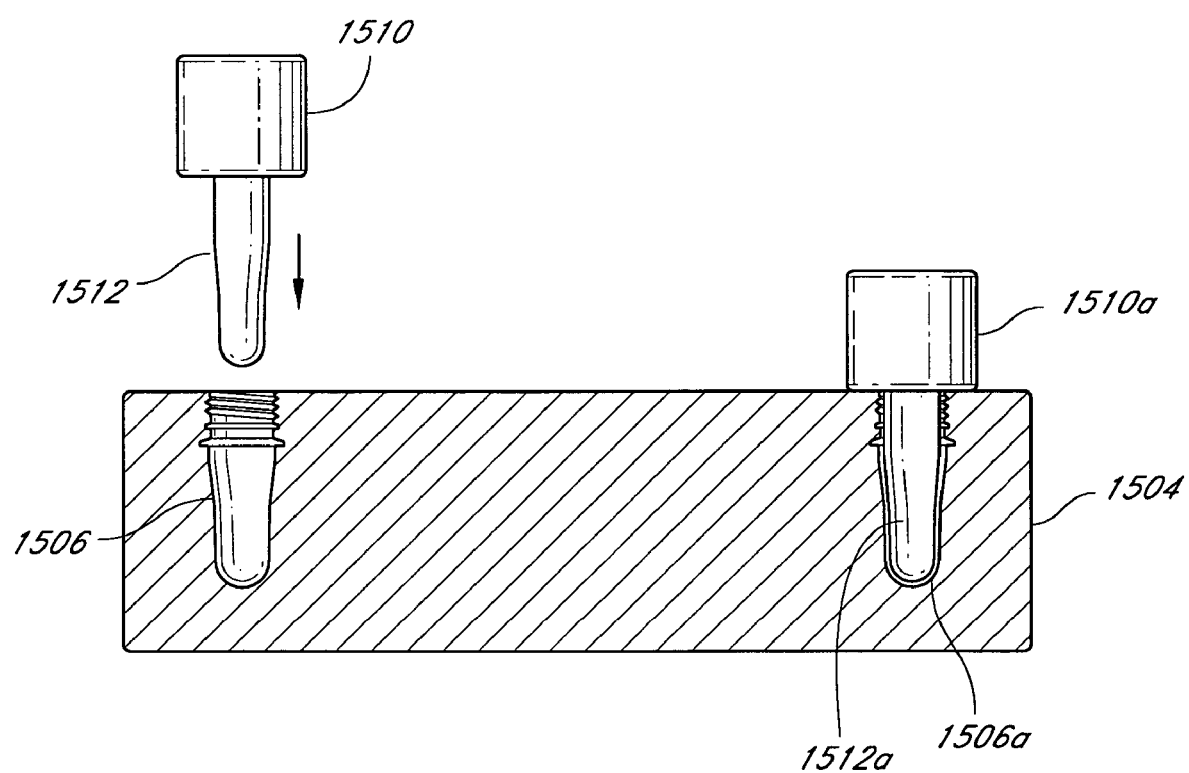
FIG. 26 is a cross-sectional view of the compression molding system taken along lines 26-26 of FIG. 25.
Figure 28:
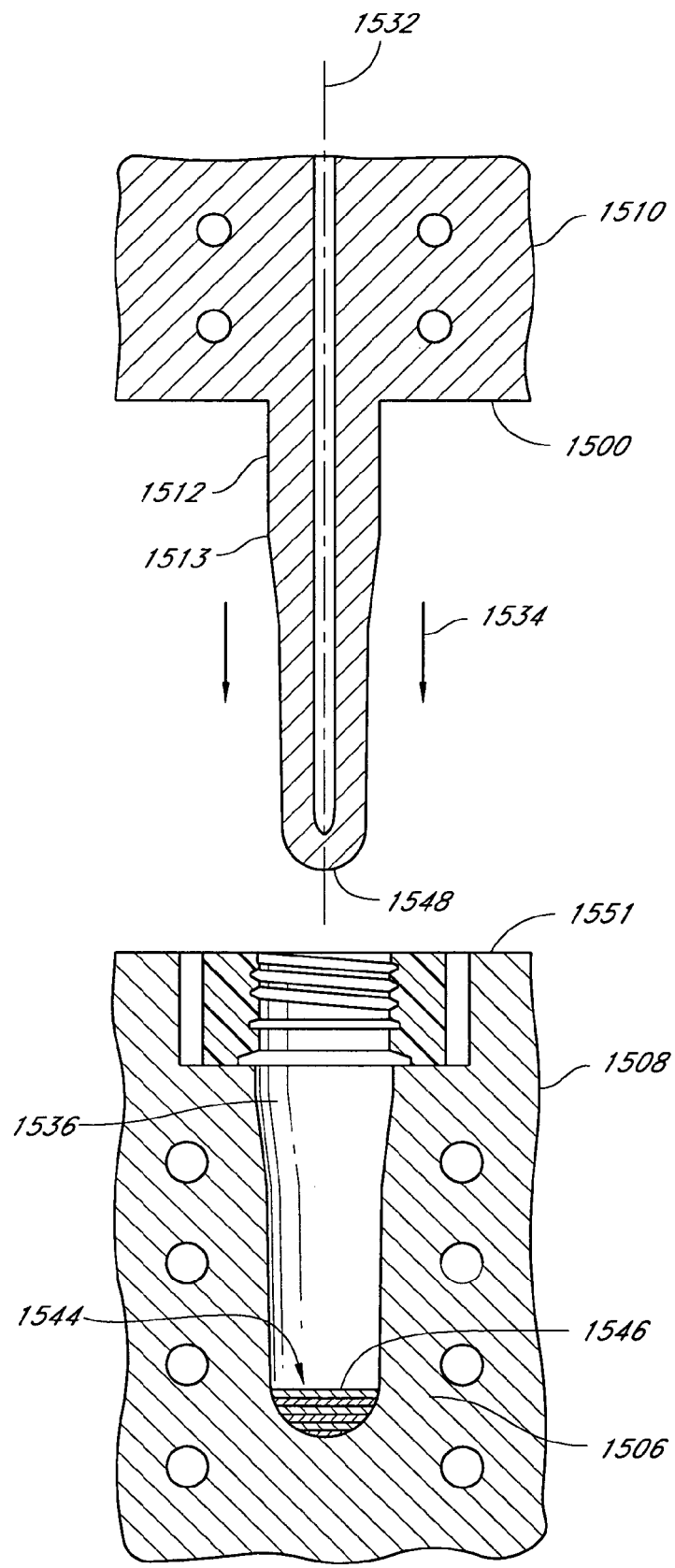
FIG. 28 is a cross-sectional view of a core section and a cavity section in an open position.

As shown in FIG. 26, the mold core 1510 has a core 1512 that is configured to cooperate with the turntable 1504 to mold the melt material. The core 1512 is configured and sized so that the core 1512 can be advanced into and out of a corresponding mold cavity section 1506. The core 1512 is designed to form the interior of a preform. The illustrated core 1512 is an elongated body that has a base end 1548 (FIG. 28). The core 1512 has a generally cylindrical body that tapers and forms the rounded based end 1548. The core 1512 can have a core molding surface 1513 for molding melt. The core section 1510 can be connected to a turntable or other suitable structure for moving the core section 1510.

The mold cavity sections 1506 can be evenly or unevenly spaced along the turntable 1504. The illustrated cavity sections 1506 are designed to mold the exterior of a preform. The molding system 1500 can have one or more circular arrangements of mold cavity sections 1506 that are preferably disposed near the periphery of the turntable 1504. In the illustrated embodiment of FIG. 25, the turntable 1504 has one circular arrangement of mold cavity sections 1506.

The source 1502 is adapted to produce a melt stream suitable for molding. The source 1502 can output foam material, PET, lamellar material, PP, or other moldable materials. In the illustrated embodiment, the melt from the source 1502 can be deposited into one or more of the mold cavity sections 1506 and then molded by compression molding.

With reference to FIG. 27, the mold cavity section 1506 can have a movable neck finish mold for molding the neck finish of a preform. In one embodiment, the mold cavity section 1506 comprises a movable neck finish mold 1520 that has a neck molding surface 1522 configured to form the neck portion of a preform and a body molding surface 1524 configured to form the body portion of the preform. The neck finish mold 1520 comprises a plurality of temperature control elements 1521 in the form of channels. The neck finish mold 1520 can be similar or identical to the neck finish molds described above. The neck finish mold 1520 can be used to produce non-crystalline and crystalline neck finishes. In some embodiments, the neck finish mold 1520 comprises high heat transfer material to increase through-put of the molding system. Of course, a working fluid (e.g., a refrigerant) can flow through the channels 1521 of the neck finish mold 1520 for rapid temperature changes.

The neck finish mold 1520 is movable between one or more positions. In the illustrated embodiment, the neck finish mold 1520 is located in a molding position so that the neck molding surface 1522 cooperates with the body molding surface 1524 of the molding body 1529 to form a molding surface 1525. The neck finish mold 1520 can be moved outward to a second position, in which the outer surface 1324 of the neck finish mold is proximate to or contacts the stop 1527. When the neck finish mold 1520 is in the second position, a preform formed within the mold cavity section 1506 can be ejected therefrom. After the preform has been removed from the mold cavity section 1506, the neck finish mold 1520 can then be moved back to the illustrated first position so that another preform can be formed.

The mold body 1529 can have one or more temperature control elements for controlling the temperature of the polymer. The illustrate mold body 1529 comprises a plurality of temperature control elements 1541 in the form of channels for circulating fluid through the mold body 1529. A working fluid can be passed through the channels 1541 to control the temperature of the material positioned within the mold.

Figure 29:
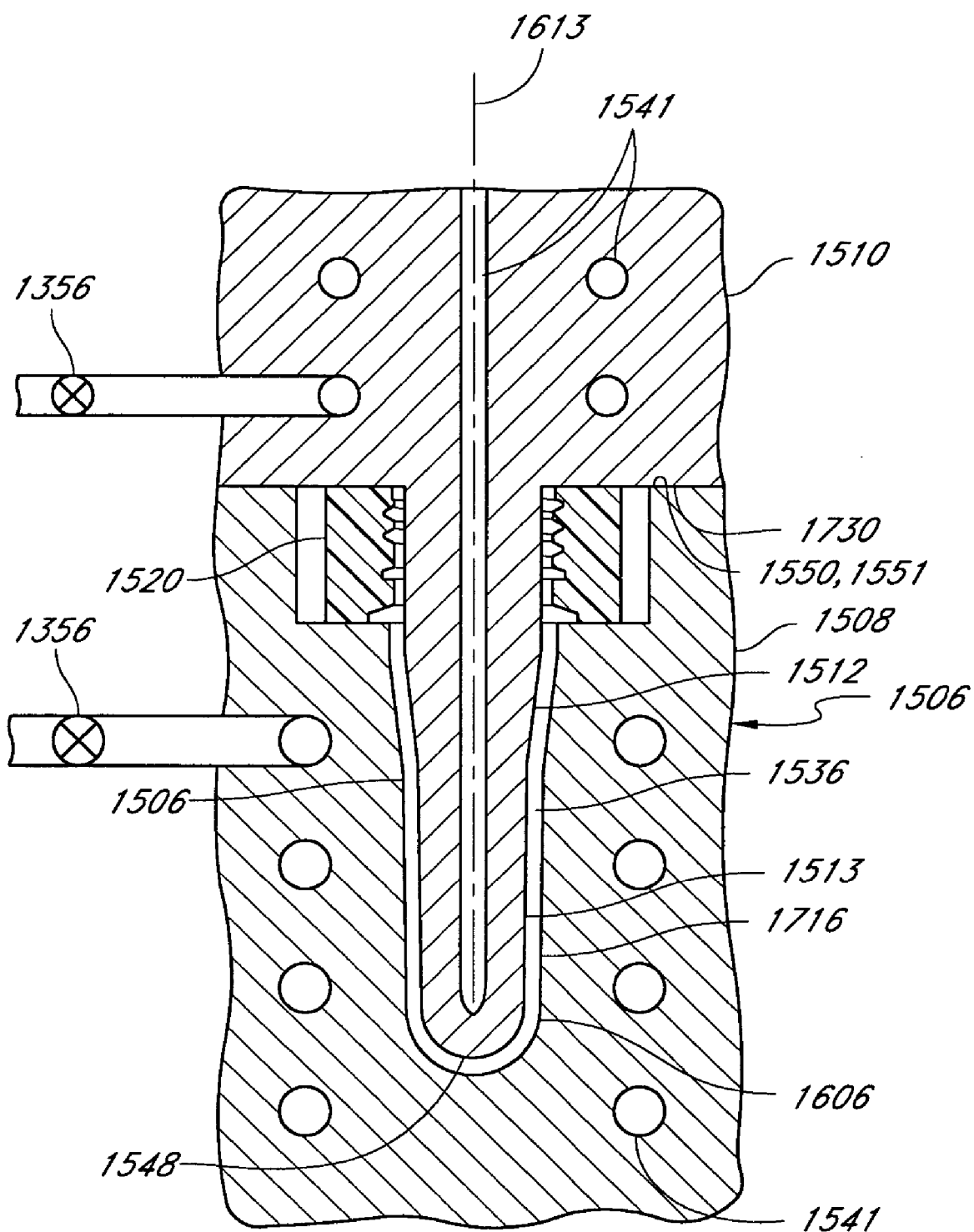
FIG. 29 is a cross-sectional view of the core section and the cavity section in a closed position.
Figure 29A:
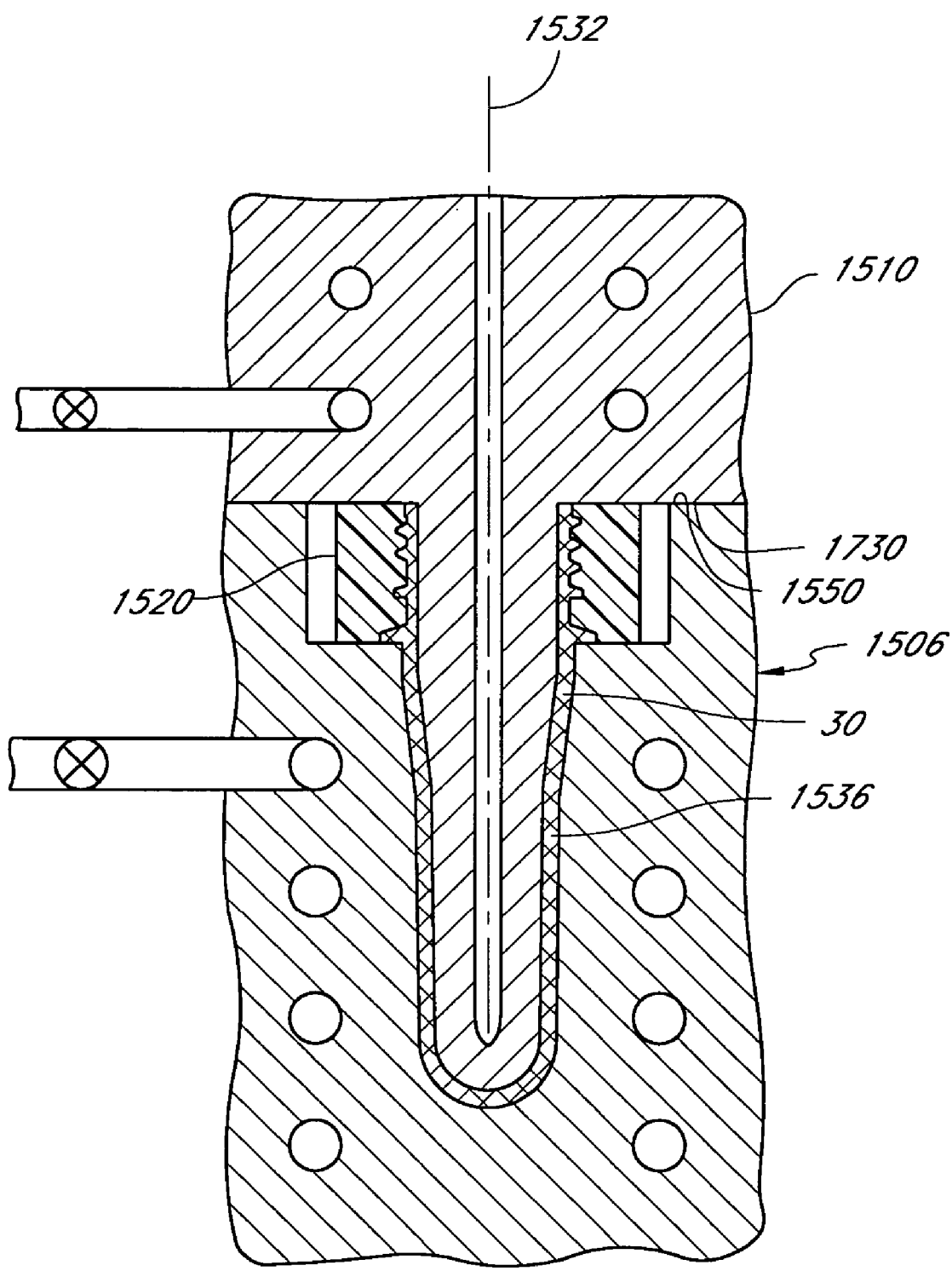
FIG. 29A is a cross-sectional view the core section and the cavity section of FIG. 29 in a closed position, moldable material is disposed within a cavity defined by the core section and the cavity section.

FIG. 28 illustrates the core section 1510 positioned above a corresponding cavity section 1508 defining the mold cavity section 1506. The core section 1510 can be moved along a line of action 1532 in the direction indicated by the arrows 1534 until the core section 1510 mates with the cavity section 1508. As shown in FIGS. 29 and 29A, the core section 1510 and the cavity section 1508 cooperate to form a space or cavity 1536 having the desired shape of a preform. After material has been deposited into the mold cavity section 1506, the core section 1510 can be moved from the open position of FIG. 28 to the closed position of FIG. 29 in order to compress the melt such that the melt substantially fills the space or cavity 1536 (FIG. 29A). To cool the polymer, a working fluid (e.g., a refrigerant) can be passed through pressure reducing elements 1356 and through the channels 1541 to cool the material in the mold.

In operation, the turntable 1504 can be positioned so that one of the mold cavity sections 1506 is located below the output 1530 of the source 1502 as shown in FIGS. 25 and 27. A plug or shot of melt is delivered out of the opening 1538 of the output 1530 such that the plug falls into the mold cavity section 1506. Preferably, the plug drops to the end cap area 1539 (FIG. 27) of the mold cavity section 1506.

The plug 1544 may comprise a plurality of layers. The plug 1544 may comprise lamellar material in any desirable orientation for subsequent compression molding. For example, one or more of the layers of the plug 1544 can be horizontally oriented, vertically oriented, or in any other orientation such that resulting preform made from the plug 1544 has a desired microstructure. In the illustrated embodiment of FIGS. 27 and 28, many or most of the layers of the plug 1544 are generally perpendicular to the line of action 1532. In some embodiments, the plug 1544 comprises material without any orientation. For example, the plug 1544 may comprise a substantially isotropic material.

The plug 1544 can be at any suitable temperature for molding. In some embodiments, the temperature of the plug 1544 is generally above the glass transition temperature ($T_g$) of at least one of the materials forming the plug 1544, especially if the plug 1544 comprises lamellar material. Preferably, a substantial portion of the material forming the plug 1544 is at a temperature that is generally above its glass transition temperature ($T_g$). In other embodiments, the temperature of the plug 1544 is in the range of about the $T_g$ to the melt temperature ($T_m$) of a substantial portion of the material forming the plug. In other embodiments, the temperature of the plug 1544 is in the range of about $T_g$ to about $T_m$ of most of the material forming the plug. In some embodiments, the temperature of the plug 1544 is generally above the $T_m$ of at least one of the materials forming the plug 1544. Preferably, the temperature of the plug 1544 is generally above the $T_m$ of a substantial portion of the materials forming the plug 1544. A skilled artisan can determine the appropriate temperature of the plug 1544 delivered from the source 1502 for compression molding.

The turntable 1504 can be rotated about its center such that the filled mold cavity sections 1506 are moved about the center of the turntable 1504 and the core section 1510 can be moved downwardly along the line of action 1532.

After the core section 1510 has moved downward a certain distance, it will contact the upper surface 1546 of the plug 1544. As the base end 1548 of the core 1512 advances into the plug 1544, the plug 1544 spreads to generally fill the entire cavity section 1536. The plug 1544 preferably comprises sufficient material to generally fill the entire cavity section 1536 as shown in FIG. 29A. The mold may or may not be preheated to facilitate the flow of the polymer material between the core section 1510 and the cavity section 1536.

With reference to FIGS. 29 and 29A, the core section 1510 is in the closed position so that the lower surface 1550 of the core section 1510 engages or contacts the upper surface 1551 of the cavity section 1506. The core section 1510 and the cavity section 1506 can have channels 1541 that can remove heat from the material forming the preform 30 disposed within the cavity section 1536. To reduce cycle times, a refrigerant can flow through the channels 1541 to rapidly cool the melt. The refrigerant can be a two-phase mixture for increased thermal load capabilities. The core section 1510 and/or the cavity section 1506 may or may not comprise high heat transfer that may work in combination with the working fluid to achieve rapid temperature changes.

After the preform has been sufficiently cooled, the core section 1510 can be moved upwardly along the line of action 1532 to the open position so that the preform can be removed from the mold cavity section 1506. Ejector pins or other suitable devices can be used to eject the preform from the mold cavity section 1506. Preferably, before the preform is ejected from the mold cavity section 1506, the neck finish mold 1520 is moved radially away from the preform to the second position, such that the preform can be conveniently and easily moved vertically out of the mold cavity section 1506. In some embodiments, pulse cooling can be employed to limit the formation of condensation on the molding surfaces.

The preform is formed within the cavity section 1536 at some point after the source 1502 deposits material into the mold cavity section 1506 and before the mold cavity section 1506 is rotated around and located once again beneath the output 1530 of the source 1502. Of course, the core section 1510 and turntable 1504 preferably rotate in unison about the center of the turntable 1504 during the compression molding process. The core section 1510 can be attached to a complementary turntable similar to the turntable 1504. The two turntables can rotate together during the molding process.

Figure 30:
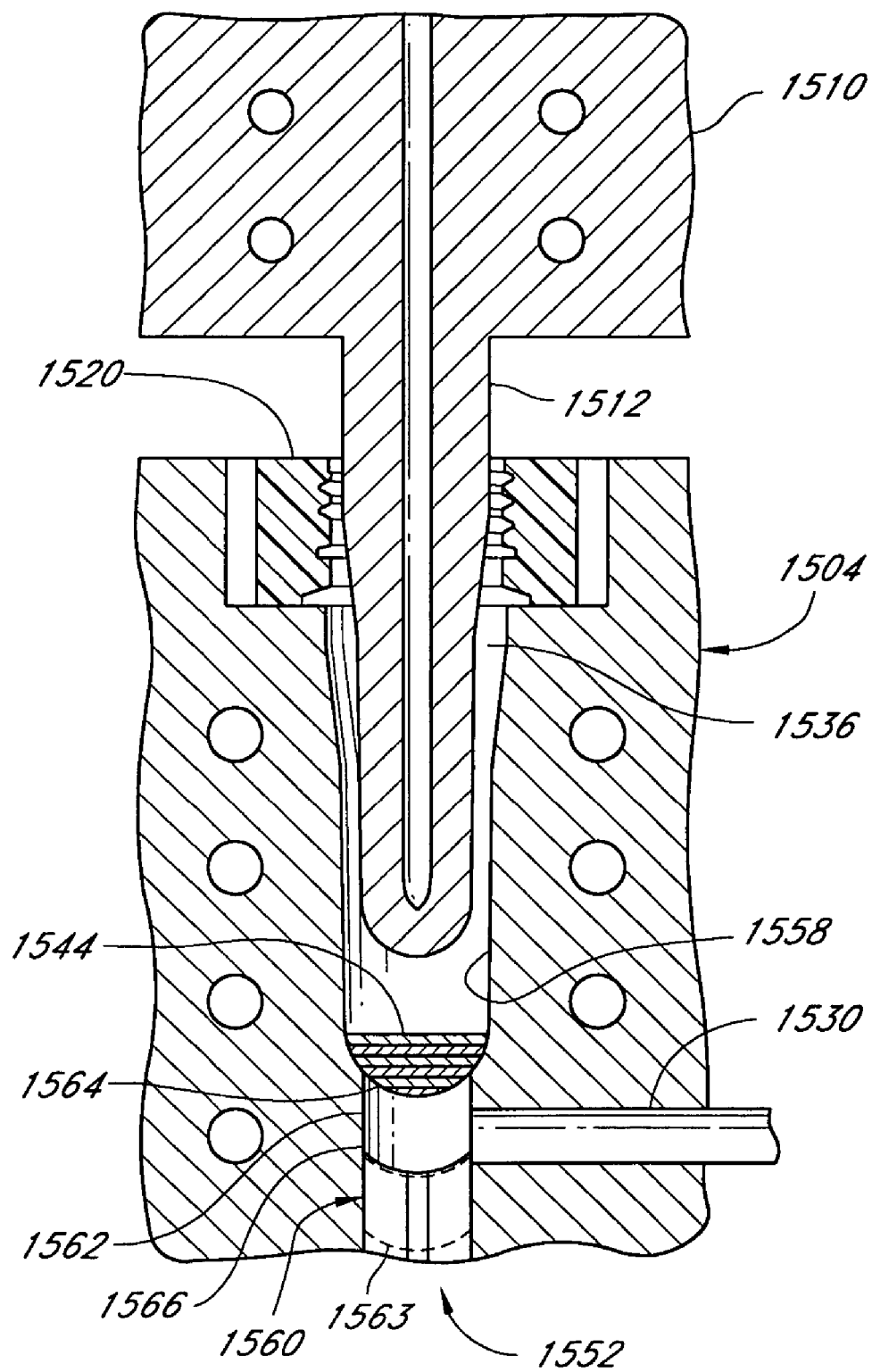
FIG. 30 is a cross-sectional view of a core section and a cavity section in a partially open position in accordance with another embodiment.

Moldable material can also be disposed by other suitable means. FIG. 30 illustrates a moldable material that can be delivered directly by an injection molding process into a modified cavity section 1558. The components of the illustrated embodiment are identified with the same reference numerals as those used to identify the corresponding components of the cavity section 1510 and turntable 1504 discussed above.

The turntable 1504 comprises a feed system 1552 configured to deliver moldable material (e.g., foam, lamellar material, PP, PET, etc.) directly into the cavity section 1558. The feed system 1552 delivers moldable material (e.g., melt) at any point along the cavity section 1558 and preferably comprises the output 1530 of a source and a means for pushing material from the output 1530 into the cavity section 1558.

In one embodiment, the feed system 1552 comprises a push assembly 1560 (e.g., a piston assembly) that is configured to push melt into the cavity section 1558. The push assembly 1560 can reciprocate between a first position and a second position and has a plunger or piston 1562 illustrated in a first position so that the upper surface 1564 of the plunger 1562 forms a portion of the cavity section 1558. Preferably, the upper surface 1564 forms the lower portion or end cap region of the cavity section 1558. The plunger 1562 can be moved from the illustrated first position to a second position 1563 (shown in phantom) for receiving material from the output 1530. When the plunger 1562 is in the second position, the output 1530 feeds melt into a cylindrical chamber defined by the tube 1566 and the upper surface 1564 of the plunger 1562. The plunger 1562 can be moved from the second position to the first position, thereby moving the material to the illustrated position. In this manner, material can be repeatedly outputted from the output 1530 and into the chamber defined by the tube 1566 and then advanced into the cavity section 1558 for compression molding.

After the plug 1544 is positioned in the cavity section 1558, the core 1512 can be advanced into the cavity section 1558 to compress and spread the material of the plug 1544 through the cavity 1536 in the manner described above. Preferably, the plug 1544 is molten plastic (e.g., lamellar, PET, PP, foam, phenoxy type thermoplastic) that can be spread easily throughout the cavity 1536.

Figure 31:
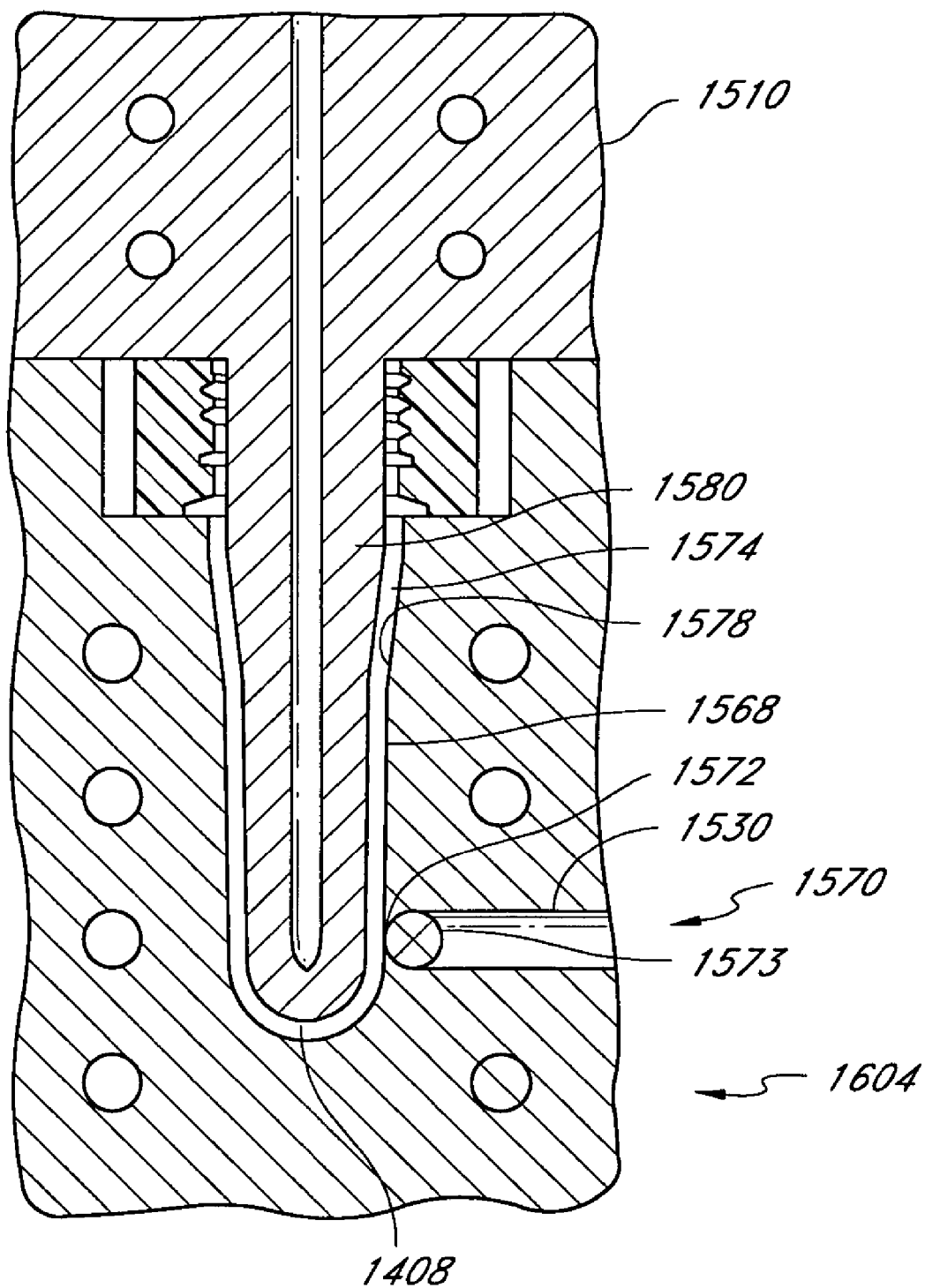
FIG. 31 is a cross-sectional view of a core section and a cavity section in a closed position in accordance with another embodiment.

With reference to FIG. 31, the turntable 1604 can have a mold cavity section 1568 that is generally similar to the mold cavities section discussed above. However, in the illustrated embodiment, the turntable 1604 can have an injection system 1570 for injecting material into the cavity section 1568. The injection system 1570 can be configured to inject material at a desired location and/or with a desired orientation. In some embodiments, the injection system 1570 can be adjusted to inject material at desired locations and/or with desired orientations.

In the illustrated embodiment, the turntable 1604 has an injection system 1570 that is configured to inject a lamellar melt stream into the cavity section 1568 at a suitable points along the cavity section surface. One or more injection systems 1570 can be used to inject a lamellar melt stream at one or more locations along the mold cavity section 1568. The injection system 1570 can inject a lamellar melt stream into a lower portion or end cap region of the mold cavity section 1568. Alternatively, the injection system 1570 can inject a lamellar melt into the upper portion of the mold cavity section 1568.

The injection system 1570 can comprise a gate 1572 at the downstream end of the output of the lamellar machine. The gate 1572 may selectively control the flow of the lamellar melt stream from the output 1530 into a space or cavity section 1574 defined by the core 1580 and the cavity section surface 1578 of the cavity section. The gate 1572 may comprise a valve system 1573 that selectively inhibits or permits the melt stream into the cavity section 1568. In one embodiment, the injection system 1570 injects material to form a plug (illustrated as a lamellar plug) at the bottom of the cavity section 1568, similar to the plug shown in FIG. 30. The plug can then be compressed by the core 1580 to form a preform within the cavity 1574.

One method of lamellar molding is carried out using modular systems similar to those disclosed in U.S. Pat. No.

6,352,426 B1 and U.S. application Ser. No. 10/705,748 filed on Nov. 10, 2003, the disclosures of which are hereby incorporated by reference in their entireties and form part of this disclosure. In view of the present disclosure, a skilled artisan can modify the methods and apparatus of the incorporated disclosures for compression molding. For example, the injection-over-injection ("101") systems of the U.S. Pat. No. 6,352,426 B1 can be modified for compression molding. For example, the melt of those systems can be injected into a mold cavity section and then the core can be used to compress the melt to form a preform. Those systems can be modified into compress-over-compress systems used to make multilayer preforms formed by compression molding. Additionally, one or more components, subassemblies, or systems, of these apparatuses can be employed in the mold described herein. For example, the cavity sections and/or core sections of the molds disclosed herein may comprise high heat transfer material for enhancing thermal transfer with heating/cooling systems.

The compression molding system 1500 can be used to produce preforms that comprise non-lamellar materials (e.g., foam material, PET, PP, barrier material, combinations thereof, and other materials disclosed herein). Compression molding systems for making preforms comprising lamellar material, and preforms comprising foam, can be similar to each other, except as further detailed below. That is, in some embodiments a foam melt can be molded in a similar manner as the lamellar material described herein. The temperature control elements of the mold can be used to precisely control the temperature and expansion of the foam material.

Figure 25A:
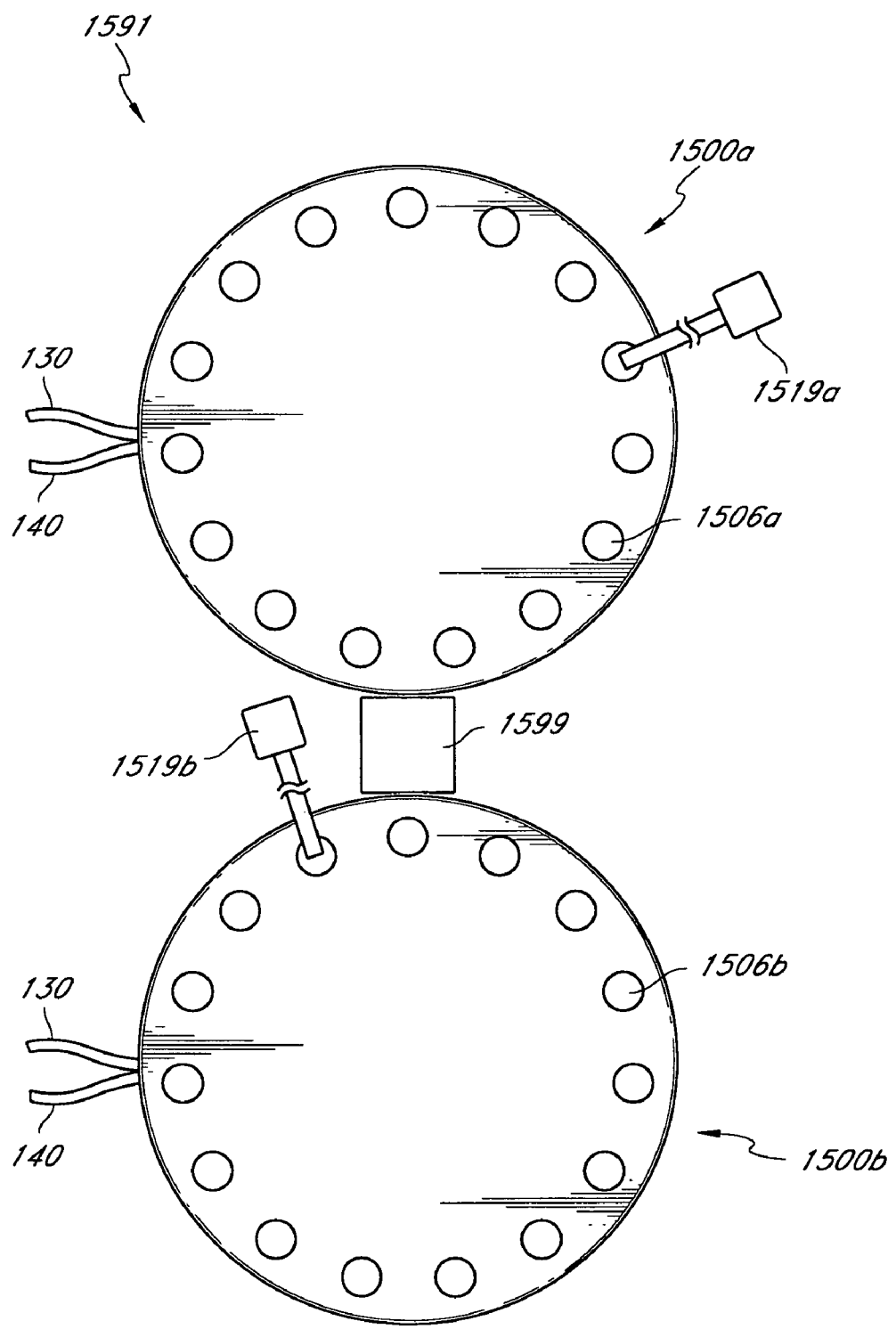
FIG. 25A is a top plan view of a compression molding system for producing multilayer preforms.

FIG. 25A illustrates a system 1591 comprising a plurality of subsystems and is arranged to produce multilayer articles. Each of the subsystems can have a temperature control system for controlling the temperature of molds. Generally, the system 1591 includes one or more systems (e.g., compression systems, closure lining systems, etc.) and is configured to produce multilayer articles, such as preforms, closures, trays, and other articles described herein. In some embodiments, the system 1591 comprises a first system 1500a connected to a second system 1500b. The first system 1500a can be a compression molding system that molds a first portion of an article, and the second system 1500b can be configured to form a second portion of the article. The illustrated systems 1500a, 1500b have turntables that rotate in the counter-clockwise direction during a production process. A transport system 1599 can transport a substrate article from the first molding system 1500a to the second system 1500b. Of course, additional subsystem(s) can be added to the system 1591. For example, the one or more compression molding system similar to the compression molding system 1500 can be connected to the system 1591. Thus, systems (similar to or different than the systems 1500, 1500a, 1500b, etc.) can be added to the system 1591 to produce articles having more than two layers, to place liners in multilayer closures, and the like.

The illustrated system 1591 comprises a first molding system 1500a that can be similar to or different than the molding systems described herein, such as the molding system 1500 of FIG. 25. The first molding system 1500a can have a plurality of cavity sections 1506a configured to mold substrate articles. The cavity sections 1506a, 1506b are arranged in a substantially circular pattern. The first molding system 1500a can deliver the substrate articles to the transport system 1599.

The illustrated transport system 1599 can carry substrates produced by the first compression molding system 1500a to the second system 1500b. The transport system 1599 carries and delivers the substrates to the second system 1500b, which can be a compression molding system. The transport system 1599 can comprise one or more of the following: handoff mechanisms, conveyor systems, starwheel systems, turrets, and the like. The illustrated transport system 1599 is positioned between the systems 1500a, 1500b.

The second system 1500b in some embodiments can form an outer layer over the substrate delivered by the transport system 1599. For example, the transport system 1599 can deliver substrate preforms to a core (not shown) of the molding system 1500b. The source 1519b can deposit melt into the cavity section 1506b, and the core holding the substrate can be advanced into the cavity section 1506b to mold the melt therein. The cores and the cavity sections 1506b can rotate continuously during the production process. The cavities of the cavity section 1506b can be larger than the cavities of the cavity sections 1506a in order to form an outer layer on the article. For example, the system 1591 can be configured to mold the preform 50 of FIG. 3. The first system 1500a can form the inner layer 54 of the preform 50. The transport system 599 can remove the inner layer 14 and deliver the inner layer 54 to the second system 1500b. The second system 1500b can have a holder (e.g., a core) that holds the inner layer 54. The cavity sections 1506b can be rotated and moved under the source 1519b to receive melt. After melt has be delivered into a cavity section 1506b, the core and the inner layer 54 can be advanced into the cavity section 1506b, which can be similar to the cavity sections 1568 of FIG. 33, to form the outer layer 52 of the preform 50. The outer surface of the layer 54 and the cavity section 1506b cooperate to mold the melt. Of course, the system 1591 can be modified to form the other preforms described herein.

In some embodiments, the transport system 1599 can place the substrate preform in the cavity section 1506b. Melt can be deposited by the source 1519b into the interior of the substrate preform. A core (not shown) of the second system 1500b can be advanced into substrate located within the cavity section 1506b to mold the melt. Thus, the second system 1500b can mold a layer over the substrate produced by the first molding system 1500a. The system 1591 can therefore be a compress-over-compress system for producing multilayer articles.

The system 1591 can be configured to produce other articles such as multilayer closures. The first system 1500a can mold at least a portion of a closure (e.g., a closure comprising lamellar material, foam, and/or other materials described herein). The transport system 1599 can receive the at least a portion of a closure and deliver the at least a portion of the closure to the second system 1599. The second system 1599 can be a spraying system that sprays material onto the closure, lining system (e.g., a spray lining system, a spin lining system, insertion system, etc.), compression molding system, and the like. For example, the second molding system 1500b can comprise systems or employ techniques similar to those disclosed in U.S. Pat. No. 5,259,745 to Murayama and U.S. Pat. No. 5,542,557 to Koyama et al., which are incorporated by reference in their entireties.

Figure 32:
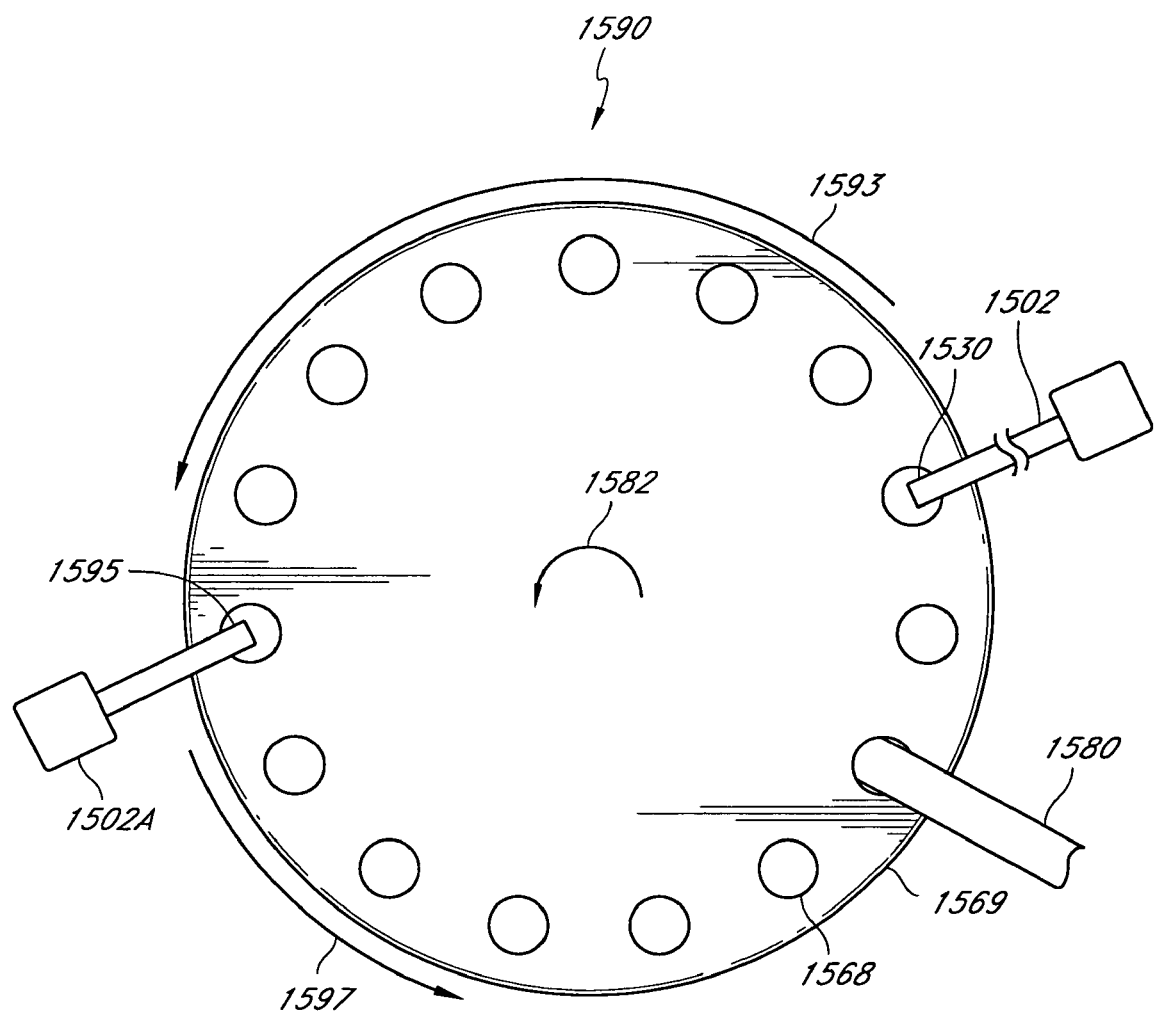
FIG. 32 is a top plan view of a compression molding system for producing preforms in accordance with another embodiment.

FIG. 32 shows a compression molding system 1590 configured to mold multi-layer articles in the form of preforms. The compression molding system 1590 can be a compress-over-compress processing machine. Generally, the system 1590 can comprise one or more material sources configured to deliver material to the mold cavity sections 1508 of the turntable 1569. In the illustrated embodiment, the molding system 1590 comprises a pair of material sources configured to output melt streams into the mold cavity sections 1506. For example, in the illustrated embodiment, the system 1590 can comprise a pair of melt machines that can be similar or different from each other. The molding system 1590 can also comprise one or more ejector systems 1580 configured to remove the completely formed preforms from the turntable 1569.

Figure 33:
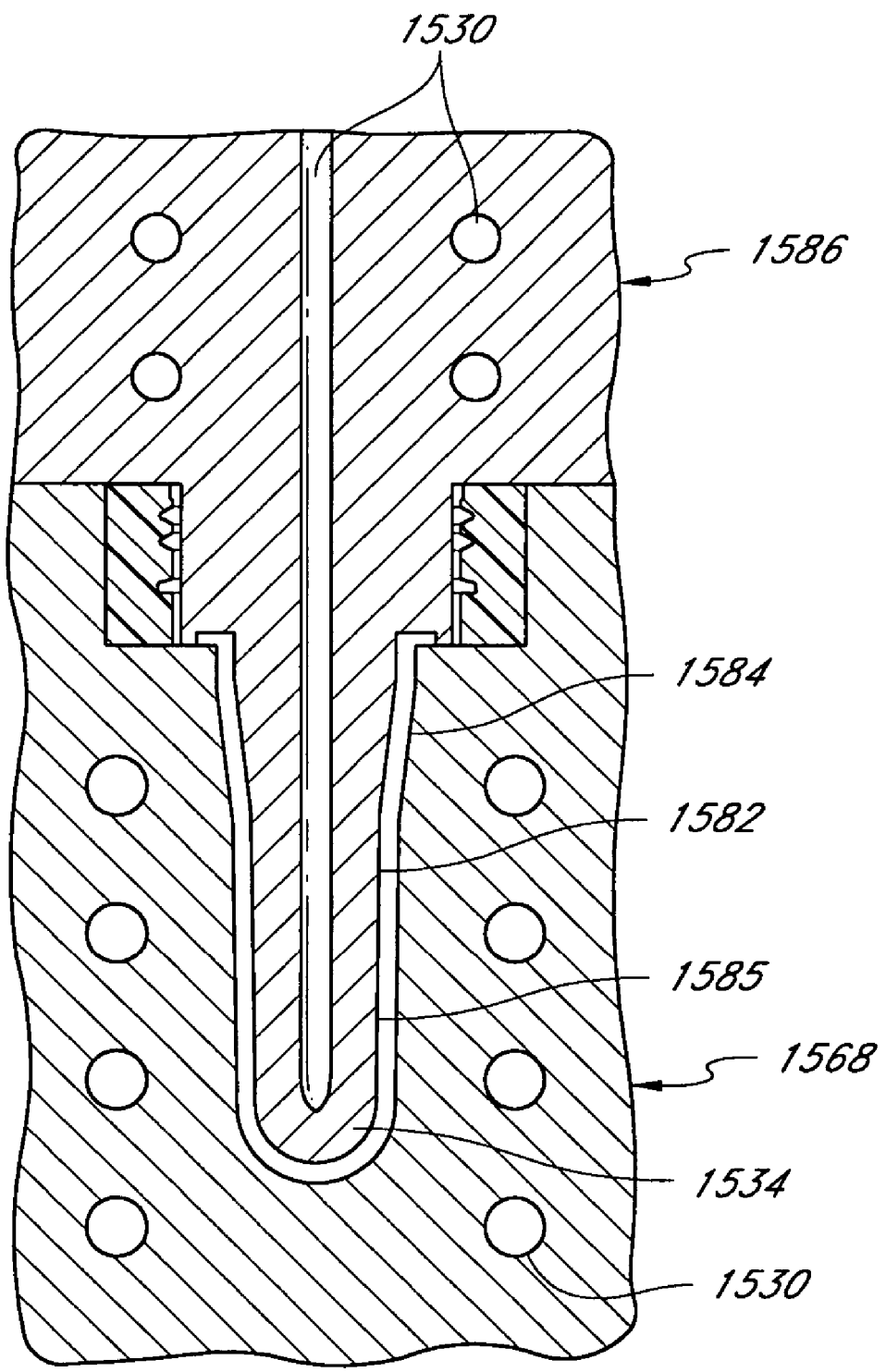
FIG. 33 is a cross-sectional view of a core section and a cavity section of the system of FIG. 32 in a closed position, the core section and the cavity section define a cavity for forming an outer layer of a preform.

As shown in FIG. 33, the core section 1568 has a core 1582 that is configured to be disposed within a corresponding mold cavity section 1568 and can have various sizes depending on the desired article formed through the compression molding process. For example, a plurality of compression molding steps can be performed, wherein each step forms a different layer of a preform. As the turntable 1569 rotates about its center, various cores can be inserted into the turntable 1569 at different times to form various portions of the preforms as described below.

With reference to FIG. 33, the core section 1568 and the cavity section 1568 are in the closed position. The core 1582 and the mold cavity section 1568 are configured to form a portion of a preform. The core 1582 and mold cavity section 1568 cooperate to define a cavity 1585 in the shape of the outer layer 52 of the preform 50 of FIG. 3. Melt material can be placed in the mold cavity 1585 when the core section 1568 is in the open position. The core 1582 and mold cavity section 1568 can cooperate to compress the melt material to fill the cavity 1585 to form the outer layer 52 in the manner described above. A skilled artisan can determine the appropriate amount of material to deposit into the mold cavity section 1568 to fill the cavity 1585 defined by the core section 1568 and the mold cavity section 1568. A temperature control system can deliver cooling fluid through the channel 1530 to cool the preform.

Figure 34:
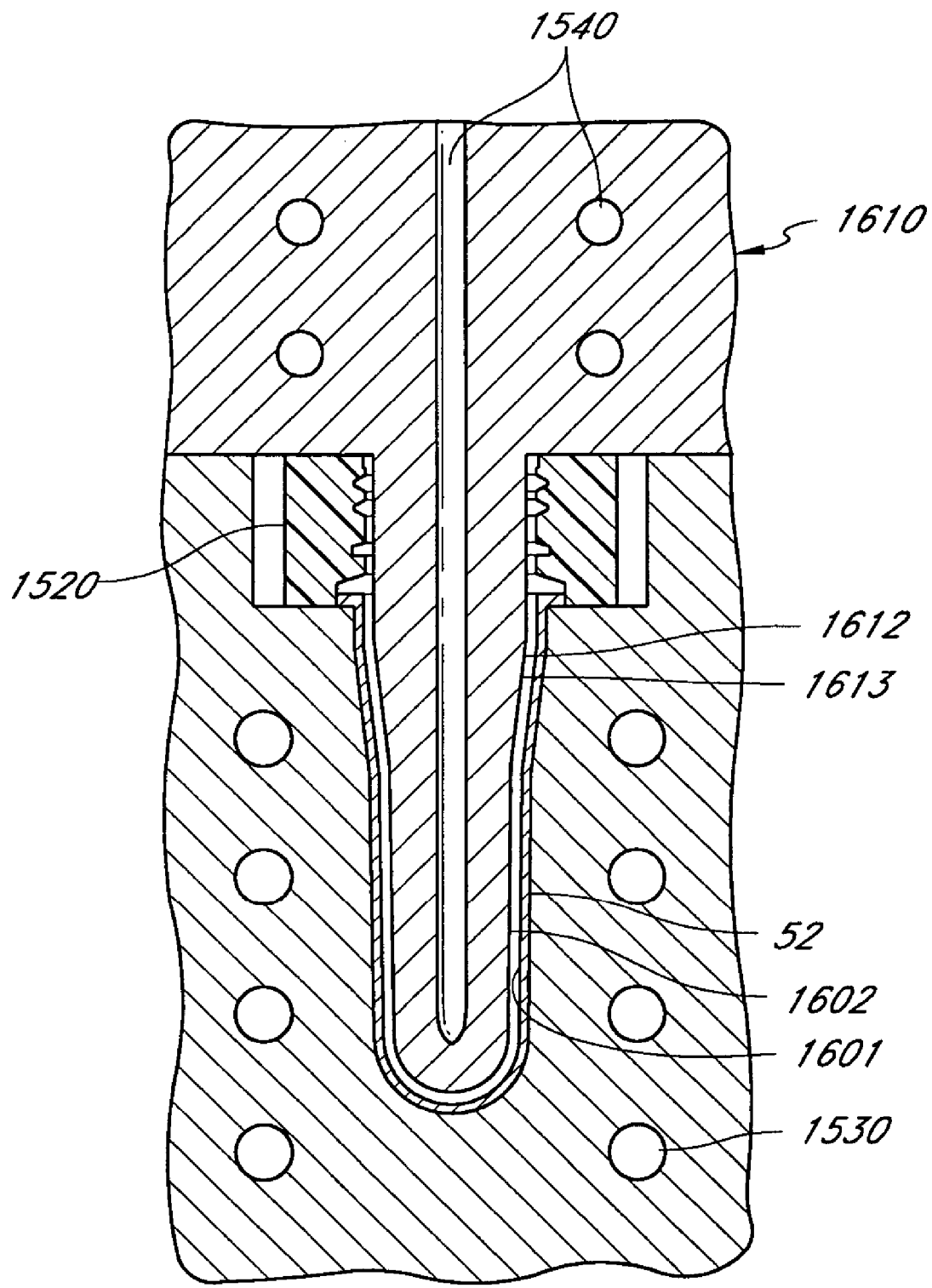
FIG. 34 is a cross-sectional view of another core section and the cavity section of the system of FIG. 32 in a closed position, the core section and the cavity section define a space for forming an inner layer of a preform.

After the outer layer 52 is formed, the core 1582 can be removed from the cavity 1584 while the layer 52 is retained in the cavity 1584. Another core can be used to mold another layer of material, which is preferably molded over the layer 52. As shown in FIG. 34, another core (i.e., core 1612) can be used to mold melt over the layer 52.

The cavity section 1602 can be formed between the outer surface 1601 of the layer 52 and the outer surface 1213 of the core 1613. The core 1612 may have a shape that is generally similar to the shape of the core 1582. Preferably, however, the core 1612 is smaller than the core 1582 so that the surface 1613 of the core 1612 is spaced from the layer 52 when the core section 1610 is in the illustrated closed position. The size and configuration of the core 1512 can be determined by one of ordinary skill in the art to achieve the desired size and shape of the cavity 1602 which is to be filled with material to form a portion of the preform.

In operation, the system 1590 can have a source 1502 that outputs melt and drops it into the mold cavity section 1568 disposed beneath the output 1530. After the mold cavity section 1506 with the plug rotates in the direction indicated by the arrow 1593, the core 1582 can be advanced downwardly and into the mold cavity section 1568. As the base end 1534 of the core 1512 compresses the plug, the material spreads and proceeds upwardly along the cavity 1587 until the material substantially fills the entire cavity 1587. A cooling fluid can be run through a temperature system 1530 within the core section 1568 and the turntable 1569 to rapidly cool the material forming the outer layer 52. After the material has sufficiently cooled, the core section 1568 is moved upwardly so that the core 1582 moves out of the mold cavity section 1568.

With continued reference to FIG. 32, after the core section 1568 has been moved to the open position, the turntable 1569 can be rotated in the direction indicated by the arrow 1593 until the mold cavity section 1506 is located under the second material source 1502*a*. The source 1502*a* can output a melt stream from the output 1595 onto the interior surface 1601 (FIG. 34) of the outer layer 52. The turntable 1509 can then rotate in the direction indicated by the arrow 1597 and the core section 1610 can be inserted into the turntable 1509 to compresses and spread the melt throughout the cavity 1602. In this manner, this second compression process can form the inner layer 53 of the preform 50. Once again, the temperature control system 1530 can be used to rapidly and efficiently cool the preform 50 for subsequent removal. After the core section 1610 has moved to the open position and the neck finish mold 1520 is moved apart, the preform 50 can be conveniently lifted vertically out of the turntable 1509 by the ejector system 1580. The process can then be repeated to produce additional multilayer preforms.

It is contemplated that any number of core sections, cavity sections, and sources of materials can be used in various combinations to form preforms of different configurations and sizes. The preforms may have more than two layers of material. Although not illustrated, there can be additional cores that are used to form additional layers through compression molding. Additionally, the above compression process can be used to produce coatings or layers on conventional preforms.

Those of ordinary skill in the art will recognize that the mold cavity sections can be located in any structure suitable for molding. For example, the mold cavity sections 1506 can be located in a stationary table. One or more extruders or melt sources and the cores can be movable with respect to the mold cavity sections. Thus, an extruder can move to each mold cavity sections and deposit melt within the cavity section. The core section can then move into the corresponding core to mold the preform.

The molding system 1590 can be configured to make multi-layer preforms by the compress-over-compress process. In some embodiments, the molding system 1590 can have a core 1582 that is configured to mate with the mold cavity 1568 to form an inner portion of a preform, such as the inner layer 54 of the preform 50 of FIG. 3. In other words, the cavity 1585 can be in the shape of the inner layer 54 of the preform 50. Melt can be deposited into the cavity section 1568 and can then be compressed between the core 1582 and the cavity section 1568 to form the inner layer 54. After the inner layer 54 has been formed, the core section 1568 can be moved upwardly out of the cavity section 1568. When the cavity section 1568 is moved out of the cavity section 1568, the outer layer 54 is preferably retained on the core 1582. The outer layer 54 and the core 1582 can then be inserted into a second cavity, preferably configured to mate with the outer surface of the outer layer 54 to define a cavity in the shape of the outer layer 52 of the preform 50. Melt can be deposited into the second cavity section and then compressed as the core section 1568 and layer 54 are moved into the second cavity. Thus, the second material can be compressed into the shape of the outer layer 52 of the preform 50. After the preform 50 has been formed, the cavity section 1568 can be moved upwardly out of the second cavity so that the preform 50 can be removed. Thus, one or more layers of a preform can be positioned on a core and used to mold multiple layers of a preform in one or more cavities section. In view of the present disclosure, a skilled artisan can select and modify the molds disclosed herein to make various preforms and other articles disclosed herein.

Figure 35:
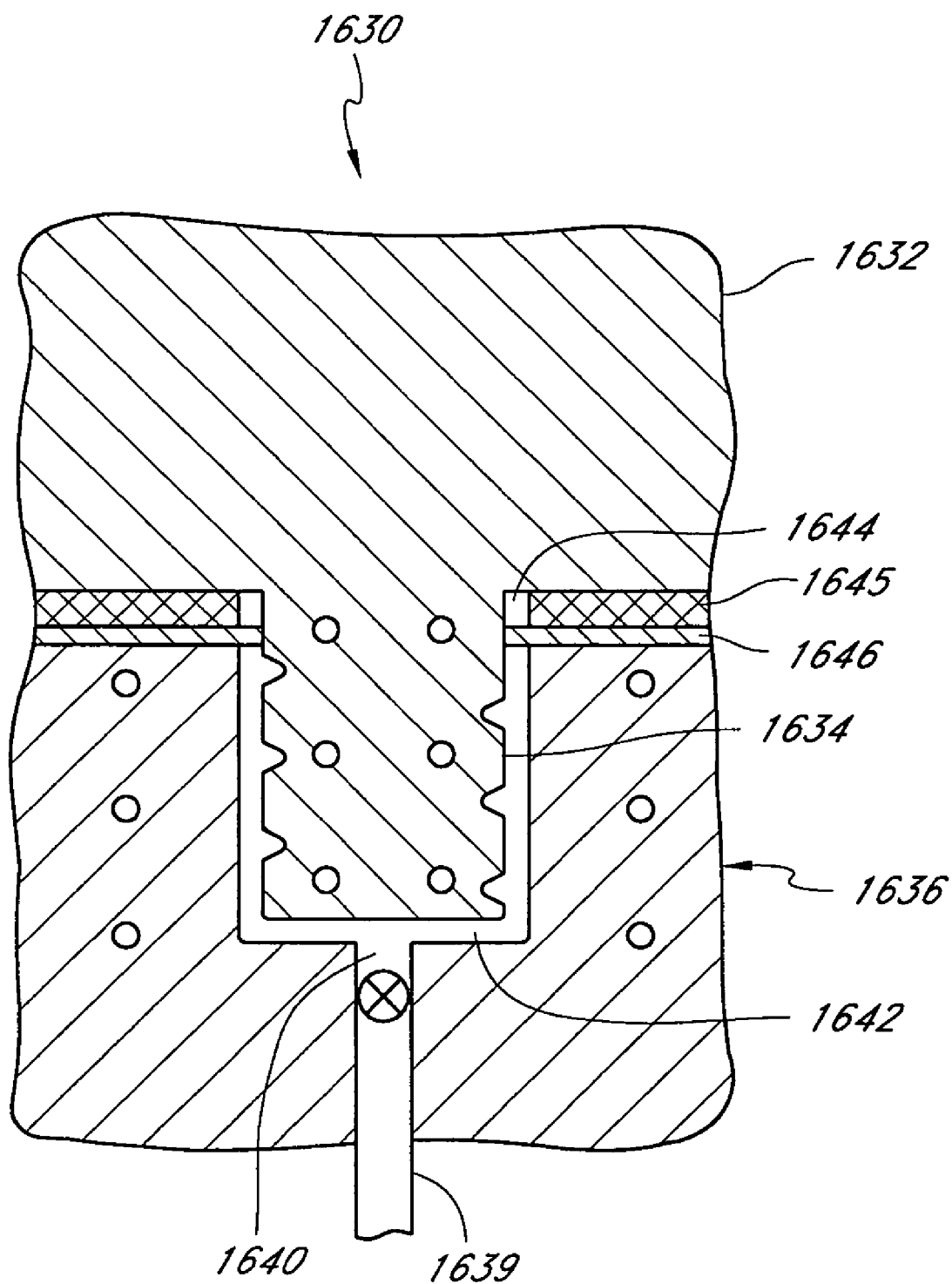
FIG. 35 is a cross-sectional view of a compression molding system configured to make a closure.

It is contemplated that articles of other shapes and configurations can be molded through similar compression molding process. For example, FIG. 35 illustrates a molding system 1630 that is configured to mold a mono or multilayer closures. The molding system 1630 is defined by a core section 1632 having a core 1634 and a mold cavity section 1636. In one embodiment, material is passed through the line 1639 and through the gate 1640 and into the cavity 1642 defined between the core 1634 and the cavity section 1636. The core half 1632 can be in the open position when the material is passed through the gate 1640. The core half 1632 can then be moved to the closed position to mold the melt into the desired shape of the closure. In the illustrated embodiment, the cavity 1642 also optionally includes a portion 1644 for forming a band and connectors between the body and the band of the closure. The mold 1630 can optionally include neck finish molds 1644, 1646 (e.g., split rings) that can be moved apart allowing the core half 1632 to move out of the cavity section 1636.

Figure 36:
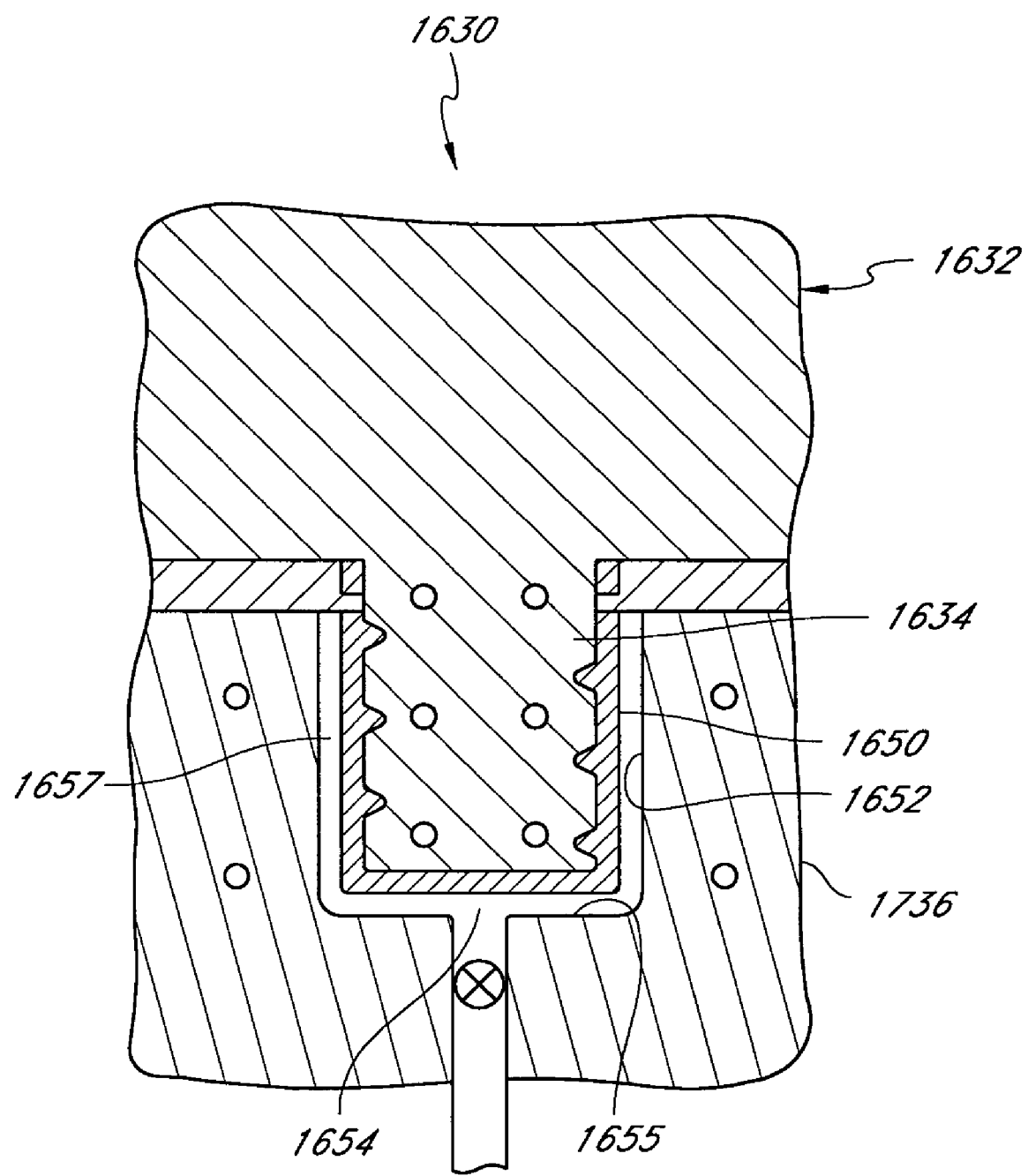
FIG. 36 is a sectional view of another cavity section and the core section of FIG. 35, the core section and the cavity section define a space for forming an outer layer of a closure.

Additional layers can be added to the closure by additional compression molding processes. For example, the substrate 1650 (FIG. 36) formed in the cavity 1642 can be retained on the core 1634 and inserted into a second cavity section 1652. The delivery system of the second cavity section 1652 can deposit material out of a gate 1654 and into the cavity section 1652, preferably when the core section 1632 and cavity section 1652 are in the open position. The core half 1632 can be moved from the open position to a closed position, while the substrate 1650 is positioned on the core 1634, the outer surface of the substrate 1650 acts as a molding surface to compress the melt between the substrate 1650 and the surface 1655 of the cavity section 1652. The melt can be spread throughout the space 1657 defined between the substrate 1650 and the surface 1655. After the closure has sufficiently cooled, the core half 1632 can be removed from the cavity section 1652. Optionally, additional layers of material can be molded onto the closure by a similar compress-over-compress process. In view of the present disclosure, a skilled artisan can design the desired shape of the systems and molds disclosed herein to make various types of articles and packaging described herein. Multiple layer closures can also be formed by the compress-over-compress processes as described above. For example, the inner layer of the closure can be molded within the outer layer.

The system 1591 of FIG. 25A can be configured to produce multilayer closures. The first system 1500A of FIG. 25A of the system 1591 can mold a first layer of the closures in a similar manner as described with respect to FIG. 35. The second system 1500B of FIG. 25A can mold an outer layer of the closure in a similar manner as described with respect to FIG. 36.

Other types of molding systems can be employed to form mono and multi-layer articles. As described below, there are various systems that can be employed to deliver material to a compression molding system. Although the exemplary embodiments are disclosed primarily with respect to stationary mold cavities section, these systems can be used in rotary systems, such as the turntable system described above. Additionally, described herein, certain embodiments, features, systems, devices, materials, methods and techniques described herein may, in some embodiments, be similar to any one or more of the embodiments, features, systems, devices, materials, methods and techniques described in U.S. patent application Ser. No. 11/108,342 entitled MONO AND MULTI-LAYER ARTICLES AND COMPRESSION METHODS OF MAKING THE SAME, filed on Apr. 18, 2005, which is hereby incorporated by reference in its entirety. The temperature control systems can be used to control the temperature of these compression molding systems.

1. Method and Apparatus of Making Crystalline Material

Molds (including compression and injection molds) can be used to produce preforms having a crystalline material. While a non-crystalline preform is preferred for blow-molding, a bottle having greater crystalline character is preferred for its dimensional stability during a hot-fill process. Accordingly, a preform constructed according to preferred embodiments has a generally non-crystalline body portion and a generally crystalline neck portion. To create generally crystalline and generally non-crystalline portions in the same preform, one needs to achieve different levels of heating and/or cooling in the mold in the regions from which crystalline portions will be formed as compared to those in which generally non-crystalline portions will be formed. The different levels of heating and/or cooling are preferably maintained by thermal isolation of the regions having different temperatures. In some embodiments, this thermal isolation between the thread split, core and/or cavity interface can be accomplished utilizing a combination of low and high thermal conduct materials as inserts or separate components at the mating surfaces of these portions.

The cooling of the mold in regions which form preform surfaces for which it is preferred that the material be generally amorphous or semi-crystalline, can be accomplished by chilled fluid circulating through the mold cavity and core. In preferred embodiments, a mold set-up similar to conventional injection molding applications is used, except that there is an independent fluid circuit or electric heating system for the portions of the mold from which crystalline portions of the preform will be formed.

The molding systems of FIGS. 25-36 can be configured to produce preforms having crystalline material. In the illustrated the cavity section 1508 includes the body mold 1529 comprising several channels 1541 through which a fluid, preferably chilled water or a refrigerant, is circulated. The neck finish mold 1520 has one or more channels 1521 in which a fluid circulates. The fluid and circulation of channels 1541 and channels 1521 are preferably separate and independent.

The thermal isolation of the body mold 1529, neck finish mold 1520 and core section is achieved by use of inserts or having low thermal conductivity. Examples of preferred low thermal conductivity materials include heat-treated tool steel (e.g. P-20, H-13, Stainless etc.), polymeric inserts of filled polyamides, nomex, air gaps and minimum contact shut-off surfaces.

In this independent fluid circuit through channels 1521, the fluid preferably is warmer than that used in the portions of the mold used to form non-crystalline portions of the preform. Preferred fluids include water, silicones, and oils. In another embodiment, the portions of the mold which forms the crystalline portions of the preform, (corresponding to neck finish mold 1520) contain a heating apparatus placed in the neck, neck finish, and/or neck cylinder portions of the mold so as to maintain the higher temperature (slower cooling) to promote crystallinity of the material during cooling. Such a heating apparatus can include, but is not limited to, heating coils, heating probes, and electric heaters. Additional features, systems, devices, materials, methods and techniques are described in patent application Ser. No. 09/844,820 (U.S. Publication No. 2003-0031814) which is incorporated by reference in its entirety and made a part of this specification. Additionally, the channels 1521 can be used to heat the molds and cause expansion of foam material.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A mold comprising:
   a core section having a core surface;
   a cavity section having a cavity surface, a mold cavity being defined by the core section and the cavity section when the mold is in a closed position;
   a fluid channel being disposed within one of the core section and the cavity section; and
   a pressure reducing device configured to receive and vaporize at least a portion of a refrigerant, the pressure reducing device in fluid communication with the fluid channel;
   wherein said one of the core section and the cavity section comprising high heat transfer material, the high heat transfer material being positioned between the fluid channel and the mold cavity.

2. The mold of claim 1, wherein the high heat transfer material has a thermal conductivity at least two times greater than a thermal conductivity of iron.

3. The mold of claim 1, further comprising a plurality of fluid channels disposed within the cavity section and the high heat transfer material forms at least a substantial portion of the cavity section which is interposed between the plurality of fluid channels and the mold cavity.

4. The mold of claim 1, wherein the cavity surface is defined by the high heat transfer material.

5. The mold of claim 1, wherein the pressure reducing device is an expansion valve with a fixed diameter orifice.

6. The mold of claim 1, wherein the refrigerant comprises substantially nitrogen or carbon dioxide.

7. The mold of claim 1, wherein the mold cavity is defined by the cavity surface and the core surface, the cavity surface and the core surface each comprises high heat transfer material.

8. The mold of claim 1, further comprising a first fluid channel, a second fluid channel, and a fluid line, the fluid line is configured to receive heated fluid that has passed through at least one of the first fluid channel and the second fluid channel and delivers the heated fluid to the first fluid channel, the second fluid channel is configured to receive fluid, which has passed through the pressure reducing device and is cooler than the heated fluid.

9. The mold of claim 1, further comprising a temperature control system configured to deliver fluid comprising mostly refrigerant in a liquid state to the core section or the cavity section and to receive fluid comprising mostly refrigerant in a gas state that has passed through a portion of the core section or the cavity section.

10. The mold of claim 9, wherein the temperature control system is an open loop system that vents the refrigerant to the atmosphere.

11. The mold of claim 9, wherein the temperature control system is a closed loop system.

12. The molding of claim 1, wherein the high heat transfer material has a thermal conductivity greater than iron.

13. The mold of claim 1, wherein the cavity section further comprises a plurality of pressure reduction devices proximate to the cavity surface.

14. The mold of claim 1, wherein the mold is one of a compression mold or an injection mold.

15. A molding system, comprising:
    a first mold section and a second mold section movable between an open position and a closed position, a mold cavity being defined between the first mold section and the second mold section when the first mold section and the second mold section occupy the closed position, at least one of the first mold section and the second mold section comprising high heat transfer material and at least one fluid channel;
    a fluid source in fluid communication with the at least one fluid channel, the fluid source containing refrigerant; and
    a pressure reducing element in fluid communication with the at least one fluid channel and the fluid source, the pressure reducing element configured to reduce a pressure of the refrigerant from the fluid source to a second pressure equal to or less than a vaporization pressure of the refrigerant.

16. The molding system of claim 15, wherein the high heat transfer material has a thermal conductivity at least two times greater than the thermal conductivity of iron.

17. The molding system of claim 15, wherein the refrigerant comprises a cryogenic fluid.

18. The molding system of claim 15, wherein the first mold section and the second mold section form one of a blow mold, injection mold, and a compression mold.

19. The molding system of claim 15, wherein the pressure reducing element vaporizes an effective amount of the refrigerant to reduce the temperature of the refrigerant such that the refrigerant can sufficiently cool an article within the mold cavity to form a dimensionally stable outer surface of the article suitable for demolding.

20. The molding system of claim 15, wherein the pressure reducing element is positioned in the at least one fluid channel.

21. The molding system of claim 15, further comprising:
    a heat exchanger in fluid communication with the at least one fluid channel;
    a compressor configured to receive fluid from the at least one fluid channel and to output a pressurized fluid, the compressor is positioned along a fluid path between the at least one fluid channel and the heat exchanger; and
    a bypass system comprising a flow regulating valve, the bypass system being configured to convey pressurized fluid from the compressor to the flow regulating valve and to the pressure regulating element such that the pressurized fluid flows through the pressure reducing element and then into the at least one fluid channel.

22. The molding system of claim 15, further comprising a second fluid source containing a second fluid, the second fluid having a freezing point temperature that is greater than the temperature of the refrigerant from the first fluid source in the at least one fluid channel.

23. The molding system of claim 21, further comprising:
a temperature sensor interposed between a molding surface of the at least one of the first mold section and the second mold section and the at least one fluid channel; and
a controller iii communication with the temperature sensor, the controller is configured to selectively control the operation of the pressure reducing element and the flow regulating valve in response to a signal from the temperature sensor.

24. The molding system of claim 15, wherein the refrigerant comprises liquid selected from one of liquid carbon dioxide, liquid nitrogen, and combinations thereof.

25. The molding system of claim 15, wherein the pressure reducing element comprises a valve with a fixed orifice.

26. The molding system of claim 15, wherein the pressure reducing element comprises a valve with a variable opening.

27. The molding system of claim 15, wherein the pressure reducing element comprises a nozzle valve or a needle valve.

28. The molding system of claim 15, wherein the high heat transfer material comprises a hardened copper alloy having a thermal conductivity at least twice a thermal conductivity of iron.

29. The molding system of claim 15, further comprising a plurality of fluid channels for cooling melt disposed within the mold cavity and a plurality of fluid sources, each of the fluid channels is in fluid communication with at least one of the fluid sources, wherein the number of fluid sources is less than the number of fluid channels.

30. The molding system of claim 15, wherein the at least one of the first mold section and the second mold section comprises a plate, the plate comprising the at least one fluid channel, and a fluid line in fluid communication with the fluid source and the at least one fluid channel.

31. The molding system of claim 30, wherein the at least one fluid line is thermally insulated.

32. The molding system of claim 15, wherein the first mold section comprises a core terminating at a core tip, the mold cavity is in the shape of a preform, and the pressure reducing element is positioned within the core and near the core tip.

33. The molding system of claim 32, wherein a substantial portion of the core comprises high heat transfer material.

34. The molding system of claim 32, wherein the core comprises an upper core portion configured to mold a neck portion of a preform, the upper core portion comprises a first material, and the core tip comprises a second material having a thermal conductivity greater than a thermal conductivity of the first material.

35. The molding system of claim 15, further comprising a neck finish mold positioned between the first mold section and the second mold section, the neck finish mold comprising high heat transfer material.

36. The molding system of claim 15, wherein the molding system is one of an injection molding system, a compression molding system, and a stretch blow molding system.

37. A mold for molding an article, the mold comprising:
a cavity section; and
a core section being configured to mate with the cavity section to form a mold cavity, the core section comprising a core defining an internal surface of the mold cavity, a tube within the core extending from a proximal end of the core to a pressure reducing valve at a distal end of the core, the pressure reducing valve configured to receive fluid from the tube and to deliver at least partially vaporized fluid to a channel within the core, wherein the partially vaporized fluid in the core is at a temperature less than a temperature of the internal surface of the mold cavity when melt fills the mold cavity.

38. The mold of claim 37, further comprising a neck finish mold being configured to mold a neck portion of a preform, the neck finish mold being positioned between the cavity section and the core section and comprising high conductivity material.

39. The mold of claim 37, wherein the channel extends from the proximal end to the distal end of the core and is between the tube and an outer wall of the core.

40. The mold of claim 37, wherein a portion of the core is configured to form a portion of the mold cavity and has a length to diameter ratio greater than about 4.

41. The mold of claim 37, wherein a portion of the core is configured to form a portion of the mold cavity and has a length to diameter ratio greater than about 6.

42. A mold assembly comprising:
a core section;
a cavity section defining a cavity surface configured to mold at least a portion of an article, the cavity section cooperates with the core section to form a space;
a plurality of fluid channels surrounds a portion of the cavity surface, the plurality of fluid channels is positioned within a portion of the cavity section having a high thermal conductivity; and
a valve system being located upstream of the fluid channels, the valve system receives cryogenic fluid at a first temperature and delivers the cryogenic fluid at a second temperature, which is less than the first temperature, to the plurality of fluid channels.

43. The mold assembly of claim 42, wherein the cavity section comprises a first portion and a removable second portion, the valve system comprises an insertable pressure reducing element that is exposed when the second portion is removed from the cavity section.

44. The mold assembly of claim 42, wherein the valve system comprises a plurality of expansion valves, and each expansion valve is in fluid communication with at least one fluid channel.

45. The mold assembly of claim 42, wherein the plurality of fluid channels comprises fluid channels that are in fluid communication with each other.

46. The mold assembly of claim 45, further comprising a plurality of fluid passages, each fluid passage extends between a pair of the fluid channels.

47. The mold assembly of claim 42, further comprising a portion of the cavity section positioned between the plurality of fluid channels and the cavity surface, wherein the portion of the cavity section is formed of high heat transfer material.

48. A molding system, comprising:
a first mold section and a second mold section movable between an open position and a closed position, a mold cavity being defined between the first mold section and the second mold section when the first mold section and the second mold section occupy the closed position, the mold cavity having a shape of a preform; and
a neck finish mold interposed between the first mold section and the second mold section, the neck finish mold having a neck molding surface configured to mold a portion of melt disposed in the mold cavity, the neck finish mold comprising high heat transfer material and a temperature control element configured to selectively control the temperature of the neck molding surface, wherein the high heat transfer material is positioned between the neck molding surface and the temperature control element.

49. The molding system of claim 48, wherein a substantial portion of the neck finish mold extending between the temperature control element and the neck molding surface comprises high heat transfer material.

50. The molding system of claim 49, wherein the high heat transfer material forms the neck molding surface, the neck molding surface is dimensioned so as to form threads of a preform.

51. The molding system of claim 49, wherein a portion of the neck finish mold extends between the temperature control element and the neck molding surface, wherein high heat transfer material forms at least 80% by weight of the portion of the neck finish mold.

52. The molding system of claim 51, wherein high heat transfer material forms at least 90% by weight of the portion of the neck finish mold.

53. The molding system of claim 48, wherein the temperature control element comprises a plurality of cooling channels disposed within the high heat transfer material.

54. The molding system of claim 48, wherein the neck finish mold is a split ring that is movable between a first position for molding a portion of a preform and a second position for demolding the preform.

* * * * *